United States Patent [19]
Kaye et al.

[11] Patent Number: 5,623,609
[45] Date of Patent: Apr. 22, 1997

[54] COMPUTER SYSTEM AND COMPUTER-IMPLEMENTED PROCESS FOR PHONOLOGY-BASED AUTOMATIC SPEECH RECOGNITION

[75] Inventors: Jonathan Kaye, London; Geoffrey Williams, Chelmsford Essex, both of United Kingdom

[73] Assignee: HAL Trust, L.L.C., Radnor, Pa.

[21] Appl. No.: 300,929

[22] Filed: Sep. 2, 1994

Related U.S. Application Data

[63] Continuation of Ser. No. 76,734, Jun. 14, 1993, abandoned.

[30] Foreign Application Priority Data

Apr. 11, 1994 [GB] United Kingdom ............... 94/07108

[51] Int. Cl.$^6$ ............................... G10L 5/06; G10L 9/00
[52] U.S. Cl. ....................... 395/263; 395/2.64; 395/2.4
[58] Field of Search .......................... 395/2, 2.63, 2.71, 395/2.28, 2.14, 2.58, 2.59, 2.64

[56] References Cited

U.S. PATENT DOCUMENTS

| | | | |
|---|---|---|---|
| 3,679,830 | 7/1972 | Uffelman et al. | 179/1 SA |
| 4,087,632 | 5/1978 | Hafer | 179/1 SD |
| 4,670,851 | 6/1987 | Murakami et al. | 364/518 |
| 4,783,804 | 11/1988 | Juang et al. | 381/43 |
| 4,811,399 | 3/1989 | Landell et al. | 381/43 |
| 4,813,076 | 3/1989 | Miller | 381/43 |
| 4,815,134 | 3/1989 | Picone et al. | 381/31 |
| 4,820,059 | 4/1989 | Miller et al. | 381/43 |
| 4,868,867 | 9/1989 | Davidson et al. | 381/36 |
| 4,885,791 | 12/1989 | Fujii et al. | 381/43 |
| 4,896,358 | 1/1990 | Bahler et al. | 381/43 |
| 4,899,385 | 2/1990 | Ketchum et al. | 381/36 |
| 4,910,781 | 3/1990 | Ketchum et al. | 381/36 |
| 4,933,973 | 6/1990 | Porter | 381/43 |
| 4,965,580 | 10/1990 | Tasaki et al. | 341/200 |
| 5,054,085 | 10/1991 | Meisel et al. | 381/43 |
| 5,129,001 | 7/1992 | Bahl et al. | 381/43 |

FOREIGN PATENT DOCUMENTS

| | | | |
|---|---|---|---|
| 0238697 | 9/1987 | European Pat. Off. | G10L 5/06 |
| 0238698 | 9/1987 | European Pat. Off. | G10L 5/06 |
| 2240867 | 8/1990 | United Kingdom | G10L 5/00 |
| WO87/02816 | 5/1987 | WIPO . | |
| WO92/02013 | 2/1992 | WIPO | G10L 5/06 |

OTHER PUBLICATIONS

ISBN 4-88552-072-X, In Japanese with translation, pp. 26-60, 19988.

Kaye et al., "Constituent Structure and Government in Phonology," Phonology, vol. 7, 1990, pp. 193-231.

Eide et al., "A Linguistic Feature Representation of the Speech Waveform," International Conf. on Acoustics, Speech and Signal Processing, vol. 2, Apr. 27, 1993-Apr. 30, 1993, pp. 483-486.

Datta, "Manner-based Labelling of Speech Signal Using Total Energy Profile," EPO Conf. on Speech Comm. and Technology, vol. 2, Sep. 26, 1989, pp. 100-107.

(List continued on next page.)

*Primary Examiner*—Allen R. MacDonald
*Assistant Examiner*—Richemond Dorvil
*Attorney, Agent, or Firm*—Wolf, Greenfield & Sacks, P.C.

[57] ABSTRACT

The present invention is based on the use of linguistic, especially phonological, knowledge to guide the speech recognition process. A speech signal containing an utterance is received and linguistic cues in the speech signal are detected. From these detected linguistic cues, a symbolic representation of the contents of the speech signal is generated. This symbolic representation comprises at least one word division, wherein each word division consists of an onset-rhyme pair and associated phonological elements. These phonological elements are univalent, may appear in all languages and are distinguishable from each other and directly interpretable in the speech signal. A lexicon of predetermined symbolic representations is provided for words in a particular language. A best match to the generated symbolic representation in found in the lexicon, thereby recognizing the spoken word.

16 Claims, 36 Drawing Sheets

OTHER PUBLICATIONS

Giordana et al., "Use of Lexical Constraints in Continuous Speech Understanding," Proceedings of the Int'l Conf. on Systems, Man and Cybernetics, vol. 1, Dec. 29, 1993–Jan. 7, 1984, pp. 319–322.

Weintraub, "The GRASP Sound Separation System," Proceedings of the IEEE Int'l Conf. on Acoustics Speech and Signal Proc., vol. 2, Mar. 19, 1984–Mar. 21, 1984, pp. 18A.6.1–18A–6.4.

D. Touretzky and D. Wheeler, "Exploiting Syllable Structure in a Connectionist Phonology Model," pp. 612–618.

Ken–ichi Iso and T. Watanabe, "Speech Recognition Using Demi–Syllable Neural Prediction Model," pp. 227–233.

B. Dresher and J. Kaye, "A computational learning model for metrical phonology," Elsevier Science Publishers B.V., Cognition, vol. 34, (1990) pp. 137–195.

G. Williams and W. Brockhaus, "Automatic Speech Recognition: A Principle–Based Approach," SOAS Working Papers in Linguistics, vol. 2, pp. 293–313 (1992).

Lyons, J., Introduction to Theoretical Linguistics, (Cambridge: Camb. Univ. Press, 1968, 1991).

J. Kaye, J. Lowenstamm, and J. Vergnaud, "The internal structure of phonological elements: a theory of charm and government," Phonology Yearbook 2, (1985), pp. 305–328.

J. Harris and J. Kaye, "A Tale of Two Cities: London Glottalling and New York City Tapping," The Linguistics Review, vol. 7, pp. 251–274, 1990.

J. Kaye, "'Coda' Licensing," Phonology 7 (1990), pp. 301–330.

M. Randolph, "Syllable–based Constraints on Properties of English Sounds," Sep. 1989, Ph.D. Thesis, Massachusetts Institute of Technology.

Speech Recognition Update, "News and analysis of speech recognition markets, companies, and technology, vol. 2," Mar. 1993, pp. 1–24.

Lyn Frazier, "Structure in auditory word recognition," in Spoken Word Recognition, Frauenfelder et al., eds., congination 25, 1987, pp. 7–187.

F. Jelinek, "Continuous Speech Recognition by Statistical Methods," Proceedings of the IEEE, vol. 64, No. 4, Apr. 1994, pp. 532–556.

L.R. Rabiner, B.H. Juang, S.E. Levinson, and M.M. Sondhi, "Some Properties of Continuous Hidden Markov Model Representations," AT&T Tech. Journal, vol. 64, No. 6, Jul.–Aug. 1985, pp. 1251–1270.

S. Roucos, A. Wilgus, and W. Russell, "A Segment Vocoder Algorithm for Real–Time Implementation," Proceedings of the IEEE, 1987, pp. 1949–1952, 45.7.1–45.7.4.

C. Tsao and R. Gray, "Shape–Gain Matrix Quantizers for LPC Speech," IEEE Transactions on Acoustics, Speech, and Signal Processing, vol. ASSP–34, No. 6, Dec. 1986, pp. 1427–1439.

Y. Shiraki and M. Honda, "LPC Speech Coding Based on Variable–Length Segment Quantization," IEEE Transactions on Acoustics, Speech, and Signal Processing, vol. 36, No. 9, Sep. 1988, pp. 1437–1444.

L. Bahl, P. Brown, P. deSouza and R. Mercer, "Speech Recognition with Continuous–Parameter Hidden Markov Models," IEEE Acoustic Speech and Signal Processing Society, 1988 Int'l Conf., pp. 40–43.

L.R. Rabiner, B.H. Juang, S.E. Levinson, and M.M. Sondhi, "Recognition of Isolated Digits Using Hidden Markov Models with Continuous Mixture Densities," AT&T Technical Journal, vol. 64, No. 6, Jul.–Aug. 1985, pp. 1211–1234.

L.R. Bahl, P.F. Brown, P.V.deSouza, and R.L. Mercer, "A New Algorithm for the Estimation for Hidden Markov Model Parameters," IEEE Acoustics, Speech, and Signal Processing Society, 1988 Int'l Conf. vol. 1, pp. 493–496.

M. Fanty and R. Cole, "Spoken Letter Recognition," pp. 220–226.

J. Aitchison, Words in the Mind—An Introduction to the Mental Lexicon—, Blackwell: Oxford, pp. 120–125, 1987.

S. Blumstein, "Acoustic Invariance in speech production: Evidence from measurements of the spectral characteristics of stop consonants," J. Acoust. Soc. Am. 66(4), Oct. 1979, pp. 1001–1017.

W. Brockhaus, "Colourful Leagues: A Government Phonology Approach to Final Obstruent Devoicing in German," UCL Working Papers In Linguistics, vol. 2, pp. 270–297, 1990.

W. Brockhaus, "Skeleton and supra segmental structure within Government Phonology," (dated 18 Jan. 1993), pp. 1–49.

S. Blumstein, "Perceptual invariance and onset spectra for stop consonants in different vowel environments," J. Acoust. Sco. Am. 67(2), Feb. 1980, pp. 648–661.

C. Browman and L. Goldstein, "Articulatory gestures as phonological units," Phonology 6 (1989), pp. 201–251.

M. Charette, "License to govern," Phonology 7 (1990), pp. 233–253.

M. Charette, "Mongolian and Polish meet Government Licensing," pp. 275–291, SOAS Working Papers in Linguistics, vo., 2, pp. 275–292 (1991/2).

K. Church, "Phonological parsing and lexical retrieval," In Spoken Work Recognition, Congnition 25, 1987, (Frauenfelder et al., eds.).

Altman, Gerry T., ed., Cognitive Models of Speech Processing, (Cambridge, Mass.: MIT Press, 1990), pp. 1–23, 211–235 and 263–280.

J. Harrington, "Acoustic Cues for Automatic Recognition of English Consonants," pp. 69–143.

John Harris, "Segmental complexity and phonological government," Phonology 7 (1990), pp. 255–300.

G. Lindsey and J. Harris, "Phonetic Interpretation in Generative Grammar," UCL Working Papers in Linguistics, vol. 2, pp. 355–369, 1990.

J. Harris and G. Lindsey, "The elements of phonological representation," Mar. 1993, in New Frontiers in Phonology, (Durand and Katamba, eds.) pp. 1–51 (Harlow; Essex: Longman).

J. Harris, "Licensing Inheritance," pp. 359–406, UCL Working Papers in Linguistics, vol. 4, 1992.

C. Hoequist, Jr., "Phonological Rules and Speech Recognition," pp. Hoequist 1 through Hoequist 8, Cambridge Papers in Phonetics and Linguistics, vol. 2, 1986.

R. Jakobson, C. Fant, M. Halle, Preliminaries to Speech Analysis, The MIT Press, Sep. 1976, pp. i–43.

Jonathan Kaye, "Do you believe in magic? the story of s+C sequences," pp. 1–21, SOAS Working Papers in Linguistics, vol. 2: 293–314, 1992.

D. Klatt, "Lexical Representations for Speech Production and Perception," in The Cognitive Representation of Speech (Myers et al, eds.), 1981, pp., 11–31 (North Holland Publishing Co.).

L.R. Rabiner and M.R. Sambur, "An Algorithm for Determining the Endpoints of Isolated Utterances," (Jun. 10, 1974), AT&T Tech. Journal, vol. 54, No. 2, Feb. 1975, pp. 297–315.

J. Rubach, "Final Devoicing and Cyclic Syllabification in German," Linguistic Inquiry, vol. 21, No. 1, Winter 1990, pp. 79–94.

S. Schane, "The fundamentals of particle phonology," Phonology Yearbook 1, pp. 129–155, 1984.

Elisabeth O. Selkirk, "The Syllable," In the Structure of Phonological Representation, vol. 2, Dordecht: Furls, pp. 337–383, 1982.

K. Stevens et al. "The Search for Invariant Acoustic Correlates of Phonetic Features," in P. Eimas and J. Miller, eds. Perspectives on the Study of Speech, (Hillsdale, New Jersey: Lawrence Erlbaum Pubs.), 1981, pp. 1–38.

K. Stevens, "On the quantal nature of speech," Journal of Phonetics, (1989), vol. 17, pp. 3–45.

H. Sussman, "The Representation of Stop Consonants in Three-Dimensional Acoustic Space," Phonetica 1991, vol. 48, pp. 18–31.

I.H. Witten, "Principles of Computer Speech," 1982, New York, Academic Press, pp. 122–149.

Geoffrey Williams, "Automatic speech recognition: a Government-Phonology approach," in Proceedings of the 7th International Phonology Meeting, Krems, Austria.

Moira Yip, "The Obligatory Contour Principle and Phonological Rules: A Loss of Identity," Linguistic Inquiry, vol. 19, No. 1, Winter 1988, pp. 65–100.

Shohei Yoshida, "A government-based analysis of the 'mora' in Japanese," Phonology 7 (1990), pp. 331–351.

Victor W. Zue, "The Use of Speech Knowledge in Automatic Speech Recognition," Proceedings of the IEEE, vol. 73, No. 11, Nov. 1985, pp. 1602–1615.

John McCarthy, "OCP Effects: Gemination and Antigeminatin," Linguistic Inquiry, vol. 17, No. 2, Spring 1986, pp. 207–263.

Rabiner, L. et al., Fundamentals of Speech Recognition, (Prentice Hall, 1993) pp. 45–50.

A Generalized Model for Utilizing Prosodic Information in Continuous Speech Recognition, Hunt, IEEE/Apr. 1994.

250 { one / iti/ ← 252
00:,N1:2066,01:2498,,N1:2066, ← 254
two /ni/
01:6760,,N1:2066,
three /saN/
01:8352,,N1:1025,01:6760,,N1:0,
four /yoN/
01:2050,,N1:3093,01:6760,,N1:0,
four /si/
01:8352,,N1:2066,
five /go/
01:192,,N1:3093,
six /roku/
01:6176,,N1:3093,01:448,,N1:3092,
seven /nana/
01:6760,,N1:1025,01:6760,,N1:1025,
seven /siti/
01:8352,,N1:2066,01:6624,,N1:2066,
eight /hati/
01:8320,,N1:1025,01:6624,,N1:2066,
nine /kyuu/
01:448,,N1:2050-3092,00:,N1:3092,
ten /juu/
01:2754,,N1:2050-3092,00:,N1:3092,  } 248

COMPUTER SYSTEM AND COMPUTER-IMPLEMENTED PROCESS FOR PHONOLOGY-BASED AUTOMATIC SPEECH RECOGNITION

CROSS-REFERENCE TO RELATED APPLICATIONS

This application claims the benefit under 35 U.S.C. §120, and is a continuing application, of U.S. patent application Ser. No. 08/076,734, filed Jun. 14, 1993 now abandoned. This application is also related to U.K. patent application 9407018.1, filed Apr. 11, 1994, which is hereby incorporated by reference.

CLAIM TO COPYRIGHT OWNERSHIP

Portions of the disclosure of this patent document and the accompanying appendix contain material which is subject to copyright protection and for which copyright protection is expressly claimed. The copyright owner has no objection to the facsimile reproduction, e.g., photocopy, by anyone of the patent document at it appears in files of any Patent Office, but otherwise reserves all copyright rights whatsoever, for example, including but not restricted to the right to load the software on a computer system.

FIELD OF THE INVENTION

The present invention is related to machine recognition of speech and spoken words. It is more particularly related to speech and word recognition based on a linguistic theory known as government phonology.

BACKGROUND OF THE INVENTION

"Automatic speech recognition" signifies machine conversion of sounds, created by or simulating natural human speech, into a machine-recognizable representation indicative of a word or words actually spoken. Typically, sounds are converted to a speech signal, such as an analog or digital electrical signal, which the machine then processes. Automatic speech recognition involves recognizing a spoken word as such, not determining the meaning of the word. Automatic speech recognition may be either continuous or performed on isolated words. (Determining the meaning of a spoken word is a problem of speech understanding and may require, for example, that the contextual use of the word be analyzed).

To date, numerous machines and processes for automatic speech recognition have been proposed. Most currently commercially-available automatic speech recognition systems include computer programs which are used to process intensively a speech signal using statistical models of the speech signals generated from different spoken words. This technique is generally known as the hidden Markov model (HMM) method and is generally computationally intensive. Each word which can be recognized by the machine typically must have a hidden Markov model derived for it based on the spectrum of one or more acoustic images of the word. Also, all of the HMMs for all of the words which the system is capable of recognizing typically must be derived together. Thus, adding a word to the set of words recognizable by the machine typically involves restructuring the whole lexicon. Some of these systems perform a type of segmentation of the speech signal to identify "syllables," which are then processed using HMMs.

Another kind of automatic speech recognition system uses phoneme matrices. A phoneme matrix indicates mouth position over a period of time, according to binary, or bivalent, articulatory variables representing a vocal tract configuration used to create a sound. For example, there are about twenty binary features, recognized by a theory known as generative phonology, from which a phoneme matrix is constructed. A segmented phonetic sequence is extracted from a speech signal, and converted by a set of rules to obtain a phoneme matrix. The phoneme matrix is then compared to stored sample phoneme matrices for known words using time-warping techniques. This approach has been generally discredited because the rules used to generate phoneme matrices are generally arbitrary and are not likely to be adequate models of how humans process speech.

Another kind of automatic speech recognition system is template-based. Each word has a template which represents the spectral evolution of the word over time. Such a system also uses time-warping techniques, but uses them to match the spectral change of an input speech signal with the stored templates.

SUMMARY OF THE INVENTION

The most significant drawback of previous speech recognition systems is that either (1) they do not use any knowledge of linguistics or phonology to assist in the processing of the speech signal, or (2) they are based on a theory which renders the speech recognition problem extremely difficult. For example, the statistical and template-based approaches perform pattern matching at the speech signal level. That is, a speech signal is matched directly with a representative speech signal or statistical model of a speech signal. In these systems, it is therefore more difficult to perform speaker-independent recognition because the effects of speaker variation can be found in speech signals used in the lexicon.

The phoneme-based approaches, while attempting to use some linguistic knowledge, are based upon a generally discredited theory of phonology. It has been proven that the problems of extracting phonetic segments, and of determining and applying the rules by which a phonetic representation can be generated from these segments, are intractable. The rules which convert these segments to a phonemic representation are also language specific. Also, this kind of system relies on articulatory information for speech processing whereas a human must process speech using acoustic information.

In this invention, by applying and using knowledge of phonology and linguistics to guide the speech recognition process, an automatic speech recognition system has been developed that is less complex and less computationally intensive than prior systems. An appropriate theory of phonology on which the invention can be based is government phonology. Some aspects of this theory are common with other theories of phonology which may also provide suitable bases for speech recognition systems. Because of the universality of this linguistic knowledge, a speech recognition system can be developed which is speaker-independent and is useful for multiple languages.

The linguistic knowledge used in this invention includes the fact that the speech signal includes acoustic cues to significant linguistic information. These cues may be grouped together so as to define primitive phonological elements which are univalent. The elements are univalent because they are either present or not in a representation (and the speech signal); there is no definition of the absence of a phonological element. The use of these elements is based on the belief that speech processing uses the acoustic signal and not articulatory variables.

This invention also utilizes the fact that each word includes one or more structural divisions each of which consist of two constituents, an onset; and a rhyme. According to government phonology, the structure of a word is constant, and is not affected by phonological processes. Therefore, each acoustically distinct word has only one unique phonological representation consisting of sequences of onset rhyme pairs, wherein each of the onset and rhyme constituents is associated with one or more phonological elements.

Thus, with this system, the creation of lexical entries can be performed using textual or keyboard input, rather than by recording of actual speech. Also, the lexical representations are independent of speaker variation. Effects of speaker variation can be eliminated in the detection of the acoustic cues and in the matching process. Also, a word can be added to the lexicon without any need for adjusting the current lexicon. There are numerous other advantages of this system, as will be apparent from the following detailed description.

Accordingly, one aspect of the invention is a machine-implemented process for recognition of a spoken word in an utterance. This process involves receiving an speech signal containing an utterance and detecting presence of linguistic cues in the speech signal. From detection of linguistic cues, a symbolic representation is generated. The symbolic representation comprises at least one word division, each word division consisting of an onset-rhyme pair and associated phonological elements. A best match to the symbolic representation is identified in a lexicon of symbolic representations of words, thereby recognizing the spoken word. In one embodiment, the step of generating involves detecting presence of univalent phonological elements in the speech signal according to detected linguistic cues, and associating each detected univalent phonological element with one of an onset or a rhyme constituent. In another embodiment, the step of detecting involves detecting voiced and voiceless regions in the speech signal, detecting sonorant and nucleus regions in the voiced regions of the speech signal, and detecting presence of phonological elements within each of any silence, fricative, sonorant and nucleus regions detected, and identifying each of the detected regions as defining either an onset or a rhyme.

Another aspect of the invention an apparatus for recognition of a spoken word in an utterance. This apparatus includes 1) means for receiving an speech signal containing an utterance; 2) means for detecting presence of linguistic cues in the speech signal; 3) means for generating, from detection of linguistic cues, a symbolic representation comprising at least one word division, each word division consisting of an onset-rhyme pair and associated phonological elements; and 4) means for identifying a best match to the symbolic representation in a lexicon of symbolic representations of words, thereby recognizing the spoken word.

In one embodiment, the means for generating a symbolic representation comprises means for detecting presence of univalent phonological elements in the speech signal according to detected linguistic cues, and means for associating each detected univalent phonological element with one of an onset or a rhyme constituent. In another embodiment, the means for detecting comprises means for detecting voiced and voiceless regions in the speech signal, means detecting sonorant and nucleus regions in the voiced regions of the speech signal, and means detecting presence of phonological elements within each of any silence, fricative, sonorant and nucleus regions detected, and identifying each of the detected regions as defining either an onset or a rhyme.

Another aspect of the invention is an apparatus for recognition of a spoken word in an utterance. This apparatus includes a univalent element and structure detector having an input for receiving a speech signal and an output providing a symbolic representation of a word detected in the speech signal, wherein the symbolic representation comprises at least one word division, each word division consisting of an onset-rhyme pair and associated phonological elements. A lexicon of predetermined symbolic representations of words is also provided. A lexical matching system having a first input for receiving the symbolic representation from the output of the univalent element and structure detector, a second input for receiving predetermined symbolic representations from the lexicon and an output, provides an indication of the predetermined symbolic representation which best matches the symbolic representation output by the univalent element and structure detector. In one embodiment, the univalent element and structure detector includes a phonetic classifier and segmenter having an input for receiving features of the speech signal and an output, which provides a string of tokens indicative of presence of univalent phonological elements in the speech signal according to detected linguistic cues. A word parser has an input for receiving the string of tokens from the phonetic classifier and segmenter and associates each detected univalent phonological element with one of an onset or a rhyme constituent so as to provide the symbolic representation.

Another aspect of the invention is an automatic speech recognition system comprising:

means for detecting presence of at least one of a plurality of uniquely identifiable univalent phonological elements from a speech signal;

means for associating each detected phonological element with either an onset or a rhyme; and means for comparing a combination of the detected phonological elements and associated onset and rhymes to a lexicon of possible combinations of such onset and rhyme divisions and phonological elements and for selecting from the lexicon a possible acceptable representation of a word most similar to the detected onset and rhyme divisions and phonological elements.

Another aspect of the invention is a method for automatic speech recognition, in which presence of a plurality of uniquely identifiable phonological elements is detected in a speech signal. The detected phonological elements are associated with either an onset or a rhyme. The combination of the onset and rhyme divisions and the associated detected phonological elements are compared to a lexicon of possible combinations of such onset and rhyme divisions and phonological elements from which is selected a possible acceptable representation of a word most similar to the detected onset and rhyme divisions and phonological elements.

BRIEF DESCRIPTION OF THE DRAWINGS

In the drawing,

FIG. 31 illustrates a sample lexicon for the numbers 1 through 10 in Japanese;

DETAILED DESCRIPTION

Figure 1:
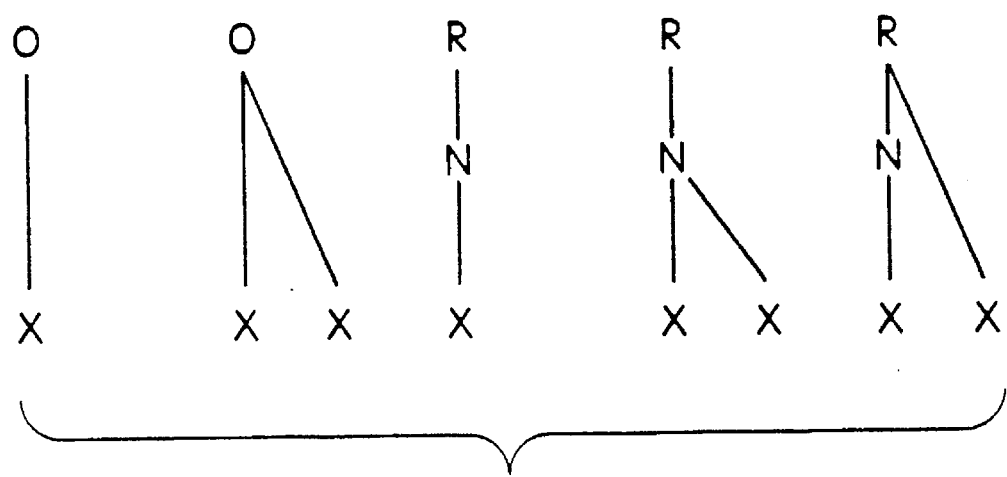
FIG. 1 is a representation of the possible structural divisions, or constituents, of any language.

The present invention will be more completely understood through the following detailed description which should be read in conjunction with the attached drawing in which similar reference numbers indicate similar structures. Throughout this document some terms of phonology are used. Where not defined herein, the definitions of these terms are intended to be the same as found in *Introduction to Theoretical Linguistics*, by J. Lyons, Cambridge University Press, 1969. This and all other references referred to herein are hereby expressly incorporated by reference.

One problem to be solved by any speech recognition system, if it is to be speaker independent, is eliminating effects of variation between different speakers on acoustic properties of a spoken word, in both time and frequency. Such variation is due to, among other things, regional accent, sex, age, pitch of voice, emotional state, and speaking rate. Another problem is distinguishing speech from background noise.

Speaker variation and noise are nonlinguistic phenomena which humans, although sensitive to their presence, can adequately ignore or compensate for so that communication with previously unknown speakers presents little difficulty. A human can compensate for variation and noise and perceive the intended word correctly most of the time. Given that recognition errors made by humans are less frequent when words are spoken in the context of a sentence, it seems reasonable to assume that corrections are based on higher-level, non-acoustic information.

A theory of phonology called government phonology is likely to be a suitable model of how a human processes speech using higher-level information and has been used as a basis for this invention. Accordingly, the invention will be better understood given the following brief description of major concepts in this theory.

A better understanding of this theory may also be obtained from publications discussing this theory, of which the following are exemplary:

"The Internal Structure of Phonological Elements: A Theory of Charm and Government", by Jonathan Kaye, Jean Löwenstamm and J. R. Vergnaud in *Phonology Yearbook* 2, 1985, pp. 305–328. (Kaye et al., 1985).

"Constituent Structure and Government in Phonology," *Phonology*, by Jonathan Kaye et al., Vol. 7, 1990, pp. 193–231. (Kaye et al., 1990).

"Coda Licensing," by Jonathan Kaye in *Phonology*, Vol 7, 1990, pp. 301–330. (Kaye 1990).

"A Computational Learning Model for Metrical Phonology" by B. Elan Dresher and Jonathan Kaye, *Cognition* Vol. 34, 1990, pp. 137–195. (Dresher et al., 1990).

"Derivations and Interfaces," by Jonathan Kaye, in *SOAS Working Papers in Linguistics and Phonetics*, Vol. 3, 1993, pages 90–126. (Kaye, 1993).

A. Theoretical Phonological Basis and Definitions

In general, there are acoustic cues in any speech signal which are indicative of significant linguistic and especially phonological information. These cues are found in speech in all human languages. In government phonology, these cues are related to the univalent atomic units of segmental representation, known as phonological elements, in such a way that one or more cues relate uniquely to a single element.

The advantage of this relationship between acoustic cues and phonological elements is that it allows a relatively direct mapping between linguistic units and their manifestation in the speech signal. This theory suggests that there are a small number, e.g., less than 15 of these univalent phonological elements used in all spoken human natural languages.

"Univalent" signifies that the phonological element is either present or not in a speech signal. This is in contrast to some other phonological theories, such as those involving phonemes, which suggest that certain features (or articulatory variables) are always present and take one of two states. In other words, univalent phonological elements are different from binary articulatory variables in that there is no definition of the absence of a phonological element.

Accordingly, a phonological element is a univalent universal phonological property, the presence of which can be detected using one or more distinct cues in a context-free manner. That is, a cue or group of cues indicates the presence of a phonological element independently of the context in which it is found. Also, these phonological properties are not language specific.

Examples of phonological elements and associated acoustic signatures which have been suggested by government phonology so far are listed in Table 1. This association of acoustic signatures with phonological elements is only an example of those currently suggested by government phonology. It is possible that other groupings may exist.

TABLE 1

| Element | Acoustic signature |
|---|---|
| ? | Abrupt drop in energy (in range 0.5 kHz–2.0 kHz) for a minimum duration of 20 ms |
| h | Aperiodic energy characterized by, for example, a high zero-crossing rate |
| A | 'Mass': high value of 1st formant frequency (F1), convergent with 2nd formant frequency (F2); broad distribution in energy between 100 Hz and 2 kHz |
| I | 'Dip': convergence of F2 and 3rd formant frequency (F3) at about 2.5 kHz |
| U | 'Rump': low F2, convergent with F1; Diffuse-falling burst spectrum; narrow band at low frequency with a rapid fall in the frequency domain |
| v | Neutral spectrum; compact |
| R | Diffuse, rising burst spectrum |
| N | Similar to L |
| H | Raised fundamental frequency ($f_o$); additionally, in non-nuclear positions, F1 cutback in transition to following vowel |
| L | Lowered $f_o$; additionally, in non-nuclear positions, rapid rise in frequency of F1 at onset of following vowel |

Due to similarities, some of these phonological elements may possibly be combined theoretically (conflated) as one, such as h and H or N and L. That is, they may actually be one phonological element manifested in two different ways.

Since some of these phonological elements are present both in vowels and consonants, they cannot simply be discussed under these two categories. For example, although elements U and I are commonly found in vowels, they are also often present in consonants and are related to what is commonly called the place of articulation of the consonant. Phonological elements ? and h are commonly found in consonants and are related to what is commonly called the manner of articulation of the consonant. It should be understood that, in government phonology, there is no true definition of a vowel or consonant.

Each univalent phonological element has a unique identifiable acoustic signature as well as an articulatory representation. Since a phonological element is also a cognitive object associated to some sound pattern rather than a set of articulatory variables associated to some vocal tract configuration, a closer relationship is expected to exist between a phonological element and its acoustic properties than between a phonological element and its articulatory properties. This relationship reflects the primacy of sound patterns over vocal-tract configurations in speech processing. The use of articulatory properties in connection with the invention to describe phonological elements is really only a convenience to assist those not familiar with the theory in government phonology. Table 2 lists the phonological elements presently suggested by the theory of government phonology along with their associated sounds and salient articulatory features.

TABLE 2

| Element | Sound | Salient Feature |
|---|---|---|
| A | roughly "a" as in father: | non-high |
| I | roughly "i" as in hit | front/palatal |
| U | roughly "oo" as in book | labial/round |
| N | roughly "n" as in button; | nasal |
| R | roughly "tt" in American English pretty; | coronal |
| h | "h" as in horse; | noise |
| ? | glottal catch as in "uh-oh" or Cockney "pretty" | occluded |
| H | high tone as in tone languages or "tense/fortis" stops, cf. Korean p' | stiff vocal cords |
| L | low tone as in tone languages or truly "voiced" stops as in French b (not English b) | slack vocal cords |
| v | cold vowel | none |

A phonological element is pronounceable in isolation and can appear in a speech signal by itself. Also, two or more phonological elements may be combined to form a phonological expression. A phonological expression is defined as the combination of one or more phonological elements, called "operators," with at most one other phonological element, called a "head" element. The combination of phonological elements into an expression can be represented by the following equation:

$$R,?,h.U \qquad (1)$$

The head appears to the right of the "." The phonological elements combined in an expression are all manifested; however those which are operators appear to be dependent upon, or dominated by, the head element in the speech signal. Generally speaking, the head element is more predominant in the speech signal.

As a universal principle, i.e., for all languages, all tense vowels are generally full-headed, while lax vowels are generally empty-headed. Thus, the vowel i as in "heat" may be represented by the phonological expression (_.I), using the convention of placing the head element on the right of the operator. The lax vowel in "hit" may be then (I._), i.e., an empty-headed phonological expression containing the phonological element I as an operator.

There are also language-specific conditions, or licensing constraints, which limit the combinations of phonological elements in phonological expressions. In English for instance the following licensing constraints apply: non-branching nuclei (a concept defined below) are headless, and the U and I elements cannot combine.

Phonological expressions or elements constituting any word are grouped into structural divisions of the word, called constituents, of which there are three types: the onset (O), the nucleus (N) and the rhyme (R), where a rhyme necessarily contains a nucleus. A well-formed phonological representation of a word thus consists of a sequence of O-R pairs, so that the right-most position within a given domain (i.e., the last position to occur in time) is always a nucleus. ("Left" refers to the first to occur in time and "right" refers to the last to occur in time.) Each constituent (onset, rhyme or nucleus) may contain up to two skeletal positions, i.e., may branch. All possible structures of constituents are represented by the illustration of FIG. 1, where O=onset, N=nucleus, and R=rhyme. These structures are, in order from left to right in FIG. 1, the non-branching onset, the branching onset, the non-branching nucleus (in a non-branching rhyme), the branching nucleus, and the branching rhyme.

Each skeletal position is associated with a phonological expression, thus defining a phonological segment. A skeletal position in an onset is referred to as an onset position; in a nucleus it is referred to as a nuclear position. The right branch of the branching rhyme is also called the "Coda position." One consequence of the foregoing constraints is that a branching nucleus followed by a coda segment is disallowed; a phonological expression following a branching nucleus must be associated with the following onset-rhyme pair, normally with the following onset.

A universal principle known as "Coda Licensing" prevents a phonological expression from being associated with a coda position unless it is followed by an onset position which is associated to a phonological expression with appropriate properties. (This allows effects of the "Maximal Onset Principle" to be derived in a principled way rather than by stipulation, as in many other phonological theories.)

Because constituents may branch, the constituents in languages may vary only with respect to three binary parameters. In other words, setting three parameters suffices to characterize the possible constituents that may be found in any language. These parameters are shown in Table 3.

TABLE 3

| Parameter | Possible Values |
| --- | --- |
| 1. Branching Onset | yes/no |
| 2. Branching Nucleus | yes/no |
| 3. Branching Rhyme | yes/no |

The parameters for a few languages are shown in Table 4 (the column numbers refer to the row numbers of the parameters above in Table 3). These parameters have been determined empirically by phonological analysis.

TABLE 4

| LANGUAGE | 1 | 2 | 3 |
| --- | --- | --- | --- |
| English | yes | yes | yes |
| German | yes | yes | yes |
| Japanese | no | no | no |
| French | yes | no | yes |
| Arabic | no | yes | yes |

TABLE 4-continued

| LANGUAGE | 1 | 2 | 3 |
| --- | --- | --- | --- |
| Turkish | no | no | yes |
| Korean | no | no | no |

A phonological representation of a word in government phonology thus includes indications of (1) the constituents (O, N and R) (2) skeletal positions (the x's in FIG. 1) and (3) phonological expressions associated with the skeletal positions. Therefore, the lexical representation of a word from a phonological point of view (i.e., as a human mind may "store" a representation of a word) is its constituent structure plus a list of the phonological elements which are associated with each skeletal position. There may be a one-many or many-one relation between any of these levels. The structures above, according to government phonology, exhaust the possibilities for all known human languages of the world.

Government phonology allows for onset and nuclear positions to be lexically empty, in which case they contain only the cold vowel as a null element. An onset position may or may not dominate a skeletal position, but a nuclear position always dominates a skeletal position. These empty positions, in particular empty nuclear positions, are subject to strict licensing restrictions defined by what is known as the Empty Category Principle. (Licensing deals with whether a vowel is pronounced or silent. See Kaye et al. 1990). Domain-final empty nuclear positions represent a special case; they can be licensed parametrically by the language. English and German, for example, license domain-final empty nuclear positions, while Japanese does not. A licensed empty nuclear position is not realized phonetically; if it is unlicensed, it is pronounced in most languages as the cold vowel, i.e., a high back unrounded vowel. This explains why English and German have word-final consonants; the "final" consonant is followed by a licensed empty nucleus, which is, therefore, not audible. The phonological mechanism by which word-internal empty nuclear positions are licensed will not concern us here.

Permitted sequences of branching constituents are determined by the properties of the phonological segments contained within these constituents. The relationships into which adjacent skeletal positions enter are called governing relations. Certain phonological segments have governing properties and may be associated to governing skeletal positions; they are known as governors. Other phonological segments are governable and associate to governed positions; they are referred to as governees. From these governing relations one can derive the phonotactic constraints of natural languages, i.e., which define the well-formed sequences of phonological segments. Therefore, these constraints are derived in a principled way, in contrast to some other theories in which these constraints are arbitrary language-specific statements.

Phonological representations are furthermore subject to the Phonological Projection Principle, similar to the projection principle of government and binding theory (a dominant theory of syntax that deals with the relationships of adjacent objects) as described in Noam Chomsky's 1981 *Lectures on Government and Binding* (Dordrecht: Foris). The projection principle as applied to phonology states that the constituent structure of a phonological string is not affected by phonological processes. Relationships between skeletal positions are fixed iexically and cannot be changed. In practice, this means that constituent structure and governing relations are constant throughout a phonological derivation. That is, there is nothing corresponding to the notions of deletion, epenthesis or resyllabification commonly found in other phonological theories (e.g., lexical phonology). Rather, during a phonological derivation, while some portions of the phonological segments in a word may be lost, or a phonological segment may gain additional material through phonological events such as spreading, the constituent structure of the word as listed in the lexicon is preserved. A more detailed discussion of derivation as used in government phonology is found in Kaye, 1993. One consequence of the projection principle and derivations is that empty skeletal positions may occur in surface forms, subject to the above licensing restrictions.

The constancy of the constituent structure of words has important consequences in speech recognition. First, words are always comprised of one or more structural divisions, each consisting of an onset followed by a rhyme, whatever the apparent clusters of phonological segments in the speech signal seem to indicate. Thus, there is no need to store multiple versions of words which can be realized differently, for example, due to vowel-zero alternations or 'epenthetic' consonants. If an impossible sequence is detected, then a phonological parser may, for example, insert an empty nucleus at the appropriate place, so the correct constituent structure is used in lexical access.

Second, related to the concept of derivation in other phonological theories is the general assumption that the phonological representation of a word is part of the lexical entry for that word in the human psychological lexicon. In addition, in government phonology a phonological representation of a word is also the address or location of the lexical entry for the word. Thus the human lexicon is a form of content addressable or associative memory that responds to a phonological representation identified in a surface form. The psychological lexicon also has a collating sequence based on the phonological representations of its forms. Forms that are phonologically similar are lexically proximate (i.e. found near each other in the lexicon). Phonological similarity is based on, hierarchically, (1) the consonants, (2) the constituent structure, and (3) the vowels. Vowels provide very little information, whereas the consonants form a code. From a speech recognition point of view, consonantal identification and constituent structure are therefore considerably more important to humans than vowel identification.

B. Implementation.

Recognizing a word in a speech signal involves addressing at least three problems (which are neither necessarily distinct nor performed separately): 1) detecting significant information from the speech signal, 2) generating a representation of the word from the significant information detected in the speech signal and 3) searching a lexicon to find the word which best matches the generated representation. A system for addressing these problems using the theory of government phonology will now be discussed in connection with FIG. 2. Not all aspects of this theory have been implemented in this recognition system. For example, the recognition of tonal patterns, common in tone languages such as Chinese and Thai, has not been implemented. Not all of the phonological elements discussed above are expressly detected. Also, only limited principles and licensing constraints are implemented. Nonetheless, suitable recognition over a variety of speakers can be obtained with reasonable accuracy given a limited vocabulary, such as the numbers 1 through 10 in Japanese, English or Korean.

Figure 2:
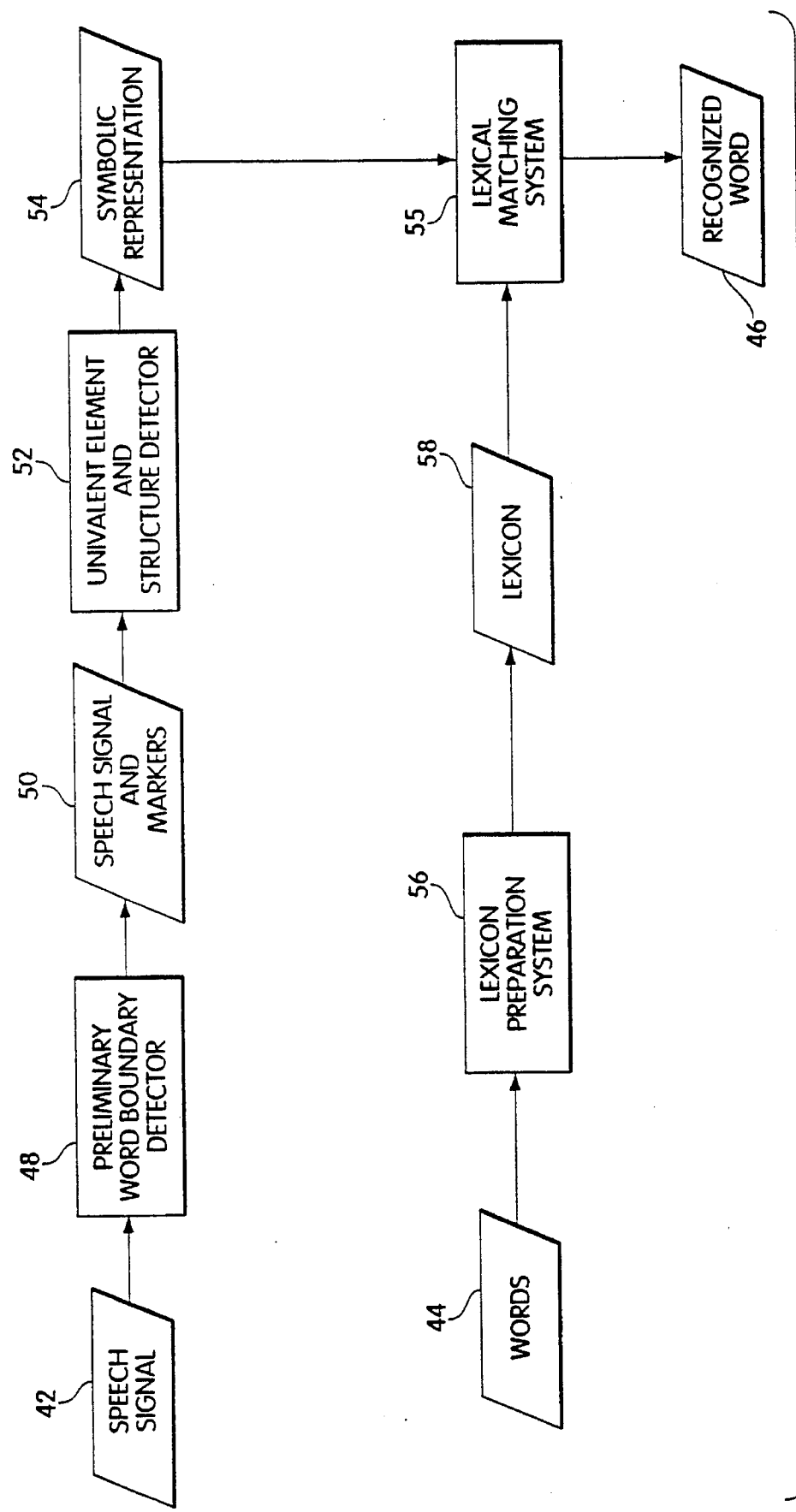
FIG. 2 is a block diagram of a speech recognition system in accordance with the invention.

FIG. 2 is a block diagram illustrating the interconnection of major components of a speech recognition system. This speech recognition system 40 receives a speech signal 42, an indication of words in a language 44, and outputs an indication of a recognized word, as indicated at 46. An optional word boundary detector 48 processes the speech signal to isolate words from silence in the speech signal. The output of the word boundary detector is the speech signal and a pair of markers indicating preliminary boundaries of the words, as indicated at 50. A univalent element and structure detector 52 then analyzes each of the individual words within the speech signal. The output of this detector 52 is a symbolic representation 54 of the structure and phonological elements within each word in the speech signal which a lexical matching system 55 uses to identify the word.

A lexicon preparation system 56 receives indications of words which are input to the system and ensures that the input complies with the theory of government phonology, to provide a lexicon 58 in which each word is represented and accessible according to its constituent structure and phonological elements. Each word in a given language in lexicon 58 should have, according to government phonology, a single representation which is independent of the representations of all other words in the lexicon 58. That is, the addition of one word to the lexicon 58 does not change the representation of other words in the lexicon. The lexical matching system 55 uses the symbolic representation 54 to access the lexicon 58, and outputs the best match of the representation 54 in the lexicon 58 as the recognized word 46.

Each of the word boundary detector 48, univalent element and structure detector 52, lexicon preparation system 56, lexicon 58 and lexical matching system 55, may be implemented using a computer program and a general-purpose, programmable, digital electronic computer. The lexicon preparation system and lexicon 58 may be on a separate computer, perhaps in a remote location, so as to enable generation of a computer-readable database of lexical entries accessible by many speech recognition systems. They may also be implemented using custom, semi-custom, or other specialized electronic circuits, including integrated circuits. Each of these components will be described in more detail below.

Figure 3:
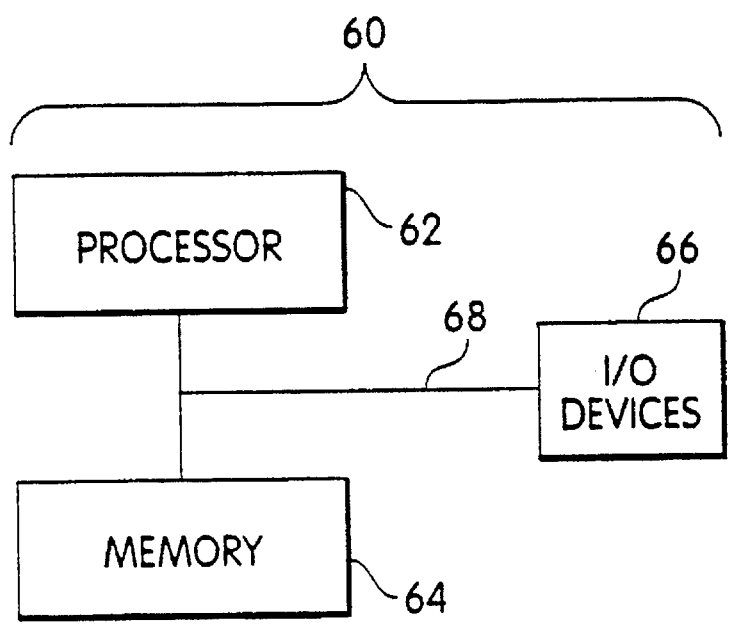
FIG. 3 is a block diagram of a computer system suitable for practicing the present invention.

A suitable computer generally has a structure illustrated as the computer 60 in FIG. 3. The computer 60 includes at least one processor 62 which executes computer programs represented by logic signals stored in memory 64. The processor 62 is generally a commercially-available microprocessor and its supporting control circuitry and the memory 64 is typically a volatile random-access memory, which may be either static or dynamic and is typically one or more integrated circuits. Speech signals are obtained through one of the input/output devices 66, such as a microphone or telephone line connected to the computer through an analog-to-digital converter. A suitable sampling rate is 12 kHz, which provides a bandwidth of 0 Hz to 6 kHz for analysis. A digital source of audio information may also be used. Input/output devices 66 also generally include (1) input devices such as a keyboard, mouse, trackball, touchscreen, touchpad, light pen, etc., for receiving input from a user, (2) non-volatile memory devices, including disk drives, tape or other recordable or readable media for storing data and computer programs, (3) output devices, such as video graphics displays and printers for providing information to a user, and (4) communication devices, including modems, network interfaces and networks to interconnect computer 60 to other computers. This enumeration of input/output devices is merely exemplary and is not intended to be limiting. These elements 62, 64 and 66 are interconnected by a bus 68. The general operation and interaction of these elements in response to a given computer program is well-known.

Although equipment for recording, digitization and acoustic analysis of speech is generally available, and many commercially available systems may be used, the Loughborough Sound Images Speech Workstation 1.1 was used in one embodiment by the inventors. The inventors have also used a SPARCStation IPX workstation computer, available from SUN Microsystems of California, using the SunOS, version 4.1.3, operating system and the XWindows application environment. The ESPS signal processing system (ESPS library), Version 4.1, and the xwaves+ computer program, version 2.1, both available from Entropic Research, Inc., of Washington, D.C., were used to provide signal processing capabilities, in combination with other computer programs written in ANSI-C (for phonological element, constituent and word boundary detection) and Icon (for lexical matching). These computer programs were compiled into machine-readable and executable instructions. The Appendix contains a source code listing for most of the portions of this system. Those which are omitted are nonetheless completely described below. An IBM-PC-compatible computer may also be used, as well as other programmable digital computers.

The modules of this system shown in FIG. 2 will now be described in more detail. The word boundary detector 48 preferably detects word boundaries in a speech signal using a process performed by a function called "find-ep" in the ESPS library, which is a modified version of the process described in "An Algorithm for Determining the End-Points of Isolated Utterances," *Bell System Technical Journal*, Vol. 54, pp. 297–315 by L. R. Rabiner and M. R. Sambur. This process is used because the raw speech signal is not always reliably indicative of the presence or absence of speech because, in some cases, speech sounds are hardly distinguishable from background noise. To avoid problems with these cases, the process of Rabiner and Sambur uses two time-domain representations of the signal, namely the short-time energy level and the zero-crossing rate.

Figure 4:
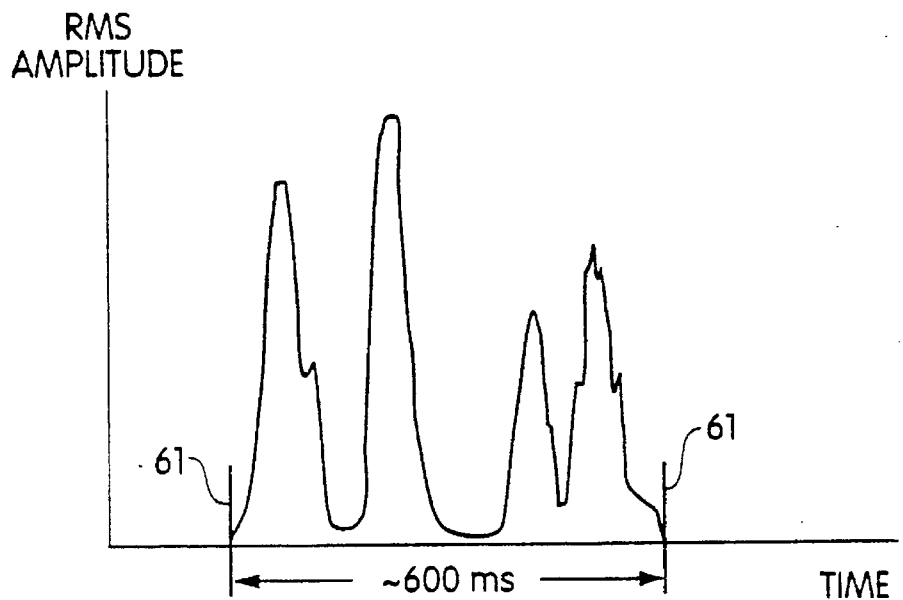
FIG. 4 illustrates a typical plot of the short-time energy level (for the Japanese word "yozakura")

A plot of a typical short-time energy level is shown in FIG. 4 of the Japanese word "yozakura," which means "evening cherry". The ordinate indicates the root-mean-square (RMS) amplitude whereas the abscissa indicates time. This plot was determined at intervals of 10 ms using a rectangular window of length 15 ms, into a signal sampled at 10 kHz. From this plot the location of the utterance can be determined fairly precisely by inspection; it constitutes that part of the curve for which the energy is greater than zero (indicated by the vertical markers). Each peak corresponds to a nucleus. Words containing one of the known problem cases, however, have an energy level very close to the background silence level, so that if short-time energy alone were used as an end-point detector, errors would result in these cases.

Figure 5:
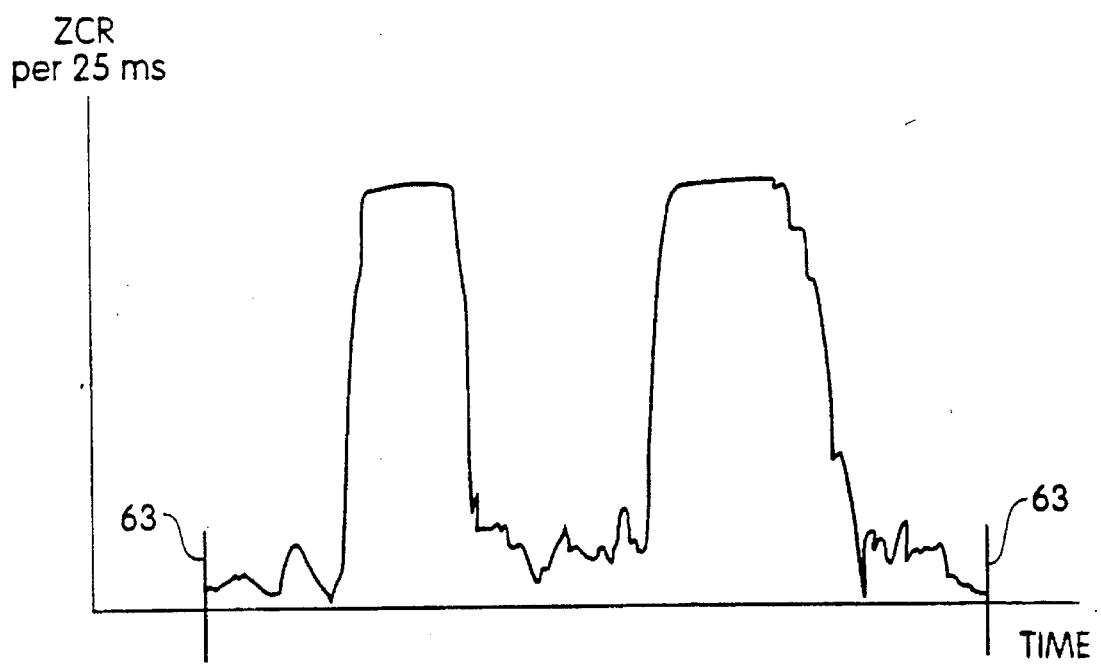
FIG. 5 is a typical zero crossing rate plot (for the English word "six")

The zero-crossing rate (ZCR) is a reliable indicator of the presence of signal activity which does not rely on the energy measurement. The ZCR is defined as the number of times the amplitude of the speech signal crosses the zero level (or some other arbitrary level) in a given time interval, e.g., 25 ms. A typical plot generated by determining the ZCR at 10 ms intervals, is shown in FIG. 5, for the word "six". In this figure the ordinate indicates the ZCR for a 25 ms internal and the abscissa indicates time. Noise bursts and fricatives appear in the signal as high values of zero-crossing rate, while vowels and sonorants typically cause a low, steady value. The utterance in this example appears between the vertical markers 63.

To identify word boundaries, upper and lower threshold values for the short-time energy level and the zero-crossing rate are set. The threshold values may be determined from measurements of the background noise or fixed experimentally. Fixed threshold values are justified where working conditions are fairly stable (same microphone, same environment), but an adaptive mechanism should be used to cope with variable input, such as from a telephone line. Where the ZCR or short-time energy level is above the corresponding threshold, an utterance is assumed to exist.

The output 50 of word boundary detector 48 is a pair of markers which indicate the beginning and end of an utterance in the speech signal. The output 50 may also include the speech signal, but the univalent element and structure detector 52 typically receives the speech signal 42 directly rather than from the word boundary detector.

It should be understood that the word boundary detector 48 does not actually discriminate between speech and non-speech, but merely between the presence versus absence of high sound intensity. It is then assumed that the region of high sound intensity is an utterance. Discrimination between speech and non-speech is a much more difficult problem, as yet unsolved as far as we know. The detection of phonological elements as described herein may be applicable to this problem.

Word boundary detection may also be performed by calculating a spectral difference, for example, by using the spectral difference calculator 84 which is discussed below in connection with FIG. 5. Because the human cognitive system responds to changing, rather than static, input and because the frequency spectrum of speech signals typically changes much more rapidly than that of random background noise, a measure of the spectral rate of change should be useful to detect speech. In certain cases, e.g., where an "f" is the final consonant, a spectral difference function would indicate the change from consonant to silence more reliably than the ZCR function. Thus, the spectral difference can provide a more precise location of word boundaries, especially after using the Rabiner and Sambur algorithm to provide an initial rough estimate. If the spectral difference function is accurate enough to detect word boundaries, use of the Rabiner and Sambur algorithm becomes redundant.

Word boundary detection is also done for purely practical reasons. In the artificial task of isolated word recognition, a speech signal is assumed to contain an utterance somewhere. The whole speech signal is normally mostly silence; the word or words occurring in the signal may be only 20% or 30% of the speech signal. Because it would involve unnecessary computation to do a complete spectral analysis of long regions of silence, the word is first isolated, using quick and computationally cheap signal processing. Human speech recognition probably does not work this way. This technique of word boundary detection probably does not extend to continuous speech where there are typically no word boundaries in the signal; however, it can be used to isolate an utterance from background silence. In a continuous speech recognition, word boundaries would have to be inferred. Detection of constituent boundaries, as discussed below, may be useful in solving that problem as well.

Figure 6:
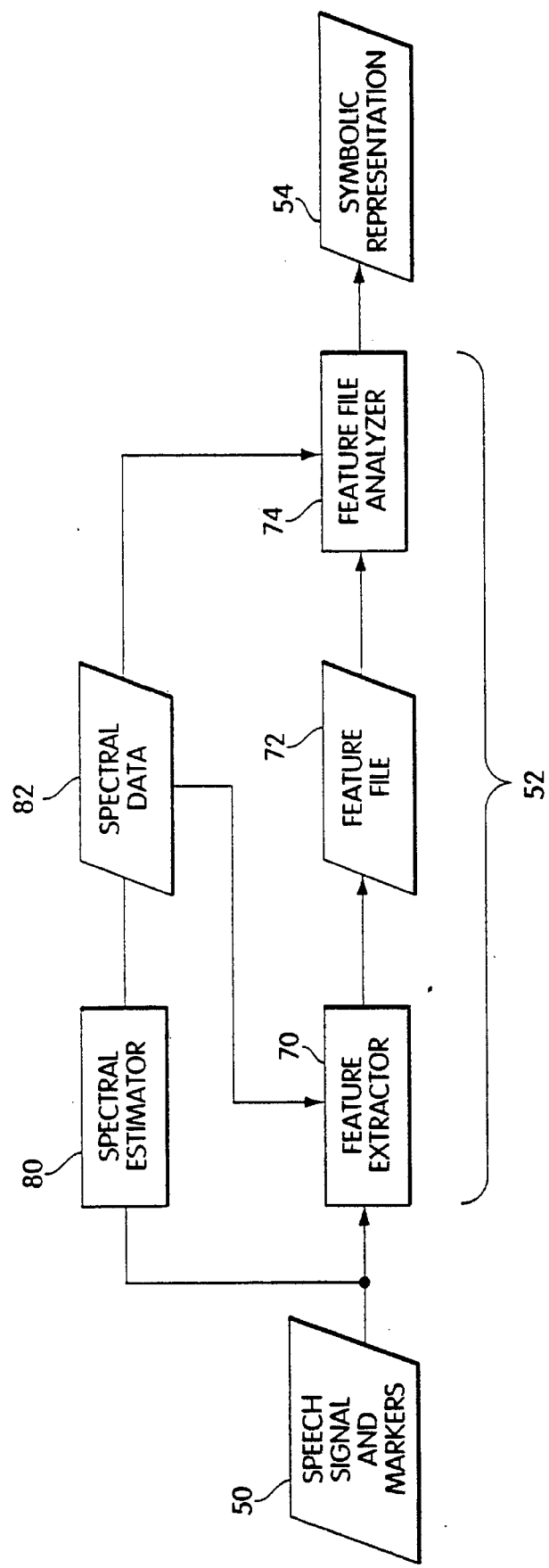
FIG. 6 is a block diagram illustrating the univalent element and structure detector of FIG. 1 in more detail.

The univalent element and structure detector 52, illustrated in more detail in FIG. 6, contains a spectral analyzer 80 which generates a spectral data file 82 from a DC-removed speech signal. A spectral slice is provided at 5 ms intervals using a 20 ms window, having a Hamming shape, into the speech signal. A Kaiser shape window may also be used. Preferably, the ESPS library command "me_sgram -w20 -E0.94-o14 -S5 -dHAMMING" is used, as described above, to generate pre-emphasized spectra using a maximum entropy method. Linear predictive coding (LPC) and fast Fourier transforms (FFT) may also be used. The 0.94 value lies on a scale in which 0 represents no pre-emphasis, whereas 1.0 means a boost of 6 dB per octave.

A feature extractor 70 processes the speech signal and the spectral data file 82 between the markers identified by the word boundary detector 48 to obtain a feature file 72. The feature file contains a description of the speech signal in terms of its signal characteristics such as the fundamental frequency ($f_o$) and the formant frequencies (F1, F2 and F3), the total power, mid-power, zero-crossing rate, the probable voicing, spectral difference computed from LPC spectra, spectral difference computed from formants, and a ratio (k1) of the first two cross-correlation coefficients. These features are provided in the feature file 72 at 10 ms intervals, i.e., at a 10 ms frame rate.

The spectral slices and formant values are produced every 5 ms both for higher sensitivity and also because a pair of adjacent values is needed to provide a single value for a spectral and formant difference. When formant values are stored in the feature file, every alternate value is stored, thus providing them at 10 ms intervals. Phonological element detectors, which are discussed below, may use these alternate values but do not appear to require any more precision than 10 ms intervals. The feature file analyzer 74 analyzes the feature file 72 and the spectral data file 82 to produce the symbolic representation 54.

Figure 7:
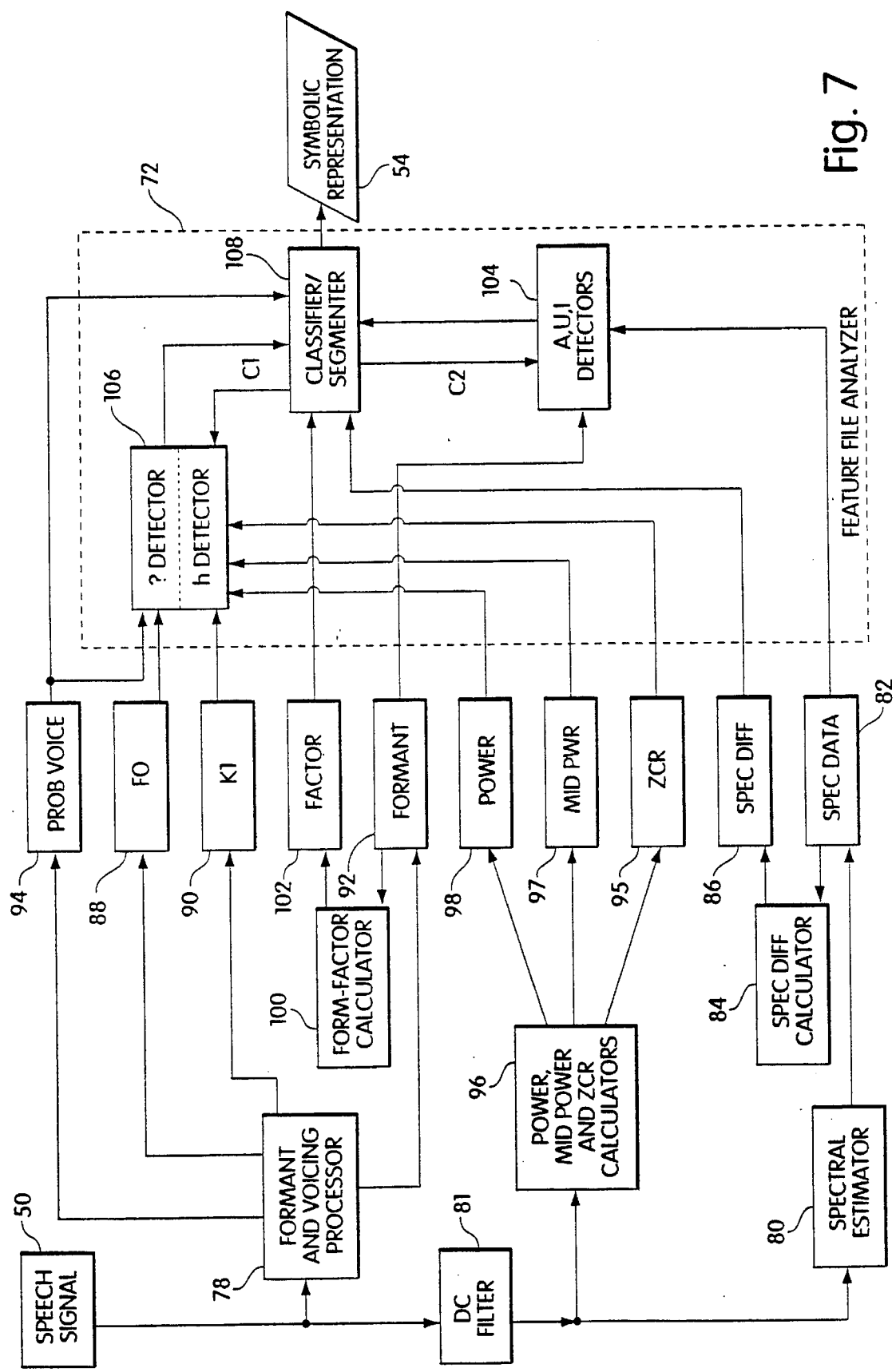
FIG. 7 is a block diagram illustrating the feature extractor and feature analyzer of FIG. 6 in more detail.

The feature extractor 70 and feature file analyzer 72 are illustrated in more detail in FIG. 7. The speech signal and markers 50 are fed to a formant and voicing processor 78; a DC-removed speech signal is applied to a power, mid-power and ZCR calculator 96. The removal of the DC-component of the speech signal 50 is obtained, for example, by a DC filter 81, which may be implemented using the ESPS command "rem_dc".

A spectral difference calculator 84 receives the spectral data file 82 as an input and computes the difference between adjacent spectral slices. This spectral difference is output as indicated by "spec-diff" at 86. This spectral difference calculator 84 plots the Euclidean distance between adjacent (i.e., 5 ms apart) pairs of pre-emphasized spectra from spectral data file 82. The pre-emphasis function has high values in transitions between nuclear and non-nuclear positions, and low values in stable regions, i.e., nuclei. It reflects the belief that attention is drawn to regions of rapid spectral change, i.e., consonants, and that these regions need more precise analysis than the rest of the signal. In human speech processing, the ear is more sensitive to frequency change at lower frequencies, i.e., it has a greater frequency resolution at the lower end of the spectrum, decreasing roughly logarithmically as the frequency increases. Accordingly, a log-weighted spectrum is appropriate for the spectral difference calculation. If a log-weighted spectrum is not used, the spectral difference calculator may behave erratically during fricative or silence regions, rather than providing peaks when there is a change from one type of region to another.

Euclidean distance or squared Euclidean distance may be used as the distance metric; however, they are prone to insignificant phonetic detail, such as sudden changes in vowel amplitude. A log-weighted distance metric may be implemented on a PC and may be better in this respect than the Sun/ESPS version, since in ESPS there is no simple way to generate a log-weighted spectrum. A Mahalanobis metric may also be used. Ideally, the measure of spectral difference should be insensitive to insignificant phonetic detail, but sensitive to relevant linguistic changes.

In prior template-based automatic speech recognition systems, recognition is based on the scores obtained from matching a word to its stored spectral evolution with time. These systems have a similar problem of defining an appropriate spectral difference function. Generally, the use of a proper auditory model appears to provide the best results. Such models are described in "A Joint Synchrony/Mean-Rate Model of Auditory Speech Processing," by S. Seneff, *Journal of Phonetics*, Vol. 16, No. 1: pp. 55–76, 1988, and are used in the "LUTEAR Model" available as a software library from Loughborough University of Technology, in Loughborough, United Kingdom. Whole papers in the field of automatic speech recognition are devoted to discussing this problem of selecting a good measure of spectral difference. See, for example, Chapter 14 of *Invariance and Variability in Speech Processes*, edited by Perkell and Klatt, (Lawrence Erlbaum Assoc.: Hillsdale, N.J. 1986). This work may be useful in identifying other suitable spectral distance metrics for use with this invention.

The formant and voicing processor 78 computes (1) the voicing probability ("prob voice"), which is a value within the range of zero to one as indicated at 94; (2) the fundamental frequency ("F0"), as indicated at 88; (3) the ratio ("k1") of the first two cross-correlation coefficients of the speech signal as indicated at 90; and (4) the first, second and third formant frequencies (F1, F2 and F3) as indicated at 92. The formant and voicing processor 78 may be implemented using the ESPS function "formant". Pre-emphasis is preferably used by using the ESPS command "formant -p.95 -i.005 -f12000 -w.025 -W1 -o14". The formants should be calculated using a 25 ms Hamming window at 5 ms intervals.

The formant frequencies 92 are fed to a formant factor calculator 100 which outputs a formant-derived spectral difference measure indicated as "factor" 102. The calculator 100 determines a spectral difference based on formants of adjacent 5 ms time periods, using the following formula:

$$sqrt\left(\sum_{n=1}^{n=3} ((F_i n - F_{i+1} n)/F_{i+1} n * 100)^2\right),$$

where $F_i n$ and $F_{i+1} n$ are the formant frequencies of successive frames.

The power, mid-power and ZCR calculator 96 determines the power (or short-time energy level over the whole frequency range), mid-power and zero crossing rate of the DC-removed speech signal using the ESPS function "acf" at 10 ms intervals using a 15 ms Hamming window and no pre-emphasis. The mid-power indicates the power in the frequency range of 1–2.7 kHz. "Power" signifies the short-time energy, or total power, of the signal. ZCR was defined above.

Figure 35:
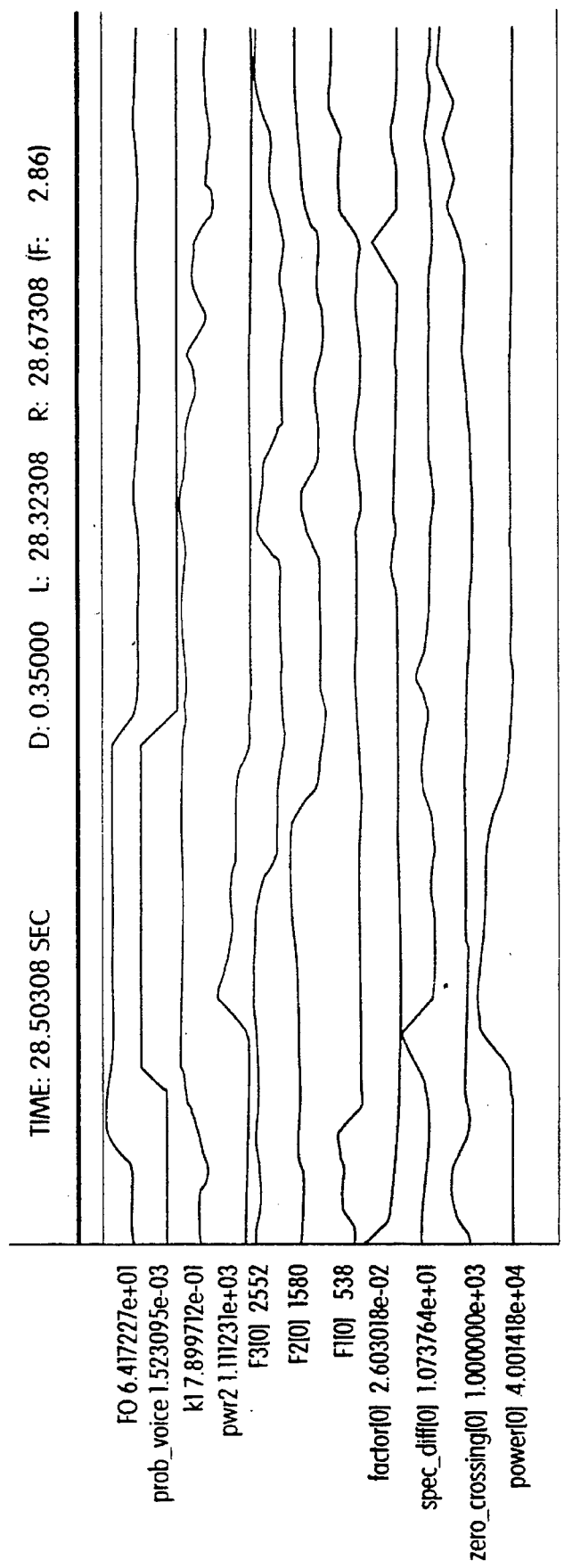
FIG. 35 is a graph illustrating the contents of a sample feature file over a period of time.

A sample feature file for the word "eight", spoken by a female English speaker, is shown in FIG. 35. Each of the features discussed above is illustrated In FIG. 35 on a normalized scale, where the abscissa represents time and the ordinate represents the normalized value. The features illustrated include $f_o$, the probable voicing, K1, the mid-power, the first three formants, the formant difference, the spectral difference, the zero crossing rate, and the total power, or short-time energy function.

The spectral data file 82 and the formants 92 from the formant and voicing processor 78 are used by A, U, and I phonological element detectors 104. The total power, mid-power, zero crossing rate, k1 and "prob voice" features are used by the '?' and 'h' phonological element detector 106. The outputs of the phonological element detectors 104 and 106 along with the "spec-diff" 86, "factor" 102 and "prob voice" 94 are input to a classifier and segmenter 108 which determines and outputs the symbolic representation 54 of the word using a process described below. The classifier and segmenter 108 controls the use and operation of the detectors 104 and 106 as shown by control lines C1 and C2.

The classifier and segmenter 108, its interaction with detectors 104 and 106, and the operation of these detectors will now be described in connection with FIGS. 8–11. The processing of the input speech signal into voiced and voiceless regions, further subclassification and identification of a phonological elements can be viewed as an implementation of a machine defined by a grammar. Each word can be divided into a sequence of alternating voiced and voiceless regions. Each voiced region is a sequence of alternating regions with either of a sonorant or a glide following or preceding a nucleus. Similarly, a voiceless region is comprised of alternating sequences of fricative and silence subregions. Prevoicing and the spectrum of a release burst following a silence region can also be analyzed to identify phonological elements. By defining the speech recognition process as a grammar, higher level linguistic knowledge can be used to constrain the recognition process, thereby simplifying it and enabling the elimination of effects of speaker variation and noise. Also, it simplifies implementation of processing of the speech signal. Thus, a number of different implementations of this recognition process are possible. The following is merely exemplary.

More particularly in this embodiment of the invention, classification of the voiced and voiceless regions is based on primitive context-free "grammars" which define the well-formed sequences of sub-regions. In the case of voiced regions, the grammar is simply:

Region→N

Region→(R)NR* (*=Kleene Star)

N→N1

N→N2

R→R1R2

That is, a voiced region consists of either (a) a single Nucleus (N), or (b) a sequence beginning optionally with a sonorant followed by alternating Nucleus and sonorant (R) sub-regions, of which the nuclei may be branching (N2) or non-branching (N1). This is an over-simplification as indicated above, omitting the category Glide. Similarly for voiceless regions the appropriate grammar is:

Region→S(B)

Region→F

Region→(F)S(B)*

That is, a voiceless region consists of either (a) Silence (S) followed by an optional Burst (B), or (b) a single Friction sub-region (F), or (c) a sequence optionally beginning with a Friction sub-region followed by alternating sub-regions of Silence (plus optional Burst) and Friction. An additional constraint is that a word may not consist of a single voiceless region, i.e., it must contain an obligatory voiced region. This generalization applies to all languages with virtually no exceptions. These simple grammars or sub-region sequences are used to implement parsing routines for the two major types of regions.

Figure 8:
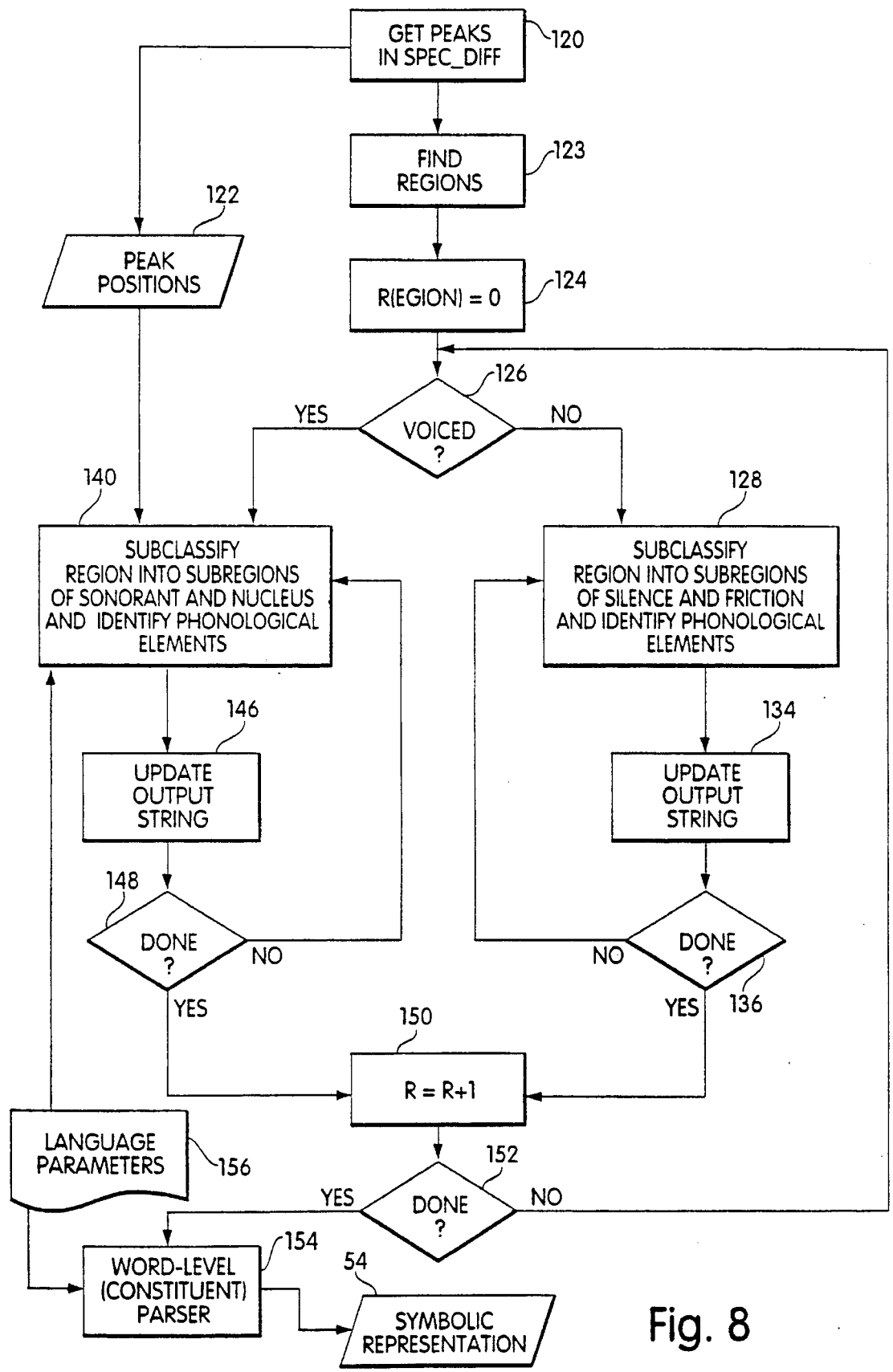
FIG. 8 is a flow chart describing the operation of a phonetic classifier and segmenter 108 and its interaction with element detectors 104 and 106.

FIG. 8 is a flowchart describing the operation of the phonetic classifier and segmenter 108. The classifier and segmenter first obtains the peaks of the spectral difference information 86 in step 120. The peak positions are output at 122. These peak positions are used to subclassify voiced regions in the speech signal into further subregions which are presumed to be indicative of skeletal positions.

Next, in step 123, all of the voiced and unvoiced regions are identified, using the "prob_voice" value of each frame. The classification of frames into such regions is performed by identifying a number of successive frames which are either voiced or voiceless. This identification may be performed by analyzing the probable voicing feature of each frame, for example, by comparing it to a threshold. For example, if the "prob-voice" value is less than 0.20, a voiceless sound is presumed to exist. A sound is voiced if this value is greater than 0.80. In some instances, the "prob-voice" value of a given frame may indicate that the signal at that frame is neither clearly voiced nor clearly voiceless. In such a case, the frame is grouped into the region having the nearest (in time) frame having a definitive value. A variable R, representing a region number being processed from left to right in the input signal, is then initialized to zero in step 124.

The remaining steps performed by the classifier and segmenter 108, generally speaking, breakdown the speech signal into a number of regions wherein each region corresponds to a skeletal position and is classified into a category. The categories into which the regions are classified are: silence (? as head), sonorant (or resonant) (liquids and nasals with ? as operator), friction (h present), and nucleus (A, U and/or I present). Friction regions are further subcategorized as burst or continuous friction. One category which has not been addressed is what is commonly called "glides". Glides are also a form of voiced region. This kind of classification is only necessary in larger databases where words are distinguished by detecting the presence of such a region. Detection of this kind of region appears not to be necessary in a limited task for example, recognizing the numbers 1 through 10 in either Japanese, English or Korean. In languages that have no branching constituents, all non-nuclear regions are onsets. Each region is then analyzed to identify the phonological elements within it. For example, the nuclear regions are input to the A, U and I detectors for analysis as will be described below.

Classification begins by analyzing the first region (region R=0) in the speech signal. If a region is voiceless, the region is next broken down into subregions, wherein each subregion is classified as being either silence or friction (step 128). The phonological elements in each of these subregions are also identified. This process of step 128 will be described in more detail below in connection with FIGS. 18–24. For each subregion identified, an output string is updated in step 134 to indicate the kind of region and the phonological elements identified in the region. The voiceless region is continually analyzed from left to right until the entire region is classified into subregions. Thus, if frames remain in the region to be classified, as determined in step 136, steps 128 and 134 are repeated.

If a region is voiced, as determined in step 126, the region is broken down into subregions wherein each subregion is classified as sonorant or a nucleus in step 140. The peak positions 122 assist in identifying subregions. Phonological elements in each subregion are also identified. For example, if a subregion is a nucleus, the U, A and I detectors 104 are then used to identify phonological elements in the subregion. Whether the nucleus constituent is branching is also considered, in the case where the language allows branching nuclei, by reference to language parameters 156 (see tables 3 and 4 above). This process of step 140 will be described in more detail below in connection with FIGS. 9–17. For each subregion identified, the output stream is then updated in step 146 to indicate the classification of each subregion as well as the phonological elements defined therein. If more frames remain to be analyzed in this region, as determined in step 148, steps 140 and 146 are repeated.

Upon completion of analysis of a voiced or voiceless region, the variable R is incremented in step 150. If more regions remain to be analyzed as determined in step 152, i.e., if more of the speech signal remains to be classified, processing continues by returning to step 126. Otherwise, the resulting output stream, represents, with a string of tokens, the sequence of phonological segments identified in the speech signal. This output string is processed by a word level constituent parser 154 which will be described in more detail below. The word level parser 154 generally takes the output stream of the classifier 108 and converts it into the symbolic representation 154 for use with lexical matching in accordance with language parameters 156.

The subclassification of voiced regions (step 140) will now be described in more detail in connection with FIGS. 9–17.

FIGS. 9–20 describe the process performed by the computer during execution of the "parse_voiced" procedure found in the Appendix. In the case of inconsistencies between these and other Figures and the Appendix, the Appendix shall be presumed to be correct. The first step of processing a voiced region involves setup (step 300), including declaration and assignment of a number of variables used in the process. These variables will be discussed in more detail below where they are used. For example, if an entire word is voiced, the local maxima of the power and mid-power are those of the entire region. Also, the region is presumed to include a stressed vowel. Otherwise, the region is presumed to include a stressed vowel if the maximum power within this region is the same as the maximum power of the word uttered and whether the local maximum of the mid-power is greater than 95% of the maximum mid-power of the voiced regions. In this setup process, if an entire region is voiced, and if it includes more than 15 frames (has a duration of longer than 150 ms), it is presumed that there are at least two nuclei within the word. Otherwise, it is also presumed that there is only one nucleus in this region. Finally, if the mean fundamental frequency of the region is greater than 160, it is presumed that the speaker is female, otherwise, it is presumed the speaker is male. Whether this presumption is correct is immaterial because this classification is merely used to set other thresholds.

After setup procedures, the computer then checks to identify any initial silence in the word (step 302). Generally, initial silence can be discarded. If the type of any previous region was unknown, or a burst, or a low tone, and if the length of this region is greater than a minimum expected length, step 302 is performed. This process will be described in more detail below in connection with FIG. 10.

Next, the previous region-type is examined in step 304. If the previous type is either edge, silence, low tone, error or burst, step 306 of finding nuclei and sonorants is then performed by the computer. Upon termination of this step 306, an output string is constructed and processing returns to step 148 (FIG. 8). If the previous region-type is either onset or fricative, the computer continues by performing the step 310 of finding sonorants and nuclei. The output string is then constructed in step 308. If the region-type is unknown, the computer continues by processing the region as an initial unknown region before proceeding to the step of finding sonorants and nuclei. Steps 306, 310 and 312 will be described in more detail below in connection with FIGS. 11 through 20.

Figure 9:
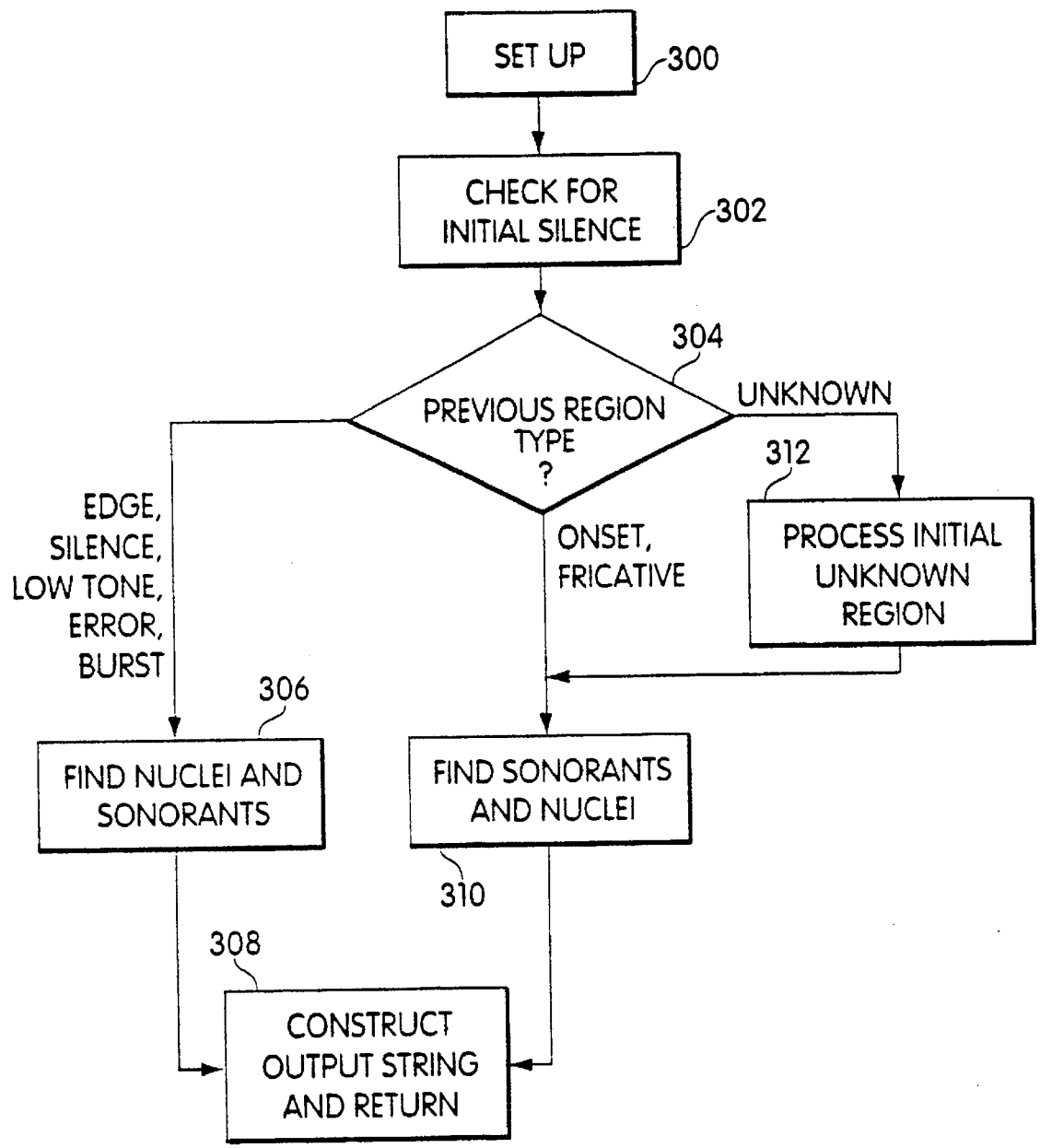
FIG. 9 is a flow chart describing how a voiced region is subclassified.
Figure 10:
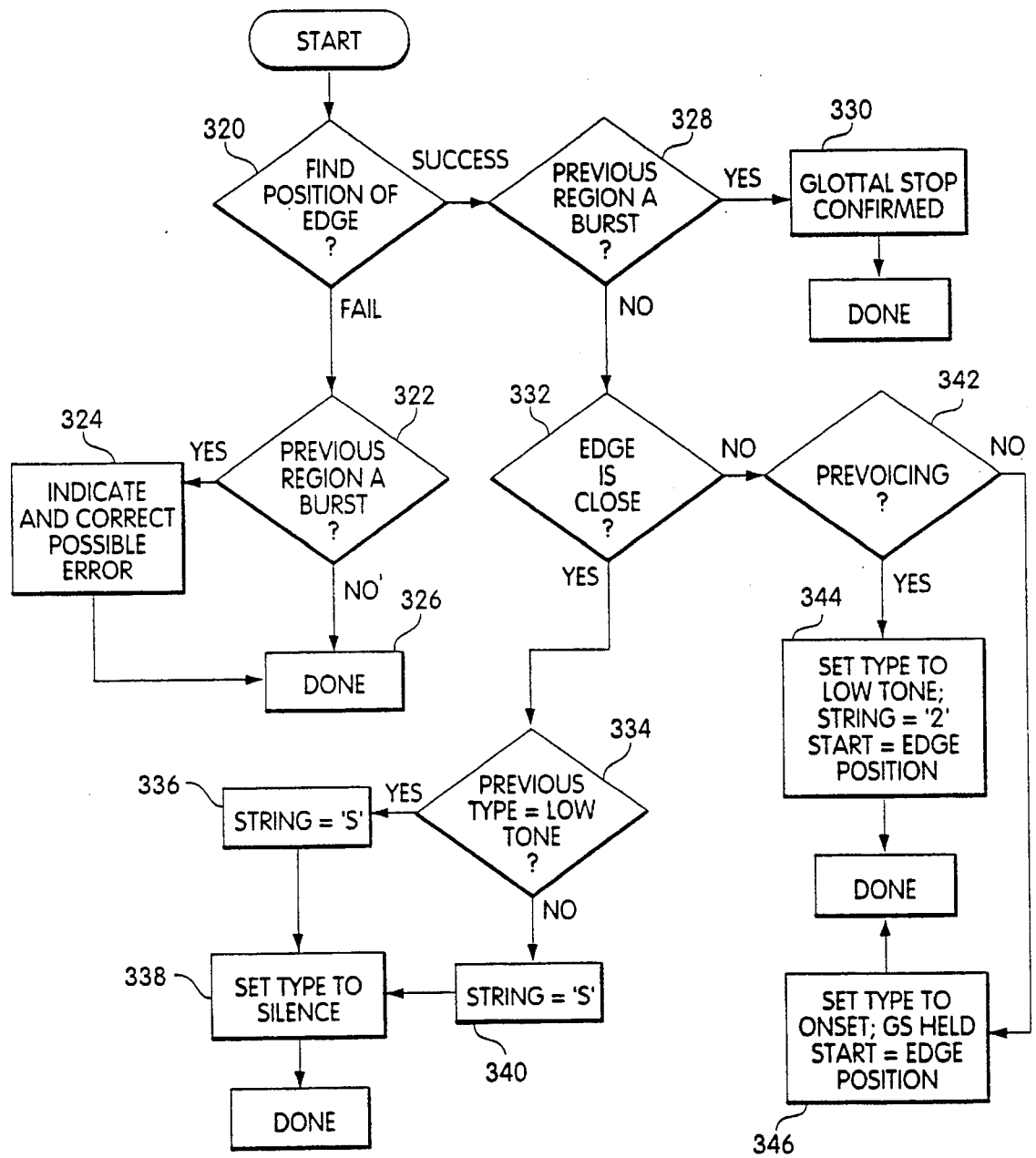
FIG. 10 is a flow chart describing how initial silence is detected.

The process of checking for an initial silence (step 302, FIG. 9) will now be described in connection with FIG. 10. The first step of this process is finding a position of an edge in the region (step 320). If no edge is found, and if the previous region was a burst as determined in step 322, a possible error is indicated and may be corrected in step 324. The possible error is due to the fact that a glottal stop should be found after a burst. A glottal stop is typically confirmed by finding an edge. One possible way to correct for this error is to take the indicator of the burst out of the output string (strip the 'Sh' sequence out of the output string). After correction of the error, if necessary, step 302 is completed at step 326.

The position of an edge in a region is found by locating a rising edge in the total power or mid-power curves within the region with a slope of greater than 40%. If an edge position is found and the previous region was a burst, as determined in step 328, the existence of a glottal stop is confirmed as indicated in step 330. If the previous region was not a burst, and if the edge is close, i.e., less than four frames away, as determined in step 332, the type of the previous region is then examined in step 334. If the type of the previous region is a low-tone, then it is presumed that the region prior to the burst should be silence and the token string is updated by the character "Z" as indicated in steps 36 and 338. Otherwise, i.e., if the previous type is unknown, the string is updated to have the token "S" as indicated in step 340, and the region-type is set to be silence.

If the position of the edge is not close to the beginning of the region, it is then assumed that there is a prevoiced region before the rising edge as checked for in step 342. Prevoicing is a short period of energy at or around only the fundamental frequency. If prevoicing is found, the type of the region, or subregion, is said to be a low-tone; the token string is updated to include "Z" and the start position from which analysis will take place within this region is set to be the edge position (step 344). Otherwise, the type of this subregion is set to be onset and the starting position for analysis of the remainder of the region is then set to the edge position (step 346).

Step 306 of finding nuclei and sonorants following an edge, silence, low-tone, error or burst subregion will now be described. Initially, if the prior region was an edge, an "S" is inserted to the token string. If the previous region was silence, a "." (the token delimiter character) is inserted in the token string. It is presumed that a nucleus should follow. Accordingly, processing begins by looking for a nucleus. This is done in the following manner.

In step 350, it is first determined if the rest of this voiced region is short and if the previous region was a sonorant. The rest of a region is short if its length is less than the minimum duration of a typical final nucleus in a region, which is typically 60 ms, or in this example, six frames. If the current region follows a sonorant and is short and nonfinal, a nucleus is forced in step 352. A nucleus is forced by identifying the first frame starting from a start frame of the subregion in which the total and mid-power is less than the total and mid-power of the start frame and in which the mid-power is less than 20% of the maximum mid-power in the voiced region. If the number of frames between the start frame and the identified frame is less than the number of frames in the voiced region, a nucleus is thus forced.

If the rest of the voiced region is not short, or if the previous subregion is not a sonorant, an attempt is then made to identify a nucleus in the region as indicated at step 354. This step will be described in more detail below in connection with FIGS. 12–13, and returns an indicator of the frame at which the nucleus, if identified, ends. This procedure also identifies a type of a nucleus. A region-type is then assigned in step 356 according to this nucleus-type. This nucleus-type indicates a nucleus end or and edge. If the nucleus-type is an edge, the region-type is nucleus, otherwise the region-type is simply the value of the nucleus-type returned.

After a nucleus is identified or forced, and if the nucleus region is long enough as determined at step 358, it is first determined in step 360 whether any gap existed from any previous region and any gap is then adjusted. A nucleus region is long enough if it is longer than the minimum typical nucleus length which has been found empirically to be about 50 ms, or five frames. A gap is identified and adjusted if the previous subregion was a sonorant and if the distance from the start of the nucleus region being examined and the last frame which has been positively classified in the sonorant subregion is greater than some maximum gap size, which is preferably about four frames. The start of the nucleus subregion being classified is then adjusted to be the frame immediately following the last frame positively classified in the sonorant subregion.

Figure 15:
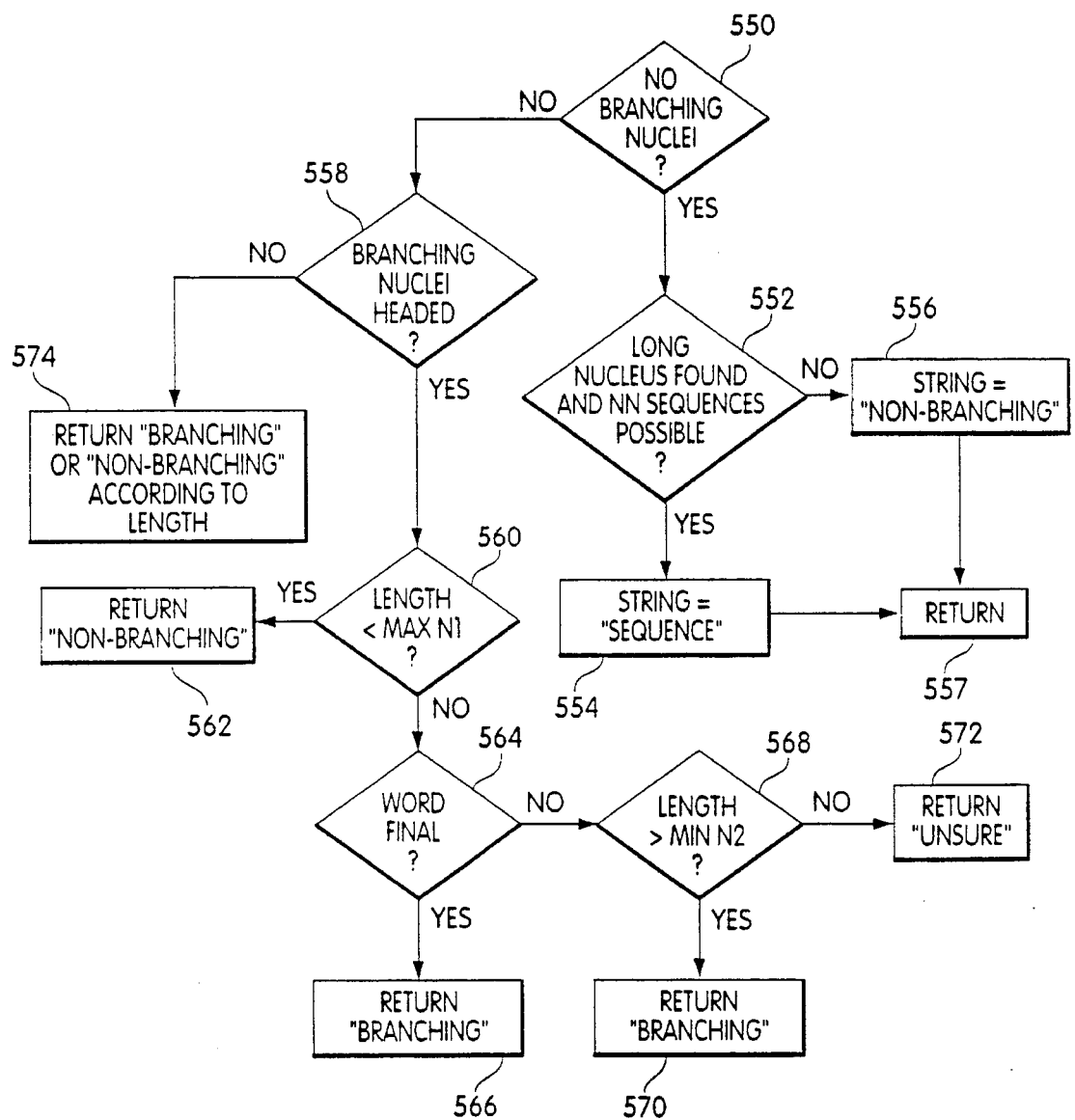
FIG. 15 is a flow chart describing how a nucleus type is assigned.

The branching-type of the nucleus subregion is then assigned in step 362 in a process to be described below in connection with FIG. 15. Next, a code is then obtained in step 364 which identifies which of the phonological elements A, U and I are present in the currently identified subregion. This step is described in more detail below in connection with FIGS. 16 and 17. Based on this code, and the branching-type, the token string is updated in step 366. If the type of the nucleus is branching, the token string is updated to include "N2;", otherwise it is updated to include "N1;". The decimal code for the presence of the phonological elements A, U and I is then added, followed by a ".". If the type of nucleus is a sequence, such as found in Japanese, the output string is updated to include "O.N1;", followed by the decimal code for the presence of phonological elements A, U and I, followed by a ".".

After the token string has been updated in step 366, it is then determined in step 368 whether the nucleus-type was an edge. In such a case, the previous region-type is set to be "edge" in step 370 and this process is completed. The process is also completed if this voiced region has been completely processed as determined in step 372. Typically, if the determined end of the nucleus is outside of the voiced region or is within two frames of the end of the voiced region, the end of this region is presumed to have been reached. It is then determined if the end of a nucleus has certainly been reached in step 374 in order to force the detection of a sonorant in step 376. The end of a nucleus has certainly been reached when the nucleus-type is nucleus-end, the last region-type is a nucleus, if the remainder of the voiced region is between a minimum threshold of about 40 ms, or four frames, and a maximum expected duration of a final sonorant, which is about 70 ms, or 7 frames, and if the local maximum in both of the mid-power and total power curves is within the first half of the nucleus subregion. A sonorant is forced by returning the end of the voiced region as the end of a sonorant subregion and by returning a string "sonorant."

If the end of a nucleus is not certain, an attempt is made to find a sonorant in step 378. This process will be described in more detail below in connection with FIGS. 12–13. This process returns an indicator of the frame which is the last frame of the sonorant region. The last region-type is then set in step 380. If the nucleus-type returned by the find sonorant process is nucleus-end, the last region-type is set to be nucleus, otherwise it is set to be the returned nucleus-type. If the nucleus-type is onset, the name string is set to be "onset" rather than "sonorant."

If the sonorant subregion is determined to be long enough, i.e., longer than 40 ms or four frames, as determined in step 382, the presence of a gap between this sonorant region and any previous region is then detected and adjusted in step 384. After any necessary checking and adjustment for a gap, it is then determined whether the end of the voiced region has been reached in step 386, similar to step 372. If the voiced region has been completely processed, this procedure is complete; otherwise the process continues by checking whether the stressed subregion has been processed in step 388, by determining (1) if the next subregion to be processed is after the frame having the maximum power within the voiced region, and (2) if a nucleus has been assigned. If the stressed subregion has been processed, a value indicating stress has been set to false, otherwise it remains true and processing returns to step 350.

Figure 11:
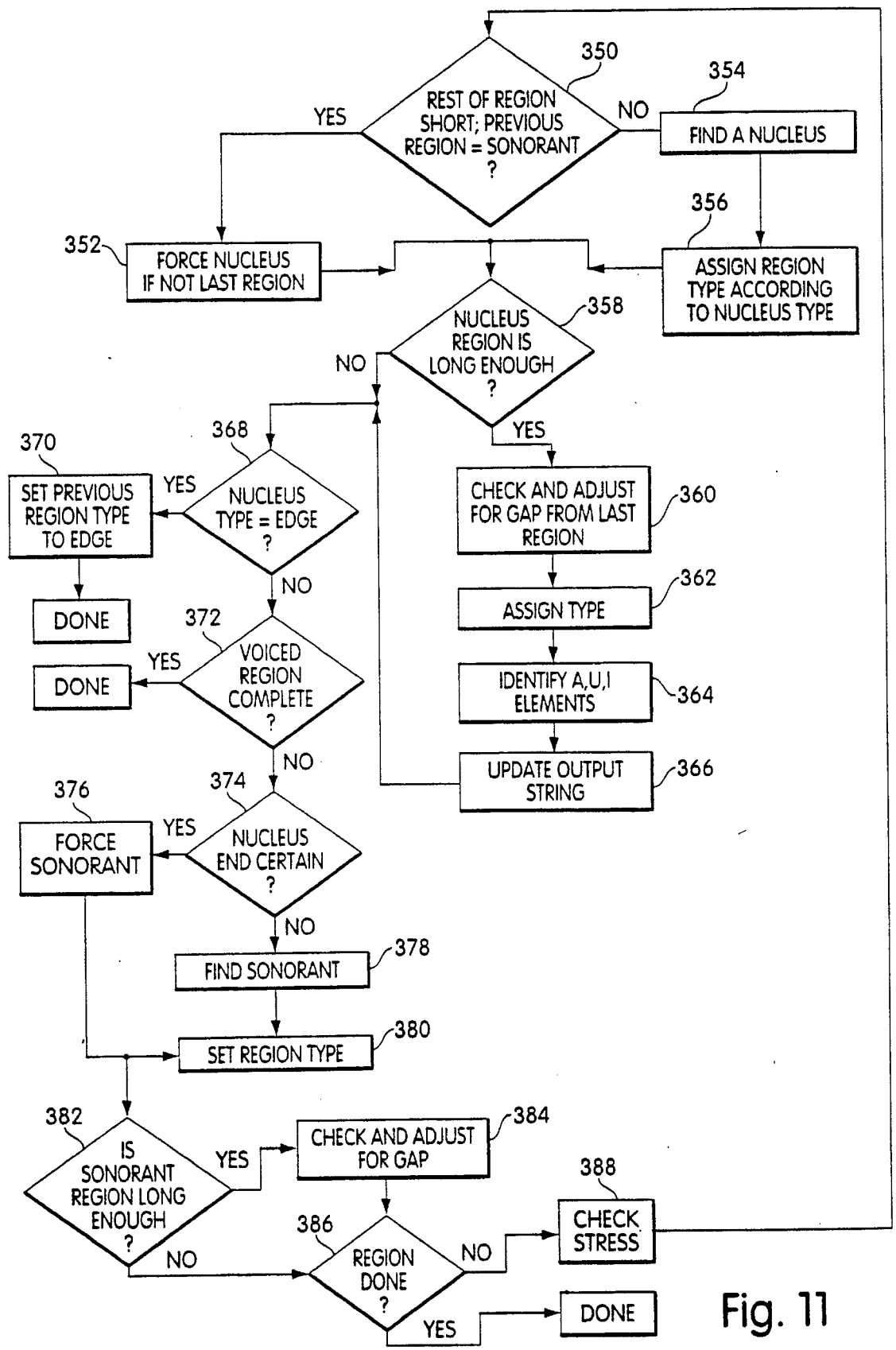
FIG. 11 is a flow chart describing how nuclei and sonorants are found.

As can be seen in FIG. 11, this process generally constrains sequences within a voiced region, generally, to be alternating between sonorant and nucleus subregions. With this process, it is possible that a nucleus may be empty. Thus, at most two consecutive sonorants are allowed and in this case, the preceding nucleus must contain a stressed vowel. If phonological segments corresponding to what are commonly called "glides" are to be detected, one would expect an alternation between nucleus and one of either sonorant or glide regions.

Figure 12:
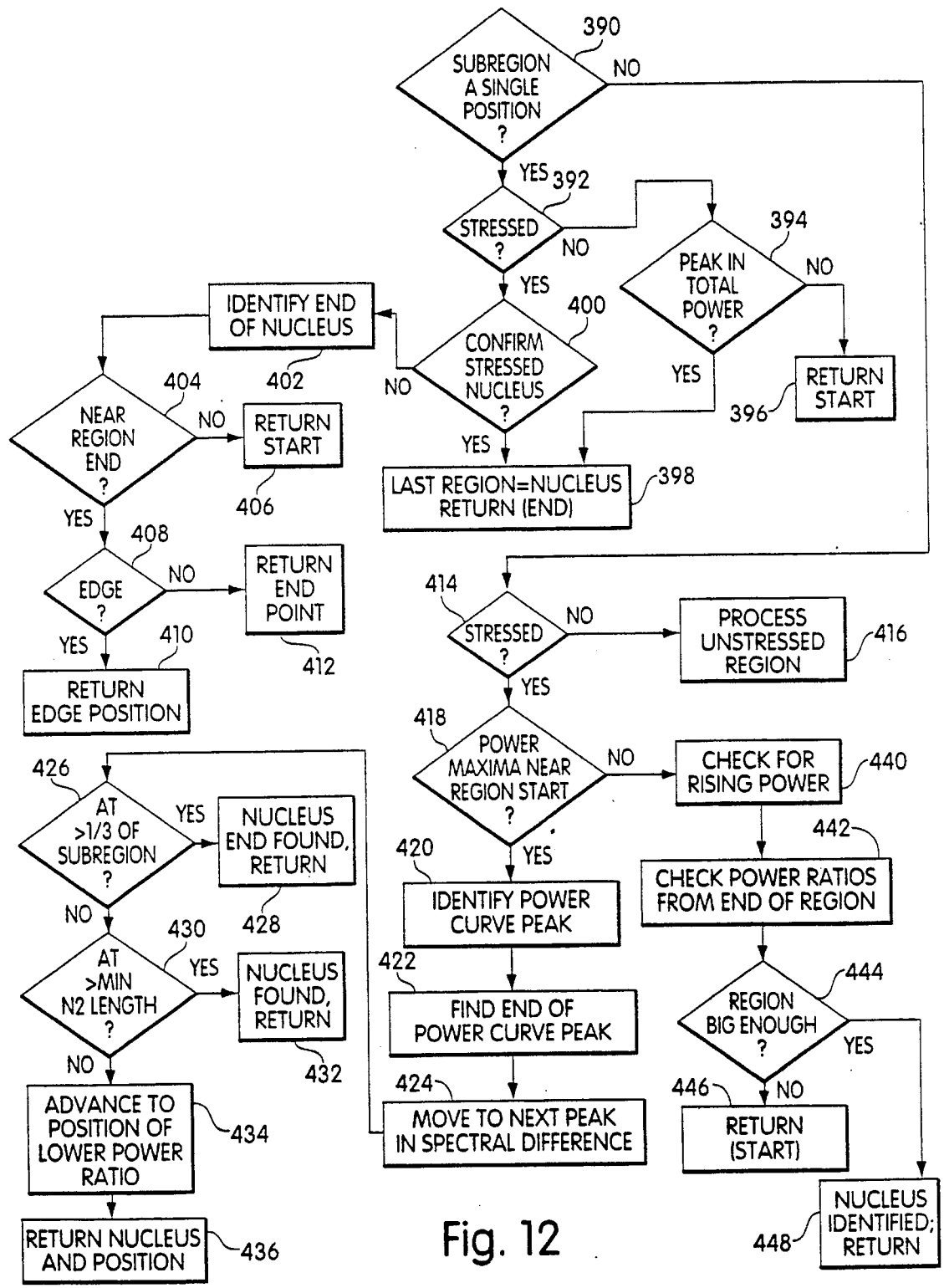
FIG. 12 is a flow chart describing how a nucleus subregion is found.
Figure 13:
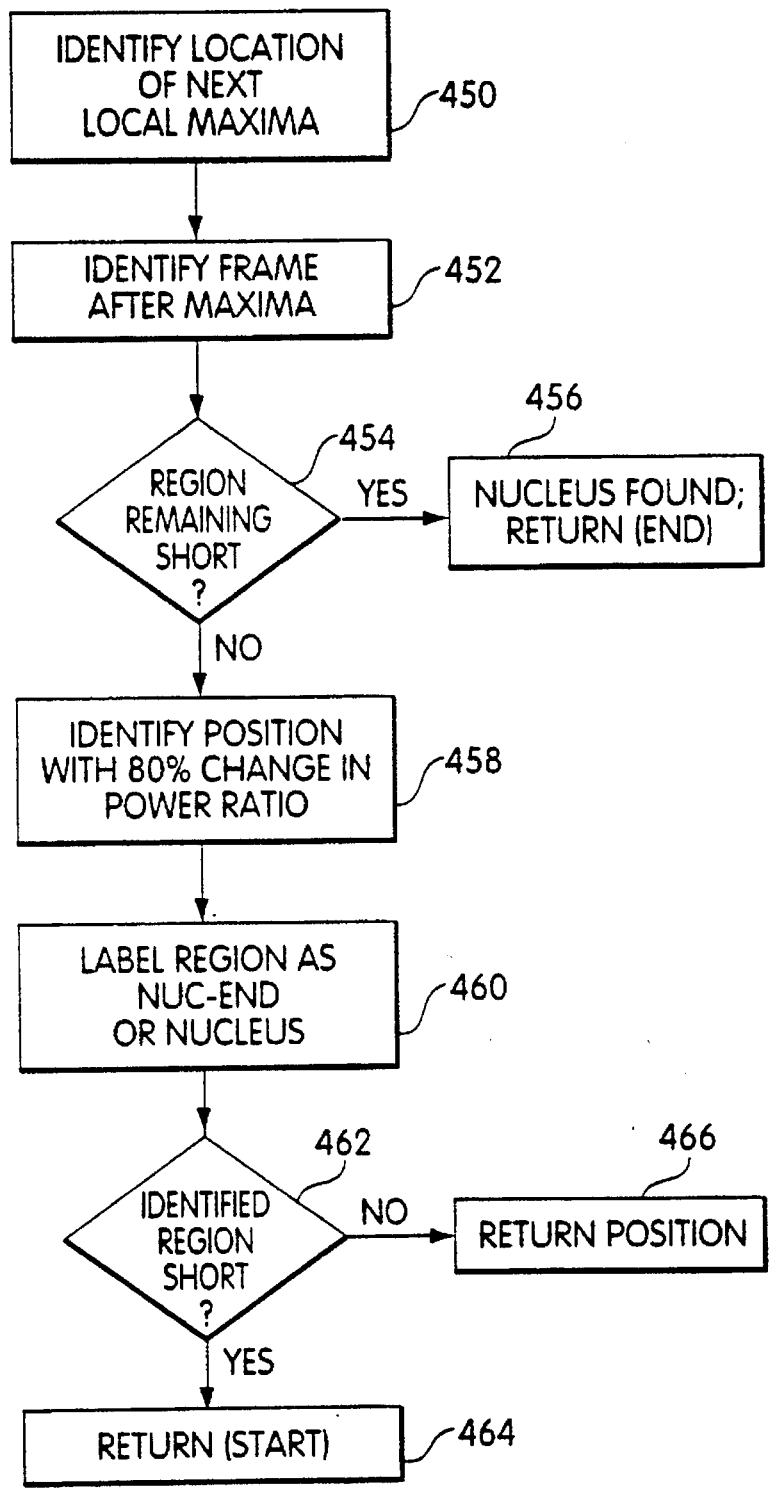
FIG. 13 is a flow chart describing how an unstressed region is processed.

The step of finding a nucleus (step 354) will now be described in more detail in connection with FIGS. 12 and 13. It is first determined in step 390 whether a subregion is a single position. Generally, this step is performed by examining the length of the subregion. If this length is less than 11 frames, or 110 ms, it is likely that there is only a single nuclear position. It is next determined whether this region is stressed in step 392. If this region is not stressed, the subregion is examined for a peak in the total power curve in step 394. A peak is identified by comparing the mean power of the subregion to the expected power of a nucleus which is greater than 500,000 in absolute terms, or by determining whether the mid-power in the subregion is high. In this embodiment, the mid-power is high if at least half of the values are higher than 40% of the maximum value. If no peak is found in the total power, this process returns the index of the starting frame in step 394; otherwise, the index of the end frame of the subregion is returned and the indication of the previous region is set to be nucleus in step 398.

If the region was determined to be stressed in step 392, the existence of a stressed nucleus is confirmed in step 400, for example, if the ratio of the mean total power to the mean mid-power is greater than a given threshold and if the mean of the mid-power is greater than a second threshold. Alternatively, this mean power ratio could be 50% of the first threshold and the mid-power could be generally high and also indicate a peak. By experiment, the first threshold has been determined to be 60%. The second threshold has been determined to be 200,000. As above, the mid-power is high if at least half of the values in this region are greater than 40% of the maximum of the region.

If the existence of a stressed nucleus is not confirmed, the end of the nucleus is then identified in step 402. This end is identified by finding the frame in which the slope of the total power and mid-power curves drop below predetermined thresholds. For example, if the slope of the total power curve in one frame falls below −25 and the slope of the mid-power curve in that frame or a subsequent frame falls below −35, the frame in which the mid-power curve falls below −35 is selected as the end of the nucleus. If this end frame is sufficiently far from the end of the voiced region, e.g., four or more frames, as determined in step 404, the index of the start frame of the region is returned in step 406. Otherwise, if this end frame identifies an edge (step 408), this edge position is then returned with the last region-type to be indicated as edge. Otherwise, the last region-type is indicated as nucleus-end and the end-point detected in step 402 is then returned in step 412. An edge is detected if the total power of this end frame drops quickly from above the power typical for a nucleus, e.g., 500,000. A glottal stop may also be present at this position.

If, in step 390, the subregion is likely to be more than one position, and if the region is not stressed as determined in step 414, the "unstressed" region is processed in a manner to be described below in connection with FIG. 13, as indicated at step 416. It is then determined whether the local maxima in the total power and mid-power curves are near the region's start in step 418. In particular, if the local maximum in either the mid-power curve or the total power curve is within eight frames of the start frame, or 80 ms, this condition is met. From the occurrence of this condition, the frame containing the last occurring power curve peak is then identified in step 420. Starting from this frame, the end of the power curve peaks is then identified in step 422. This point is where the total power falls below the expected power per nucleus, or where the mid-power falls below a given factor of the expected mid-power in a voiced region. The factor is typically 20%.

After the end of the power curve peak is found, the next peak in the spectral difference curve is then found in step 424. If the current frame is at least beyond one-third of the subregion, a nucleus-end is then determined to have been found and an index to this frame is returned in step 428. Otherwise, if it is determined in step 430 that the distance from the start of this subregion to this frame is greater than the minimum length of a branching nucleus, it is determined that a nucleus has been found and the index to this frame is returned to step 432. When this condition fails, the frame at the position of the lower power ratio is then selected in step 434 and that position is returned and a nucleus is presumed to exist ending at that position in step 436.

When the power maxima detected in step 418 are not close to the start of the region, the power curves are analyzed by frame, sequentially, in step 440 for a rising condition, to identify a frame in which rising terminates. Then, starting from the end of the region and working back to this identified frame, the power ratios are then examined in step 442 while the mean power ratio remains above a given threshold (half its value at the identified frame). The mean power ratio is the normalized mean from the start position to the currently selected position near the end of the region. When a current frame has been selected through steps 440 and 442 it is then determined whether the region it defines is long enough in step 444. That is, it should contain more than five frames, or 50 ms. If the region is not long enough, the start position is returned in step 446; otherwise a nucleus is identified and the index to the current frame is returned in step 448.

The processing of the unstressed region will now be described in connection with FIG. 13. The first step in this process is identification of the frame containing the next local maximum in the total and mid-power curve (step 450). If this position is near, within 80 ms of the start position, the frame after the local maximum is selected in step 452. If the length of the remainder after the selected frame is short, as determined in step 454, the nucleus is presumed to be found and the end of the region is returned in step 456. Otherwise, the position after that frame in which there is an 80% change in the power ratio is then selected in step 458. If the power in this region is less than 20% of the maximum power, the region is labeled as nucleus-end in step 460, otherwise it is labeled as a nucleus. If the identified region is short, i.e., less than 60 ms long, as determined in step 462, then the start position is returned in step 464; otherwise, the selected frame position is returned in step 466.

Figure 14:
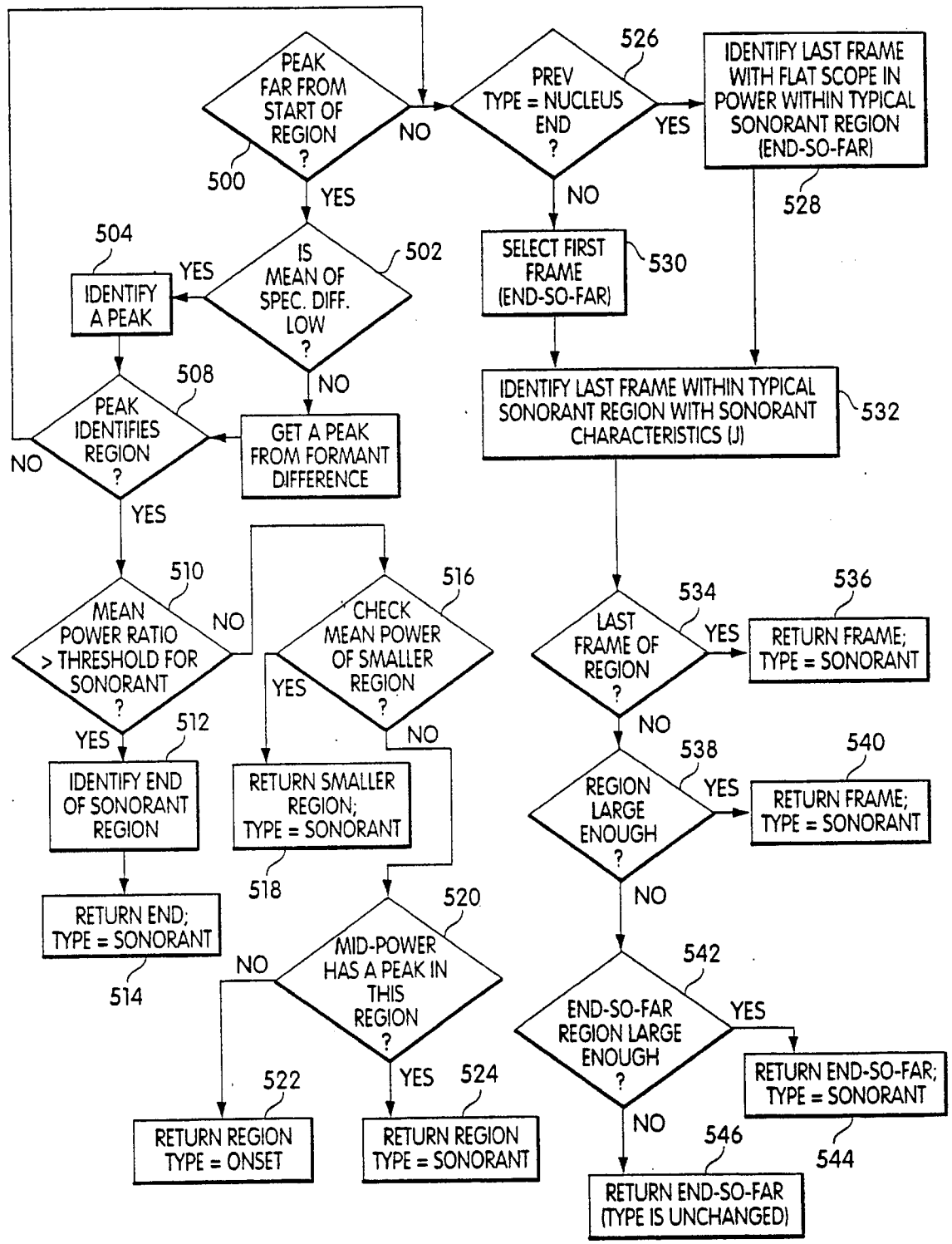
FIG. 14 is a flow chart describing how a sonorant subregion is found.

The process of finding a sonorant will now be described in connection with FIG. 14. The first step of this process is step 400 for determining whether the peaks of the mid-power and total power curves are far from the start of the region. This condition is true, for example, when the region is longer than 100 ms and the position of the peaks are farther away than the typical length of a sonorant region, which is about 80 ms. If the peak is far from the start of the region and if the mean value of the spectral difference function in the region is low, as determined in step 502, the next peak from the spectral difference function is then obtained in step 402. Otherwise, a peak from the formant difference is obtained in step 506. The mean value of the function is low if at least half of the values in the region are less than half of an upper limit, in this case 40%.

After a peak is obtained in either step 504 or 506, it is then determined whether the peak identifies a region in step 508. A peak identifies a region if the peak is between the 40 ms and 140 ms from the start of the region, e.g., 4 to 14 frames from the start. If the peak identifies the region, and if the ration of low power to mid-power over the region is greater than a predetermined threshold for the mean power of a sonorant region, the end of the sonorant region is identified in step 512 and the end of that region is returned and the type of this subregion is set to be sonorant in step 514. The predetermined threshold for the sonorant used in step 510 is 4,000 if the speaker is presumed to be female, or 300 if the speaker is presumed to be a male. This distinction is based on presumed gender only and is actually based on the fundamental frequency of the speech signal.

The end of a sonorant region is identified in step 512 by identifying the frame in which the low-power to mid-power ratio is greater than this threshold and where the frame is not yet the frame with the maximum low-power.

In step 510, if the mean power ratio is less than the predetermined threshold, the mean power ratio is then checked in a smaller region in step 516. If the mean power ratio of the smaller region is below the same threshold, that smaller region is returned as a sonorant subregion in step 518. Otherwise, it is then determined in step 520 whether the mid-power has a peak in this region. If the peak is identified, the region is returned as an onset. Otherwise, it is returned as a sonorant in step 524.

If the peak in the power was not far from the start of the region as determined in step 500, and if the previous type of region was a nucleus-end, the last frame starting with The start of the region and having a flat slope in the power curves within the length of a typical sonorant region is then identified in step 528. This value may be indicated as the "end-so-far". Step 528 utilizes 80 ms as the length of the typical sonorant region. The slope in the power curve is flat, for these purposes, if absolute value of the slope is less than the maximum slope expected for a sonorant region, which is about 12%. If it is determined that the previous type of region is not a nucleus-end, the first frame of this subregion is selected as the "end-so-far" (step 530).

Using the "end-so-far" value, the last frame within a typical sonorant region having typical sonorant characteristics is then identified in step 532. Again, the typical sonorant region is presumed to be, for example, 80 ms. A typical sonorant characteristic in this embodiment is that the low to mid-power ratio is greater than a predetermined threshold (i.e., the same as discussed in step 510), and either that the mid-power of the frame is less than a threshold (e.g., 3,000) or that the slope is flat, as defined above. If this frame is the last frame of the region, as determined in step 534, it is returned as the end of a subregion of which the type is sonorant in step 536.

If the frame identified in step 532 is not the last frame of the region, it is then determined whether the region it defines is large enough to be a true region (step 538). This frame is then returned and the region is indicated as being sonorant in step 540. Otherwise, it is then determined whether the region defined by the value "end-so-far" is large enough to be a region. If it is, that value is returned as an indicator of the end of the region in step 544 with the region-type being sonorant. Otherwise, the "end-so-far" value is returned with the type of region unchanged. In effect, a gap is created in the classification of the voiced region, which is handled at a later time.

The assignment of the branching-type of a nucleus will now be described in connection with FIG. 15. If the parameters given for the language to be recognized indicate that there are no branching nuclei, as determined in step 550, and if a long nucleus is found and double nuclei sequences are possible in this language (e.g., Japanese), as determined in step 552, an output string "sequence" is generated in step 554. Otherwise, a string "non-branching" is output in step 556 and the process is completed as indicated at step 557.

If the language permits branching nuclei, and if branching nuclei are headed (e.g., as in English) as determined in step 558, the length of the region is then compared to a maximum value in step 560. This value indicates the typical maximum length of a single nuclear position, and is typically 80 ms. In this case, the string "non-branching" is returned in step 562. Otherwise, if the nucleus is word-final, as determined in step 564, the string "branching" is returned in step 566. If the region is not word-final, and the length of the region is greater than the minimum length for a branching nucleus (typically 200 ms) (step 568), the string "branching" is returned in step 570 otherwise the string "unsure" is returned in step 572.

If branching nuclei are not headed (see step 558), the string "branching" is returned if the length of the region is greater than 140 ms; otherwise the string "non-branching" is returned: The threshold of 140 ms is determined by taking the average of the maximum single nucleus length and the minimum branching nucleus length.

Processing of a nuclear region to identify the phonological elements A, U and I, will now be described in connection with FIGS. 16 and 17. In this process, a variable "ct" is set to be the start of the region to be processed in step 580. The value "ct" will now be referred to as a current frame. The presence of the A, U and I elements is then detected in the current frame in step 582. Detection is performed by the A, U and I detectors 104 (FIG. 6) which will now be described in more detail. The detectors search for each phonological element independently of the others. The search may be done either serially or in parallel. There are 3 possible outputs: the phonological element is either (i) absent, (ii) present as the "head" (most salient component) or (iii) present as an "operator" (less salient). Only one phonological element should be found as the head in any search. If an element is detected as a head in English then a branching nucleus is presumed to exist. The detectors return a three-bit code which represents the presence of U, I and A.

The detectors 104 use the spectral slice of a given frame and calculate the energy in various frequency bands, in particular, the 100 Hz–1 kHz, 1–2 kHz, and 2–4 kHz bands. The position, (i.e., the frequency) in the spectrum at which the amplitude first falls below 20 dB below the maximum value is also calculated. This position is referred to as the "20 dB" value and is used as a rough guide to the property "Mass," used in the definition of A.

For A to be present as an operator the 20 dB value must be greater than 500 Hz and F1 must be between 450 Hz and 1200 Hz. For A to be present as a head, either (1) the 20 dB value must be greater than 1000 Hz and F1 and the frequency F2 amplitudes must be substantially equal, within 10 dB, and F2 can be no more than about twice the frequency F1, or (2) with no restriction on the relative amplitudes of F1 and F2, the 20 dB value must be greater than 1200 Hz, or the energy in the first quarter of the (log-warped) spectrum must be greater than a threshold value.

For U to be present as a head, energy is concentrated in the region below 1 kHz, and F1 and F2 are below about 500 Hz and 950 Hz respectively. The amplitude of F3 is around 35 dB below that of F1. For U to be present as an operator there must be a rapid fall-off in energy above a particular frequency which varies according to the head element. In other words it acts like a low-pass filter with variable cutoff frequency.

The salient property of I is a low frequency F1 (less than 500 Hz) and a greatly increased frequency F2 such that it approaches the frequency F3. This produces a characteristic pronounced dip in the spectrum. The detector 104 measures the intervals between F1 and F2, and between F2 and F3 (which may be irrelevant), as well as the depth of the dip, defined as the amplitude difference between the highest peak and the lowest point of the dip. As an operator, I appears with an F1–F2 (or F2–F3) interval of at least 900 Hz, and an F2 amplitude relative to the lowest point greater than 0.3 times the depth of the dip. For I to be present as a head, only the F1–F2 interval is relevant: the dip depth must be greater than 20 dB and the F2 factor is increased to 0.4. Further the energy in region 2–4 KHz must be greater than that in region 1–2 KHz. Another condition where I is present as a head, should any of the previous conditions fail narrowly, the F2–F1 interval in the frequency domain is greater than 68% of the frequency range.

The invention is not limited to the details of detection of the A, U and I detectors as described above. There are many ways to implement the details of detection of these elements. For example, neural networks could be trained to do pattern matching and distinguish among the A, U and I phonological elements as both head and operator elements in a phonological expression. The process used to detect these elements could also be changed due to a change in the theory as to how these elements are manifested acoustically or are combined in phonological expressions. Also, low level pattern recognition for the other phonological elements can be improved. For example, a neural network or other pattern recognition device could be used.

Next, a running count of the detection of A, U and I in this region is kept and is incremented in step 584. For the current frame, an element code is then generated in step 586. In this embodiment, the presence of an "A" is given a value "1", the presence of an "I" is given a value "2", and the presence of an "U" is given a value "4". The values of all the elements present in a frame are then added together to obtain this element code for the current frame. The head count of each element detected as a head element is then incremented in step 588. Whenever an element is identified or detected as a head in a frame the total for that element is incremented as well as a counter which keeps track of the number of frames in which the element appears as a head. The current counter is incremented in step 590. If the last frame has been reached as determined in step 592, step 582 is then performed, otherwise step 594 is performed to complete the generation of the element code for this region according to whether it is branching or not. This step 594 will now be described in more detail in connection with FIG. 17.

Figure 16:
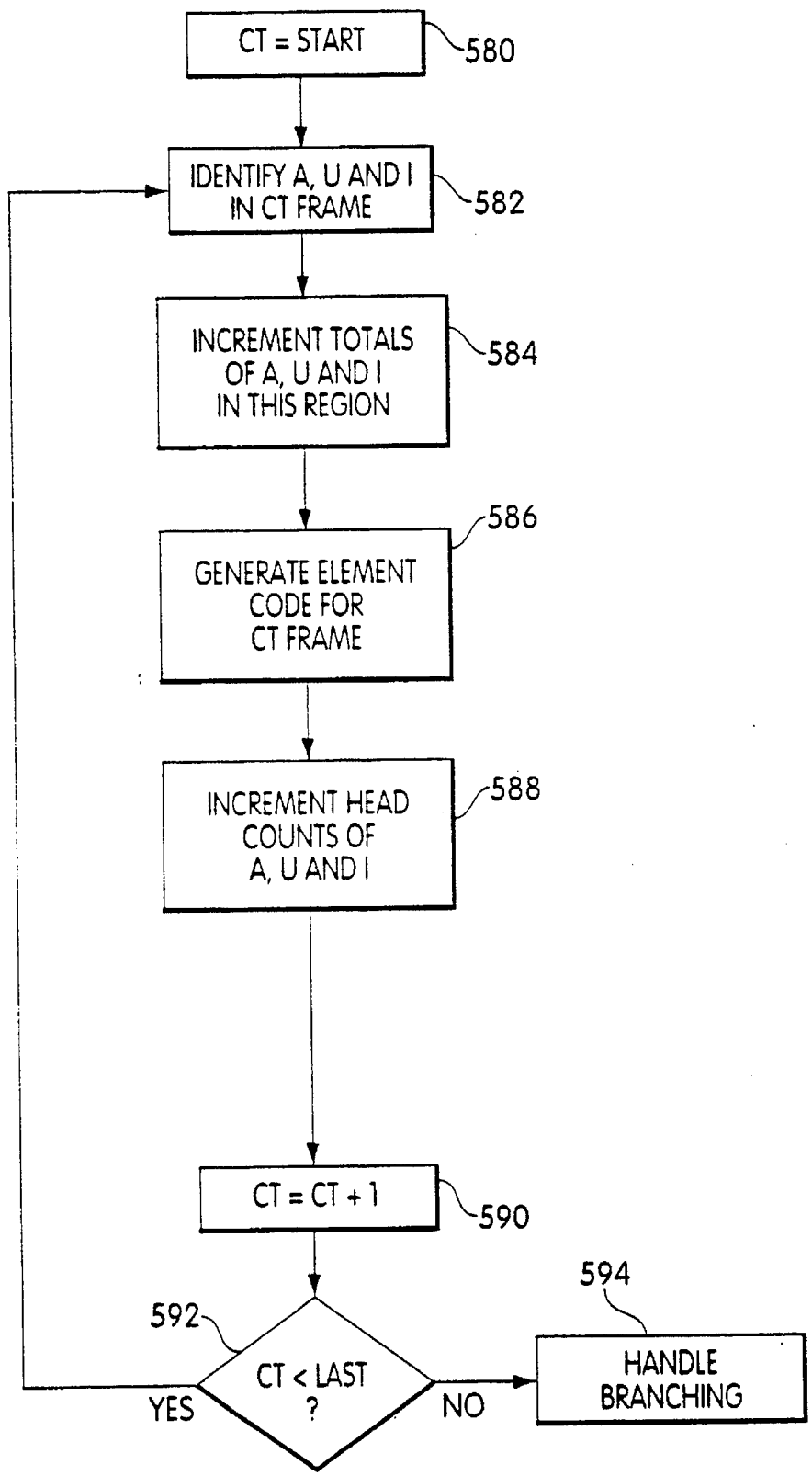
FIG. 16 is a flow chart describing how a nucleus subregion is processed to find phonological elements A, U and I.
Figure 17:
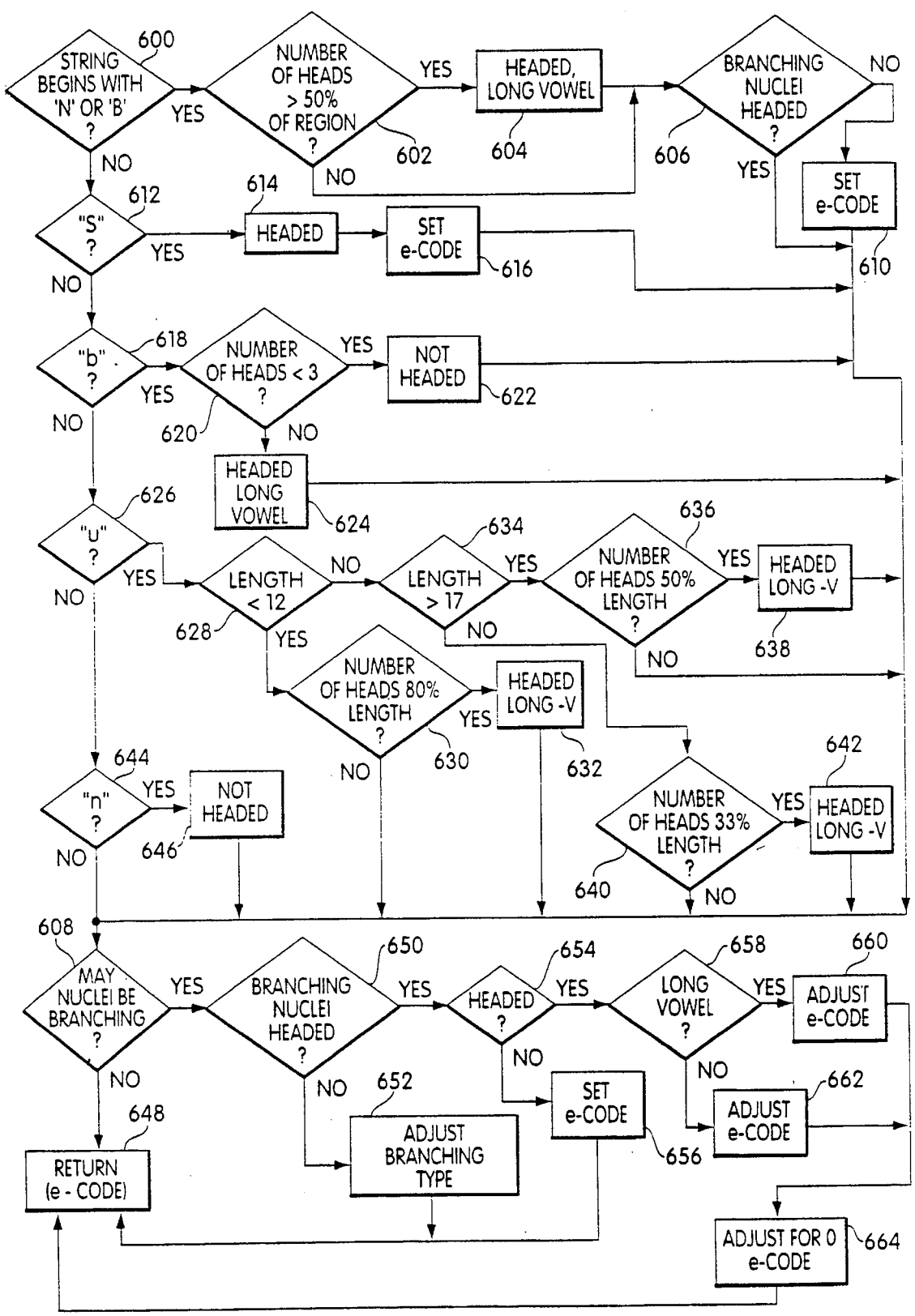
FIG. 17 is a flow chart describing how a branching type and an element code are processed for a nuclear region.

The process described in FIG. 16 involves handling all the cases of the types of output string as output in connection with the assignment of the branching-type, discussed above, in connection with FIG. 15. If this output string begins with a "N" or "B" (step 600), and if the number of heads appearing in the region is greater than 50% of the length of a region, as determined in step 602, the region is indicated as headed and as being a long vowel in step 604. In either case, and if branching nuclei are headed, as determined in step 606, processing proceeds to step 608 which will be described in more detail below. If branching nuclei are headed, the element code is set in step 610 before proceeding to step 608. This step 610 will be described in more detail below.

If the string indicates a sequence, (e.g., begins with "S") as determined in step 612, the region is indicated as headed in step 614 and the element code is set in step 616 before proceeding with step 608. If the string begins with a "b" as determined in step 618, and if the number of heads is less than 3 as determined in step 620, the region is indicated as not headed in step 622; otherwise, it is indicated as headed and a long vowel in step 624.

If the string indicating a nucleus-type indicates that it is "unsure" (e.g., it begins with "u"), as determined in step 626, and if the length of the region is less than 120 ms as indicated in step 628, the number of heads is examined in step 630. If this number of heads is less than 80% of the length of the region (in terms of the number of frames), processing proceeds with step 608. Otherwise the region is indicated as headed and containing a long vowel in step 632. Processing then proceeds with step 608. If the length of the unsure region is greater than 170 ms, as determined in step 634, the head count of the region is examined in step 636. If the number of heads is greater than 50% of the number of frames, the region is headed and is a long vowel as indicated in step 638. In either of the headed or unheaded case, processing proceeds with step 608. If the length of the region is between 120 ms and 170 ms as determined in step 628 and 634, and if the number of heads is greater than 33% of the length, as determined in step 640, the region is headed and contains a long vowel as indicated in step 642. Processing then continues with step 608.

If the region is non-branching as determined in step 644, the region is not headed in step 646 and processing proceeds in either case to step 608. The remainder of this process, starting with step 608, determines the branching-type and element code for the region. If the language under examination does not permit branching nuclei, the element code is returned in step 648. Otherwise, if branching nuclei in this language are not headed, as determined in step 650, the branching-type is adjusted in step 652 before returning to the element code in step 648. If branching nuclei are headed, and if the region is not headed as checked in step 654, the element code is set in step 656 and returned in step 648. If the region is headed and if it contains a long vowel, as checked in step 658, the element code is adjusted in step 660. If there is no long vowel, the element code is adjusted differently in step 662. Steps 666, 660 and 662 will be described in more detail below. If the element code obtained after performing step 660 or 662 contains a zero, this is corrected in step 664 and the element code is then returned in step 648.

The "e-code" is set in the steps calling for "set-e-code" by determining whether the total values of A, U and I are more than 50% of the number of frames in the region. For each element satisfying this condition its appropriate code (i.e., 1, 2 or 4) is added to the element code value. If this element code is zero, after that step it can be set if the total of any of the phonological elements is 1.

In step 662, the element code is adjusted by multiplying the element code of the first part of the long vowel by 10 and adding the element code of the second part of the vowel. In step 660, the element code is adjusted by setting A, U and I to be present when their total is greater than or equal to the minimum of 20 frames, or the length of the region. The resultant code is then multiplied by 10. If the resulting element code is zero, the element having the highest head count is then used to set the element code. If the element code is still a zero, it is set to 4. i.e., the nucleus is assumed to contain the element U.

Figure 18:
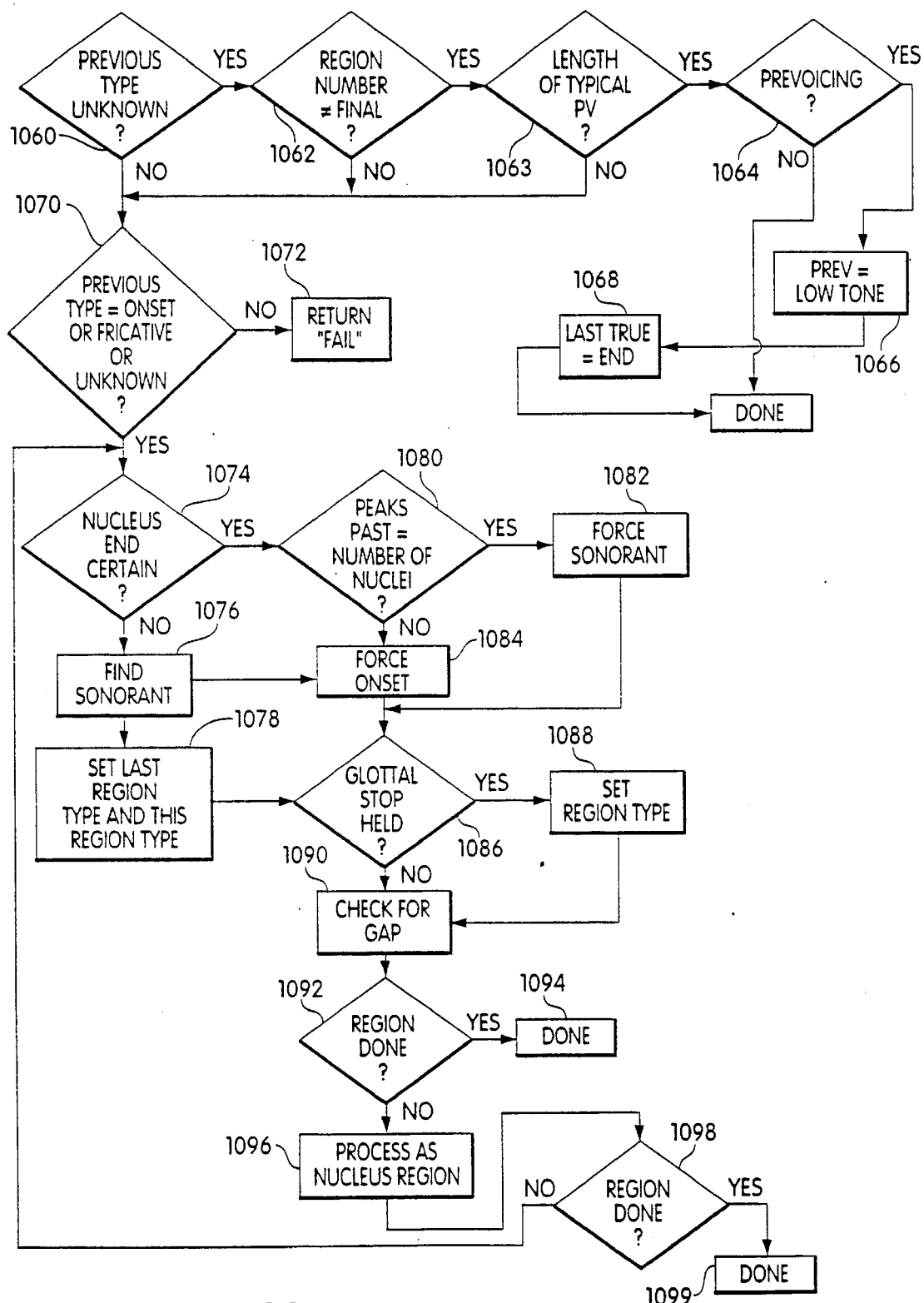
FIG. 18 is a flow chart describing steps 310 and 312 of FIG. 9 in more detail.
Figure 19:
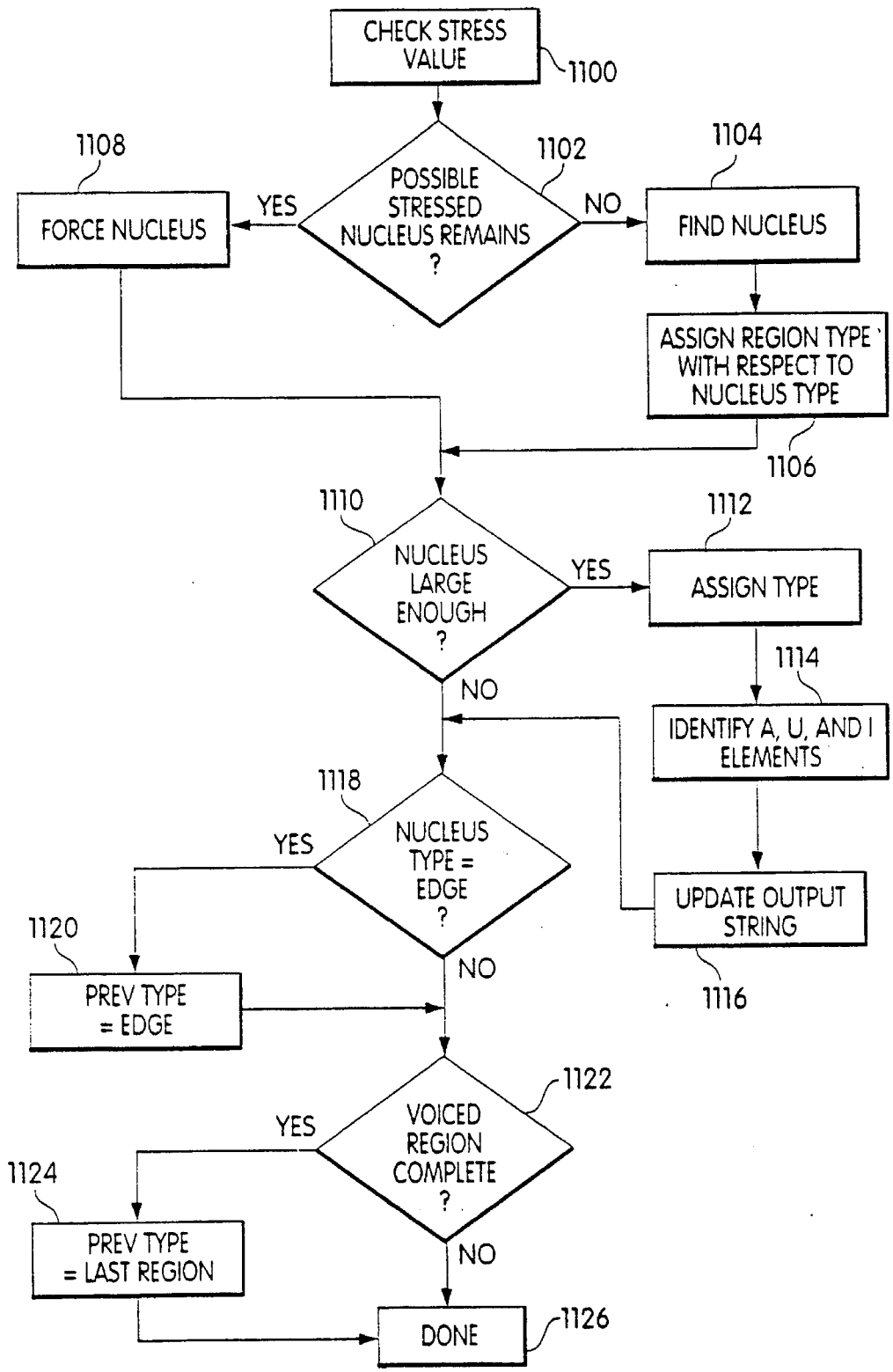
FIG. 19 is a flow chart describing how a portion of a voiced region is processed as a nucleus region.

A processing of a voiced region after an unknown, onset or fricative region, i.e., steps 310 and 312 of FIG. 9, will now be described in more detail in connection with FIG. 18 and FIG. 19.

If the previous type of region is unknown, as determined in step 1060, and the region number is not that of the final region, as determined in step 1062, it is likely that prevoicing is present in that region. If the length of the region is shorter than a typical prevoicing region (step 1063), there is no prevoicing. If the length of the region is such that prevoicing is present, as determined in step 1064, the previous region type is set to low-tone. It is possible simply to assert that prevoicing exists so that, as a result, the previous region type is always set to low-tone. In either case, the last true value (indicating the last positively classified frame) is set to the end of that region in step 1068 and processing continues with step 1074 to be described below. Similarly, if the previous type was unknown and the region number is that of the final region, processing proceeds to step 1074.

If the previous type was not unknown, and the previous type is neither onset nor fricative, as determined in step 1070, failure is indicated in step 1072. If the previous type is onset or fricative, processing proceeds with step 1074 which will now be described.

The remainder of the processing of this region is similar to the processing described in FIG. 11. It is first determined whether a nucleus end has been detected with certainty in step 1074. If not, an attempt is then made to find a sonorant in step 1076. The last region type and the current region type are then set in step 1078 similar to step 380 in FIG. 11.

If the nucleus end has been detected with certainty, and the number of peaks passed is equal to the number of nuclei, as determined in step 1080, a sonorant is forced in step 1082. Otherwise, an onset is forced in step 1084. An onset is forced by identifying the frame at which a rise in the power curve begins. Also, the previous region type is set to "ONSET" and a "O." is added to the output token string if this frame is sufficiently far (40 ms) from the start frame. After either forcing an onset or sonorant, or finding a sonorant, if a glottal stop has been held, as determined in step 1086 (see FIG. 10, step 346), the region type is then set in step 1088. In either case, a gap is checked for and adjusted for in step 1090.

If the region has now been completed, as determined in step 1092, processing is done as indicated in step 1094. Otherwise, the remainder of the region is processed as a nucleus region, step 1096. After processing to identify a nucleus subregion, if the region has been completely processed (step 1098), processing is done as indicated in step 1099, otherwise, the processing returns to step 1074.

Processing of a region as a nucleus region will now be described in more detail in connection with FIG. 19. First, the stress value is checked and updated in step 1100. The "stressed" boolean value is set to false if the local maxima in the power curve have been passed and a nucleus has been assigned already within the current voiced region. If a possible stressed nucleus remains, as determined in step 1102, an attempt is made to find a nucleus as indicated in step 1104 after which the region is assigned a type with respect to the nucleus type step 1106.

If no stressed nucleus remains, a nucleus is forced in step 1108. A nucleus is forced if a region of sufficient length is identified by a frame in with the total power and mid power are greater than that of the first frame and where the midpower is greater than 0.2 times the local midpower maximum.

Whether stressed or unstressed, processing proceeds to step 1110 in which it is determined whether an identified nucleus region is large enough. If the region is large enough, i.e., having a typical minimum nucleus length, it is assigned a type in step 1112, A, U and I elements are identified in step 1114, the output string is updated in step 1116. If the region is not a large enough nucleus region, or after the output string has been updated, if the nucleus type is an edge as determined in step 1116, the previous type is set to be an edge in step 1120. In either case, processing proceeds to step 1122 to determine whether the voiced region has been completely processed. If it has been completely processed the previous type is set in step 1124 to be the type of the last region, such as may have been set in step 1078. In either case, the processing is complete in step 1126.

Figure 20:
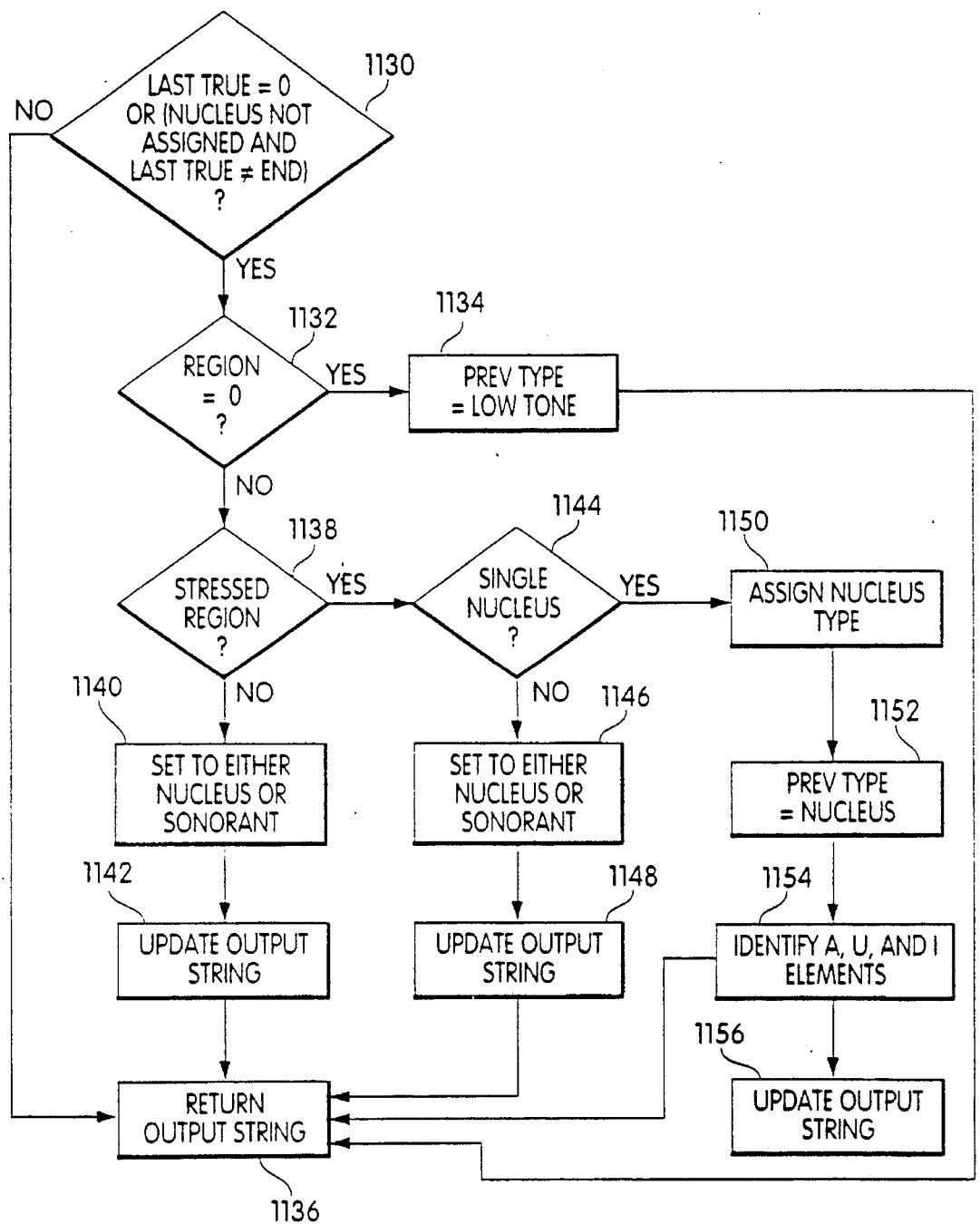
FIG. 20 is flow chart describing a portion of step 308 of FIG. 9 in more detail.
Figure 21:
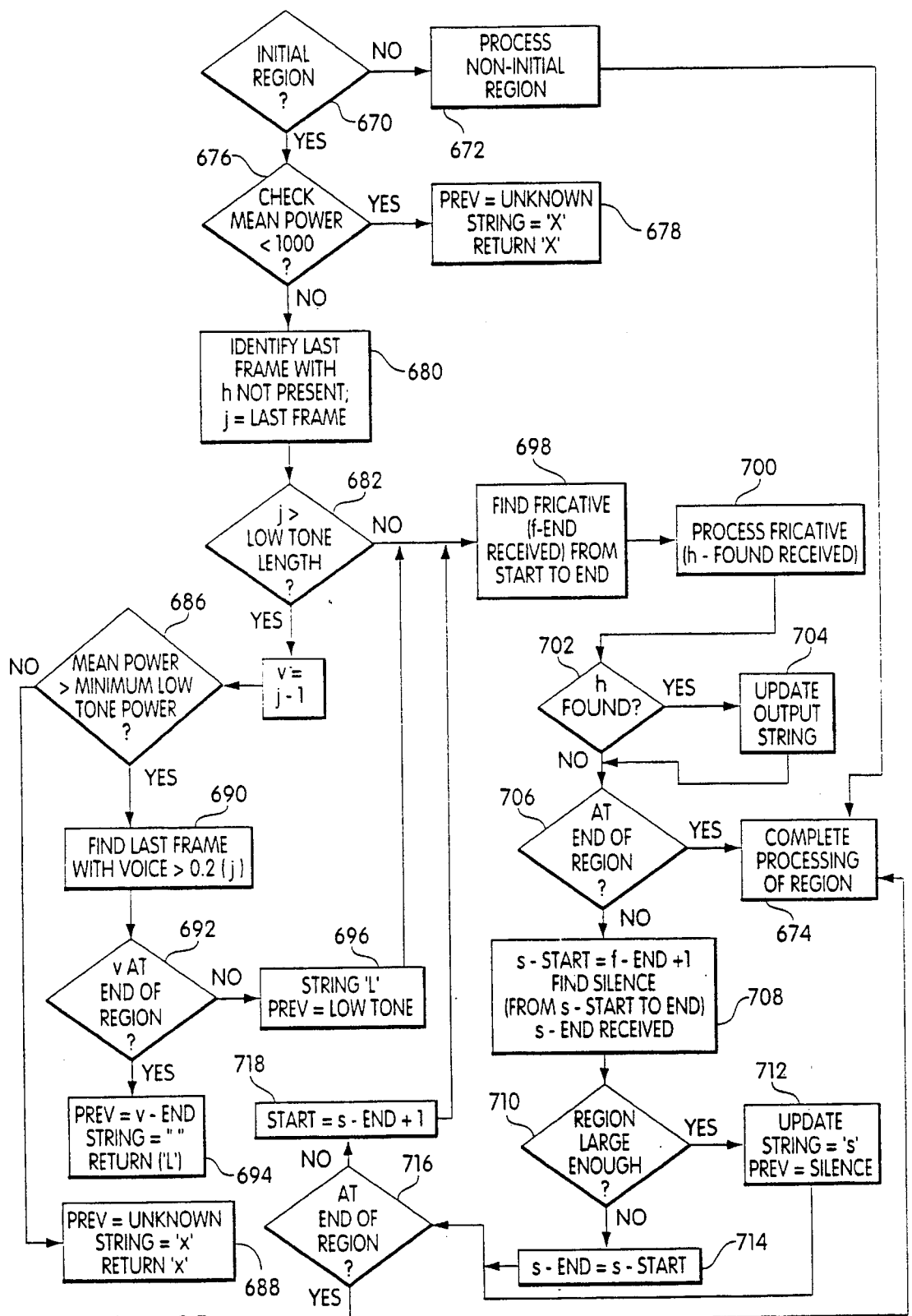
FIG. 21 is a flow chart describing how an unvoiced region is processed.

After processing in accordance with the steps 306, 310 or 312, an output string is constructed and returned from step 308, which will now be described in more detail in connection with FIG. 20. First, the output string is simply returned if the last positively identified frame or classified frame was not the start frame and if a nucleus was assigned (step 1130).

Otherwise, if this is the first region, the previous type is set to low-tone and the output string is returned in step 1136. If the region being processed is not the first region, and if it is not a stressed region as determined in step 1138, it is set to be either a nucleus or a sequence of nucleus-sonorant in step 1140 and the output string is updated to step 1142 and returned in step 1136. In step 1140, the region is assumed to be an unstressed rhyme if the duration is less than 100 ms and the previous type is set to be "NUCLEUS" and the output token string includes "N1;0.". If the duration is greater than 100 ms, the previous region type is set to be "SONORANT" and the output token string is updated to include "N1;0.R.".

If the region is stressed, and it is not likely to be a single nucleus, i.e., greater than 120 ms, as determined in step 1144, the region is set to be either nucleus or sonorant in step 1146. In particular, the previous type is "NUCLEUS" and "N1;0." is added to the output string is no nucleus was assigned and the last positively classified frame was not the start frame. Otherwise the previous type is "SONORANT" and "N1;0.R." is added to the output string. The output string is updated in 1148 and returned in step 1136.

If the region is less than 120 ms, it is assigned a nucleus type in step 1150, the previous type is set to be nucleus in step 1152, A, U and I elements are identified in step 1154. The output string is then updated in step 1156 and then returned in step 1136. Steps 1150–1156 are similar to steps 362–366 in FIG. 11.

Having now described the process of subclassifying a voiced region, the process of subclassifying a voiceless region into subregions of silence and friction (step 128 in FIG. 8), will now be described in connection with FIGS. 21–27. These figures describe the "parse_unvoiced" procedure found in the Appendix. The first step of parsing an unvoiced region is identifying whether the region is the initial region in step 670. An initial region is processed differently in step 672, as will be described below. After processing either of an initial or non-initial region, the processing of the region is then completed in step 674 which is also described in more detail below.

In an initial region, if the mean power is below a given threshold, such as 1,000, as determined in step 676, an error is returned in step 678. Otherwise, the last frame in the region in which the "h" phonological element is not present, is then identified in step 680. This frame is given the index "j" from the start of the region. If "j" indicates a region which is longer than a typical low-tone length, as determined in step 682, a new variable "v" is set to the value j–1 in step 684. A typical low-tone length used in step 682 is 50 ms.

First, the presence of a voice bar is detected, indicating the element L (low tone), which is often mis-classified as a voiceless region by the ESPS function. If the mean power between the start frame and the vth frame is less than the minimum mean power for low-tone, e.g., 50,000 (step 686), an error is returned in step 688. If this mean power is greater than the low-tone minimum power, the first frame from the start frame with voicing probability greater than 0.2, indicating the start of the voice bar, is then found in step 690. This value is set to be "j". Next, if the value "v" is near the end of the region as determined in step 692, a previous region value is set to be "v" and the value "L" is returned. If "v" is not at the end of the region, the output string is updated to include the string "L" and a previous region value is changed to "low-tone" (step 696).

Figure 22:
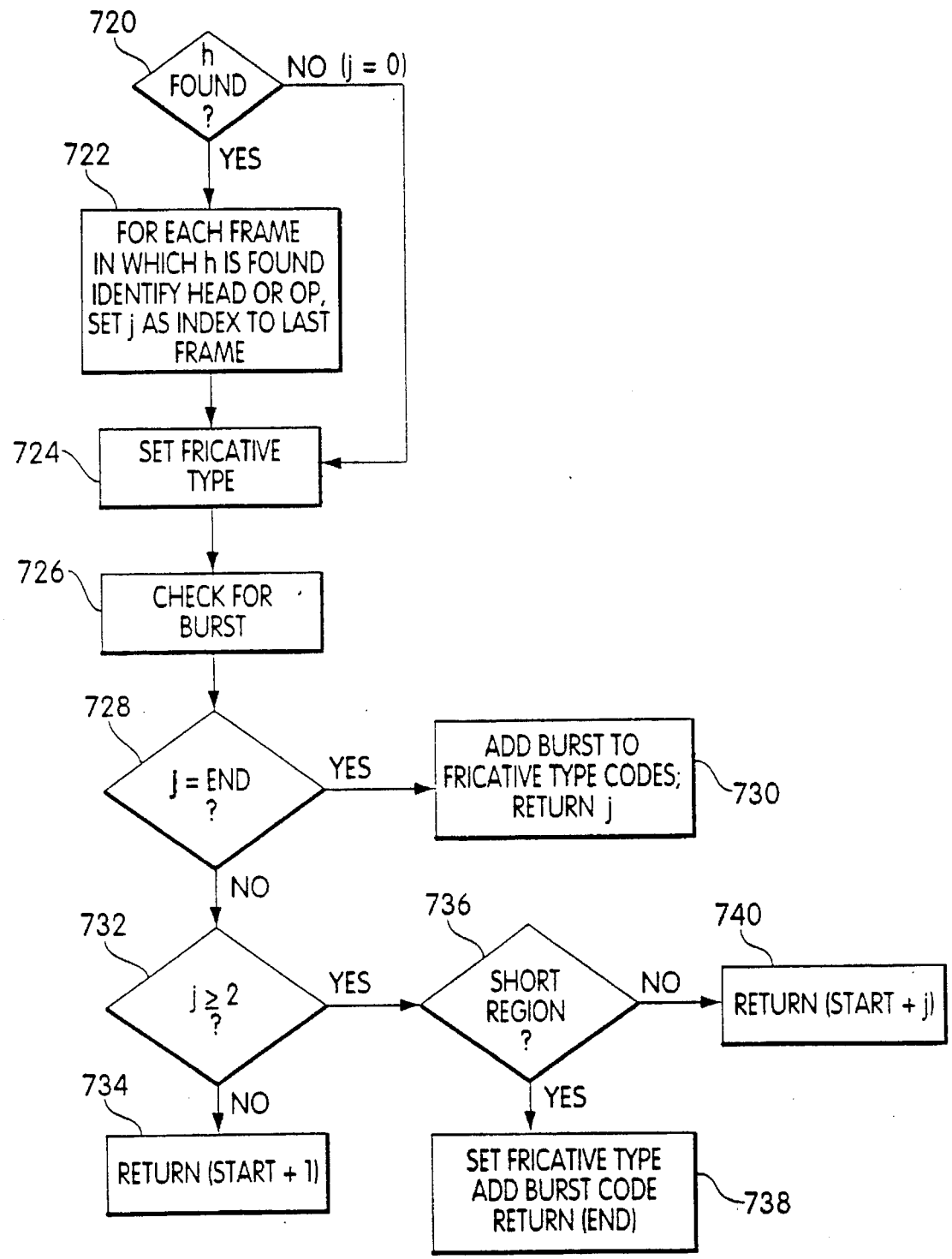
FIG. 22 is a flow chart describing how a fricative subregion is found.
Figure 23:
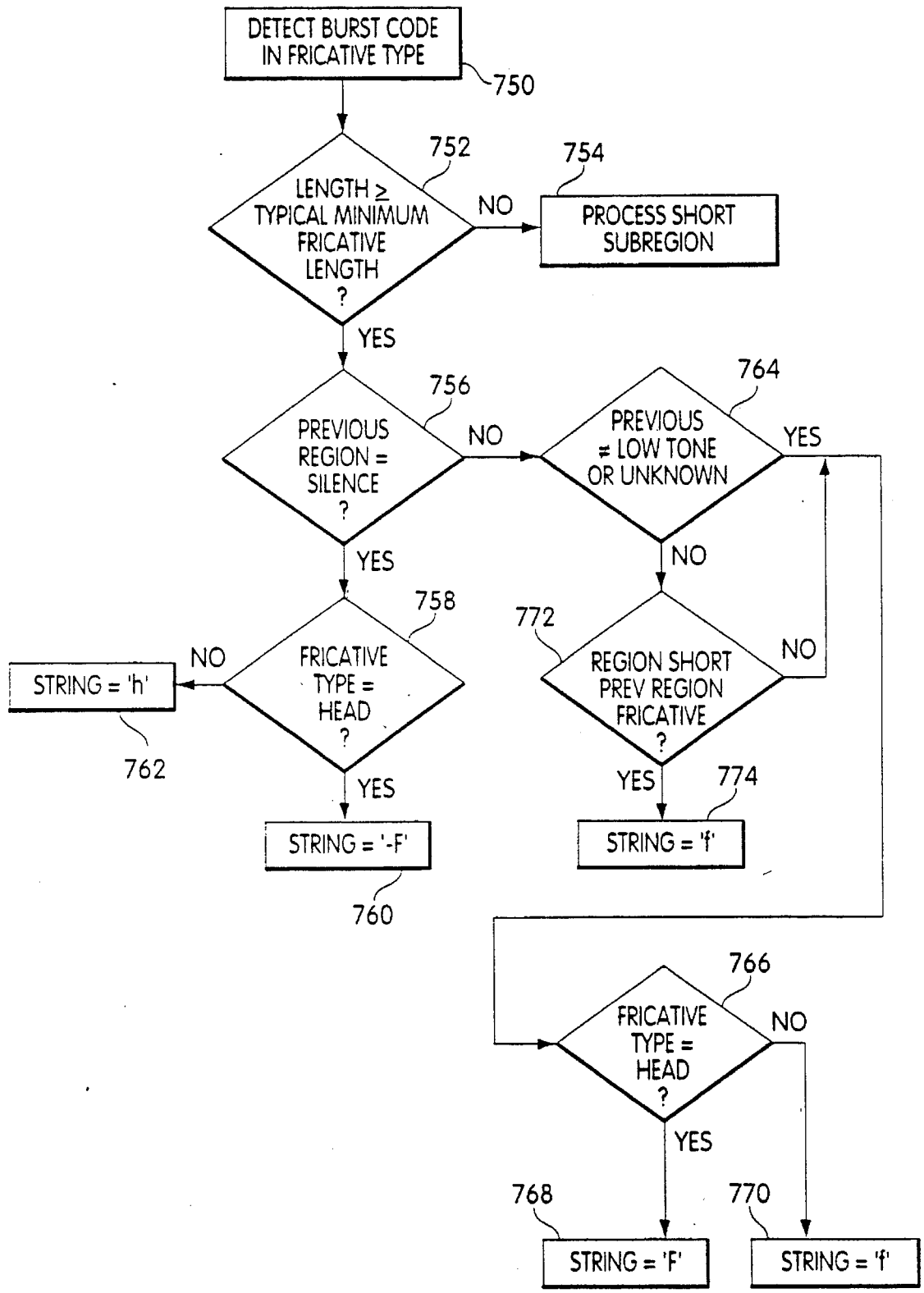
FIG. 23 is a flow chart describing how a fricative subregion is processed.
Figure 24:
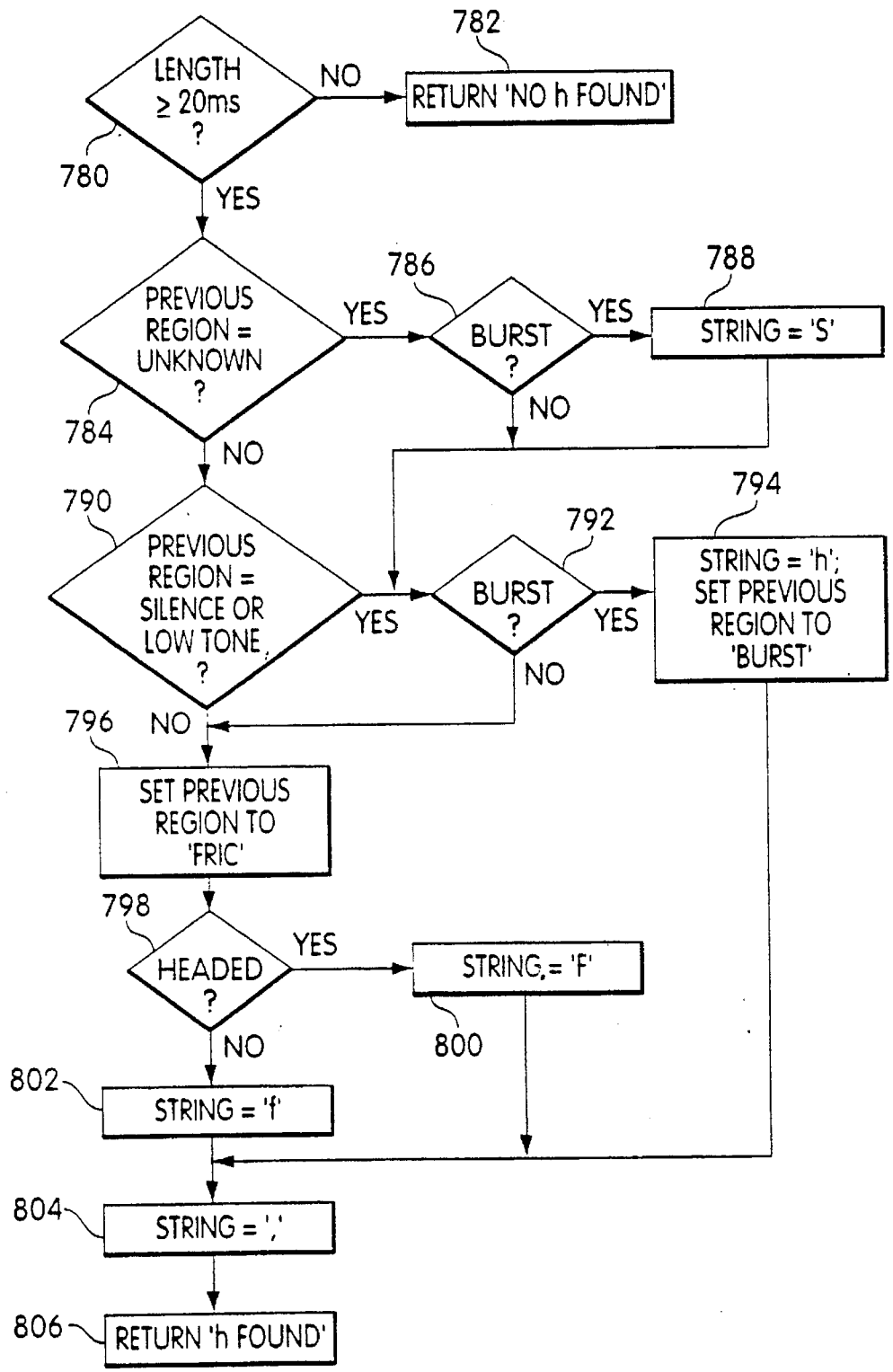
FIG. 24 is a flow chart describing how a short fricative subregion is processed.

If the value "j" is not longer than the typical low-tone length, or if a low-tone has been detected in step 696, the processing continues with step 698 of finding a fricative, a process to be described in more detail below in connection with FIG. 22, which finds the end of a fricative region within a region defined by a start value, which is initialized as "j", and the end of the region being analyzed. This fricative region is then processed in step 700, a process to also be described below, which returns a Boolean value as to whether the phonological element "h" has been found. If an "h" has been found as determined in step 702, the output string is updated in step 704. After the output string has been updated or if no "h" has been found, it is next determined, in step 706, whether the end of the region has been reached. If the end has been reached, processing of the region is completed in step 674, as will be described below. Otherwise, a value "s-start" is set to the value "f-end+1". The region from s-start to the end of the region is then processed to find a silence region in step 708. This process will be described in more detail below in connection with FIG. 25, and returns a value "s-end" which indicates the end of the silence region within the region processed. If the subregion defined by s-end is large enough, as indicated in step 710, the output string is updated to include an "S" in step 712 and the previous region-type is set to be silence. Otherwise, the value s-end is set to be s-start. If the end of the region has been reached, as determined in step 716, processing of the region is complete in step 674. Otherwise, the start value is then reset to be s-end+1 in step 718 and processing returns to step 698.

The process of finding a fricative will now be described in more detail. The first step of finding a fricative is to determine whether the phonological element "h" is found as determined in step 720. An "h" is found where the zero crossing level is higher than a threshold or if the value of K1 is below a given threshold. In this embodiment, the zero crossing rate threshold is 2,000 and the K1 threshold is 0.8. If an "h" is found, for each frame in which "h" is found until the last frame is identified, a head or operator is then identified. In this process, an "h" is found if it is found either as a head or an operator. It is found as a head if the zero crossings are higher than the threshold of 5,000, and the value of K1 is less than zero. For each frame where h is identified as a head, a head count is incremented. "h" is found as an operator if the zero crossing rate is higher than 2,000 or if the value of K1 is less than 0.5. For each frame in which "h" as an operator is found, an operator count is implemented.

When the last frame has been identified and a value of "j" has been set as its index or if the element "h" is not found, the fricative type is then set in step 724. It is identified as a head if the head count is greater than the operator count, otherwise it is indicated as an operator. Next, a burst is detected in step 726. A burst is identified if the maximum zero crossing rate between the start and the end of the region being analyzed is greater than a minimum zero crossing rate threshold for a burst, which is typically 6,000. If the index "j" is at the end of the region as determined in step 728, a burst is added to the fricative type code in step 730 and the process returns to the value "j". Otherwise, if the region defined by "j" is too short, i.e., less than 20 ms, the index of a start frame, plus one, is returned in step 734. Otherwise, if the whole region from start to end, being analyzed, is less than 100 ms long, the end of that region is returned and the fricative type is set to be operator if the mean ZCR in the region is greater than 2,000 and is set to be head if the mean ZCR is greater than 5,000. Otherwise, the start value plus the value "j" is returned in step 740 and it is left to the calling function to decide whether a valid friction region was found.

Processing of a fricative region will now be described. First, a burst code is detected in step 750 in the fricative type which is generated by the find fricative procedure discussed above. If the length of the region being processed is greater than or equal to the typical fricative length as determined in step 752, and if the previous region is silence as determined in step 756, an output string is generated based on the fricative type. If this type is "head" as determined in step 758, the output string is "–f" as indicated in step 760. Otherwise, the output string is "h" as indicated in step 762. If the previous region is not silence, and the previous region is also neither low-tone nor unknown, as determined in step 764, the output string is updated according to the fricative type which is examined in step 766. The output string is updated to include a "F" if the fricative type is head, otherwise it is updated to include "f" (step 770). If the previous type of region examined in step 764 is either low-tone or unknown, and if either the region is short or the previous region type is friction, as determined in step 772, the output string is updated to be "f" in step 774, otherwise it is processed by step 766–770. If the length of the region being processed is less than the typical minimum fricative length, it is processed as a short subregion in step 754, which will now be described in more detail.

If the length of this region is longer than 20 ms, as determined in step 780, the process returns indicating that no "h" has been found in step 782. Otherwise, if the previous region was unknown as determined in step 784, and if a burst was detected in the region (step 786) the output string is updated to include a "S". If the previous region, as determined in step 790, was either silence or low-tone, and the region includes a burst as determined in step 792, the string is also updated to include a "h". The previous region value is then set to be "burst" (step 794). Step 792 and 794 are also performed if the previous region was unknown.

If no burst was detected or the previous region is neither unknown, nor silence, nor low-tone, the previous region value is set to be fricative in step 796.

If the previous region has been set to be fricative in step 796, whether the region is headed is examined in step 798. If the region is headed, the output string is updated to include a "F" in step 800; otherwise it is set to be a "f" in step 802. After the output string has been updated to include a "h", "F" or "f", after steps 794, 800 or 802, the string is terminated by a "." in step 804 and an indication that an "h" has been found is returned in step 806.

Figure 25:
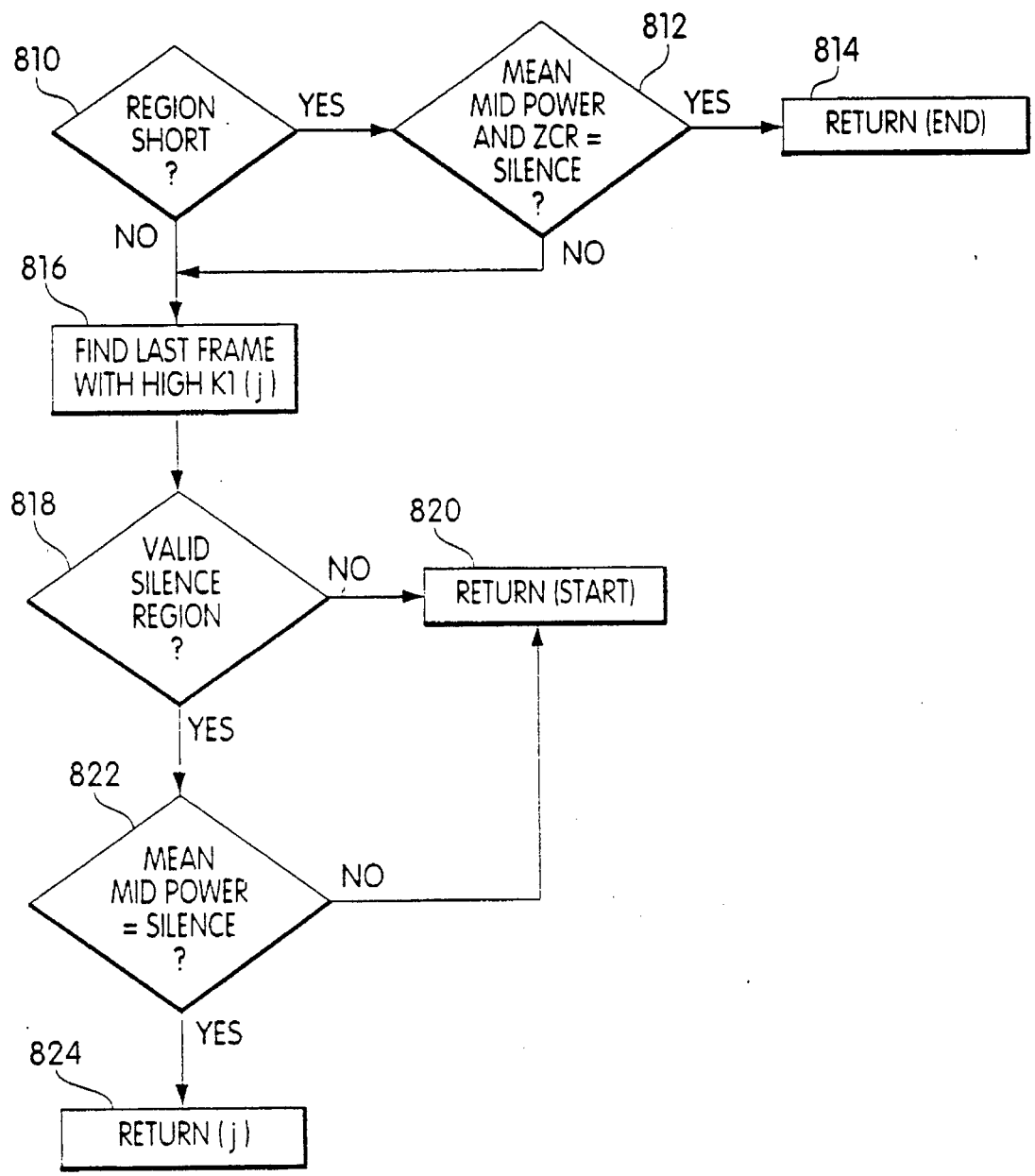
FIG. 25 is a flow chart describing how a silent region is processed.
Figure 26:
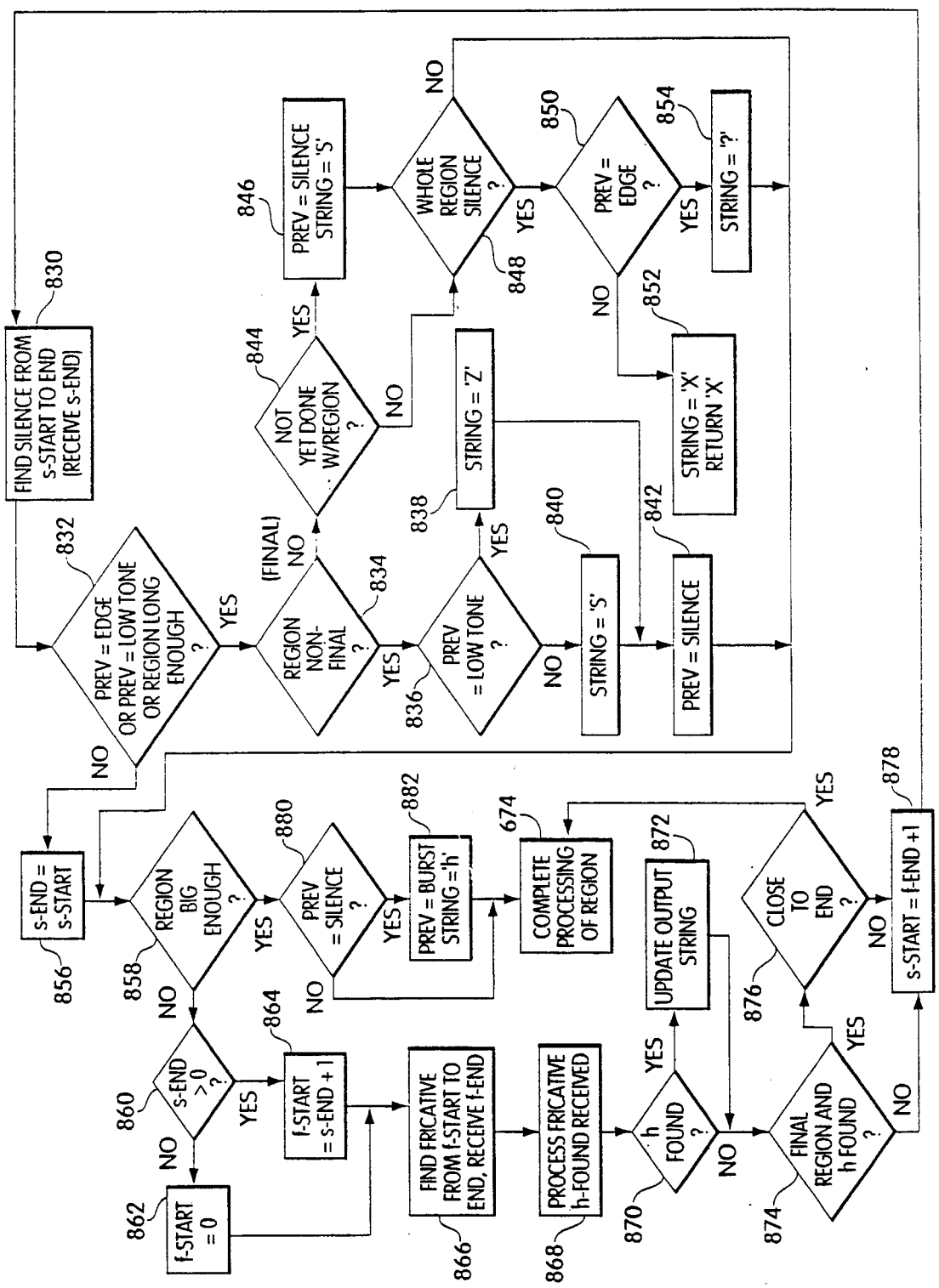
FIG. 26 is a flow chart describing how a noninitial unvoiced region is processed.
Figure 27:
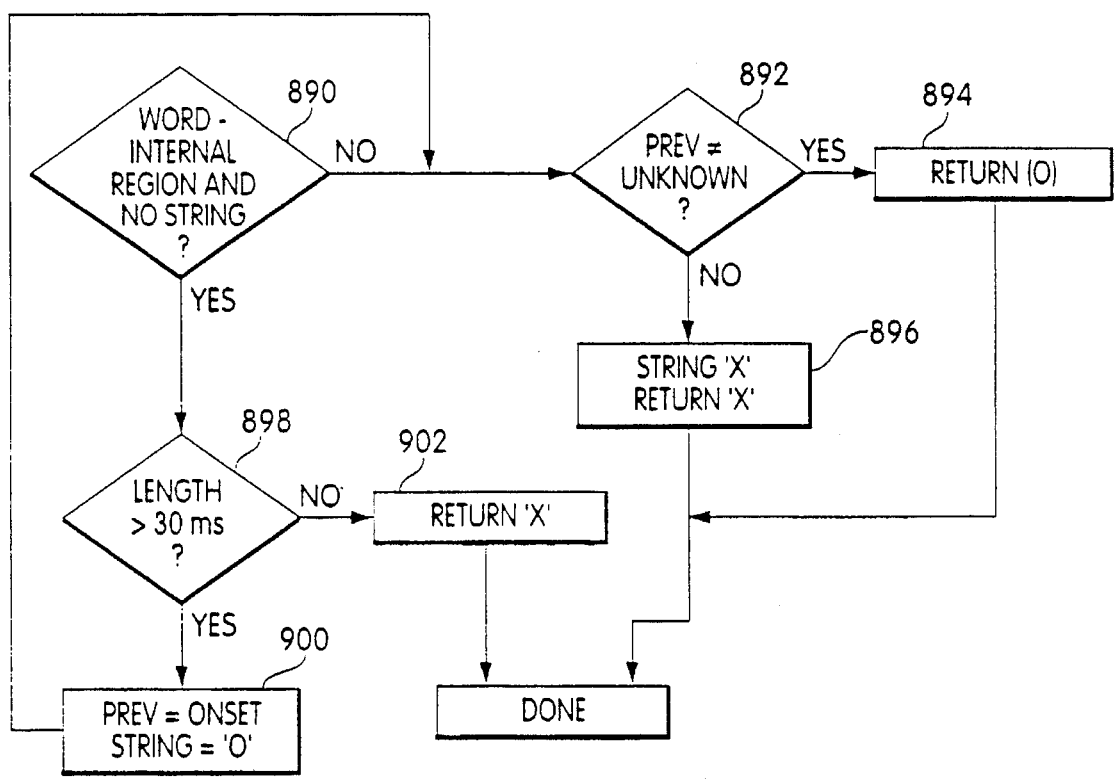
FIG. 27 is a flow chart describing how processing of an unvoiced region is completed.

The processing of a region to identify the end of a silent portion will now be described in connection with FIG. 25. If the region to be processed is short, as determined in step 810, and if the mean mid-power and ZCR indicates silence as determined in step 812, the end of the region is returned as the end of the silent portion in step 814. A region is short if it is not greater than about 100 ms. If the mean ZCR is less than 1,000 and the mean mid-power is less than 1%, this indicates silence. If the region is not short or it does not indicate silence, the last frame from the start to contain a high value of K1 is identified in step 816. The index of this frame is then returned. A high value of K1 is identified when either the value of K1 of the given frame or its adjacent frame is greater than 0.68.

Given this last frame, it is then determined whether it defines a valid silence region. A valid silence region is defined if the frame is the end of the region or if it is more than 40 ms from the start of the region. If a valid silence region is identified in step 818 and if the mean mid-power indicates silence (i.e., is less than 1%), the index "j" is returned in step 820; otherwise, if the value "j" does not define a valid silence region, the start value of the region being processed is then returned in step 820.

Step 672 of processing a non-initial region will now be described in more detail. The first step of processing a non-initial region is finding silence in step 830. The process of finding silence is discussed above. Next, in step 832, if the previous region is either an edge or low-tone, or if the region is long enough, it is then determined in step 834 whether the region is final. For a non-final region, if the previous region is low-tone, the output string is updated to include a "Z", otherwise it is updated to include a "S" in step 840. The previous region is then set to be silence in step 842. If the region is final, and if the region has not yet been completely processed, as determined in step 844, the previous region-type is set to be silence and the output string is updated to include "S" in step 846. After the output string has been updated or if the region has been completely processed, whether the whole region is silence is then determined in step 848.

If the previous region is not an edge, and the whole region is silence, as determined in step 850, an error is presumed to exist in this region as indicated in step 852. Otherwise, the string is updated in step 854 to indicate "?.". After any of steps 848, 854, and 842, the processing proceeds with step 858 as will be discussed below.

If the previous region is not an edge, is not a low-tone, or is not long enough, the value s-end is set to be s-start in step 856, processing proceeds with step 858. If the region currently being examined from start to s-end is not big enough, as determined in step 858, and if s-end is equal to zero, a value "f-start" is set to zero in step 862. Otherwise, the value of f-start is set to s-end+1 in step 864. Given f-start, the process of finding a fricative is then performed in step 868. This process was discussed in detail above. Next, the fricative region is processed in step 868 as discussed above. If the element "h" is found as determined in step 870, the output string is updated in step 872. Steps 870 and 872 are similar to step 702 and 704 discussed above. If the region being examined is the final region as determined in step 874 and value "h" has been found, and the value of f-end is close to the end of the region, processing of the region is completed as indicated in step 674. If this is not the final region, and the element "h" is not found, or f-end is not close to the end of the region, the value s-start is reset to f-end+1 in step 878 and processing resumes with step 830.

If it was determined in step 858 that the silence region identified is large enough, and if the previous region type was silence, the processing of this region is completed in step 674. If the previous region was silence, the previous region-type is then set to be "burst" and the output string is updated to include a "h." in step 882. Processing with this region has been completed in step 674.

Step 674 will now be described in more detail. If the region being processed is neither the initial or final region, as determined in step 890 and no output characters were generated by the processing of this region, and if the previous region-type was not unknown, a zero is returned in step 894. If the previous type was unknown, an "x" value is returned in step 896 indicating an error. If the current region is not word-internal and its length is greater than 30 ms, previous region-type is set to be onset and the output string is set to include a "O" (step 900). If the length is less than 30 ms, an error indication is returned in step 902. After the output string is updated in step 900, processing returns to step 892.

The processing of the speech signal by the classifier 108 results in an output string which indicates the type of subregions and phonological elements identified in the speech signal from left to right. For example, this output string may indicate "N2;30.Sh", for the English word "eight". Other typical outputs are "N2;20.S-F" or "?.N2;30.Sh". The output string is processed by a word parser 154 to obtain the symbolic representation 54. A symbolic representation of a word contains the structural information of a word: the constituents, the number of positions contained in each constituent, and the phonological expressions associated to these positions. The three constituents recognized for all languages are those described above, namely: N(nucleus), O (onset) and R (rhyme). The N constituent may contain one (N1) or two (N2) positions. The O constituent may contain zero (O0), one (O1) or two (O2) positions. The R constituent always contains two positions (R2). This latter representation may seem redundant (i.e. if "R" then 2) but is portrayed in this way for clarity.

Each phonological expression may be represented by a fourteen (14)-bit word. The 10 least significant bits (bit numbers 0 to 9) represent the presence or absence of each of the ten phonological elements. If a given bit is set (=1) then the phonological element is present in the expression; if the bit is not set (=0) then the phonological element is absent.

The most significant four bits (bit numbers 10–13) indicate which of the elements (if any) is the head of the expression. This four bit binary number represents the bit number of the head plus one, of which bit 13 as the most significant bit. For example, if A is the head of the expression, then its bit number is 0. Therefore bits 10 to 13 are: 0001. If R is the head of the expression, its bit number is 5. Therefore bits 10 to 13 are: 0110. A table of suitable bit assignments to phonological elements is shown in Table 6.

The binary number of a phonological segment is stored in an array called "element", where the index for a phonological element in the array corresponds to the bit number of the phonological element.

element(0) = "A"  '1
element(1) = "I"  '2
element(2) = "U"  '4
element(3) = "N"  '8
element(4) = "#"  '16
element(5) = "R"  '32
element(6) = "?"  '64
element(7) = "h"  '128
element(8) = "H"  '256
element(9) = "L"  '512 viewed horizontally,

TABLE 6

| bit: | 9 | 8 | 7 | 6 | 5 | 4 | 3 | 2 | 1 | 0 |
|---|---|---|---|---|---|---|---|---|---|---|
| element: | L | H | h | ? | R | # | N | U | I | A |

Consider the following example representations of phonological expressions:

Example 1

| Decimal value: | 3524 |
|---|---|
| Binary value: | 0011 0111000100 |

This expression contains the elements U, R, ? and h. The bit number of the head is 3−1=2. Therefore U is the head of this expression. This expression corresponds to a "p" as in the English word "put".

| Decimal value: | 8338 |
|---|---|
| Binary value: | 1000 0010010010 |

This expression contains the elements I, # and h. The bit number of the head is thus 8−1=7, or h. This expression corresponds to "sh" as in the English word "shirt".

This kind of representation guarantees that each linguistically significant phonological expression in any human language has a unique identifier (a number) which receives uniform interpretation for any human language. The number representing a phonological expression is stored in decimal form. The functions bin_to_dec and dec_to_bin (well known in the 'C' programming language) handle conversion between decimal and binary forms.

Figure 28:
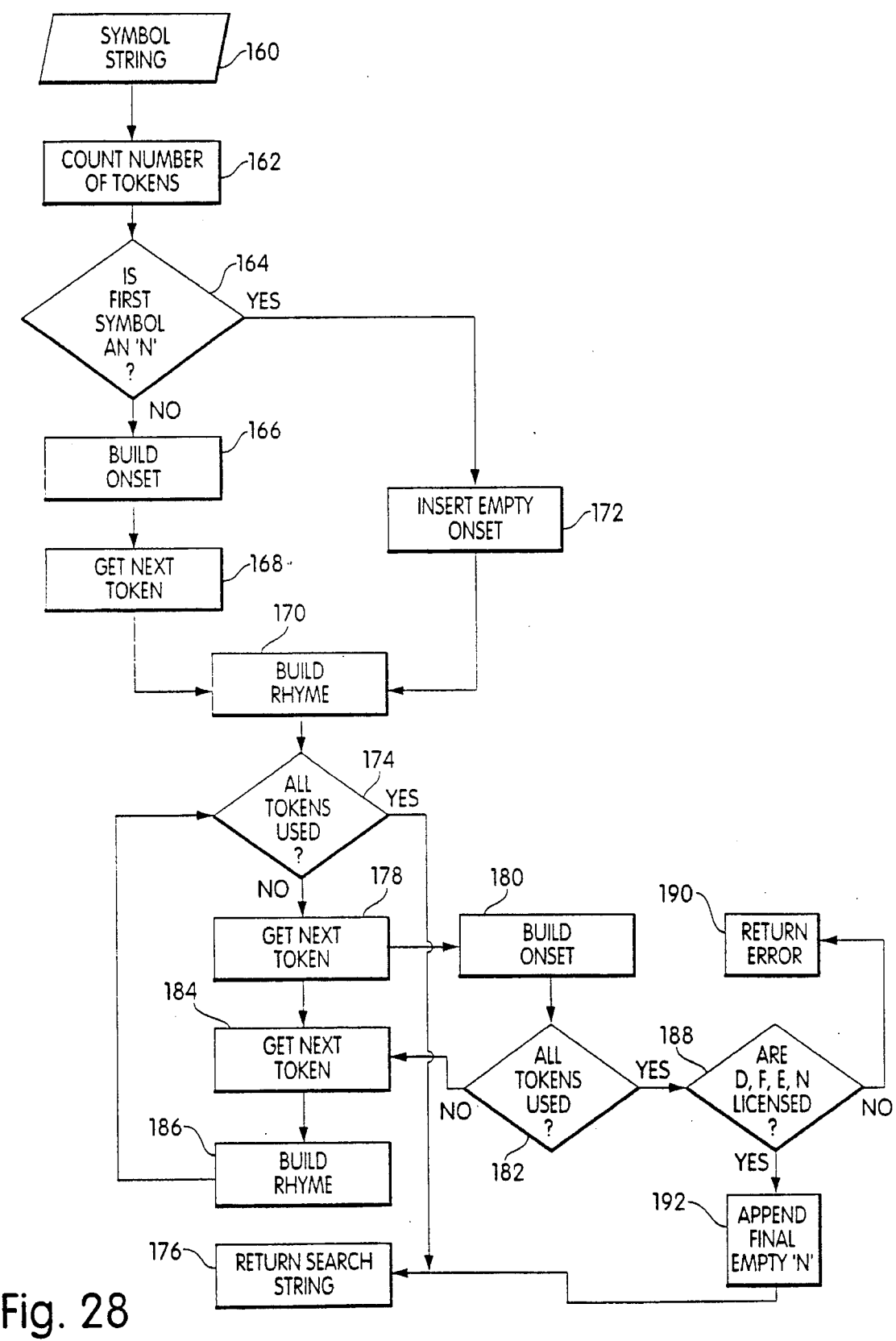
FIG. 28 is a flow chart describing how the output file from the phonetic classifier and segmenter is parsed into a symbolic representation.

The operation of the word parser 154 will now be described in connection with FIG. 28. The word parser 154 receives the symbol string 160 which corresponds to the output string updated in the process described in connection with FIG. 8. The number of tokens in this symbol string is then counted in step 162. If the first symbol is not an "N", indicating a nucleus, as determined in step 164, an onset is built in step 166 as will be described in more detail below in connection with FIGS. 29A–B. This building of an onset constructs the symbolic representation of the first onset of the sequence. The next token is obtained in step 168 and a rhyme is then built in step 170 as will be described in more detail below in connection with FIGS. 30A–B. The build rhyme procedure essentially constructs the symbolic representation of the subsequent rhyme in the speech signal. If the first symbol is an "N", indicating a nucleus, an empty onset is inserted into a symbolic representation as indicated in step 172 and the processing proceeds to the "build rhyme" procedure, in step 170.

If all the tokens are used, as determined in step 174, the search string, or the symbolic representation 54, is then returned as indicated at step 176. Otherwise, the next token is obtained in step 178. An onset is then built in step 180, similar to the step 166 of building an onset. If all of the tokens are not used, i.e., tokens remain in the symbol string, as determined in step 182, the next token is obtained in step 184 and a rhyme is then built in step 186. Processing then returns to step 174. If all the tokens are used as determined in step 182, it is then determined whether domain final empty nuclei are permitted in this language, as shown in step 188. If domain final empty nuclei are not licensed, an error is returned in step 190. Otherwise, a final empty nucleus is appended to the symbolic representation in step 192 and the search string is returned in step 176.

Figure 29A:
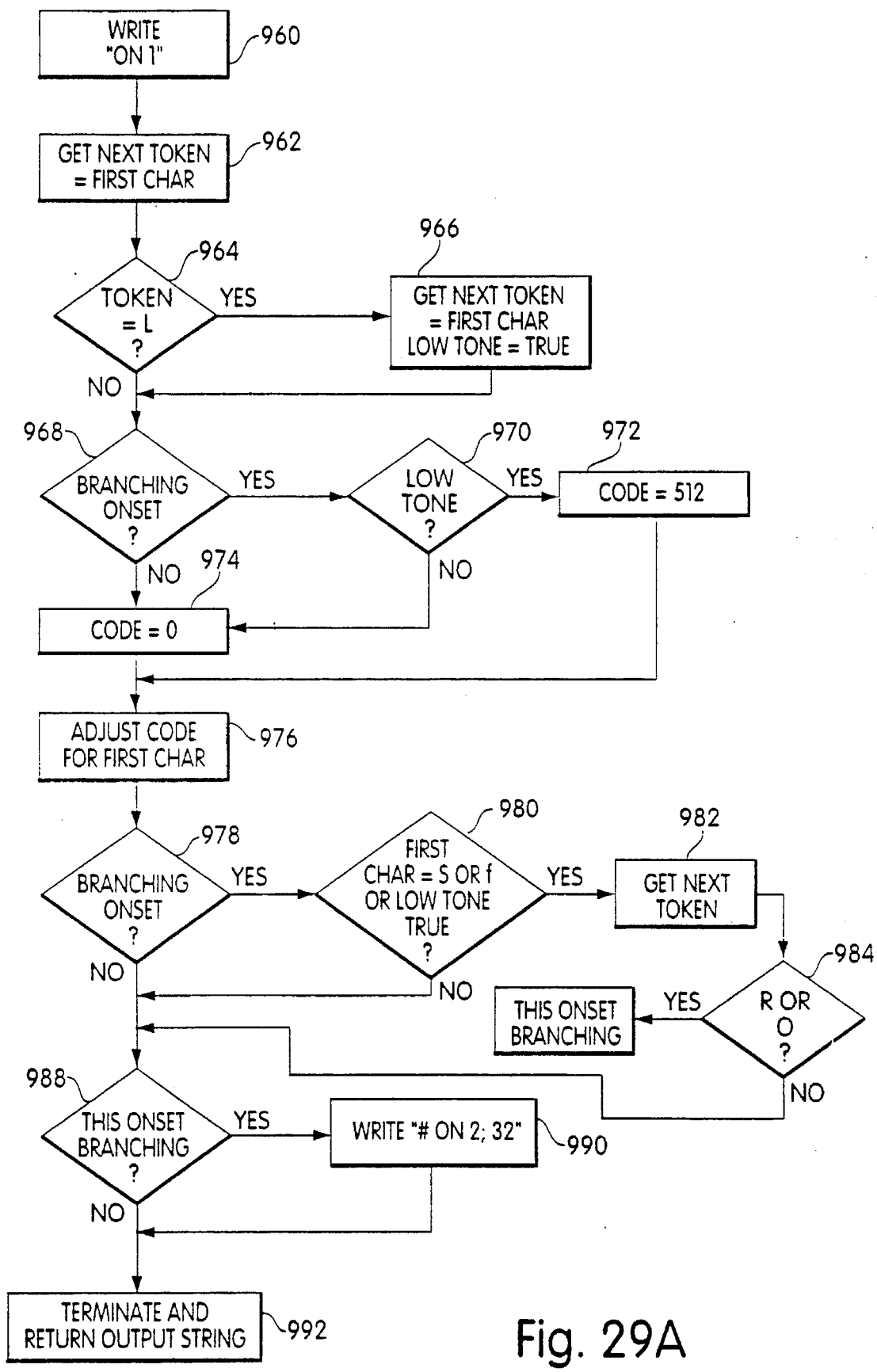
FIGS. 29A–29B are flow charts describing how onsets are built.

The process of building an onset will now be described in connection with FIG. 29A–B. This process accepts as its input a string corresponding to a single token read from the token string output by classifier and segmenter 108 and returns a string containing one or more constituents (depending on branching status) with the codes for their associated phonological elements as described above. The current syllable index is held in a variable "syll". An input token can be of any of the set: {S, Sh, S-F, R, O, Z, h, f, F, ?, Lf, Lh}, i.e., a token may contain 1 or 2 symbols. The O-R pair (or syllable) index is included in the output string. For example, in syllable 2, the input string 'Sh' will be converted to the string "021;192", because 192= 128+64, for h and glottal stop, respectively. This element code is stored in the variable 'code'. This process uses the following global variables: (1) BRANCHING ONSET parameter; (2) SON STOP parameter; (3) HV DEVOICED parameter; (4) token counter; and (5) pointer into the input symbol string.

The first step of building an onset is writing output string "On1", where "n" is the syllable index. The next token is then obtained in step 962. If this token is a "L" checked in step 964, the next token is then obtained in step 966 and the value of low-tone is set to true. If branching onsets are used in this language, as determined in step 968 by reference to the parameters set previously, and if low-tone is true, as checked in step 970, the output code is set to 512 in step 972 and, on the failure of any of these cases, the code is set to zero in step 974.

The code is then adjusted according to the token obtained in step 976. This adjustment from particular tokens will be described in more detail in connection with FIG. 29B. After the code has been adjusted appropriately, whether this language permits branching onsets is then again checked in step 978. If branching onsets are permitted, and either if the first character is either "S" or "f" or if low-tone is true, (these are the possible heads of branching onsets) the next token is then obtained. If the first character of this next token is "R" or "O" then this onset is branching and a token counter is incremented; otherwise it is false. If this onset is branching, it is then checked in step 988, the output string is updated to include "#On2;32", where "n" is the syllable index (step 990). In either case, the output string is terminated and returned in step 992.

The adjustment of the element code for the first character (step 976) will now be described in more detail in connection with FIG. 29B. If the first token is an "R" (step 1000), and if the language is Japanese (step 1008), do the following: if the current token is the final token of the string (step 1010), a "616" (the code corresponding to a nasal sonorant) is written to the output string in step 1012, otherwise a "64" is written to the output string in step 1014. Otherwise, i.e., the language is not Japanese as determined in step 1008, if sonorants contain glottal stops in this language (step 1002), a "64" is written to the output string (step 1004), otherwise a zero is written to the output string in step 1006. This sequence of steps for processing an 'R' token is then done as indicated in step 1016.

If the token is a "h" or a "f", the current code plus 128 is written to the output string. If the token is an "O" (step 1022) a "0" is written to the output string in step 1024. If the token is a "F" the current code is written to the output string in step 1028. If this language has devoiced high vowels, such as Japanese, the next token is then obtained in step 1032. If this next token is a "S" as determined in step 1034, the output string is augmented to include "#Nn1;2" in step 1036.

If the token is a "Z" or a "?", "192" is written to the output string in step 1040. Finally, if the token is a "S", as determined in step 1042, and if the next character in the token string is either "h", "–" or "F", "192" is written to the output string in step 1048. Otherwise the "64" is written to the output string in step 1050.

Figure 29B:
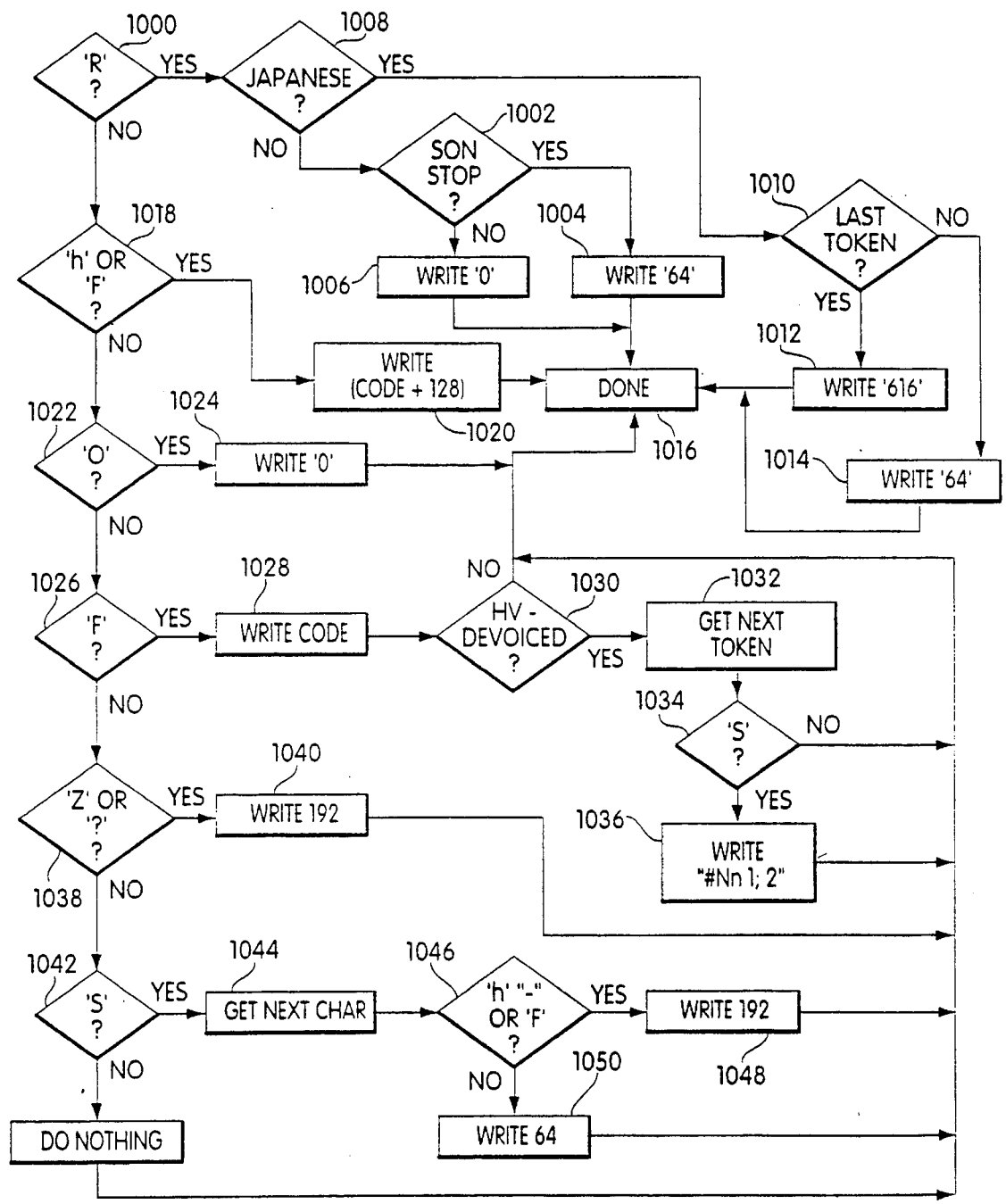

Thus, with this procedure outlined in FIG. 29B, the output string is updated to include a code indicating the elements present in the onset.

Figure 30A:
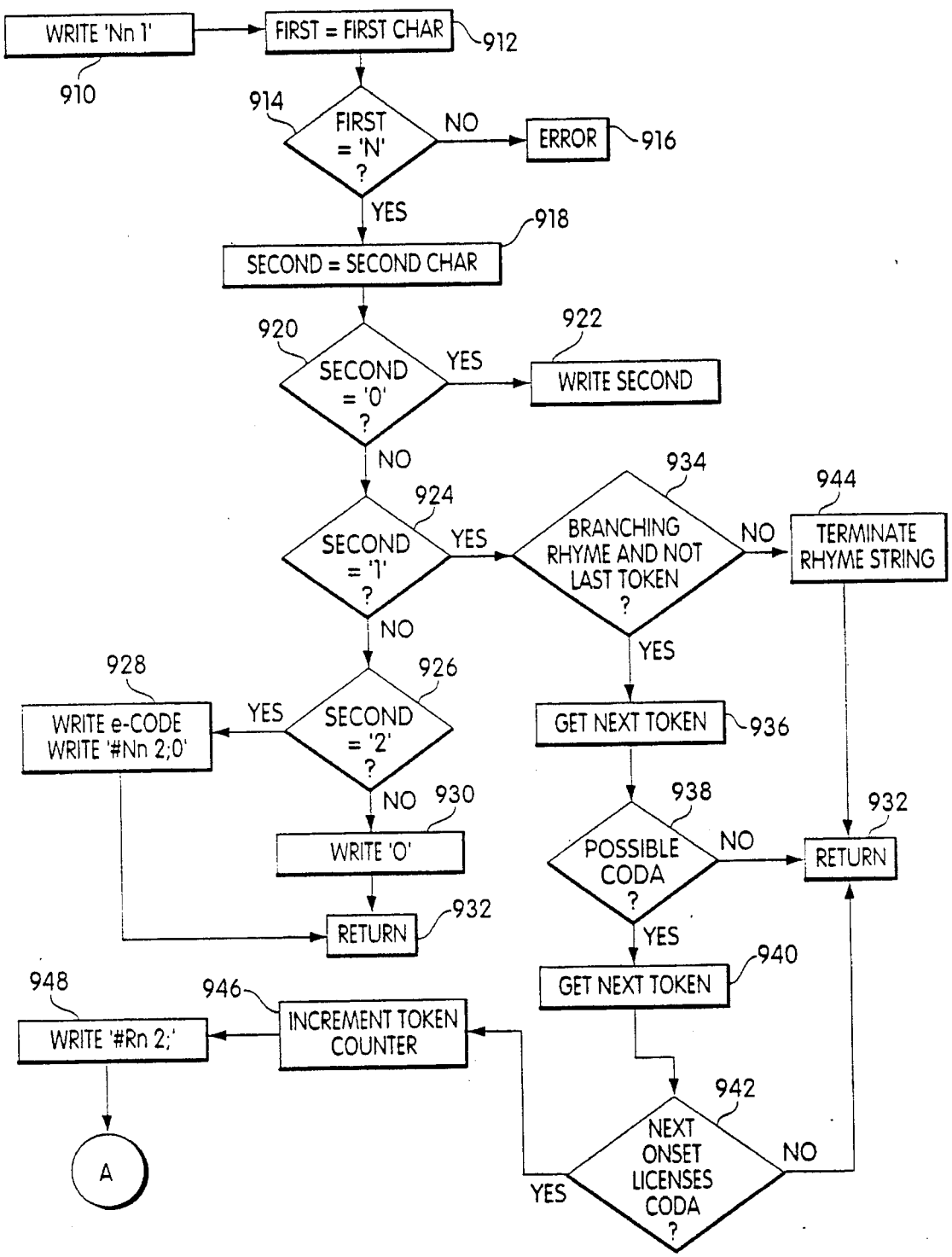
FIGS. 30A–30B are flow charts describing how rhymes are built.
Figure 30B:
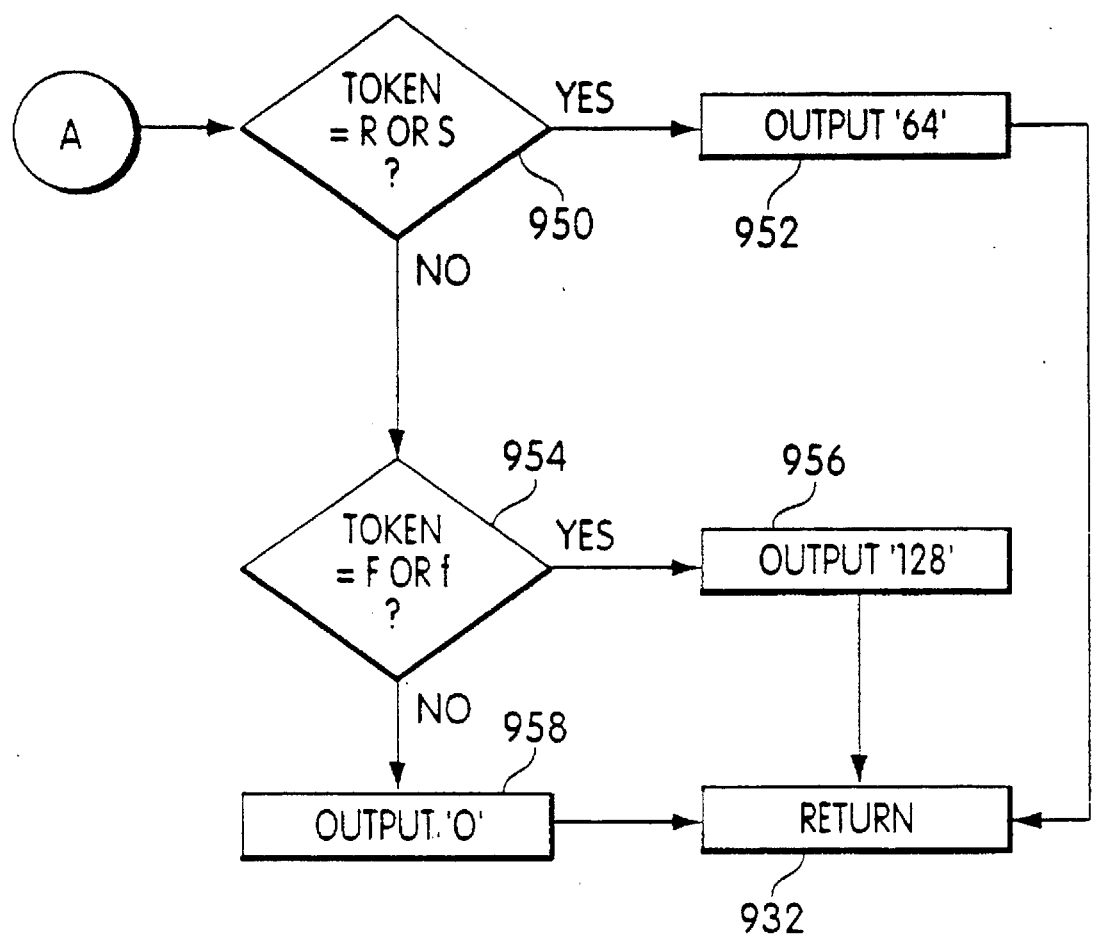

The process of building a rhyme will now be described in connection with FIGS. 30A–B. The input and output of this process are the same as for building an onset. The initial token received is one corresponding to a nucleus, and its branching status is predetermined. The only decision to be made is whether we have a closed onset-rhyme pair, i.e., a vowel followed by a coda. So, if the language allows branching rhymes, the next two tokens are examined to check whether there is a rhymal consonant. The second consonant must be a governor, or licensor, for the first, as per Coda Licensing (Kaye 1990). This is checked by a subfunction licenses (left, right), which returns just True or False depending on whether the right token governs the left token. Rhyme strings are of the form: N0 or N1;x for non-branching nuclei; or N2;x;y for branching nuclei, where x,y are the element codes and 0<x,y<7; y is always 0 for the moment, i.e., we ignore sequences like [au], [oi] and assume all branching nuclei are just long vowels. Relevant parameters are BR_RHYME; True for English, False for Japanese and Korean.

First, the string "Nn1" is written as the output, where "n" is the syllable index (step 910). The first character is then obtained from the token string in step 912. If the first character is not an "n" as determined in step 914, an error is returned in step 916. Otherwise, the second character from the token is obtained in step 918. If the second character is "0", a "0" is written to the output string in step 922. If the second character is a "1", as detected in step 924, it is determined whether there is a branching rhyme with a possible coda in steps to be described in more detail below. If the second character is a 2 as determined in step 926, the element code is then retrieved and written in step 928 and the sequence "#Nn2;0" is then written to the output string. In the default case, something valid is written in step 930 to the output string, such as a zero. The output string is then returned in step 932. If the second character obtained is a 1, and branching rhymes are permitted in this language, and this is not the last token, as determined in step 934, the next token is obtained in step 936. If this next token is a possible coda token in the language, it is determined in step 938, yet the next token is then obtained in step 940. It is then determined whether this most previously obtained token licenses the potential coda token in step 942. If it does not license the potential coda token the output string is returned in step 932. Also, if the next token is not a possible "token" the output string is then returned to step 932. If no branching rhymes exist or if this token is the last token, the rhyme string is terminated in step 944 and the output string is returned in step 932. If it is determined that the onset licenses the potential coda tokens, the token counter is incremented in step 946 and the output string is updated to include the string "#Rn2;" where "n" is the syllable index (step 948).

Next, if this second token has been determined as a coda is an "R" or an "S", the output string "64" is written and the output string is returned in step 932. If the token is an "f" or "F", the string "128" is written to the output string and the output string is returned in step 932. Otherwise, a "0" is written to the output string and the output string is returned in step 932.

In the current system, step 942 is performed in the following manner. If the potential onset token is a "S" the condition is true. If the potential coda token is "r" the licensing is true if the onset token is also either "F" or "f" or "R". In all other cases, the condition fails. These conditions results from the fact that a stop in an onset will govern anything while a fricative or a sonorant can only govern sonorants. (In fact, only a nasal sonorant can govern another sonorant.)

With the process of parsing completed, the system has now provided a symbolic representation of a word or words in the speech signal. As an example, the symbolic representation of the English word "eight" could be, for the first example token string:

013;0#N11;3#N12;0#021;192#N21;0

For the second example token string for "eight," the symbolic representation would be the same, except that "013;0" would likely be replaced by "011;64". This should be the case when the word is pronounced with an audible initial glottal stop.

In this symbolic representation, each field begins with an "O" or an "N" and terminates with a "#". The first digit following the "O" or the "R" is an index into the string, increasing by 1 for every O-R pair. The second digit is the number of the skeletal position in that constituent. That is, for a branching constituent there would be a second entry, say O12, for the contents of the second position. The second digit is followed by a ";". The decimal number following the ";" corresponds to the phonological expression associated with the skeletal position. Thus each field (delimited by #..#) corresponds to a phonological segment.

To match the symbolic representation to a word, it is compared to a lexicon such as lexicon 58 in FIG. 2. The lexicon 58 of FIG. 2 will now be described in more detail.

A lexicon 58 is preferably established for each individual language. It may be in the form of a computer-readable file called, for example, "language.voc," where "language" is the name of the language in question (or the first eight characters thereof) and the extension ".voc" (vocabulary) indicates the format of the file in which lexical data is stored. For example, a lexicon 58 for English may be labeled "english.voc". This file-name format is exemplary only, and many other formats may be suitable. FIG. 31 shows at 248 a lexicon, for the numbers 1 through 10 in Japanese, in human readable form with typical lexical entries 250 which may be used in this system.

Each lexical entry has two lines: a first line 252 contains an indication of the standard orthography of the word for the language in question, such as an ASCII text representative of the word. This first line may store anything which may be used to display a human-readable representation of the word. In this example, an English word and a phonetic representation of the Japanese word is shown. Most computer systems have the ability to display numerous Western and Eastern scripts for this purpose. This first line is for display purposes only and is not used in the recognition process itself. The second line 254 of each lexical entry for a word contains a lexical representation of a word. A typical lexical representation, for example the word "eight" in English would appear as follows:

O1:0,,N1:2051,N2:2,O1:6368,,N1:0

In this lexical representation, each phonological segment is delimited by a ",". It includes an indication of the constituent-type (the first two characters) of which the first character indicates either an onset ("O"), nucleus ("N"), or rhyme ("R"). It also indicates the number of skeletal positions in this constituent, which is either 1 or 2. A rhyme constituent is always marked with a "2" and only follows a non-branching nucleus ("N1"). The phonological expression associated with this segment follows the ";" and is generated according to the same principles discussed above using a 14 bit word to identify the phonological expression.

The lexical matching system 55 (of FIG. 1), which will now be described in more detail, matches a symbolic representation 54 from the parser 154 to the phonological representation of each lexical entry in the lexicon 58. A general description of the concept behind lexical matching will be provided first. The matching to be performed can be presumed to be a form of pattern matching using incomplete vectors. Thus, a variety of implementations can be envisaged, such as associative memories and content addressable memories. More particularly, a system can use a form of a weighted distance metric to identify a best match in the lexicon to the symbolic representation.

More particularly, a search may proceed as follows. Once all onsets have been identified, a search pattern can be produced in the form of a consonantal skeleton plus the positions of surrounding nuclei, which may then be input to a searching system. For example, for the input word 'letter', we should have the sequence [l_t_], where the alphabetic symbols are only intended as abbreviations for the phonological expressions which form each particular segment. The "t" may well only consist of 1 or 2 elements from the set of (R, ?, h). This is immaterial however, as it does not appear as if it would produce any serious mismatches. For example, if only ? or h is found, the resulting output from a lexical search is only the words containing stops or fricatives and stops respectively. In the case of isolated word recognition where no higher level constituents are available, if a ? element is found we know from the phonology of English that the sound must be a "t" and the parser can supply the remaining elements to narrow down our search. If R and h are found, we have a possible mismatch with 'lesser', but this is a common human error in any case.

At this stage, the result of any preliminary search is a short list of words fitting the identified consonantal skeleton, say: 'latter', 'litter', 'letter', differing only in the content of the nuclei. In order to select the correct word, we merely need to identify the first nucleus, and recognition would then proceed by identifying the elements associated to that position.

Another strategy would be applied in the case of the word 'potato', such as may be pronounced quickly, resulting in a dropped first 'o', resulting in the string [pt__t__], (where the two underscores indicate a branching nucleus). Given that the sequence 'pt' does not form a possible onset, the string would be modified by the parser to [p__t__t__] before searching the lexicon, and again potential search errors are avoided. In this case the skeleton will be sufficient to produce a single match in the English lexicon, and no vowel identification will then be necessary.

Figure 32:
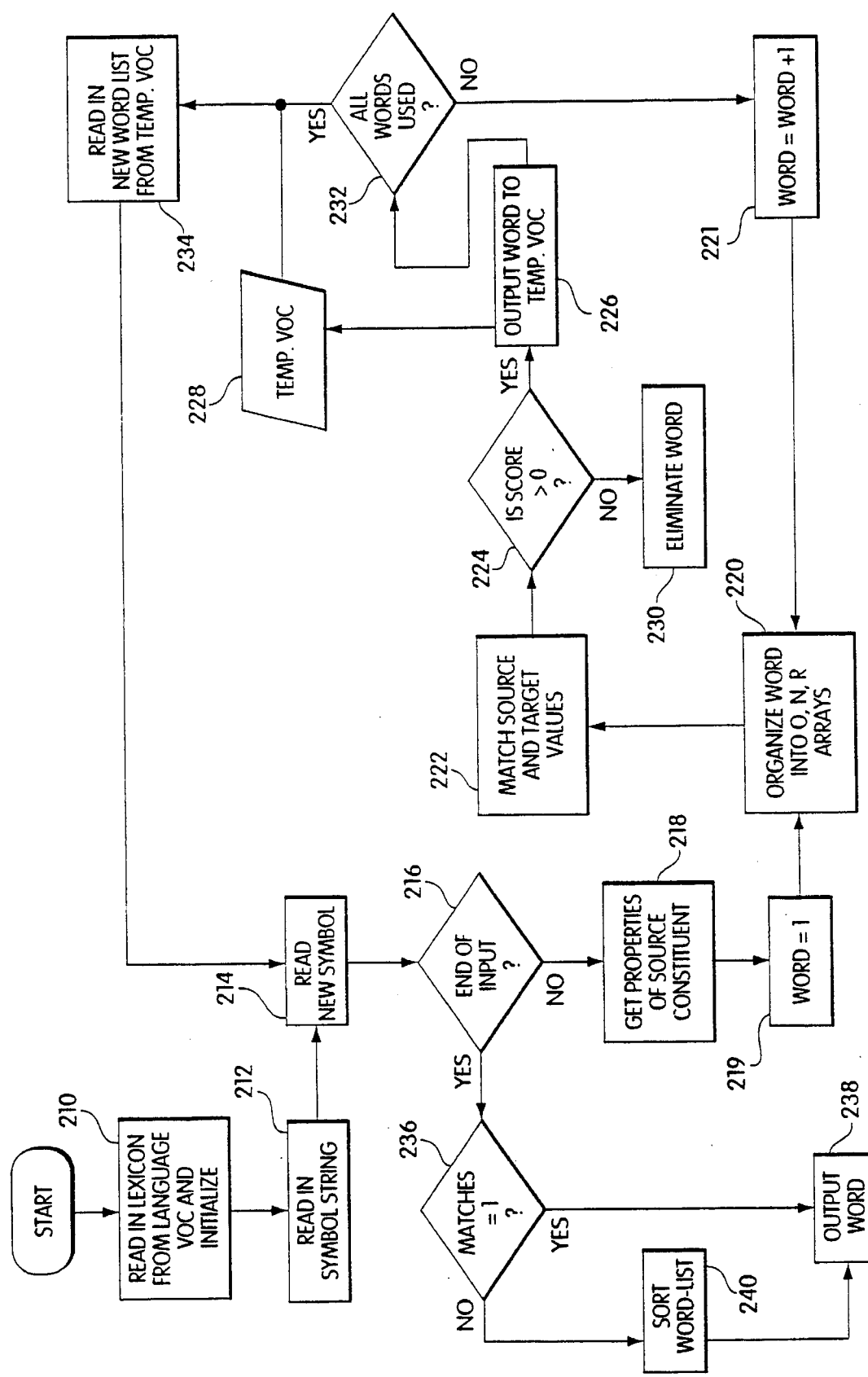
FIG. 32 is a flow chart describing how a symbolic representation is matched to entries in a suitable lexicon.

The process of accessing a lexicon to match a symbolic representation to a word will now be described in connection with FIG. 32.

The input to the lexical matching system is the symbolic representation 54 output by the parser 154. This representation, as discussed above, contains information on the structure (Onset-Nucleus pairs) identified in the signal, plus their associated phonological elements. Whatever structure has been recognized, the symbolic representation 54 will be a well-formed sequence.

The first step 210 of the lexical matching process is reading the contents of the lexicon for the specified language, from "language.voc," into an a two-dimensional, n-entry array, herein called "entry", where n is the number of entries in the lexicon. The first field, entry [n][1], stores the word's orthography or translation, and the second field, entry [n][2], stores the actual phonological structure. An array, herein called "weights", is also created to store weights or scores assigned to each entry as matching proceeds. All weights are initially zero. In the event of multiple matches, after all parts of the input string have been tested, the weights may be used to select the best match as will be described below. Another array, herein called "status" is also created to monitor which words are still candidate matches during the matching process. Each word in the lexicon has an entry in the array "status" of which the value is either "1," indicating a possible candidate, or "0," indicating a rejected word.

The symbolic representation is then read into a string in step 212 from a file created by the parser and called "language.dat," where "language" is the name of the appropriate language: default (English), Japanese, or Korean. The first data field (up to the first #) is stripped off the front of the string in step 214, and decomposed into a set of variables corresponding to constituent type, skeletal position, index number and element data (step 214). As long as there is no input left, as determined in step 216, processing continues. Properties of the source constituents are then obtained in step 218. More particularly, the element data, i.e., the number between the semi-colon and the #, is converted to binary, for example, by the C programming language command "dectobin", producing a variable, herein called "bsource". As discussed above, each of the more significant bits in this number corresponds to a phonological element: a 1 indicates the phonological element is present, whereas a 0 means the phonological element is absent. Only this first segment is analyzed on the first run. The computer then matches this data against each lexical entry, as will be described below, discarding any entries which produce a serious mismatch. The computer then repeats this process for each field on the input string, one field at a time. On these subsequent operations the "weights" array is carried over, and not re-initialized.

Before performing the repetitions of the process, the computer determines the number of the nuclei in the input string. This determination is needed because a word which forms a component of the target word always produces a match, e.g., in Japanese the input "siti" matches both "siti" and "Si". The fact that "si" only contains 1 nucleus but the target word contains 2 is then used in the matching routine to de-weight "si", but not discard it altogether.

The computer matches the input string to the lexicon in the following manner. The computer loops through the lexical entries by setting a variable "word" to be equal to 1 in step 219, and by incrementing this variable in step 221 after matching of each word is completed, assigning the orthography and the representation to variables "orth" and "myentry" respectively. For each word, the computer converts, in step 220, "myentry" into a set of arrays convenient for matching purposes, as follows. Arrays of variables O, N and R are set up, of dimension 6×2 (6×3 for Onsets). The first dimension, arbitrarily set to six, refers to the O-R index, i.e., allowing for a maximum of six O-R pairs. The second dimension is for the skeletal points, of which there are either one or two. These arrays are then filled up with numbers corresponding to the element content of each position in the expression. For example in the word 'two', there is a glottal stop and an h in the first point in the first onset, so O[1][1] will contain the value 128+64=192. There is no second point, so O[1][2] will remain Null, e.g., "−1", but not zero. The value of N[1][1] will be 4 (code for the U element), the value for N[1][2] will be zero (not 4 or Null, as it is lexically empty). For longer words, there will be values for O[2][1], N[2][1] etc. The O[][3] position is reserved for the empty onset case.

After the lexical entries are converted, a variable "btarget" is created as a binary number specifying the phonological element content of the skeletal position in the target word corresponding to the one in the input field. That is, if the input field contains N, index 2, skeletal position 1, the same position in the current lexical entry is examined, which will be stored in N[2][1] and called "bsource". This may be either 1) null, indicating that no such constituent exists in that word, or 2) zero, indicating that the constituent exists but is empty, or 3) non-zero, in which case the number is the phonological element content). The computer then matches two binary numbers "bsource" and "btarget" in step 222 in a manner described below. This matching process returns a weight or value corresponding to the degree of similarity between the two binary numbers. If the weight is positive as determined in step 224, the weight is added to the current weight for that word, and the word is written out to the file "temp.voc" 228 (both "orth" and "myentry" are written) in step 226. The number of matches, a variable named "nn," is then incremented by 1. If the weight is negative as determined in step 224, indicating a fail, the word is eliminated in step 230 and "fail" is written to "temp.voc," and the status value for that word is set to zero, so it will not be checked on subsequent iterations of the matching process.

Whenever the number to be placed in "btarget" is null, which means the lexical entry does not contain a constituent of the type given in the input string, the "dectobin" function will fail. This failure does not result in an automatic matching failure, in case something was missing in the input. Instead the weight is reduced by two; the word fails only if the constituent is an onset. Onsets should not be missed, but a nucleus may be missed. In the case of a nucleus, a word fails only if the cumulative weight goes below zero. If all of the words have been analyzed, as determined in step 232, the new word list is read in step 234 and processing on the next identified constituent in the symbolic representation 54 is performed by returning to step 214. Otherwise the variable "word" is incremented in step 221 and processing returns to step 220.

On subsequent iterations, only those words whose status is "1" are checked against the new constituent. In one embodiment if a word failed on a previous iteration, the weight of the word may be reduced by one, to provide a scale of failure values. That is, the weight of a failed word may be continually reduced so that the weight of the failed word should be less than the weights of words which more closely match the input. After the whole input string has been tested, as determined in step 216, or the set of candidate matches is reduced to a single word, as determined in step 236, processing stops. If there is only a single word that matches, this word is output in step 238 and the computer stops processing. If not, the result is a file "temp.voc" which contains a pair of lines for each lexical entry which is then sorted in step 240. The first of the pair is the orthography and the weight, the second will be either the phonological structure if the word has not failed, or the word "fail". If a word is still in the running, i.e., its status is "1", the word and its weight value are stored in a table structure called "frame". This table is then sorted by the weight value, so that the word with the highest weight becomes the first entry in the table. This word is then output in step 238 as the best match. In the event of two words having this same weight, both are output. If there is no match and there are two guesses in the input file, this same process is repeated with the second entry.

The matching process of step 222 will now be described in more detail. The arguments passed in are "bsource," "btarget" and the constituent type. The constituent type is used to allow different processing for onsets and nuclei, in that onset matches/mismatches are given higher/lower weight values than nucleus ones. This reflects the claim of government phonology that onsets are more important in lexical access. Zero values of either "bsource" or "btarget" are treated separately. If "bsource" is zero, indicating an empty constituent in the search string, this can be matched with anything, so the weight is set to zero. But, if the target string is also zero, a higher weight is assigned, depending on the constituent type, because an exact match with an empty position is just as significant as a match between two identical non-empty positions. If "btarget" is zero, but "bsource" is not, there is a mismatch (something that is not there was recognized in this particular word), which normally results in a failure in an onset but not in a nucleus. As a special case, empty onsets are often realized as glottal stops, so we allow for this possibility by assigning a zero weight.

In non-zero cases, the "btarget" and "bsource" numbers are first decoded into a head value (the first 4 bits of the binary number) and a phonological element value (the remaining 10 bits). If the heads are identical, the weight is increased by 4. Then the phonological element value is scanned bit by bit, and weights are assigned according to whether both input and target are 0, 1 or different. The results vary according to constituent type as explained above. The number of hits and misses are recorded to determine whether an exact match was made with the whole binary number. If so, the weight is increased by the number of elements matched. The result of this process, for each constituent, is a weight.

Having now described the speech recognition and matching process, the development of a suitable lexicon will now be described.

More particularly, the lexical entry system (56 in FIG. 2) will now be described in connection with FIGS. 33 and 34. This system uses a default character set which may be edited by the user. The default character set is stored in a computer-readable data file, preferably called: "default.chr." This file consists of a set of number pairs, such as shown below in Table 7.

TABLE 7

| Phonological Expression | ASCII Key |
| --- | --- |
| 0 | 93 (]) |
| 1 | 75 (K) |
| 1025 | 97 (a) |
| 2066 | 105 (i) |
| 3092 | 117 (u) |
| 2051 | 69 (E) |
| 3077 | 79 (O) |
| 2067 | 101 (e) |
| 3093 | 111 (o) |
| 1027 | 60 (<) |

The first number of the pair is the decimal encoding of the phonological expression. The second member of the pair represents the ASCII code of the character of the key to which the phonological expression is bound. The particular character set used depends on the expected phonological expressions to be input, which may in turn depend on the language.

The entry system is also based on the theoretical principle that the constituent structure of any word in any language is comprised of a sequence of structural divisions, each consisting of an onset-rhyme pair. The only variation allowed is whether any or all of the three constituents, onset, nucleus or rhyme, may contain two positions, or whether they are limited to a single position. The parameters defining the constituents for a language stored in a file called "<language name>.par". The number "1" indicates that the branching parameter is set for branching; a "0" indicates that it is not set. The "default" language is set to allow for branching in all three constituents, thus having "111" as its contents. Since Japanese has no branching constituents, the "japan.par" file would have as its contents "000". In order to create the ".chr" and the ".par" files, a phonological analysis of the language must have been performed.

Figure 33:
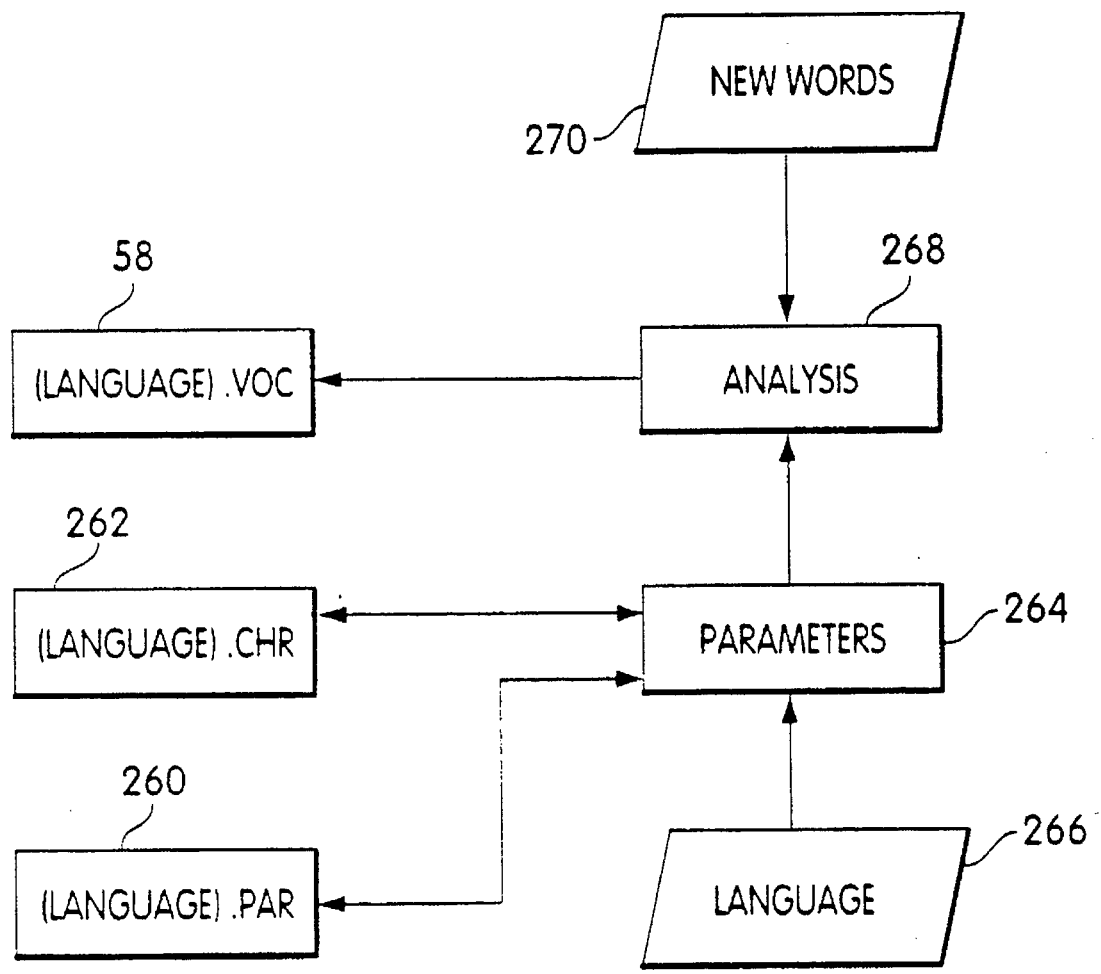
FIG. 33 is a block diagram of the lexical entry system.
Figure 34:
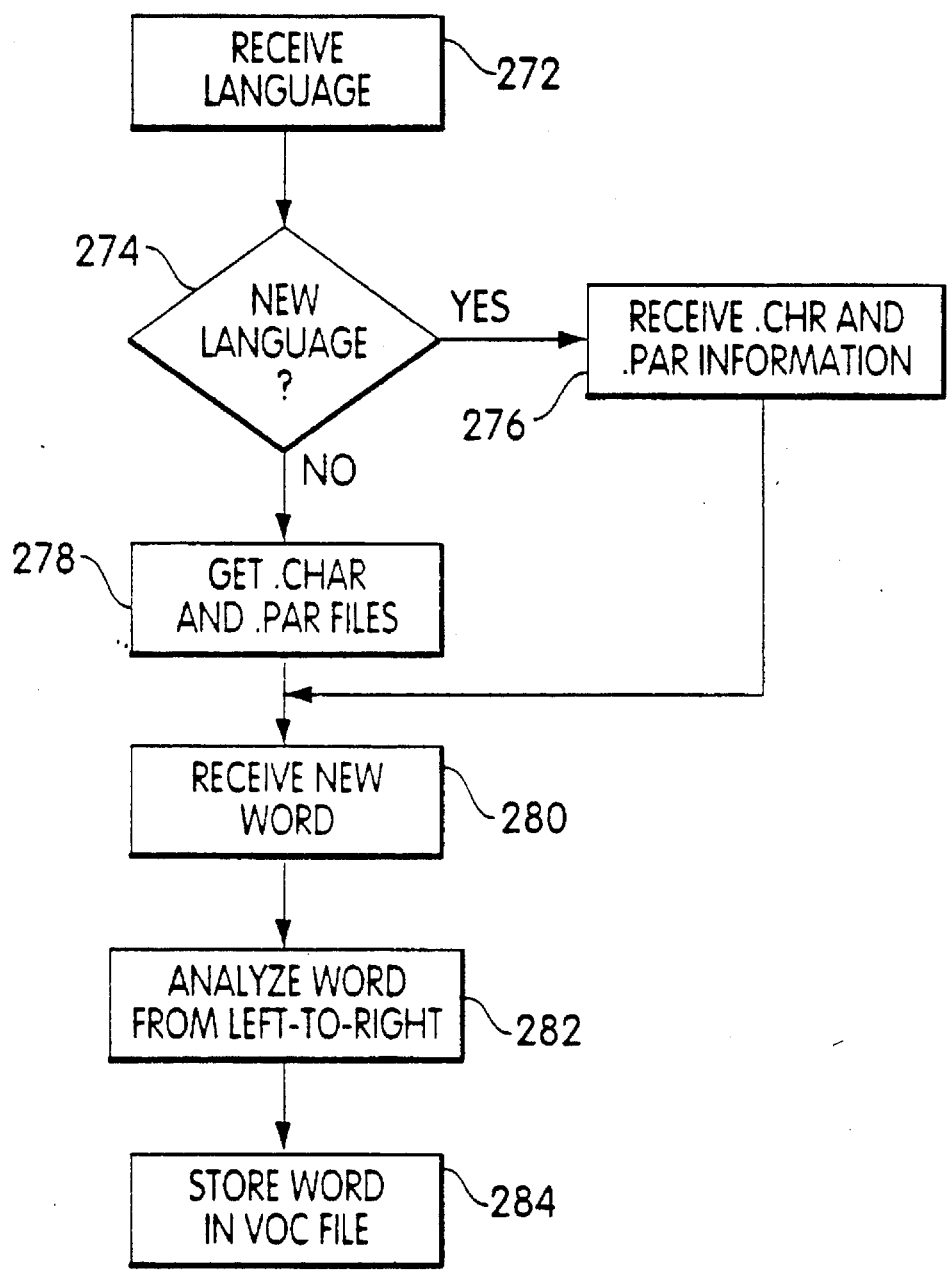
FIG. 34 is a flow chart describing how the lexical entry system operates.

A lexical entry system in FIG. 33 includes a lexicon 58, and parameter and input character set files 260 and 262. These are accessed, edited and stored by via a parameters module 264. The parameter module 264 receives an indication of a language 266 in order to determine which character and parameter files 260 and 262 to access. The analysis module 268 is used to input new words 270 using the information obtained and maintained by the parameters module 264. Operation of the analysis and parameters modules will now be described in connection with FIG. 34.

When entries are to be added to a lexicon for a language, the user provides an indicator of the language choice (step 272). If this language is a new language as determined in step 274, parameters may then be entered (step 276). If the "language.chr", "language.par" or the "language.voc" files do not exist, then this is a new language. To enter the character set, the user is queried as to whether the "default.chr" character set should be used. If yes, a copy of "default.chr" is made, using the name "<language name>.chr," for example. When a new language is started, the user is also prompted to supply the branching parameters, preferably using a display and dialog box in the form of three check boxes, indicating whether the onset, nucleus or rhyme may branch. If the language exists, the existing ".chr" and ".par" files are used.

Next, new words are received from the user in step 280 as a series of phonological segments, in onset-rhyme pairs, using the keys assigned to each segment. Words may be entered using standard orthography or some phonemic type spelling depending on the nature of the orthographic conventions. An input word is keyed in along with the orthography/translation. Buttons preferably appear on the display screen allowing the entry of branching constituents if the parameter settings indicate that such constituents are allowed. No buttons appear for Japanese since it has no branching constituents. If one or both members of a given onset-rhyme pair is branching (assuming that this is permitted by the parameter settings) then the appropriate buttons are clicked by the user. Thus, the computer receives and indication of a constituent, whether it is branching, and the segment or segments contained therein.

The word is processed by Onset-Rhyme pairs from left to right in step 282. The Analysis module 252 checks if a putative branching constituent is well-formed and responds with an error message if such is not the case. That is, the governing properties of proposed constituent comembers are checked. If they have the correct governing properties, i.e. if the left member is a governor and the right member, a governee, then the structure is accepted; otherwise it is rejected and the user is prompted to reenter the new entry.

The input form is analyzed in a pair-wise fashion until the string is exhausted. The user is then prompted to provide bracketing if the form is a compound (e.g. blackboard =[[black][board]]). Finally, if the user is satisfied and the system has accepted the form as a legal entry, user may indicate this fact to the computer which then stores the form in the language database, "<language name>.voc" (step 284).

In practice, the analysis of a language and construction of an appropriate database is performed by framed phonologists. A database of lexical representations of words of a variety of languages maintained in computer-readable form. One may thus access this database and select only those words in which one is considering to have recognized by the speech recognition system.

There are numerous advantages of this approach to speech recognition over other types of speech recognition systems. For example, by requiring words to have a limited syllable structure and by restricting the signal processing task of speech recognition to the detection of a small set of phonological elements the problem of phonologically-based speech recognition becomes tractable.

Another advantage of this invention is that the syllable structure of a word in a speech signal need not be analyzed, determined, or identified explicitly prior to further classification or analysis. Rather, the syllable structure is inferred from other lower level information detected in the speech signal.

Also, the determination of a symbolic representation of a word in this invention eliminates any durational information about a given sound from the process of matching the symbolic representation to a lexicon. This is in contrast to prior speech recognition systems which require some time-dependent mapping, either with time-dependent statistical models or with time-warping of spectral templates.

Another advantage of this automatic speech recognition system is that the same processing engine can be used for all languages except for the selection of the branching parameters, licensing parameters and lexicon.

Given this description of a few embodiments of the invention, it should be apparent to those skilled in the art that the foregoing is merely illustrative and not limiting, having been presented by way of example only. Numerous modifications and other embodiments are within the scope of one of ordinary skill in the art. For example, non-linear models of the auditory perceptual system may also be used to achieve greater discrimination between apparently similar spectra. Extensions to tone languages may be made by analyzing changes in the fundamental frequency $f_o$ to identify changes in pitch of vowels. Also, there may be some language-specific constraints, such as licensing constraints, which could be parametrized and used to simplify speech processing.

Although the system described herein does not provide for detection of the phonological elements which are related to the place of articulation in consonants, nor does it perform detection of the element N, defining nasal sounds. These phonological elements may also be detected in the process of classification described above. For example, the phonological elements related to the place of articulation of a sound can be identified, for example, by analyzing the shape of the spectrum of a release burst, which typically occurs after the ? element.

Also, the lexicon could be arranged or structured in a manner so as to enhance the matching process. For example, those entries which are structurally similar could be made lexically proximate, for example, by using a tree structure. Also, the matching process could be incorporated into new signal processing modules, allowing matching to be performed while the signal is being processed. Such integrated matching and structured lexicon, would enable a quick elimination of non-matching words.

These and other modifications are contemplated as falling within the scope of the invention as defined by the appended claims and equivalents thereto.

APPENDIX
1

```
/***********************************************************************
*           SPECDIF2.C                                                 *
*
*     A revision of specdiff.c: spectral difference for frame n is calculated
      by taking the difference of two adjacent spectra as follows: 1-2, 3-4 etc
***********************************************************************/ ifndef lint
    static char *sccs_id = "@(#)specdif2.c    1.0    XX/XX/XX";
endif define     True 1
define     False 0
#define LIN False
#define LOG True
#define NORMALDB 40
define FORMANTS 4 char *Version = "1.00";

include <stdio.h>
include <stdlib.h>
#include <math.h>
#include <esps/esps.h>
#include <esps/unix.h>
#include <esps/limits.h>
#include <esps/feasd.h>
#include <esps/fea.h>
#include <esps/feaspec.h>
#include "include/util.h"

char   *ProgName = "Specdiff";
#include "include/spectrum.h"

#define max(x, y) ((x>y) ? x : y)
#define min(x, y) ((x<y) ? x : y)
#define FORMENTRY(x, y) (x*FORMANTS + y)
#define SYNTAX \
USAGE("specdiff -b[start value] -e[end value] -r[range] input.feaspec input.fea
output.fea specdiff.txt")

/* will normally be used in a script like so:
   specdiff -rXX:YY lpcspec.fea input.fea output.fea specdiff.txt
       lpcspec.fea contains spectral records;
       input.fea contains power and zero-crossings;
       output.fea contains these plus the spectral difference data
       specdiff.txt contains the values of all 3 parameters
```

```
     In this version, both no of formant records and no of spectral records are
     twice the number of feature records. This means adjacent pairs of values are
     used in calculating the spectral and formant difference arrays (0-1, 2-3, 4-5
etc).
     Formant records are usually a bit fewer than spectra because of the longer
     window size used in the calculations.
*/
/*********
.Globals
**********/
long    num_rec;           /* no of data records to read */
long    num_fearec;        /* number of records in feature file */
long    num_formrec;       /* number of records in formant file */
int     num_freqs;         /* no of freq's in each feaspec record */
                           /* should be 257, but we ignore the first value, so
                              SPECSIZE = 256 */
int     debug_level = 0;
int     step_size = 10;    /* ms */ char    *debugfilename = "/home/geoff/src/DEBUG.TXT";
ULONG   data_length;              /* No. of samples in file */
int     f_scale_max = 4000,       /* Maximum value in formant plot */
        f_range;                  /* f_scale_max - f_scale_min */
float   l_range;                  /* = Maxfrequency/STARTFREQUENCY */
point   curve[2][SPECSIZE];       /* For storing curve coordinates:
                                     */

/********************
   external functions and prototypes
********************/
void    dump_curve( point curv[SPECSIZE] );
float       specmaxl( float *data, long s, long *index, float limit );
int     get_formants( struct header *ifh, FILE *iffile, int *peak_set );
void    get_specvals( float *source, float *dest );
char    *eopen();
void    lrange_switch();
float       maxl( float data[], long s, long *index );
float       maxi( float data[], int s, int *index );
float   minl( float data[], long s, long *index );

extern unsigned char *Title;

/*int e_scale_fac = 1000;                    "      " */

FILE    *fp, *fout, *flist, *fdata;
```

3

```
int     Number_output_values;
int     scale_max,         /* Maximum value in difference plot */
        scale_min,
        scale_fac = 10;

main( int argc, char **argv )
{
    char            *param_file = NULL; /* parameter file name */
    FILE            *ifile = stdin,    /* input and output file streams */
                    *ofile = stdout,
            *ifea_file,
            *ofea_file,
            *iffile,    /* formant file */
            *fp;        /* for curve dump */
    struct header                /* input and output file headers */
            *ih, *ifh, *fh, *oh;
    char            *iname,    *oname,    /* input and output file names */
            *ofea_name, /* output FEA file name */
            *ifea_name,
            *ifname;    /* formant file name (=formant.fb) */
    struct feaspec *rec;    /* record for feaspec data */
    struct fea_data *p, *q;   /*     "       fea data */
      char *fields[] = {"power","zero_crossing", NULL};
      int  /* split,    split point used in calculating weights */
           error, rval,
           fin;
      int  *peaks,        /* Dynamic array for storing peak values:
                       used as    peaks[Number_Of_values][4] */
           lower, upper,    /* used in form_diff calculation */
           factor_size;     /* size of the formant factor array */
    const float Min_SD_max = 1.0e4;
    float   this_sample[SPECSIZE],
            next_sample[SPECSIZE],
            weight[SPECSIZE]; /* Log weighting array */
    float spec_val, tot_pwr,
            temp, val,
            xnew, yamp;    /* used in calculating logf curve */
    float distance,
            max_value,
            min_value,
            range;
    float   *d_data,   /* Dynamic array for distance data */
            *d2_data,
            *spec_ptr, /* ptr to diff data in output FEA file */
            *form_diff, /* dynamic array for formant weighted
                        difference data */
            *factor,   /* array of multipliers for form_diff */
```

4

```
            *dist_ptr;    /* pointer to above in output file */
            short pflag = 0,   /* flag for range (pts.) option*/
            one_val_short = 0,
            *F1_ptr, *F2_ptr, *F3_ptr;
    char        *prange = NULL;   /* string for range specification (-p) */
    long    start, end,  /* boundary points for search */
            nan, index,
            loop, last;      /* loop counter */
    int     startf, x_step;
    float   sample_rate,
            this_pwr, next_pwr,    /* tot_power of current & next spec */
            this_avg, next_avg,    /* averaged spectral values */
            temp_zcr,              /* zerocrossing value */
            *src_sf,               /* source sampling frequency */
            *pptr_in, *zptr_in,
            *pptr_out, *zptr_out;
    double      *rec_freq, *     /* record freq. of source */
            *start_time;           /* start time in sec's in source file*/
    char    ch, *charpt;
    char    str[255];
    long    count, sample,
            halfnum_rec,           /* no of spectral records / 2 */
            *start_rec;       /* starting record num in source file */
register int     f, ct, j, pos,
            xpos, ypos;       /* Cursor positions */
    extern int    optind;
    extern char   *optarg;
    short   bflg=0, eflg=0,
            bigspec=0,  /* True if num_freqs = 513 */
            interval;   /* =bigspec+1 */ printf("     Spectral Difference Program\n");
    printf("     ==========================\n\n");

while ( (ch = getopt(argc, argv, "b:e:r:")) != EOF ) {
      switch (ch) {
      case 'b':
            start = (long) atoi(optarg);
            Fprintf(stderr,"start value = %ld\n", start);
            if (start < 0)
               bflg++;
            break;
      case 'e':
            end = (long) atoi(optarg);
            Fprintf(stderr, "end value = %ld\n", end);
            if (end < start)
               eflg++;
```

```
                break;
        case 'r':
                prange = optarg;
            pflag++;
                break;
/*      case 'f':
            ifarg = optarg;
            Fprintf(stderr, "Formant file is %s\n", ifarg);
            break; */
        default:
            SYNTAX;
            break;
    }
  }
  if (bflg) {
    Fprintf(stderr, "Error: start value must be >0\n");
    exit(1);
  }
  if (eflg) {
    Fprintf(stderr, "Error: end value must be > start\n");
    exit(1);
  }
  if (pflag) {
    start = 1;
    end = LONG_MAX;
    lrange_switch(prange, &start, &end, 0);
    nan = (end == LONG_MAX) ? 0 : end - start + 1;
    /* data_start_time = file_start_time + (start - 1) / sf; */
  } if (optind < argc)        /* input FEA_SPEC file */
    iname = eopen(ProgName, argv[optind++], "r", FT_FEA, FEA_SPEC, &ih, &ifile);
  else {
    Fprintf(stderr, "%s: no input FEA_SPEC file specified.\n", ProgName);
    SYNTAX;
  }
  if (debug_level)
    Fprintf(stderr, "Input FEA_SPEC file is %s\n", iname);

if (optind < argc)        /* input FEATURE file */
    ifea_name = eopen(ProgName, argv[optind++], "r", FT_FEA, NONE, &ifh, &ifea_file);
  else {
    Fprintf(stderr, "%s: no input feature file specified.\n", ProgName);
    SYNTAX;
  }
  if (debug_level)
```

6

```
    Fprintf(stderr, "Input Feature file is %s\n", ifea_name);

if (optind < argc)       /* output FEA file */
    ofea_name = eopen(ProgName, argv[optind++], "w", FT_FEA, NONE, &oh,
&ofea_file);
  else {
    Fprintf(stderr, "%s: no output FEA file specified.\n", ProgName);
    SYNTAX;
  }
  if (debug_level)
    Fprintf(stderr, "Output Feature file is %s\n", ofea_name);

if (optind < argc) {     /* output text file */
      if ((ofile = fopen(argv[optind], "wt")) != 0)
        oname = argv[optind++];
  }
  else {
    Fprintf( stderr, "%s: no output text file specified. ", ProgName);
    Fprintf( stderr, "Using stdout\n");
    ofile = stdout;
    oname = "<stdout>";
  }
  if (debug_level)
    Fprintf( stderr, "Output file is %s\n", oname );

/****** Open formant file: NOT specified in command line ******/
  ifname = eopen(ProgName, "formant.fb", "r", FT_FEA, NONE, &fh, &iffile);
  if (strcmp(ifname, "formant.fb") != 0) {
    Fprintf(stderr, "%s: Error opening formant file\n");
    exit(1);
  }
  else {
    Fprintf(stderr, "Input formant file is %s\n", ifname);
  }
  /*********** Get various data from files ******************/
  num_rec = ih->common.ndrec;     /* get number of spectral data records */
  Fprintf( stderr, "Number of spectra in input file is %ld\n", num_rec );

num_freqs = (int) *get_genhd_l( "num_freqs", ih );
  /*Fprintf( stderr, "Number of freq's is %ld\n", num_freqs); */
  if (num_freqs < 257) {
    Fprintf( stderr, "%s: Exiting.\n", ProgName );
    exit(1);
  }
  if (num_freqs == 513) {
    bigspec = True;
    interval = 2;
```

```
    }
    else
       interval = 1;
       /* get generic header items we need to copy to output file */
    sample_rate = *get_genhd_f( "sf", ih );         /* SF of FEASPEC file */
       /* Get values of header items from FEA file */
    num_fearec = ifh->common.ndrec;        /* no of feature file records */
    Fprintf( stderr, "Number of records in feature file is %ld\n", num_fearec );

if (num_rec / num_fearec == 2) {
        halfnum_rec = num_fearec;
    }
    else {
      if (num_rec / (num_fearec-1) == 2) {
        halfnum_rec = num_fearec-1;
        one_val_short = True;
      }
      else {
        halfnum_rec = num_rec / 2;
        one_val_short = True;
      }
    }
      /* do some mallocs etc */
    if ( (d_data = (float *) calloc( num_rec, sizeof (float) )) == NULL ) {
         printf("\n Memory allocation error; returning to workstation..." );
         exit(1);
    }
    if ( (form_diff = (float *) calloc( num_fearec, sizeof (float) )) == NULL ) {
         printf("\n Memory allocation error; returning to workstation..." );
         exit(1);
    } peaks = (int *) calloc( 2 * num_rec * FORMANTS, sizeof(int) );
    if (!peaks) {
         Fprintf( stderr, "%s: Memory allocation error: returning to system\n",
ProgName);
         exit(1);
    }
    /*********** get formant data from formant file **************/
    rval = get_formants( fh, iffile, peaks );
    fclose( iffile );
    if ( rval != 0 ) {
         Fprintf( stderr, "%s: Error in get_formants: exiting\n", ProgName );
       exit (1);
    }
    /* The above call assigns a value to global num_formrec */
    /*if (num_formrec < num_rec/2) {
```

```c
        Fprintf( stderr, "%s: Warning; More input spectra than formant records:",
ProgName );
        Fprintf( stderr, "Formants=%ld; Spectra=%ld\n", num_formrec, num_rec/2 );
    } */
    if (num_formrec % 2 == 0)
        factor_size = num_formrec/2;
    else
        factor_size = (num_formrec + 1)/2;   /* always even number */
    if ( (factor = (float *) calloc( factor_size, sizeof (float) )) == NULL ) {
            printf("\n Memory allocation error; returning to workstation..." );
            exit(1);
    }
    if (num_formrec < num_rec) {
        Fprintf( stderr, "%s: Warning; More spectral records than formant records:",
ProgName );
        Fprintf( stderr, "Formants=%ld; Spectra=%ld\n", num_formrec, num_rec );
    }
/* Create file for dumping curve data
    if ( (fp = fopen("dumpcurv.txt", "wt")) == NULL ) {
            Fprintf(stderr, "Error opening dumpcurv.txt\n");
            exit(1);
    }
*/
    rec_freq = get_genhd_d( "record_freq", ifh );
    src_sf = get_genhd_f( "src_sf", ifh );
    start_time = get_genhd_d( "start_time", ifh );
    start_rec = get_genhd_l( "start", ifh );

Maxfrequency = (UINT) (sample_rate / 2);
                /* Freq. range = 1/2 sample rate */
    Fprintf( stderr, "Max frequency is %u\n", Maxfrequency );
    fstep = Maxfrequency / (int) SPECSIZE;      /* Declared in SPECTRUM.H */
    temp = (float) (200.0 / fstep);
    startf = 5 /*(int) (ceil(temp))*/;           /* round up */
    l_range = (float) log10( (double)(Maxfrequency / 100) );
                /* (usually) log (6000/100)=1.78 */
    if (debug_level)
        Fprintf( stderr, "fstep = %d; startf = %d; l_range = %2.1f\n", fstep, startf,
l_range);

/************** calculate the formant weighted distance array ************/
    Fprintf( ofile, "%s\n", get_cmd_line(argc, argv));
    Fprintf(ofile, "Formant weighting factors:\n");
    /*for (ct=0; ct < (int)(2*num_formrec-1); ct++) */
        /* This is for when no. of formant records = no. of spectra
           (ie frame length is 5ms for both) */
    for (ct=0; ct < factor_size; ct++) {
```

```
        temp = 0.0;
        pos = 2*ct;
        /* distance = 0; */
        for(j=0; j<FORMANTS-1; j++) { /* use only first 3 formants */
            /*Fprintf(ofile, "[%d] %d\t", j, peaks[FORMENTRY(ct, j)]); */
            lower = peaks[FORMENTRY(pos, j)];
            upper = peaks[FORMENTRY((pos+1), j)];
/* these brackets are CRUCIAL!!!---|    | */
            temp += sq((float)(upper-lower) * 100 / lower);    /* convert to % */
            /* distance = distance + sq(temp); */
        }
        factor[ct] = (float) sqrt((double) temp);
        Fprintf(ofile, "factor[%d]= %3.1f\n", ct, factor[ct]);
    }
    Fprintf(ofile, "\n");
      /* normalise to range {0,1} */

/*factor[0] = 10;           safe value */
    max_value = max( (specmaxl(factor, factor_size, &index, 120.0F)), 100.0 );
    min_value = minl(factor, factor_size, &index);
    range = max_value - min_value;
    printf( "\n" );          /* in case of messages from specmaxl() */
    scale_max = 100;
    scale_min = 0;           /*  */
    printf( "Formant factors: Scale Max=%4.1f; Scale min=%4.1f; Range=%4.1f\n",
max_value, min_value, range );
    /* convert to (clipped) % to enhance the display */
    for (j=0; j < factor_size; j++) {
      val = (factor[j]-min_value) / range;
      if (val > 1)
          val = 1.0;
      factor[j] = val;
        /* Fprintf(ofile, "[%d]: %4.3f\t", j, factor[j]); */
    }
    factor[0] = 1.0;
    Fprintf(ofile, "\n");
/***********************************************************/

/* Allocate an feaspec record */
    rec = (struct feaspec *)allo_feaspec_rec( ih, FLOAT );

/* get spec values and process them */
/********************************************************************
    printf( "\nCalculating weighting factors:" ); NOT USED for now
        Weighting function gives:
            0 @ loop=256, i.e. f=Maxfrequency
            10 @ loop=split/fstep,   i.e. f=240Hz
```

10

```
                1 @ loop=0 to split-1, to minimise voicing contribution.

split = 480/fstep;          (should be 20 @ 12k, 30 @ 8k)
    if (debug_level)
      Fprintf( stderr, "split = %d\n", split);
    for (loop=0; loop<split; loop++) {
      weight[loop] = 5.0;
      Fprintf( ofile, "%ld: %2.1f\t", loop, weight[loop] );
    }
    for (loop=0; loop<SPECSIZE; loop++) {
        weight[loop] = 10 * log10( 10 * (1 - (0.9*loop)/SPECSIZE) );
        Fprintf( ofile, "%ld: %4.1f\t", loop, weight[loop] );
    }
    printf( " Done\n" );
***********************************************************************/

/***********     Start processing spectra      *********************/
   /* Do a virtual log-log plot of spectrum
    for (f=startf; f<SPECSIZE; f++) {
        yamp = (float)(100.0 * (1 - '(this_sample[f]/NORMALDB)) );
        { yamp = this_sample[f]; }
        xnew = (float) (log10((double)(f * fstep)) - 2.0) * (float)(500.0 /
l_range);

ct = f-startf;
        curve[0][ct].x = curve[1][ct].x = (int) xnew;
        curve[0][ct].y = (int) yamp; { curve[0][0].y = spec[startf]
                          curve[0][1].y = spec[startf+1]}
    }
    dump_curve( curve[0] );
*/
   /******************************************************************
      Main loop for calculating spectral difference
   *******************************************************************/
    printf( "\nProcessing spectra...\n" );
    /* xpos = wherex();
    ypos = wherey(); */
    last = num_rec-1;
    for (loop=0; loop < last; loop+=2) {
      printf("%2d: ", loop+1);
      get_feaspec_rec(rec, ih, ifile);          /* get 1st spectrum */
      this_avg=0.0;
      for (j=startf; j<SPECSIZE; j++) {    /* SPECSIZE times in all */
            /* get_specvals( rec->re_spec_val, this_sample ); */
            this_sample[j] = rec->re_spec_val[j*interval + 1];
            /* = specarray[(ct*SPECSIZE) + j-1] = spec_val;
```

```c
            Fprintf( ofile, "Spec[%d][%d] = %f\n", ct, j, spec_val ); */
        }
        this_pwr = *(rec->tot_power);
        /* If next line used, don't forget to open file first:
        dump_spec( this_spec ); */
        distance = 0.0;
        next_avg=0.0;
             /* get next spectrum from input file */
        get_feaspec_rec(rec, ih, ifile);         /* get 2nd spectrum */
        /*get_specvals( rec->re_spec_val, next_sample ); */
        for (j=startf; j<SPECSIZE; j++)     {
            next_sample[j] = rec->re_spec_val[j*interval + 1];
            distance+= (sq(this_sample[j] - next_sample[j])) /* * weight[j] */;
        }
        next_pwr = *(rec->tot_power);
        /* dump_curve( curve[1] );    */
        /* printf( "%5.1f\t", distance ); */
        /* now multiply by the larger of the 2 power values */
        d_data[loop/2 + 1] = distance * (next_pwr > 1000);
                        /* silence threshold subject to checking */
                        /* (float) (max(this_pwr, next_pwr)) */
        /* this_avg = next_avg; */
    }
    printf( "\n" );
          /* normalise the values */
    d_data[0] = 1000;         /* safe value */
      /* in call to specmax1, the limit value depends on the step size:
      for 5ms, use 3.0e4; for 10ms use 6.0e4 */
    /* we don't want the max value to be less than 20,000, otherwise too many
peaks:
      for step-size = 50ms use 10,000 */
    /*Min_SD_max = 1.0e4;*/
    max_value = max( (specmax1(d_data, last, &index, 3.0E4F)), Min_SD_max);
    min_value = min1(d_data, last, &index);
    range = max_value - min_value;
    printf( "\n" );         /* in case of messages from specmax1() */
    scale_max = 100;
    scale_min = 0;            /*   */
       printf( "Spec Diff: Scale Max=%4.1f; Scale min=%4.1f; Range=%4.1f\n",
max_value, min_value, range );
    /* convert to (clipped) % to enhance the display */
    for (j=0; j < last; j++) {
      val = (d_data[j]-min_value) * 100.0 / range;
      if (val > 100)
         val = 100.0;
      d_data[j] = val;
    }
```

```
  d_data[0] = scale_min;
    /********** write data to output text file *************/
  for (loop=0; loop < (num_rec); loop++) {
    Fprintf( ofile, "Diff[%ld] = %5.1f;\t", loop, d_data[loop]);
  }
  for (j=0; j < (int)(halfnum_rec); j++) {
    form_diff[j] = d_data[j] * factor[j];
  }
  if (one_val_short) {
    form_diff[num_fearec-1] = d_data[num_fearec-1] * factor[num_fearec-1];
  }

/********* Create the new output Feature file **************/
  oh = new_header(FT_FEA);
  oh->common.tag = YES;
  (void) strcpy(oh->common.prog, ProgName);
  (void) strcpy(oh->common.vers, Version);
  (void) strcpy(oh->common.progdate, Date);
  oh->variable.refer = ifea_name;
  add_source_file(oh, ifea_name, ifh);  /* add input fea file as src */
  add_source_file(oh, iname, ih);  /* add input FEA_SPEC file as source */
  add_comment(oh, get_cmd_line(argc, argv));
    /* Add essential generic header items */
  (void) add_genhd_d( "record_freq", rec_freq, 1, oh );   /* Double */
  (void) add_genhd_f( "src_sf", src_sf, 1, oh );          /* Float */
  (void) add_genhd_d( "start_time", start_time, 1, oh );  /* Double */
  (void) add_genhd_l( "start", start_rec, 1, oh );        /* Long */
  if (copy_fea_fld(oh, ifh, "power") == -1)    /* trouble */
    exit(1);
  if (copy_fea_fld(oh, ifh, "zero_crossing") == -1)
    exit(1);
  /* Add an extra field to output FEA file */
  if ( add_fea_fld("spec_diff", 1L, 1, (long *) NULL, FLOAT, (char **) NULL, oh)
== -1) {
     Fprintf(stderr, "Trouble adding field to output file\n");
     exit(1);
  }
  /* Add another field to output FEA file */
  if ( add_fea_fld("factor", 1L, 1, (long *) NULL, FLOAT, (char **) NULL, oh) ==
-1) {
     Fprintf(stderr, "Trouble adding field to output file\n");
     exit(1);
  }
    /* Add 3 extra fields for the formants F1, 2 &3 */
   if ( add_fea_fld("F1", 1L, 1, (long *) NULL, SHORT, (char **) NULL, oh) == -1)
{
```

13

```
      Fprintf(stderr, "Trouble adding field to output file\n");
      exit(1);
   }
   if ( add_fea_fld("F2", 1L, 1, (long *) NULL, SHORT, (char **) NULL, oh) == -1)
{
      Fprintf(stderr, "Trouble adding field to output file\n");
      exit(1);
   }
   if ( add_fea_fld("F3", 1L, 1, (long *) NULL, SHORT, (char **) NULL, oh) == -1)
{
      Fprintf(stderr, "Trouble adding field to output file\n");
      exit(1);
   }
   write_header( oh, ofea_file );

p = allo_fea_rec(ifh);
   q = allo_fea_rec(oh);

/* Allocate pointers for copying data */
   pptr_in = (float *)get_fea_ptr( p,"power",ifh );
   zptr_in = (float *)get_fea_ptr( p,"zero_crossing",ifh );
   pptr_out = (float *)get_fea_ptr( q,"power",oh );
   zptr_out = (float *)get_fea_ptr( q,"zero_crossing",oh );
   /* now add the data for the spec_diff field */
   spec_ptr = (float *) get_fea_ptr(q, "spec_diff", oh);
   dist_ptr = (float *) get_fea_ptr(q, "factor", oh);
   F1_ptr = (short *) get_fea_ptr(q, "F1", oh);
   F2_ptr = (short *) get_fea_ptr(q, "F2", oh);
   F3_ptr = (short *) get_fea_ptr(q, "F3", oh);
   /* = q->spec_diff */
   for (ct=0; ct < min(num_fearec, factor_size); ct++) {
     if ( get_fea_rec(p, ifh, ifea_file) != EOF) {
        *pptr_out = *pptr_in;
        *zptr_out = *zptr_in;
        *spec_ptr = d_data[ct];
        *dist_ptr = factor[ct];
        *F1_ptr = peaks[FORMENTRY((2*ct), 0)];
        *F2_ptr = peaks[FORMENTRY((2*ct), 1)];
        *F3_ptr = peaks[FORMENTRY((2*ct), 2)];
           /* purely formant-based difference */
        q->tag = p->tag;
        put_fea_rec(q, oh, ofea_file);
     }
   }
   Fprintf( stderr, "OK; %ld records copied\n", ct);
   /*****************************************************/
   fclose(ifile);
```

```c
    fclose(ofile);
    fclose(ifea_file);
    fclose(ofea_file);
    free( d_data );
}                       /* End of function main */ define INF 1.0E30F float specmax1( float *data, long s, long *index, float limit )
{
  float maximum = data[0];
  /*limit = 3.0E4 or 6.0e4;    ignore values above this */
  long i;
  short bad_ct = 0;

for (i = 1; i < s; i++) {
      if ( data[i] < limit ) {
        if (data[i] > maximum) {
           maximum = data[i];
              *index = i;
        }
        }
      else
        bad_ct++;
  }
  Fprintf(stderr, "Specmax1: %hd bad values found. ", bad_ct);
  return maximum;
} define avg(x, y) ((x + y) / 2)

int get_formants( struct header *ifh, FILE *iffile, int *peak_set )
/*    Reads formant values from ESPS file input.fb, created by formant program
*/
{
  char      *param_file = NULL;    /* parameter file name */
  FILE      *ofile = stdout;
  char              /* input and output file names */
            *oname = "formant.txt";
  struct fea_data *formrec;        /* record for fea data */
  double    forms[FORMANTS];  /* array for current F values */
  double    *formptr;         /* pointer to formant values */
  register int    j, ct;
  short     row, last, next;

if ((ofile = fopen(oname, "wt")) == 0) {
       Fprintf( stderr, "get_formants: Error opening output file\n" );
```

15

```
        return (-1);
    }
    num_formrec = ifh->common.ndrec;    /* get number of data records */
    Fprintf( stderr, "Number of formant records is %ld\n", num_formrec );
        /* Allocate an fea record */
    formrec = (struct fea_data *)allo_fea_rec( ifh );
    formptr = (double *)get_fea_ptr( formrec, "fm", ifh );

/* get formant values and process them */
    ct=0;            /*Initialise loop counter*/
    Fprintf( ofile, "Formant data from formant.fb\n" );
    while ( get_fea_rec(formrec, ifh, iffile) != EOF ) {
        for (j=0; j<FORMANTS; j++) {
            forms[j] = formptr[j];
            peak_set[FORMENTRY(ct, j)] = (int)(forms[j]);
            /*Fprintf( ofile, "F%d=%4.1lf; ", j, forms[j] ); */
        }
         ct++;
    }
    /* fill in the gaps in the peak array by interpolation:
       don't need this now */
    /*for (ct=0; ct< num_formrec-1; ct++) {      # 1, 3, 5.... #
        row = ct*2+1;
        last = ct*2;
        next = 2*(ct+1);
        for (j=0; j<FORMANTS; j++)
                peak_set[FORMENTRY(row,  j)]  = avg(peak_set[FORMENTRY(last,j)],
peak_set[FORMENTRY(next,j)] );
    } */
    /* 2n-1th (ie last) value: a copy of the previous values
    row = 2*num_formrec-1;
    last = 2*num_formrec-2;
    for (j=0; j<FORMANTS; j++)
        peak_set[FORMENTRY(row, j)] = peak_set[FORMENTRY(last, j)]; */

/* dump formant values to output file: formant.txt */
    for (ct=0; ct< 2*num_formrec; ct++) {
        Fprintf( ofile, "Record[%d]: ", ct );
            for (j=0; j<FORMANTS; j++)
            Fprintf( ofile, "F%d=%d; ", j, peak_set[FORMENTRY(ct, j)] );
            Fprintf(ofile, "\n");
    } fclose(ofile);
    return(0);
}
```

```
void get_specvals( float *source, float *dest )
/* read specific frequency vals from source spectrum,
 to approximate a logarithmic spectrum */
{
 register int j;

for (j=0; j<151; j++)        /* takes us up to 1757Hz @sf=12kHz */
      dest[j]=source[j];
 for (j=151; j<200; j++)
      dest[j]=source[2*(j-151)];
 for (j=200; j<SPECSIZE; j++)
      dest[j]=source[5*(j-200)];
} void dump_curve ( point curv[SPECSIZE] )
{
 register int j;
 FILE      *fp;

if ( (fp = fopen("dumpcurv.txt", "at")) != NULL ) {
    for (j=0; j<SPECSIZE; j++)
       fprintf(fp, "%d; %d\t", curv[j].x, curv[j].y);
    fprintf(fp, "\n");
    fclose( fp );
 }
 else {
      Fprintf(stderr, "Error opening dumpcurv.txt\n");
      exit(1);
 }
} int matherr( struct exception *a )
{
  FILE *erf;

if ( a->type == DOMAIN ) {
       if ( strcmp( a->name, "sqrt" ) == 0 ) {
        a->retval = sqrt ( -( a->arg1 ) );
        return (1);
       }
       else {
        if ( strcmp( a->name, "cos" ) == 0 ) {
           a->retval = cos(0);
           printf( " \tCosine domain error\n" );
           return (1);
        }
        else {    /* Must be sine error?? */
```

17

```
            a->retval = sin( PI/2 );
            printf( "\tUnknown domain error\n" );
            return (-1); /* This WILL halt calculation */
        }
      }
    }
    erf = fopen( debugfilename, "a+t" );
    fprintf( erf, "Maths error type was: " );
    switch ( a->type ) {
       case DOMAIN:
              fprintf( erf, "DOMAIN\n" );
              break;
       case SING:
              fprintf( erf, "SING\n" );
              break;
       case OVERFLOW:
              fprintf( erf, "OVERFLOW\n" );
              break;
       case UNDERFLOW:
              fprintf( erf, "UNDERFLOW\n" );
              break;
       case TLOSS:
              fprintf( erf, "TLOSS\n" );
              break;
       default:     fprintf( erf, "Unknown\n" );
    }   /* end of switch statement */
    fclose( erf );
    return (1);     /* Some other error: this will not halt calculation
                    in calculate_spec() */
}
```

```
/* GET_SYL2.C
   by Geoff Williams

Processes an input FEA file containing power, zero-crossing and
       spectral difference data, and outputs a (text) file containing
       boundaries of regions with their constituent type:
       eg: 'cat':  0-5:Onset(1);
                   6-15:Nucleus(1);
                   15-20:Onset(1);
                   end:Nucleus(0);
       where (1)= non-branching; (0)=empty; (2)=branching
       Now combines with parse_word.c and findelem.c to produce rec_word.
*/
#ifndef lint
     static char *sccs_id = "@(#)get_syll.c      1.0    XX/XX/XX HAL";
#endif
char *Version = "2.00";
char *Date = "XX/XX/XX";

#include <stdio.h>
include <stdlib.h>
include <string.h>
#include <ctype.h>
include <math.h>
#include <esps/esps.h>
#include <esps/unix.h>
#include <esps/limits.h>
#include <esps/feasd.h>
#include <esps/fea.h>
#include <esps/feaspec.h>
#include "include/util.h"

char   *ProgName = "rec_word";

#define max(x, y) ((x>y) ? x : y)
#define min(x, y) ((x<y) ? x : y)
#define between(x, y, z) (((x>=y) && (x<=z)) ? 1 : 0)

#define SYNTAX \
USAGE(     "rec_word [-b(start value) -e(end value) | -r(range)] [-l language]\
       input.fea ouput.txt")

#define SPECSIZE 256         /* as in SPECTRUM.H */
#define PSIZE 500
#define FORMANTS 4
#define MAXPEAKS 20          /* max number of peaks in spec_diff data */
#define NAMESIZE 10          /* length of names for regions of signal */
```

```
#define MAXREGIONS (MAXPEAKS-1)    /* max number of regions bounded by peaks */
#define True 1
#define False 0
#define FINAL 100

/*enum    voice_types { UNV, TRANSITION, VCD }; */ typedef    unsigned int    UINT;
typedef UINT        BOOLEAN;

typedef struct myfeature {
      float        zeros;
      float d_data;
      float form_diff;
           float power;
      float midpower;
      float k1;
      float voiced;    /* gets converted to value in the set voice_types */
      float F0;
} Feature;

typedef struct myspec {
      float amp[SPECSIZE];
} Spectrum;

/**********
 Globals
**********/ long  num_rec,        /* no of data records to read */
      num_frec,       /* no of formant records */
      num_srec;       /* no of spectral records */
int   debug_level = 1;
int   Spec_to_fea_ratio = 2;  /* ratio of spectral records to feature records */
int   Step_size = 10;       /* ms */
int   diff_peaks[MAXPEAKS];   /* holds positions of good peaks in d_data */
                /* actual values at each peak held in diff_peakvals[] */
short num_bounds,       /* No of peaks in specdiff data */
      num_regions;
char  *language;        /* language name, used by parse_seg.c */
int   max_pwr_pos, max_mid_pos,
      max_vmid_pos;
float maxzeros, minzeros,
      maxpwr_mid, minpwr_mid,
      maxvoice_mid,
      maxpower, minpower;
/*point    curve[2][SPECSIZE];     Stores curve co-ordinates */
```

```
   float SampRate = 12000,
          l_range;              /* = Maxfrequency/STARTFREQUENCY */

/* Parameters relating to Constituent structure */
   BOOLEAN BR_ONSET,
           BR_NUCLEUS,
           BR_RHYME,
           DF_LEN;

/* Language-specific details: not parameters */
   BOOLEAN HV_DEVOICED = False,
           SON_STOP = False,
           BRN_IS_HEADED = False,      /* True if BR Nuclei must be headed as in
   English */
           NN_SEQUENCE = False;        /* True if language allows pseudo-long vowels
   */

Spectrum    *spec_array;    /* array for spectral data */

/*******************
      external functions
   *******************/ char   *eopen();
   void   lrange_switch();
          /* in parse_seg.c
   char   *get_next_token( char *word, int ct );
   char   *build_onset( char *seg, char *seg_str, int syl_ct );
   char   *build_rhyme( char *seg, char *seg_str, int syl_ct ); */
   char   *parse_seg_str( char *seg_str, char lang );

/* local functions */
   int    load_spectral_data( struct header *ih, FILE *ifile, int step, Spectrum
   *spec_array );
   int    get_formants( struct header *ifh, FILE *iffile, int *peak_set );
   float      getvmax( float *pwr2, int sl_array_size, Feature *fea_set, int *index
   );
   float      find_rise( float *parray, long start, int *offset );
   void   find_slopes( long size, float *parray, float *sl_array );
   short      get_peaks( float *data, float *p_data, float *zeros, int num_vals );
   int    get_1stmax( float *data, int start, int end );
   int    get_next_peak( float *data, int start, int end, float *pk_value );
   int    insert_peak( int *peaks, int pos, int val );

/* parse_word.c */
   float      get_mean( float *array, int start, int end );
   short      is_low( float *array, int start, int end, float uplim );
```

```
short     is_high( float *array, int start, int end );
int    find_NUC( int start, int rest, UINT stress, int lmaxpos, int maxmidpos, float
*tot_pwr,
          float *mid_pwr, float *d_data, float *form_fac, short *last_reg );
int    find_SON( int start, int rest, int speaker, int lmax_pos, float *tot_pwr,
float *mid_pwr,
          float* d_data, float *form_fac, short *nuc_end );
char  *parse_voiced( int reg_num, int start, int end, Feature *fea_set, int *uai,
int *peaks,
      short *prev );
int    find_FRIC( int start, int rest, float *zcr, float *k1, short *fric_type );
int    find_SIL( int start, int rest, float *power, float *zeros, float *mid_pwr,
float *k1 );
char  parse_unvoiced( int reg_num, int start, int end, Feature *fea_set, short
*prev,
      char *seg_str );
int    check_silence( int start, int end, Feature *fea_set );
char  *find_regions( float *diffpeaks, Feature *fea_set, char names[][NAMESIZE],
int *uai,
      int *peaks );

/***************************** MAIN ***************************/ main(int argc, char **argv)
{
    /* char       *param_file = NULL;  parameter file name */
    FILE          *fp,
             *ifile = stdin,          /* input and output file streams */
                *ofile = stdout,
             *isfile,         /* spectral data file pointer */
             *iffile;         /* formant file stream */
    struct header                      /* input, output and formant file headers */
                *ih, *ish, *ifh;
    static char   *ofile_dir = "/usr/bin/HAL/ipl/progs/data/",
            *ofile_name /* = default.dat"*/;
    char     *iname,          /* input and output file names */
             *oname,
             *ifname,
             *spec_fname /* = "rcspec.fea" */,
             *out_str, *temp_str,
             name_list[MAXREGIONS][NAMESIZE];
                     /* holds names of regions of signal */
    struct fea_data *rec;     /* record for fea data */
    Feature       *fea_set,    /* structure for my acoustic features */
             *mfp;         /* pointer used in loop */
    double   *pwr2ptr,        /* pointer to pwr2 field in FEA file */
             *k1_ptr,
```

```
                *voice_ptr,
                *pitch_ptr;
        float   *pptr, *zptr,     /* pointers to power and zero_crossing fields */
                *diff_ptr,
                *fact_ptr;
        float   *power, *powermid;     /* Arrays for power values */
        float   *sl_array, /*  "     "  slope   "   */
                *power_100, *pwr2_100,
                *zeros,     *zeros_100, /* Arrays for zcr values */
                *d_data,          /* Array for spec diff data */
                *diff_peakvals;       /* holds values of peaks in d_data */
        float   /* maxpower, minpower,     Now Globals
                maxpwr_mid, minpwr_mid,          */
                maxslope, minslope,
                risetime, tempval,
                voice_val,
                power_range, pwr_mid_range, zeros_range;
        char          *prange = NULL;   /* string for range specification (-p) */
        long    start, end, /* boundary points for search */
                nan,
                sl_array_size,    /* size of sl_array */
                j, ct;        /* loop counter */
        long    maxdex, mindex,       /* index of max/min values in array */
                maxzc_dex, minzc_dex;  /*    "       "         " in zc array */ extern int   optind;
        extern char  *optarg;
        int          offset,
                step = 1;
        register int i;
        int          ch, pos,
                rval,
                *uai,     /* Used as uai[num_rec] */
                *peaks;        /* holds formant values: [num_rec][4] */
        short   /*num_bounds, No of peaks in specdiff data: GLOBAL */
                pflag = 0,     /* flag for range (pts.) option*/
                bflg=0, eflg=0,
                l_flag=0,
                Params[4];         /* holds P-params */
        /* extra vars for loading spec data
        float   spec_val, y_scale;
        short   interval;
        long num_freqs;
        struct feaspec *srec;*/ oname = (char *)calloc( 30, sizeof(char));
        iname = (char *)calloc( 80, sizeof(char));
```

23

```
while ( (ch = getopt(argc, argv, "b:e:r:l:")) != EOF ) {
  switch (ch) {
  case 'b':
        start = (long) atoi(optarg);
        printf("start value = %ld\n", start);
        if (start < 0)
            bflg++;
        break;
  case 'e':
        end = (long) atoi(optarg);
        printf("end value = %ld\n", end);
        if (end < start)
            eflg++;
        break;
  case 'r':
                prange = optarg;
        pflag++;
            .break;
  case 'l':
        language = optarg;
        l_flag++;
        break;
  default:
        SYNTAX;
        break;
  }
}
if (bflg) {
  Fprintf(stderr, "Error: start value must be >0\n");
  exit(1);
}
else
  start = 0;
if (eflg) {
  Fprintf(stderr, "Error: end value must be > start\n");
  exit(1);
}
if (pflag) {
  start = 1;
  end = LONG_MAX;
  lrange_switch(prange, &start, &end, 0);
  nan = (end == LONG_MAX) ? 0 : end - start + 1;
  /* data_start_time = file_start_time + (start - 1) / sf; */
}
if (optind < argc)
    iname = eopen(ProgName, argv[optind++], "r", FT_FEA, NONE, &ih, &ifile);
else {
```

```
    Fprintf(stderr, "%s: no input feature file specified.\n", ProgName);
    SYNTAX;
}
if (debug_level)
    Fprintf(stderr, "Input file is %s\n", iname);

if (optind < argc) {
    if ((ofile = fopen(argv[optind], "wt")) != 0)
        oname = argv[optind++];
}
else {
    Fprintf(stderr, "%s: no output file specified. ", ProgName);
    Fprintf(stderr, "Using stdout\n");
    ofile = stdout;
    oname = "<stdout>";
}
if (debug_level)
    Fprintf(stderr, "Output file is %s\n", oname);

/* Open formant file, always formant.fb */
ifname = eopen(ProgName, "formant.fb", "r", FT_FEA, NONE, &ifh, &iffile);
if (strcmp(ifname, "formant.fb") !=0) {
    Fprintf(stderr, "%s: Error opening formant file\n", ifname);
    exit(1);
}
else {
    Fprintf(stderr, "Input formant file is %s\n", ifname);
}
            /* get number of data records */
num_rec = ih->common.ndrec;
Fprintf(stderr, "Number of feature records is %ld\n", num_rec);
if (!eflg)
    end = num_rec-1;
num_frec = ifh->common.ndrec;    /* get number of formant records */
Fprintf(stderr, "Number of formant records is %ld\n", num_frec);

/* Assign P-parameters and output file name based on language name */
ofile_name = (char *)calloc(48, sizeof(char));
strcpy( ofile_name, ofile_dir );
if (l_flag) {
  switch (language[0]) {
        case 'J':
                strcat( ofile_name, "Jap.dat" );
                for (j=0; j<4; j++)
                    Params[j] = 0;
                HV_DEVOICED = True;
                NN_SEQUENCE = True;
```

```
                    SON_STOP = True;   /* assuming r contains ? */
                    break;
            case 'j':
                    strcat( ofile_name, "japanese.dat" );
                    for (j=0; j<4; j++)
                        Params[j] = 0;
                    HV_DEVOICED = True;
                    NN_SEQUENCE = True;
                    SON_STOP = True;   /* assuming r contains ? */
                    break;
            case 'K':
            case 'k':
                    strcat( ofile_name, "korean.dat" );
                    for (j=0; j<4; j++)
                        Params[j] = 0;
                    SON_STOP = True;
                    break;
            case 'E':   /* English */
            case 'e':
            case 'd':   /* default */
            case 'D':
                    strcat( ofile_name, "default.dat" );
                    for (j=0; j<4; j++)
                        Params[j] = 1;
                    SON_STOP = True;
                    BRN_IS_HEADED = True;
                    break;
            case 'G':
            case 'g':
                    strcat( ofile_name, "greek.dat" );
                    for (j=0; j<4; j++)
                        Params[j] = 1;
                    SON_STOP = True;
                    break;
            default:
                    strcat( ofile_name, "default.dat" );
        }       /* end of switch */
    }
    else {   /* default case, no -l flag used */
      strcat( ofile_name, "default.dat" );
      language = "English";
      for (j=0; j<4; j++)
          Params[j] = 1;
      BRN_IS_HEADED = True;
      SON_STOP = True;
    }
    if (debug_level)
```

26

```
   Fprintf(stderr, "Output language file is %s\n", ofile_name );
BR_ONSET = Params[0];
BR_NUCLEUS = Params[1];
BR_RHYME = Params[2];
DF_LEN = Params[3];

/* Do some mallocs */
uai = (int *) calloc( num_rec, sizeof(int) );
   /* use num_rec instead of num_frec in above as it will always be greater */

/* make fea_set into an array of structures */
   if ( (fea_set = (Feature *)calloc(num_rec, sizeof(Feature))) == 0) {
      Fprintf(stderr, "%s: Memory allocation error; exiting.", ProgName);
      exit (1);
   }
   if ( (power = (float *)malloc(num_rec * sizeof(float))) == 0) {
      Fprintf(stderr, "%s: Memory allocation error; exiting.", ProgName);
      exit (1);
   }
   if ( (powermid = (float *)malloc(num_rec * sizeof(float))) == 0) {
      Fprintf(stderr, "%s: Memory allocation error; exiting.", ProgName);
      exit (1);
   }
   if ( (zeros = (float *)malloc(num_rec * sizeof(float))) == 0) {
      Fprintf(stderr, "%s: Memory allocation error; exiting.", ProgName);
      exit (1);
   }
   if ( (d_data = (float *)malloc(num_rec * sizeof(float))) == 0) {
      Fprintf(stderr, "%s: Memory allocation error; exiting.", ProgName);
      exit (1);
   }
   /* Open spectral data file */
   spec_fname = eopen(ProgName, "rcspec.fea", "r", FT_FEA, FEA_SPEC, &ish,
&isfile);
   if ( strcmp(spec_fname, "rcspec.fea") !=0 ) {
      Fprintf(stderr, "%s: Error opening FEA_SPEC file\n", spec_fname);
      return(-1);
   }
   else {
      Fprintf(stderr, "\tInput spectral data file is %s\n", spec_fname);
   }
   num_srec = ish->common.ndrec;    /* get number of spectral records */
   Fprintf(stderr, "Number of spectral records is %ld\n", num_srec);
   if ( (spec_array = (Spectrum *) calloc(num_srec, sizeof(Spectrum)) ) == NULL)
{
      Fprintf( stderr, "%s: Memory allocation error: returning to system\n",
```

```
      mfp->zeros = zeros[ct] = *zptr;
           power[ct] = *pptr;
      powermid[ct] = (float) *pwr2ptr;
      d_data[ct] = mfp->d_data = *diff_ptr;
      mfp->form_diff = *fact_ptr;
      mfp->k1 = (float) *k1_ptr;
      mfp->F0 = (float) *pitch_ptr;
      voice_val = (float) *voice_ptr;
      mfp->voiced = voice_val;           /* labels now assigned in find_regions
*/
      mfp++;
      ct++;
   }
   maxpower = max1( power, num_rec, &maxdex );
   minpower = min1( power, num_rec, &mindex );
   maxzeros = max1( zeros, num_rec, &maxzc_dex );
   minzeros = min1( zeros, num_rec, &minzc_dex );
   Fprintf( ofile, "Maximum power value = %f at index %ld\n", maxpower, maxdex );
   Fprintf( ofile, "Minimum power value = %f at index %ld\n", minpower, mindex );
   if (end > num_rec) {
      end = num_rec;
      Fprintf(stderr, "Warning: 'end' reduced to equal no of records (%ld)\n",
      num_rec);
   }
      /* Calculate slopes in selected region */
   if (pflag)
      sl_array_size=nan;
   else
      sl_array_size = (end-start+1);
   Fprintf(stderr, "Number of records selected is %ld\n", sl_array_size);
   sl_array = (float *)malloc(sl_array_size * sizeof(float));
   power_100 = (float *)malloc(sl_array_size * sizeof(float));
   pwr2_100 = (float *)malloc(sl_array_size * sizeof(float));
   /* zeros_100 = (float *)malloc(sl_array_size * sizeof(float)); */

/* Copy power and zc values for selected region into new arrays */
   for (j=start; j < end+1; j++) {
      power_100[j-start] = power[j];
      pwr2_100[j-start] = powermid[j];
   }
   maxpower = max1( power_100, sl_array_size, &max_pwr_pos );   /* local max */
   minpower = min1( power_100, sl_array_size, &mindex );   /* local min */
   power_range = maxpower-minpower;
   maxpwr_mid = max1( pwr2_100, sl_array_size, &max_mid_pos );   /* local max */
      maxvoice_mid = getvmax( pwr2_100, sl_array_size, fea_set, &max_vmid_pos
);   /* max pwr in
voiced regions */
```

```
ProgName);
    exit(1);
}
rval = load_spectral_data( ish, isfile, step, spec_array );
fclose( isfile );
if ( rval != 0 ) {
    Fprintf( stderr, "%s: Error in load_spectral_data: exiting\n", ProgName );
    exit (1);
}
    /* allocate memory for peaks array: 1 entry per spectrum */
if ( (peaks = (int *) calloc((num_srec * FORMANTS), sizeof(int)) ) == NULL) {
    Fprintf( stderr, "%s: Memory allocation error: returning to system\n",
ProgName);
    exit(1);
}
        /* Load in formant data */
rval = get_formants( ifh, iffile, peaks );
    /* This assigns value of global num_frec */
fclose( iffile );
if ( rval != 0 ) {
    Fprintf( stderr, "%s: Error in get_formants: exiting\n", ProgName );
    exit (1);
}
if (num_frec < num_rec) {
    Fprintf( stderr, "%s: Warning; More feature records than formant records:",
ProgName );
    Fprintf( stderr, "Formants=%ld; Features=%ld\n", num_frec, num_rec );
}

/* Allocate an FEA record */
rec = allo_fea_rec( ih );
    /* get a pointer to the data for "power" etc */
pwr2ptr = (double *)get_fea_ptr( rec,"pwr2",ih );
pptr = (float *)get_fea_ptr( rec, "power", ih );
zptr = (float *)get_fea_ptr( rec,"zero_crossing",ih );
diff_ptr = (float *)get_fea_ptr( rec,"spec_diff",ih );
fact_ptr = (float *)get_fea_ptr( rec,"factor",ih );
k1_ptr = (double *)get_fea_ptr( rec,"k1",ih );
voice_ptr = (double *)get_fea_ptr( rec,"prob_voice",ih );
pitch_ptr = (double *)get_fea_ptr( rec,"F0",ih );

/* get feature values from input FEA file */
Fprintf( ofile, "Command line text: %80s\n", (char *)get_cmd_line(argc, argv)
);
    ct=0;       /*Initialise loop counter*/
    mfp = fea_set;
    while ( get_fea_rec(rec, ih, ifile) != EOF /*&& (ct < end) */) {
```

```
    minpwr_mid = min1( pwr2_100, sl_array_size, &mindex );  /* local min */
    pwr_mid_range = maxpwr_mid - minpwr_mid;
    if (debug_level) {
      Fprintf(stderr, "Local power range = %f\n", power_range);
      Fprintf(stderr, "Local mid power range = %f\n", pwr_mid_range);
      Fprintf(stderr, "Max mid-pwr (voiced) = %5.1f @ pos %d\n", maxvoice_mid,
max_vmid_pos);
    }
    if ((power_range <= 0.0) || (pwr_mid_range <=0.0))
        exit(1);

/* Normalize the power and zero_crossing values */
    mfp = fea_set;
    for (j=0; j < sl_array_size; j++) {
            mfp->power = power_100[j];    /* store Absolute power in fea_set */
        mfp->midpower = pwr2_100[j];      /* absolute mid-range power */
        Fprintf( ofile, "Power[%d]=%3.1f; Mid Power[%d]=%3.1f; Zeros[%d]=%3.1f;
D_data[%d]=%3.1f; ",
          j, power_100[j], j, pwr2_100[j], j, zeros[j], j, mfp->d_data);
        Fprintf(   ofile,   "Form_diff[%d]=%3.2f;   K1[%d]=%3.1f;   F0[%d]=%3.1f;
voiced[%d]=%2.1f\n",
          j, mfp->form_diff, j, mfp->k1, j, mfp->F0, j, mfp->voiced );
              /* normalise the power arrays */
          power_100[j] = (power_100[j]-minpower)/power_range * 100;
          pwr2_100[j] = (pwr2_100[j]-minpwr_mid)/pwr_mid_range * 100;
        mfp++;
    }
      /* Get peaks in specdiff array: use total power here for
      checking for valid peaks */
    num_bounds = get_peaks( d_data, power_100, zeros, (int) num_rec );
    Fprintf(stderr, "Number of peaks found = %hd\n", num_bounds);
      /* Tidy up peak array: missing 1st peak: */
    if (diff_peaks[0] > 10) { /* should not be more than 100ms into file */
      pos = get_1stmax( d_data, 0, diff_peaks[0] );
      if ( insert_peak( diff_peaks, 0, pos ) == 0 ) {
            /* Insert value pos at peak 0 (2nd value in array */
      Fprintf( stderr, "Peak 0 added at position %d\n", pos );
      num_bounds++;
      }
    }
      /* missing final peak */
    if (diff_peaks[num_bounds-1] < (num_rec-10)) {    /* not >100ms from end */
      diff_peaks[num_bounds] = num_rec-5; /* any old value, 50ms from end
                (should really find 1st peak starting from right )*/
      num_bounds++;
      Fprintf( stderr, "Final Peak added\n" );
    }
```

```
    if (debug_level)
        Fprintf(stderr, "Dumping peak positions to output file\n");
    diff_peakvals = (float *)malloc( num_bounds * sizeof(float) );
    for (i=0; i<num_bounds; i++) {
        /* tempval = ; */
        diff_peakvals[i] = d_data[(diff_peaks[i])];
        Fprintf( ofile, "Diff_peaks[%d] at pos %d; d_data=%3.1f\n",
            i, diff_peaks[i], diff_peakvals[i] );
    }
    if (debug_level)
        Fprintf(stderr, "Done\n");
    num_regions = num_bounds - 1;
    /* fclose( ofile ); */
    out_str = (char *)calloc(64, sizeof(char));
    temp_str = (char *)calloc(20, sizeof(char));
    temp_str = find_regions( diff_peakvals, fea_set, name_list, uai, peaks );
    if (debug_level)
        Fprintf(stderr, "Back in main: segment string is %20s\n", temp_str);
    if (strstr( temp_str, "FAIL" ) != NULL) {
        Fprintf(stderr, "Find_regions failed: quitting!!\n");
        fclose(ifile);
        fclose(ofile);
        return 1;
    }
    out_str = parse_seg_str( temp_str, language[0] );
    printf( "\nSearch string is %s\n", out_str );
    if ( (fp = fopen(ofile_name, "wt")) != NULL ) {
        fprintf( fp, "%s", out_str );
        fclose( fp );
    }

/* Use Absolute power, and ABSOLUTE zeros!!!!!
          watch the index of power if start != 0
    if ((ofile = fopen(oname, "a+t")) != 0) {
        for (i=0; i<num_regions; i++)
        Fprintf( ofile, "Region %d: %s\n", i, name_list[i] );
    } */
/* Get slopes in power curve : OMIT THIS FOR NOW find_slopes( sl_array_size, power_100, sl_array );
    for (ct=0; ct<sl_array_size; ct++)
        Fprintf( ofile, "Power(\%)[%d] = %4.2f;\tSlope[%d] = %4.2f\n", ct,
power_100[ct], ct, sl_array[ct]);
    maxslope = maxl( sl_array, sl_array_size, &maxdex );
    minslope = minl( sl_array, sl_array_size, &mindex );
    Fprintf( ofile, "Maximum slope value = %f at posn %ld\n", maxslope, maxdex );
    Fprintf( ofile, "Minimum slope value = %f at posn %ld\n", minslope, mindex );
```

3'

```
*/ free( power );
    free( power_100 );
    free( sl_array );
    free( zeros );
    free( zeros_100 );
    free( d_data );
    fclose(ifile);
    fclose(ofile);
    return 0;
}

/****************** FUNCTIONS ***************************************/
int get_formants( struct header *ifh, FILE *iffile, int *peak_set )
/*   Reads formant values from ESPS file input.fb, created by formant program */

{
  char      *param_file = NULL;    /* parameter file name */
  FILE      *ofile = stdout;
  char                 /* input and output file names */
            *oname = "formant.txt";
  struct fea_data *formrec;        /* record for fea data */
  double    forms[4];  /* array for current F values */
  double    *formptr;  /* pointer to formant values */
/* Global:
  long           num_frec;   number of records in input file */
  short          step_flag = 0,
           local_debug = 1;
  register int   j, ct;

if ((ofile = fopen(oname, "wt")) == 0) {
      Fprintf( stderr, "get_formants: Error opening output file\n" );
      return (-1);
  }
  num_frec = ifh->common.ndrec;    /* get number of data records */
  /*Fprintf( stderr, "Number of formant records is %ld\n", num_frec );*/
      /* Allocate an fea record */
  if (num_frec > num_srec * 1.5) {     /* ie 2 formant recs to 1 spectral rec:
                                          should be false */
      step_flag++;
      if (local_debug)
           printf("Reading alternate formant entries\n");
  }
  formrec = (struct fea_data *)allo_fea_rec( ifh );
  formptr = (double *)get_fea_ptr( formrec, "fm", ifh );
```

```
    /* get formant values and process them */
ct=0;             /*Initialise loop counter*/
Fprintf( ofile, "Formant data from input.fb\n" );
while ( get_fea_rec(formrec, ifh, iffile) != EOF ) {
    Fprintf( ofile, "Record[%d]: ", ct );
    for (j=0; j<4; j++) {
        forms[j] = formptr[j];
        *(peak_set+(ct*4)+j) = (int)(forms[j]);
        Fprintf( ofile, "F%d=%4.1f; ", j, (float)forms[j] );
    }
     Fprintf(ofile, "\n");
     ct++;
    if (step_flag)
         get_fea_rec(formrec, ifh, iffile);
  }
  fclose(ofile);
  return(0);
}
    /*******************************************************************/
define NORMALDB 40          /* As in SPECTRUM.H */ int load_spectral_data( struct header *ih, FILE *ifile, int step, Spectrum
*spec_array )
/* load in spectral data from file ./rcspec.fea into array of structures spec_array
   spectrum[i,j] is spec_array[i].amp[j] or spec_array->amp[j].
   step=1 or 2 (how many input spectra to each output spectrum */
{
 register int j, ct;
 FILE       /*ifile,*/ *fp;
 /* struct header *ih; */
 struct feaspec *srec;
 float      spec_val, y_scale;
 short      interval;
 long num_freqs, maxdex;

num_freqs = *get_genhd_l( "num_freqs", ih );
 Fprintf( stderr, "Number of freq's is %ld\n", num_freqs);
 if (num_freqs < 257) {
    Fprintf( stderr, "%s: Exiting.\n", ProgName );
    return (-1);
 }
 if (num_freqs == 513) {
     /*bigspec = True;*/
    interval = 2;
 }
 else interval = 1;
```

```
    srec = (struct feaspec *)allo_feaspec_rec( ih, FLOAT );
        /* get spec values and process them */
    ct = 0;
    /* fp = fopen("dumpspec.txt", "wt"); */
    while (( get_feaspec_rec(srec, ih, ifile) != EOF ) /*&& (ct<10)*/
                && (ct < num_rec * Spec_to_fea_ratio)) {
        y_scale = maxl( srec->re_spec_val, num_freqs, &maxdex );
            if (maxdex == 0)                    /* ie maximum is at 0Hz */
                y_scale = srec->re_spec_val[1];  /* take the closest value */
        /* tot_pwr = *(srec->tot_power); */
            for (j=1; j<num_freqs; j+=interval) {   /* SPECSIZE times in all */
                spec_val = srec->re_spec_val[j] + NORMALDB - y_scale;
                spec_array[ct].amp[(j-1)/interval] = spec_val;
            }
        /* dump_spec( spec_array[ct].amp ); */
            ct++;
            if (step == 2)
                get_feaspec_rec(srec, ih, ifile);     /* skip next record */
    }
    printf("\t%d spectral records loaded\n", ct);
    return 0;
}
        /*****************************************************************/
float getvmax( float *pwr2, int sl_array_size, Feature *fea_set, int *index )
/* Finds maximum pwr in voiced regions only. Sometimes power2 in
   bursts can exceed maximum in nuclear regions. We don't want this
   to affect normalisation of power values. */
{
Feature     *mfp;
float            voice[sl_array_size],
            zcr[sl_array_size],
            max_val;
register int     j;

max_val = pwr2[0];
*index = 0;
mfp = fea_set;
for (j=0; j<sl_array_size; j++) {
    voice[j] = mfp->voiced;
    zcr[j] = mfp->zeros;
    mfp++;
}
for (j=1; j<sl_array_size; j++)
    if (pwr2[j] > max_val)
        if (voice[j] > 0.8 && zcr[j] < 2600) {
            max_val = pwr2[j];
            *index = j;
```

```c
        }
 return (max_val);
} float find_rise( float *parray, long start, int *offset )
/* This function calculates the rate of rise in power for the
   first rising transition after start; the value of offset contains
   the difference between start and the top of the transition. */
{
 register int ct = 0;          /* position relative to start */
 float       tr_size=0;
 int   rstart,
       rend;
 long pos = start;             /* absolute position in array */
 float val = parray[start];    /* power value at current pos */

/* Look for start of rise */
 while ((val > parray[pos+1]) && (pos < (start+50)))
       val = parray[++pos];
 if (pos == start+50 ) {
    Fprintf(stderr, "%s: No rising transition found; exiting\n", ProgName);
    return (1);
 }
 /* Now start measuring the rising transition */
 rstart = pos;
 val = parray[rstart];
 while ( (val < parray[pos+1]) && (pos < num_rec-start) ) {
       val = parray[++pos];
 }
 if (pos == num_rec - start) {
    Fprintf(stderr, "%s: No end of transition found; exiting\n", ProgName);
    return (1);
 }
 if (debug_level)
    Fprintf(stderr, "Top of transition: power=%4.1f; pos=%d; num_rec=%ld\n",
    parray[pos], pos, num_rec);
 rend = pos;
 if (debug_level)
    Fprintf(stderr, "rend = %d\n", rend);
 *offset = pos - start;
 tr_size = parray[rend] - parray[rstart];
 if (debug_level)
     Fprintf(stderr, "Transition size = %f\n", tr_size);
 if ( (tr_size>0) && (rend > rstart) )
    return( (float) tr_size/((rend-rstart) * Step_size) );
 else
    return (-1);            /* failure */
```

```
} void find_slopes( long size, float *parray, float *sl_array )
/*      long size;
        float       *parray;
        float *sl_array; */
{
 long pos;
 pos = 0;
 while (pos < size-1) {
        sl_array[pos] = parray[pos+1] - parray[pos];
        pos++;
 }
} short get_peaks( float *data, float *p_data, float *zeros, int num_vals )
{
 /* p_data is normalised power data: we want to ignore any spurious peaks
    during silence. zeros required because we can have low power in fricatives.
    Uses global diff_peaks[MAXPEAKS] */
 register int n, ct;
 short       pk_count=0;
 int   pos, temp,
       nmax,              /* index of max value */
       ctmax = 8,         /* arb'y value */
       last_peak;
 UINT valid[num_vals];
 float     this, next,
       last, prev,
       maxval,                /* used in calculating local max */
       plt = 2.0,     /* min power threshold */
       zlt = 1000,    /* lower zeros threshold */
       k = 6.0,       /* constant determined by exp't */
       k1 = 4.0;

Fprintf(stderr, "In get_peaks:\n");
       /* Clean up specdiff array first */
 for (n=0; n<num_vals; n++)
     valid[n]=True;              /* set all peaks to valid */
 Fprintf( stderr, "Cleaning out spurious peaks: ");
 /* we know d_data[0] is always 2.0, since set by spec_diff */
 for (n=1; n<num_vals-1; n++) {
     if (p_data[n] <= 100) {  /* Check all peaks */
       if ((p_data[n] < plt) && (p_data[n+1] < plt) &&
            (zeros[n] < zlt) && (zeros[n+1] < zlt) ) {
                        /* silence level */
             valid[n]=False;   /* set this value to false */
```

```c
            Fprintf( stderr, "%d;", n );
      }
    }
}
/* Check final value: n=num_vals */
if (p_data[n] < 100) { /* check all peaks */
    if ((p_data[n] < plt) && (zeros[n] < zlt) && (zeros[n-1] < zlt)) {
                    /* silence level */
       valid[n]=False;           /* set this value to false */
       Fprintf( stderr, "%d;", n );
    }
}
Fprintf( stderr, "Done\n");

pos=0;
/* deal with 1st 3 values */
if (valid[0] && (data[0] > 10.0)) {
   if (data[0] > data[1]) {
      if ( (data[1] > data[2]) || (data[0] > data[1]+40) ) {
         Fprintf(stderr, "Peak found at position [0]\n");
         diff_peaks[0] = 0;
         pk_count++;
      }
   }
}
/* deal with next 3 values */
if ( valid[1] && (pk_count == 0)) {          /* no peak found yet */
   if ((data[1] > 10.0) && (data[1] > data[0])) {
      if ( (data[1] > data[2]) && (data[2] > data[3])) {
         /* Fprintf(stderr, "Peak found at position [1]\n"); */
         diff_peaks[0] = 1;
         pk_count++;
      }
   }
}
n=pos=2;         /* deal with most of array in loop */
while ( n<num_vals-2 ) {
    this = data[n];
    next = data[n+1];
    last = data[n-1];
     /* Peak found if current value exceeds next/last by 10%
        and also exceeds last/next resp. */
    if (valid[n]) {
      if (this >= 80) {
         if ( (this > (last+5)) && (this > (next+5)) )    /* check for peak */
            diff_peaks[pk_count++] = last_peak = n;
      }
```

37

```
      else {
        if (this > 45) {
        if (( (this > (next+10)) && (this > (2*last)) ) ||   /* 3 was too severe */
          ( (this > (last+10)) && (this > (2*next)) )) {
          diff_peaks[pk_count++] = last_peak = n;
        }
        else {     /* 1:no valid peak found: look for slow transition.
            look for series of values > 25, find local maximum and
            assign peak to that position. Value of n is NOT incremented   */
            Fprintf(stderr, "Checking for slow transition...");
            temp = n;
            ct = 0;
            nmax = n;                   /* index of initial max value */
            maxval = this;
            while ( (this>25) && (ct<ctmax) ) {
             ct++;
             this = data[n+ct];
             if ( this>maxval ) {
                maxval = this;
                nmax = n+ct;
             }
          }
          if (ct > 3) {
            Fprintf(stderr, "assigning peak.\n");
            diff_peaks[pk_count++] = last_peak = nmax;
          }
          else
            Fprintf(stderr, "no.\n");
        } /* goes with else 1: */
      }
      else {          /* <= 45 */
        if (this > 25) {
          if ( ((this > (k1 * last)) && (this > (next+10))) ||
              ((this > (k1 * next)) && (this > (last+10))) ) {
            diff_peaks[pk_count++] = last_peak = n;
          }
        }
/* Otherwise, peak found if current value exceeds n+/-1th value
      and n+/-2th value */
        else {  /* this < 25 */
          if ( this>10 ) {
            if ( ( (this > k*last) && (this > k*next) ) &&
                 ( ((last-data[n-2]) >1) || ((next-data[n+2]) >1) ) ) {
              diff_peaks[pk_count++] = last_peak = n;
            }
            else {             /* look for lone small peak: eg N to sonorant
                  if ((n-last_peak) > 15) */
```

```c
            }
          }
        }                   /* end of last else clause */
       }            /* end of next to outer else */
      }     /* end of outer else: if this > 90 */
    }             /* end of if(valid) */
    n++;
  }   /* end of for loop: n=num_vals-2 */

/* deal with [num_val-2] value; remember [num_val-1] is end value */
  this = data[n];
  next = data[n+1];
  last = data[n-1];
  /* Peak found if current value exceeds next/last by 10% etc as above */
  if ( ((this > (last + 10)) && (this > next)) ||
       ((this > (next + 10)) && (this > last)) ) {
      /* Fprintf(stderr, "Peak found at position [%d]\n", n); */
      diff_peaks[pk_count++] = n;
  }
  /* Otherwise, peak found if current value > 10% and exceeds both
     n-1th value and n-2th value (there is no (n+2)th value) */
  else {
      if ( ((this > 10) && (this > k*next)) &&
           ((this > k*last) && (last > data[n-2])) ) {
        /* Fprintf(stderr, "Peak found at position [%d]\n", n); */
        diff_peaks[pk_count++] = n;
      }
  }
  /* deal with [num_val-1] value; ie end value */
  pos = ++n; /* = num_val-1 */
  if ( pos != (num_vals-1) ) {
      Fprintf(stderr, "Error; pos=%d; setting value to num_val-1\n", pos);
      pos = num_vals-1;
  }
  prev = last;
  last = this;
  this = next;
  if ( (this > 10) && ((this > last) && (last > prev)) ) {
      /* Fprintf(stderr, "Peak found at end position[%d]\n", pos); */
      diff_peaks[pk_count++] = pos;
  }
  /* for (n=0; n<pk_count; n++)
      Fprintf(stderr, "Peak found at position [%d]\n", diff_peaks[n]);
  */
  return (pk_count);
}                 /* end of get_peaks() */
```

39

```
int get_most_peaks( float *data, float *p_data, float *zeros, int num_vals )
{
} int get_1stmax( float *data, int start, int end )
/* finds 1st peak between start and end values of data[] */
{
 register int n;
 int   diff=4;
 float      this, last,
       next, max=0.0;
 short found = False;
 /*
 for (n=0; n<end; n++) {
     this = data[n];
     if (this > max) {
      max = this;
      pos=n;
     }
 } */ n=start;
this=data[n];
next=data[n+1];
if ( (data[n] > 10) && (next < 3) && (next > data[n+2]) )
    return n;            /* stronger condition for 1st point */
else {
    n++;
    while ((n<end-1) && (!found)) {
      next=data[n+1];
      last=data[n-1];
      this=data[n];
         if (this > 5) {
             if ( ((this > last+1) && (this > next+diff)) ||
             ((this > next+1) && (this > last+diff)) )
             found=True;
     }
     n++;
    }            /* end of while */
}
if (found)
   return n;             /* success */
else
   return 1;             /* failure: set to position 1*/
} int insert_peak( int *peaks, int pos, int val )
```

40

```
{
 register int i;
 int top = MAXPEAKS-1;

/* check for valid value of new peak */
 if (val > peaks[pos]) {
      Fprintf( stderr, "Error in insert_peak: quitting\n" );
      return -1;
 }
 else {
    for (i=top; i>pos; i--)
      peaks[i] = peaks[i-1];
    peaks[pos] = val;
    return 0;
 }
}           /* end of insert_peak */
```

```c
/**********************************************************************
 *                    FINDELEM.C
 *          by Geoff Williams
 *
 *    Forms part of recognition program rec_word, together with get_syl2.c,
 *    parse_word.c and parse_seg.c. This module contains the routines for
 *    detecting elements A, U and I in Nuclei.
 *    These routines need to be modified in the light of recent revisions
 *    to the theory.
 *
 **********************************************************************/
#include <stdlib.h>
#include <stdio.h>
#include <string.h>
include <math.h> define max(x, y) ((x>y) ? x : y)

if !defined(__UINT)
 typedef    unsigned int    UINT;
 typedef    int    BOOLEAN;
endif define    True 1
define    False 0
#define SPECSIZE 256    /* Must agree with value in SPECTRUM.H    */
#define NORMALDB 40    /*     "        "        "    */
define STARTFREQUENCY 100    /* Starting frequency for log frequency plot */ if !defined(_formant)
    typedef struct {
            float   amp;
            UINT    f;
            UINT    peak_no;
    } formant;
endif if !defined(_point)
    typedef struct {
            int    x;
            int    y;
    } point;
endif typedef struct {
        BOOLEAN U0;
        BOOLEAN A1;
```

```
                BOOLEAN    IO;
                BOOLEAN GS;
                BOOLEAN h0;
} E_type;

#if !defined(_Spectrum)
typedef struct myspec {
        float amp[SPECSIZE];
} Spectrum;
endif extern      point curve[2][SPECSIZE];    /* For storing curve coordinates */
extern      int debug_level;
E_type      *elem_set;
        /* used in process_region */
extern long num_rec,            /* no of data records to read */
        num_frec;          /* no of formant records */
extern float      SampRate,
            l_range;          /* = Maxfrequency/STARTFREQUENCY */
/* extern Spectrum      *spec_array;      array for spectral data */
extern      UINT Maxfrequency;        /* Top limit of Frequency range for
spectrum */ if !defined (_differenced)
      extern BOOLEAN      differenced;
#endif

/* #define STEPSIZE 100  Must agree with value in FINDUAI.C */ extern int  fstep;              /* Frequency range / no. of spectral points */
extern int  Spec_to_fea_ratio;  /* ratio of spectral records to feature records
(=2)*/
/************************************************************************
*                  FUNCTION PROTOTYPES                                   *
************************************************************************/
        /* UTIL.H */
float maxi( float data[], int s, int *index );
float mini( float data[], int s, int *index );

int    bandwidth( UINT peakf, /*int fstep,*/ float spectrum[] );

int    find_20db( UINT start, float spectrum[], float halfmax );
float       calc_spec_energy( int c_name, int lo_val, int hi_val );
BOOLEAN     find_A( float *e_level, formant *formants, UINT db20, BOOLEAN *head );
BOOLEAN     find_U( float *spec, float *e_level, formant *formants, UINT db20,
BOOLEAN *head );
```

43

```
BOOLEAN    find_I( float spec[], float *e_level, formant *formants, BOOLEAN *head
);
void  add_peak( int *peaks, int lower, int value );

int   process_spec( int c_name, float spectrum[], int peak_set[4], E_type *Elems,
      short *head, BOOLEAN verbose );
int   process_region( int start, int end, Spectrum *spec_array, int *peaks, int
*uai,
      char *nuc_str );
int   find_peaks( int c_name, float inspectrum[], int peak_set[4],
      E_type *Elems );

int bandwidth( UINT peakf, /*int fstep,*/ float spectrum[] )
/* Returns 3dB bw of peak in Hz; returns -1 or -2 if not possible.
   peakf is the frequency of the peak in Hz. */
{
 register int i;
 float     peakamp, lastamp, amp;
 UINT pos, startpos;
 int  bw;

if (fstep < 15) {
    fprintf(stderr, "Error: fstep = %d\n", fstep);
    return -3;
 }
 startpos = peakf / fstep;    /* Position of peak in spec units */
 pos = startpos;
 peakamp = spectrum[pos];
 lastamp = amp = peakamp;
 while ( (fabs(peakamp - amp) < 3.0) && ((pos > 0) && (amp <= lastamp)) ) {
         lastamp = amp;
         pos--;                         /* move left from peak */
         amp = spectrum[pos];
 }
 if (fabs(peakamp - amp) >= 3.0) {
     bw = 2 * (startpos - pos) * fstep;
     return bw;
 }
 else {
     if (pos == 0)   /* Should only ever apply to zeroth peak */
         bw = -1;
     else {  /* This means the curve starts rising again before
            reaching 3dB point. Try going in the other dir'n
            before giving up */
         pos = startpos;
         lastamp = amp = peakamp;
         while ( (fabs(peakamp - amp) < 3.0) && ((pos < SPECSIZE) &&
```

44

```c
            (amp <= lastamp)) ) {
           lastamp = amp;
           pos++;                           /* move right from peak */
           amp = spectrum[pos];
        }
          if (fabs(peakamp - amp) >= 3.0) {
          bw = 2 * (pos - startpos) * fstep;
          return bw;
        }
        else {
           if (pos == SPECSIZE)
            bw = -1;
           else
            bw = -2;
        }  `  /* End of inner else clause */
     }
     return bw;
  }    /* End of outer else clause */
} define MAXTHRESH 96    /* equiv. to 1500Hz */ int find_20db( UINT start, float spectrum[], float halfmax )
{
/* Find 20dB point (half max. value): this will be a good measure of Mass.
   The value is returned in Hz.
*/
 register int n;
 int threshpt,    /* Spectral point where amp first exceeds 20dB */
     droppoint;

n = start;
while ( (n < SPECSIZE/2) && (spectrum[n] < halfmax) )
     n++;          /* Find first point where curve exceeds 20dB */
                   /* This will be the start value on 2nd call */
threshpt = n;
if (threshpt >= MAXTHRESH) {
     /* ( ERROR:something wrong with this spectrum! */
     return -1;
}
else {                      /* spectrum OK */
     while ( ( n < SPECSIZE ) && (spectrum[n] > halfmax) )
          n++;
     droppoint = n;
     /* Check that spectrum doesn't just dip below threshold:
     start again: */
     if ( (droppoint - threshpt)< 3 ) {   /* i.e. 45Hz @ fstep=15 */
```

```
            fprintf( stderr, "Re-calling find_20dB with n=%d\n", n );
            return (find_20db( droppoint, spectrum, halfmax ));
        }
/*      while ( (n < SPECSIZE/2) && (spectrum[n] < halfmax) )
            n++;           # 1st point where curve exceeds 20dB
        if ( n < 300/fstep || (n - droppoint) < (10 * fstep))
                                        # Arb. value
            find_20db( n, spectrum, halfmax );
*/      else
            return (droppoint * fstep);     /* Value in Hz */
    }
} float calc_spec_energy( int c_name, int lo_val, int hi_val )
/* Measures energy in specified frequency range, based on log-log spectrum.
   Uses the curve points stored in curve[2][SPECSIZE].
   Frequency bounds are given in freq. steps, ie 0..SPECSIZE-1.
   c_name is either 0 or 1, Left or Right resp.
   Energy in range F is defined as the area under the spectrum:
                        F-1
                        sum [ (x2-x1)*(y1+y2)/2 ]
                        x=1
   where the y values are relative to -40dB, and values below this
   count as 0.
*/
{
 register int f;
 int x1, x2, y1, y2;
 float energy = 0.0;

if (lo_val<0 || lo_val>SPECSIZE) {
    printf( "Range error in calc_spec_energy: lo_val = %d\n", lo_val );
    return 0;
 }
 if (hi_val<lo_val || hi_val>SPECSIZE) {
    printf( "Range Error in calc_spec_energy: hi_val = %d\n", hi_val );
    return 0;
 }
 x1 = curve[c_name][lo_val].x;           /* */
 x2 = curve[c_name][lo_val + 1].x;
 y1 = 349 - curve[c_name][lo_val].y;
 y2 = 349 - curve[c_name][lo_val +1].y;
 for (f=lo_val; f<hi_val-1; f++) {
     x1 = curve[c_name][f].x;            /* */
     x2 = curve[c_name][f+1].x;    /* x2 is always > x1 */
     y1 = 349-curve[c_name][f].y;  /* Subtract from 349 since values inverted */
     y2 = 349-curve[c_name][f+1].y;
```

```c
        if ( y1<0 ) y1=0;
        if ( y2<0 ) y2=0;
        energy += ((x2-x1) * (y1+y2)/2);
  }
  return (energy);
} void add_peak( int *peaks, int lower, int value )
{
 register int i;
 int top=5;       /* Must be < MAXPEAKS*/ for (i=top; i>lower+1; i--) {
      /* throw away peaks[lower+top+1] */
      peaks[i] = peaks[i-1];
 }
 /* Now insert the new peak at position [lower+1] */
 peaks[lower+1] = value;
} define MAXPEAKS 6
int process_spec( int c_name, float spectrum[], int peak_set[4], E_type *Elems,
short *head,
      BOOLEAN verbose )
/* Does the same as find_peaks except gets formant values from ESPS file
   input.fb, created by formant program
*/
{
 UINT first_peak = 0;   /* Index of first peak that counts */
 BOOLEAN Ahead, Uhead, Ihead;
 FILE *of;
 formant F1, F2, F3;
 formant formant_values[3];
 register int n, i;
 char *clash_mesg = "head clash!!";
 int  db20;       /* Frequency at which curve first goes below 20dB */
 short     head_ct,
     pk_count;
 short     local_debug=0;   /* If true, print debugging info in this function */
 float     start,           /* temp variable for calculating start value */
     halfmax,
     ymax,         /* Max value of curve in dB */
     pk0, pk1,
     e_level[3]; /* [0] is Energy in range 0.1-1kHz */
                 /* [1] is Energy in range 1.0-2kHz */
                 /* [2] is Energy in range 2-4kHz */
```

47

```
if (verbose)
   of = stderr;
else {
   of = fopen("/dev/null", "w");
   /* fprintf( stderr, "Using /dev/null\n"); */
}
Ahead = Uhead = Ihead = False;
for (n=0; n<3; n++)
   e_level[n] = 0.0;
ymax = /* maxi( spectrum, SPECSIZE )*/ 40;      /* spectrum already normalised */
db20 = find_20db( 7, spectrum, ymax-20 );
            /*   7=105Hz at SPECSIZE of 256, Freq. range of 4kHz
            */
if (db20 <0) {
   fprintf( of, "\nERROR: process_spec: not a vowel spectrum!\n" );
   Elems->A1 = False;
   Elems->U0 = False;
   Elems->I0 = False;
   Elems->h0 = Elems->GS = False;
   return (-1);
}
fprintf( of, "20dB point is at %dHz;\n", db20 );
if ((c_name == 0) || (c_name == 1)) {
     e_level[0] = calc_spec_energy( c_name, 6, 64 );
     e_level[1] = calc_spec_energy( c_name, 64, 128 );
     e_level[2] = calc_spec_energy( c_name, 128, 200 );
          /* Frequencies for frange=4kHz, SPECSIZE= 256: 6-64, 64-128, 128-200
             Frequencies correct for frange=5kHz, SPECSIZE= 256 */
     fprintf( of, "Energy < 1kHz = %5.1f; 1-2kHz = %5.1f;2-4kHz = %5.1f\n",
           e_level[0], e_level[1], e_level[2] );
}
else {
   fprintf( of, "Error: c_name out of range, value = %d\n", c_name );
   /* free( fname ); */
   return (-1);
}
/*********************************************************************/

/*   Print out peak positions and amplitudes   */
if (local_debug) {
   fprintf( of, "\tPeak\t\tFrequency\tAmplitude\t3dB BandWidth\n" );
   fprintf( of, "\t====\t\t=========\t=========\t=============\n" );
   pk_count = 4;
   for ( i=0; i < pk_count; i++ ) {
     fprintf( of, "\t%d\t\t%d\t\t%3.1f\t\t%d\n", i, peak_set[i],
           spectrum[peak_set[i]] / fstep, bandwidth(peak_set[i], spectrum) );
   }
```

```
        }
        n = first_peak;
        F1.f = peak_set[0];        /* Frequency of F1 in Hz */
        F1.peak_no = n;
        F2.f = peak_set[1];        /*      "    F2   "    */
        F2.peak_no = n+1;
        F3.f = peak_set[2];        /*      "    F3   "    */
        F3.peak_no = n+2;
    /* peak_set[3] = peaks[n+3]; */
        F1.amp = spectrum[ peak_set[n] / fstep ];
        F2.amp = spectrum[ peak_set[n+1] / fstep ];
        F3.amp = spectrum[ peak_set[n+2] / fstep ];
        fprintf( of, "F1 @ %dHz (%3.1fdB), F2 @ %dHz (%3.1fdB), F3 @ %dHz (%3.1fdB)\n ",
    F1.f, F1.amp, F2.f, F2.amp, F3.f, F3.amp );
        formant_values[0] = F1;
        formant_values[1] = F2;
        formant_values[2] = F3;

Elems->A1 = find_A( e_level, formant_values, db20, &Ahead );
        if (Ahead) head_ct++;
        Elems->U0 = find_U( spectrum, e_level, formant_values, db20, &Uhead );
        if (Uhead) head_ct++;
        Elems->I0 = find_I( spectrum, e_level, formant_values, &Ihead );
        if (local_debug)
            fprintf( stderr, "Back in process_spec\n");
        if (Ihead) head_ct++;
        if (head_ct == 0)
            *head = 0;
        else {                   /* work out code for head: A=1, I=2, U=4 */
            *head = (Ahead * 1) + (Ihead * 2) + (Uhead * 4);
            fprintf( of, "\tHead Code is %d; ", *head );
            if (head_ct > 1) {
              printf("\t%s\n", clash_mesg);
              fprintf( of, "%s", clash_mesg );
            }
            fprintf(of, "\n");
        }
        Elems->h0 = Elems->GS = False;

fprintf( of,"\n");
        return(0);
    } define min(x, y) ((x<y) ? x : y)

/*extern int step;       =2 */
    /* declared in parse_word.c: */
```

```
extern int Min_N2_length;        /* = 20 Branching Nucleus condition: anything
longer
                                    than this is assumed to be branching */
extern int Max_N1_length;        /* = 8 anything less than this probably non
branching */
extern BOOLEAN
        BR_ONSET,
        BR_NUCLEUS,
        BR_RHYME,
        DF_LEN,
        BRN_IS_HEADED;

int set_e_code( A_tot, I_tot, U_tot, length, headed )
{
 int e_code;

e_code += (A_tot >= length/2 ? 1 : 0);
 e_code += (I_tot >= length/2 ? 2 : 0);
 e_code += (U_tot >= length/2 ? 4 : 0);
 if (e_code == 0)
     e_code = (A_tot > 1 ? 1 : 0) + (I_tot > 1 ? 2 : 0) + (U_tot > 1 ? 4 : 0);
 return (e_code);
} int process_region( int start, int end, Spectrum *spec_array, int *peaks, int *uai,
char *nuc_str )
/* process a range of spectra from record [start..end]; these will normally define
   a nucleus. Transform spectra to log-log and pass to process_spec routine
   (in findelem.c)
   nuc_str is either "branching", "SEQUENCE", "non-branching" or "unsure". If
non-branching or
   unsure, this function sets it to one of the others.
*/
{
 FILE *ofile = stderr;
 short    *head_array,
          head, Ah, Uh, Ih,
          A_tot, U_tot, I_tot,
          point_1, point_2,     /* 1st & 2nd points in heavy diphthong */
          head1 = 0, head_ct = 0;
 int  Maxplotfrequency = 5000,   /* this is the maximum freq in the curve plot,
                                    ie ignore 5-6k region */
      ct, rval,
      snum,                      /* index to spectral array */
      index, e_code,
      local_debug=1,
      startf, x_step,
```

```
         step = Spec_to_fea_ratio,
         last, length;
BOOLEAN quiet = False,
        verbose = True,
        headed = False,
        long_v = False;
register int f;
float       yamp, xnew,
        this_spec[SPECSIZE],
        temp;
E_type *elem_array;    /* Passed to function process_spec() */ elem_array = (E_type *) calloc( num_rec, sizeof(E_type) );
   head_array = (short *) calloc( num_rec, sizeof(short) );
   last = min(end+1, num_frec);          /* so we don't overrun peaks[][]; */
           /* add 1 because its inclusive     */
   length = last - start;
   if (local_debug) {
     printf( "\tLength of region is %d:", length );
     if (last < end+1)
        printf(" truncated.");
     printf("\n");
   }
   Maxfrequency = SampRate / 2;
   l_range = log10( (double) (Maxplotfrequency / STARTFREQUENCY) );
   if (local_debug)
     fprintf( stderr, "l_range = %f\n", l_range);
   if (l_range < 1.5) {
     fprintf(stderr, "Error in value of l_range; Exiting\n");
     return(-1);
   }
   fstep = Maxfrequency /(int) SPECSIZE; /* Declared in SPECTRUM.H */
   if (local_debug)
     fprintf( stderr, "fstep = %d\n", fstep);
   temp = (float) (100.0 / fstep);
   startf = (int) (ceil(temp));              /* round up */
   if (local_debug)
     fprintf( stderr, "Value of startf = %d\n", startf );
   if (startf < 5) {
     fprintf(stderr, "Error in value of startf; Exiting\n");
     return(-1);
   }
   x_step = fstep;
   point_1 = 1;  /* dummy values for heavy diph: A,I */
   point_2 = 2;
   Ah = Uh = Ih = e_code = 0;
   A_tot = U_tot = I_tot = 0;
```

```
    for (ct=start; ct<last; ct++) {
      snum = ct*step;
      fprintf( ofile, "Spectrum %d: ", snum );
      for (f=0; f<SPECSIZE; f++) {
          curve[0][f].x = 0;
          curve[0][f].y = 0;
      }
      for (f=startf;  f<SPECSIZE; f++)
          this_spec[f] = spec_array[snum].amp[f];
        /* Do a virtual log-log plot of spectrum */
        for (f=startf; f<SPECSIZE; f++) {
          yamp = 349.0 * (float)(1.0 - (this_spec[f] / NORMALDB) );
          xnew = (float) ( (log10((double)(f * x_step)) - 2.0) *  (float)(639.0 /
l_range) );
                                  /* 2.0 = log10(100) */
          curve[0][f-startf+1].x = (int) xnew;
          curve[0][f-startf+1].y = (int) yamp;
        }
        /* If next line used, don't forget to open file first:
      dump_curve( curve[0] ); */
      head = 0;
      rval = process_spec( 0, this_spec, peaks+(snum*4), elem_array, &head, quiet
);
      if (rval==0) {
          if (elem_array->A1) {
            A_tot++;
            fprintf( ofile, "A+," );
          }
            if (elem_array->U0) {
            U_tot++;
            fprintf( ofile, "U ," );
          }
          if (elem_array->I0) {
             I_tot++;
             fprintf( ofile, "I " );
          }
          uai[ct] = elem_array->A1 + (elem_array->I0)*2 + (elem_array->U0)*4;
          fprintf( stderr, "; Element Code is %d; ", uai[ct] );
          /*e_code+=uai[ct];*/
          head_array[ct-start] = head;
          fprintf( stderr, "Head Code is %d\n", head );
          if (head > 0) {          /* heads contribute 2 to each total */
             head_ct++;
             switch (head) {
                  case 1: Ah++;
                          A_tot++;
                          break;
```

```
                    case 2: Ih++;
                            I_tot++;
                            break;
                    case 4: Uh++;
                            U_tot++;
                            break;
                    default:
                            break;
            }      /* end switch */
        }
    }
    else {
        fprintf(stderr, "Trying to assign uai[%d]\n", ct);
        uai[ct] = 0;
        fprintf(stderr, "OK\n");
    }
    fprintf( stderr, "_____\n" );
} /* end of outer for loop */
printf( "Head count was %d\n", head_ct );
    /* Check for headedness if Branching Nuclei = TRUE */
switch (nuc_str[1]) {       /* first char is space */
    /* Upper Case means not alterable */
    case 'N':   /* Japanese, Korean: No Branching Nuclei; Greek non-branching
ones */
    case 'B':   /* so far only Greek, & English final stressed */
            if ((head_ct > length/2) || BRN_IS_HEADED)
                headed = long_v = True;
            if (!BRN_IS_HEADED)
                    e_code = set_e_code(A_tot, I_tot, U_tot, length, headed);
            /* e_code is set later for the English case */
            break;
    case 'S':   /* Japanese allows N-N sequences separated by empty onset */
            headed = True;
            e_code = set_e_code(A_tot, I_tot, U_tot, length, headed);
            break;
    case 'b':   /* branching */
            if (head_ct < 3) {
                headed = False;
                break;
            }
            /* else : check for heavy diphthong */
            headed = long_v = True;
            break;
    case 'u':   /* 'unsure' ie in between */
            printf( "In the UNdecided case\n" );
            if (length < 12) {      /* prob. single point */
                if ( head_ct > ((4 * length) / 5) )
```

53

```
                headed = long_v = True;
            }
            else {
                if (length > 17) {    /* prob. 2 points */
                    if (head_ct > (length / 2))
                        headed = long_v = True;
                }
                else {
                    if (head_ct >= length/3)
                        headed = long_v = True;
                }
            }
            /* else: check for heavy diphthong */
            break;
    case 'n':    /* non-branching */
            /*if (head_ct > (4 * length / 5))
                headed = long_v = True; */
            headed = False;
            break;
    default:
            break;
    }
if (BR_NUCLEUS) {
  if (BRN_IS_HEADED) {
  printf( "Checking for branching/non-br\n" );
  if (headed) {
     strncpy( nuc_str, " branching", 12 );
     if (long_v) {
         e_code += (A_tot >= min(20, length) ? 1 : 0);
         e_code += (I_tot >= min(20, length) ? 2 : 0);
         e_code += (U_tot >= min(20, length) ? 4 : 0);
         e_code *= 10;           /* turns n into n0 for long vowel */
     }
     else {
         e_code += (point_1 * 10);
         e_code+=point_2;
     }
 /* after all that: can't have a headed nucleus with e_code of 0 */
     if (e_code == 0) {
         head1 = ((Ah > Ih ) ? 1 : 2);
         if (head1 == 1)
             e_code = ((Ah > Uh) ? 1 : 4);
         else
             e_code = ((Ih > Uh) ? 2 : 4);
     }
 /* mop up: stick an U in */
     if (e_code == 0)
```

54

```c
            e_code = 4;
            }
        else {
         strncpy( nuc_str, " non_branching", 15 );
         e_code = set_e_code( A_tot, I_tot, U_tot, length, False );
        }       /* end if headed */
            fprintf( stderr, "Nucleus is head%s; E_code is %d\n", (headed ? "ed"
: "less"), e_code );
        }       /* end if BRN_IS_HEADED */
        else {
        fprintf( stderr, "Nucleus is %sbranching; E_code is %d\n", (nuc_str[1] == 'N'
? "non-" : ""), e_code );
        strcpy( nuc_str, (nuc_str[1] == 'N' ? " non_branching" : " branching") );
        }
    }
    else    /* Non-Branching nucleus */
        fprintf( stderr, "Non-branching Nucleus; E_code is %d\n", e_code );
    return( e_code );
    free( elem_array );
    return 0;
}

/*****************************NOT USED ***********************************
int find_peaks( int c_name, float spectrum[], int peak_set[4], E_type *Elems )
{
        Test routine:
 fp = fopen( fname, "at" );
 fprintf( fp, "\nEnd of find_peaks routine: c_name = %d\n", c_name );
 for ( n=0; n < SPECSIZE; n++ ) {
     fprintf( fp, "%d,%d\t", curve[c_name][n].x, curve[c_name][n].y );
 }
 fclose( fp );
 free( fname );
*******************************************/

BOOLEAN find_I( float spec[], float *e_level, formant *formants, BOOLEAN *Head )
{
 formant    F1, F2, F3;
 BOOLEAN        Ipresent, IHead,
            local_debug=0;
 UINT       inter_size;
 UINT       n;
 int    F1F2diff,       /* Difference between amplitudes of F1 & F2*/
        F2F3max,        /* Maximum of F2 and F3 ampitudes */
        F2F3diff,
        frange, index,
        start;
```

55

```
float    dip_depth_12,         /* Distance in dB from largest peak */
    dip_depth_23;              /* to bottom of dip */
float    dip_min_12,           /* Lowest pt of curve between F1-F2 */
    dip_min_23;        /*    "    "    "    "    F2-F3 */
float    *interval;

F1 = formants[0];
F2 = formants[1];
F3 = formants[2];
    /* Adjust formant freq's to exact multiples of fstep
F1.f = fstep * (int) (ceil(F1.f /fstep));
F2.f = fstep * (int) (ceil(F2.f /fstep));
F3.f = fstep * (int) (ceil(F3.f /fstep));*/
frange = F3.f - F1.f;
Ipresent = IHead = False;

if (local_debug) {
    fprintf(stderr, "Looking for I...");
    fprintf(stderr, "fstep = %d\n", fstep );
}
if (fstep <=0) {
    fprintf( stderr, "Error: returning to process_spec\n" );
    return False;
}
/*fprintf(stderr, "F1.f = %d; F2.f = %d; F3.f = %d\n", F1.f, F2.f, F3.f); */
/* Find minimum value of spec between F1 & F2 */
inter_size = 1 + ((F2.f - F1.f) / fstep);    /* Convert to spectrum points */
interval = ( float * ) malloc( inter_size * sizeof(float));
start = F1.f/fstep;
for ( n=0; n < inter_size; n++ )
    interval[n] = spec[n+start];
dip_min_12 = mini( interval, inter_size, &index );
/* F1F2diff = fabs( F1.amp - F2.amp ); */
dip_depth_12 = ((float) max(F1.amp, F2.amp)) - dip_min_12;
if (local_debug)
    printf( "\tFind_I: Size of Dip (F1 -> F2) = %3.1f dB\n", dip_depth_12 );

/* Find minimum value of spec between F2 & F3 */
inter_size = 1 + ((F3.f - F2.f) / fstep);    /*round up */
free( interval );
interval = ( float * ) malloc( inter_size * sizeof(float));
start = F2.f/fstep;
for ( n=0; n < inter_size; n++ )
    interval[n] = spec[n+start];
dip_min_23 = mini( interval, inter_size, &index );
F2F3max = (float) max( F2.amp, F3.amp );
/* F2F3diff = fabs( F2.amp - F3.amp ); */
```

```
dip_depth_23 = F2F3max - dip_min_23;
if (local_debug)
    printf( "\tFind_I: Size of Dip (F2 -> F3) = %3.1f dB\n", dip_depth_23 );

if ( ( (F2.f - F1.f > 900) && ((F2.amp - dip_min_12) > 0.3*dip_depth_12 ) )
    || ( (F3.f - F2.f > 900) && (dip_depth_23 > 20) && (F3.f < 3500) &&
                    /* This is to ignore formants >F3 | */
    (F3.amp - dip_min_23 > 0.5*dip_depth_23) ) ) {
    /* The purported dip between F2 & F3 is only useful in A+I = [µ] */
    if ( e_level[2] > e_level[1] ) /* ANDed with the previous condition */
     Ipresent = True;  /* Too simplistic */
    if ( (dip_depth_12 > 20) && ((F2.amp - dip_min_12) > 0.4*dip_depth_12 )
              /* ^ needs normalising somehow */
        && (dip_depth_12 > dip_depth_23) && (e_level[2] > e_level[1]) )
            Ipresent = IHead = True;
}                                     /* This condition maybe too strong */
if (!Ipresent) { /* if all else fails... */
    if ( (F2.f - F1.f) >= (0.68 * frange) )
    /* necessary because of y where F1 can have much greater amplitude than
    F2, and e_level[2] = 0. Value of 0.69 determined from Wiebke's y in wb_iyu.
Should do something better to fix this */
      Ipresent = IHead = True;
}
if (Ipresent) {
    printf( "Element I found!! " );
    if (IHead)
     printf( "as a Head.\n" );
    else
     printf( "(as an Operator.)\n" );
    *Head = IHead;
    return True;
}
else {
    printf( "No I found.\n" );
    return False;
}
}

BOOLEAN find_U( float *spec, float *e_level, formant *formants, UINT db20, BOOLEAN
*Head )
{
 /* Basically in a vowel, U is a Head when F1 & F2 are < 500Hz & 1kHz,
    and F3 is off the bottom of the screen ( <40dB below F1 ).
    Often F2 is not fully resolved, so I resort to energy values.
    Also get low F1 (<350) and F2 ~1800Hz but 30dB below F1;
    there seems to be no missing peak */
```

57

```
formant F1, F2, F3;
BOOLEAN Upresent, UHead,
      local_debug = False;
int bw2;
float E1_4 = e_level[1]+e_level[2];     /* Energy between 1 and 4kHz */
F1 = formants[0];
F2 = formants[1];
F3 = formants[2];
bw2 = bandwidth( F2.f, spec );          /* Bandwidth of F2 */

Upresent = UHead = False;
if (local_debug)
    fprintf(stderr, "Looking for U ...\n");
/* Check the bandwidth of F2:
printf( "Bandwidth of F2 is %d.\n", bw2 );    */
if ( (e_level[1] < 5000) && (e_level[2] < e_level[1]) )
   Upresent = True;           /* Doesn't work for " */
if ( (F1.f < 450) && (F2.f < 950 && bw2 > 0) ) {
   Upresent = True;
   if ( (F1.amp - F3.amp) > 35 )
      UHead = True;
   else {  /* Might fail clause 1 on bandwidth condition */
       if (( E1_4 < 500 && e_level[0] > 30000 ) ||    /* As in [u] */
          ( e_level[0] > 60000 && E1_4 < 2000 ) ||    /* As in [o] */
          ( e_level[0] > 10*e_level[1] ))  /* Exper'al, as in [o] */
         Upresent = UHead = True;
   }
}      /* end of 2nd if statement */
else {
   if ( (F1.f < 450) && (F2.f > 950) && (bw2 > 0))
      if ((F1.amp - F2.amp > 20) && (F1.amp - F3.amp > 25))
         Upresent = UHead = True;
   if ( (F1.f < 450) && (e_level[0] > 10*e_level[1])
               && (e_level[1] > e_level[2]) )
      Upresent = True;              /* Trial to catch U in [o] */
}    /* end of 2nd if..else clause */
if (Upresent) {
   printf( "Element U  found!! " );
   if (UHead)
    printf( "as a Head." );
   else
    printf( "(as an Operator.)" );
   printf( "\n" );
   *Head = UHead;
   return True;
}
else {
```

```
        printf( "No U. found.\n" );
        return False;
    }
}

BOOLEAN find_A( float *e_level, formant *formants, UINT db20, BOOLEAN *Head )
{
 formant F1, F2, F3;
 BOOLEAN Apresent, AHead,
         cond_1, local_debug=False;

F1 = formants[0];
 F2 = formants[1];
 F3 = formants[2];

/* Look for A+ element */
 if (local_debug)
     fprintf(stderr, "Looking for A+...\n");
 Apresent = AHead = cond_1 = False;
 cond_1 = (db20 > 850) && (F1.f > 450) && (F1.f < 1200 );
 if ( F1.amp >= F2.amp ) {     /* Nearly always the case */
     if ( cond_1 ||
             /*    | maybe K*F1 is better */
             ( (db20 > 500) && (F1.f > 440) ) ) {
                       /*    |   (as in schwa)
                        approx. v° F1 for female speakers */

Apresent = True;             /* Operator */
         if ( (db20 > 1000) && (( F1.amp - F2.amp <= 10 ) &&
            (F2.f < 2.2 * F1.f)) ) {    /* Head */
            AHead = True;
         }
         else {
            if ( cond_1 && ((F1.amp - F2.amp) > 10) ) {
              if ( (e_level[0] > 60000) || (db20 > 1200) )
                 AHead = True;
            }
         } /* end of else clause */
     }    /* end of if clause */
 }
 else {          /* F1 lower amplitude than F2 (see Turkish /a/) */
         if ( (F2.f > 500 && (F2.f-F1.f) < 650) && (db20 > 850) ) {   /* Turkish
/a/ or English /e/ */
             /* F2 is high enough and etc. */
             Apresent = True;
             if ( (db20 > 1000) || (F3.f < 1300) )   /* To exclude /e/ */
                AHead = True;
```

```
        } else {   /* F2 is missing and 'F3'>1200 as in phone case */
             if ( (F1.f > 400) && (F1.f < 1200) && (F2.f-F1.f < 500) )
                     /* Eliminates velar burst spectra  --^ */
                  Apresent = True;
             /* Need to find the missing F2 to check for Head */
        }
   }
   if (Apresent) {
      printf( "Element A+ found!! " );
      if (AHead)
        printf( "as a Head.\n" );
      else
        printf( "as an Operator.\n" );
      *Head = AHead;
      return True;
   }
   else {
         printf( "No A+ found." );
         printf( "\n" );
         return False;
         }
}          /* End of find_A */
```

```c
/* PARSE_WORD.C
   by Geoff Williams
   This module is compiled with findelem.c, parse_seg.c and get_syl2.c
   to form rec_word, the main recognition routine called by the "recognize"
   script.
   This module contains the routines for parsing the feature file into
   its constituents and some of their associated segmental content. Function
   find_regions is called by get_syl2.c, returning a character string
   containing the relevant information in coded form.
*/ include <stdio.h>
include <stdlib.h>
include <string.h>
#include <ctype.h>
include <math.h> extern char *ProgName;
include "include/spectrum.h"

#define True     1
#define False    0
#define MAXPEAKS 20           /* max number of peaks in spec_diff data */
#define NAMESIZE 10           /* length of names for regions of signal */
#define MAX_NUCLEI 10         /* max number of Nuclei in a voiced region */
define FINAL 100 define max(x, y) (((x>y) ? x : y)
define min(x, y) (((x<y) ? x : y)
#define between(x, y, z) (((x>=y) && (x<=z)) ? 1 : 0)

/**********
              Globals
            **********/
enum  voice_types { UNV, TRANSITION, VCD };

typedef struct myfeature {
    float       zeros;
    float   d_data;
    float   form_diff;
        float power;
    float   midpower;
    float   k1;
    float   voiced;        /* now a f.p. value */
    float   F0;
} Feature;
```

```
typedef struct myspec {
      float amp[SPECSIZE];
} Spectrum;

point curve[2][SPECSIZE];     /*Stores curve co-ordinates */
int    Min_nuc_length=4;
int    Min_N2_length = 20;            /* Branching Nucleus condition: anything longer
than this
                                        is assumed to be branching */
int    Max_N1_length = 8;            /* anything less than this must be
non_branching */

/* these are declared in the main file get_syl2.c */
extern long num_rec,              /* no of data records to read */
            num_frec;             /* no of formant records */
extern int  debug_level;
extern int  Step_size;            /* ms */
extern int  diff_peaks[MAXPEAKS];   /* holds positions of good peaks in d_data */
                /* actual values at each peak held in diff_peakvals[] */
extern short      num_bounds,      /* No of peaks in specdiff data */
      num_regions;
extern int  max_pwr_pos,          /* location of maxpower */
            max_mid_pos,          /* location of maxpwr_mid */
            max_vmid_pos;         /* location of maxvoice_mid */
extern int  Spec_to_fea_ratio;    /* ratio of spectral records to feature records
(=2)*/
extern float    maxzeros, minzeros,
            maxpwr_mid, minpwr_mid, maxvoice_mid,
            maxpower, minpower;
extern float    SampRate,
            l_range;              /* = Maxfrequency/STARTFREQUENCY */
extern BOOLEAN
      BR_ONSET,
      BR_NUCLEUS,
      BR_RHYME,
      DF_LEN,
      BRN_IS_HEADED,
      NN_SEQUENCE;

extern Spectrum    *spec_array;       /* array for spectral data */

/*************************************************************/

/* UTIL.H */
float maxi( float data[], int s, int *index );
float mini( float data[], int s, int *index );
float sub_max( float *data, int start, int end, int *index );
```

```
/* Findelem.c */
int     process_spec( int c_name, float inspectrum[], int peaks[], E_type *Elems,
            BOOLEAN verbose );
int     process_region( int start, int end, Spectrum *spec_array, int *peaks, int
*uai,
            char *nuc_str );

/* parse_seg.c */
void    reverse(char s[]);
void    itoa(int n, char *s);
/*
char    *get_next_token( char *word, int ct );
char    *build_onset( char *seg, char *seg_str, int syl_ct );
char    *build_rhyme( char *seg, char *seg_str, int syl_ct );
char    *parse_seg_str( char *seg_str );
*/

/ * * * * * * * * * * * * * * * * * * * * * * * * L o c a l         F U N C T I O N S
* * * * * * * * * * * * * * * * * * * * * * * * * * * * * * * * * * * * /
float       get_mean( float *array, int start, int end );
int     get_next_peak( float *data, int start, int end, float *pk_val );
short       is_low( float *array, int start, int end, float uplim );
short       is_high( float *array, int start, int end );
void    identify_regions( float *peak_vals, float maxpwr, float *d_data,
        float *zeros, float *tot_pwr, float *mid_pwr, char names[][NAMESIZE]);
short       find_PV( short v_length, float *voice, float *tot_pwr );
int     get_nuclei(int n_start, int end, float *tot_pwr, float *mid_pwr, float
tot_max,
        float mid_max, int *pk_array);
void    assign_ntype( short length, short tot_length, int reg_num, char *type_str );
short   find_edge_nuc(int  start,   int  rest,   UINT  stress,   int  loc_maxpos,   int
mid_maxpos,
        float *tot_pwr, float *mid_pwr);
int     find_NUC( int start, int rest, UINT stress, int lmaxpos, int maxmidpos, float
*tot_pwr,
            float *mid_pwr, float *d_data, float *form_fac, short *last_reg );
int     find_SON( int start, int rest, int speaker, int lmax_pos, float *tot_pwr,
float *mid_pwr,
            float* d_data, float *form_fac, short *nuc_end );
char    *parse_voiced( int reg_num, int start, int end, Feature *fea_set, int *uai,
int *peaks,
        short *prev );
int     find_FRIC( int start, int rest, float *zcr, float *k1, short *fric_type );
BOOLEAN process_fric( short length, short *prev, short *f_type, char *fric_string,
char *seg_str );
int     find_SIL( int start, int rest, float *power, float *zeros, float *mid_pwr,
float *k1 );
```

```
char  parse_unvoiced( int reg_num, int start, int end, Feature *fea_set, short
*prev,
      char *seg_str );
int   check_silence( int start, int end, Feature *fea_set );
char  *find_regions( float *diffpeaks, Feature *fea_set, char names[][NAMESIZE],
int *uai,
      int *peaks );

float get_mean( float *array, int start, int end )
{
 register int j;
 float total=0.0;

for (j=start; j<end; j++)
     total += array[j];
 return (total/(end - start +1));
}
            /* end of get_mean */ short is_low( float *array, int start, int end, float uplim )
{       /* are at least half the values in this region of the array < half
        the minimum value?
        returns True (1) if so, False (0) otherwise */
 register int j;
 float     min=10000,
      enough=0.5, /* constant */
      this;
 int total=0;

/* Find local min: is it < 50% of uplim? */
 fprintf(stderr, ": Checking local minimum...");
 for (j=start; j<end; j++) {
      this = array[j];
      min = (this < min) ? this : min;
 }
 fprintf( stderr, "Min value=%3.1f;\n", min );
 if (min < 0.2 * uplim)
     return 1;            /* this is good enough */
 if (min < 0.5 * uplim) {    /* significant max */
    for (j=start; j<end; j++) {
      if (array[j] < (2 * min))     /* trial value */
         total++;
    }
 }
 return (total >= (enough * (end-start+1))) ? 1 : 0;
}           /* end of is_low */
```

```c
short is_high( float *array, int start, int end )
{       /* are at least half the values in this region of the array > 40%:
        returns True (1) if so, False (0) otherwise.
        NB Works for NORMALISED arrays only */
 register int j;
 float      max=0.0,
        enough=0.5, /* constant */
        this;
 int total=0;

/* Find local max: is it > 50%? */
 fprintf(stderr, ": Checking local max...");
 for (j=start; j<end; j++) {
        this = array[j];
        max = (this > max) ? this : max;
 }
 fprintf( stderr, "Max value=%3.1f;", max );
 if (max > 80)          /* ie 80% */
    return 1;           /* this is good enough */
 if (max > 40) {  /* significant max */
    for (j=start; j<end; j++) {
       if (array[j] > (0.5 * max))   /* trial value */
          total++;
    }
 }
 return (total >= (enough * (end-start+1))) ? 1 : 0;
}           /* end of is_high */ int get_next_peak( float *data, int start, int end, float *pk_value )
/* returns the position (relative to start) of the first peak in data[],
   > than *pk_value;   or just start if no peak found.
   *pk_value is set to the size of the peak if peak found. */
{
 register int n;
 int   diff=4;
 float    this, last,
       next, max=0.0;
 short found = False;

n=start;
this=data[n];
next=data[n+1];
if ( (data[n] > 25) && (next < 3) && (next > data[n+2]) ) {
    *pk_value = this;
    return n;           /* different condition for 1st point */
}
else {
```

```
        while ((n<end-1) && (!found)) {
          n++;
          next=data[n+1];
          this=data[n];
          if (this > 95) {
             if (next > 95) {
                n++;
                *pk_value = next;
             }
             else
                *pk_value = this;
             found = True;
             break;
          }
          last=data[n-1];
              if (this > *pk_value) {
                 if ( ((this > last+1) && (this > next+diff) && (last>data[n-2])) ||
              ((this > next+1) && (this > last+diff) && (next>data[n+2])) ) {
              found=True;
              *pk_value = this;
           }
         }
       }          /* end of while */
   }
   if (found)
      return n-start;         /* success */
   else
      return 0;         /* "failure": set to position 0 (relative to start) */
}
/*******************************************************************
          Now the serious stuff
*******************************************************************/
#define ONSET       0
#define SILENCE     1
#define NUCLEUS     2
#define SONORANT 3
#define BURST       4
#define FRIC        5
#define LOW_TONE 6
#define HI_TONE     7
#define     UNKNOWN     10
#define     NUC_END     20
#define EDGE        21
#define     UP_EDGE     22
define ERROR       30 define MALE        50
```

```
define FEMALE     60 define     OPERATOR 70
define HEAD        80 int final_son_length = 7;     /* minimum duration of final SON in stressed region
*/ short  find_edge_nuc(int  start,  int  rest,  UINT  stress,  int  loc_maxpos,  int
mid_maxpos,
       float *tot_pwr, float *mid_pwr)
/* Look for a rising edge with a slope greater than 40%. This will indicate glottal
stop.*/
{
 register int    i, j;
 int    end = start+rest-1,
        lastmax = max(loc_maxpos, mid_maxpos);
 short      gs_pos = -1;
 char *indent = "\t\t";
 float      *mid_slopes,
       *slopes,
       *pwr_ratios,
       *pwr_mid100,
       *pwr_100,
       loc_max_pwr = tot_pwr[start + loc_maxpos],
       thresh = 35.0,
       mid_thresh = 40.0;
 BOOLEAN    gs_found = False,
            gs_max, gs_mid;

printf( "%sIn find_edge_nuc: searching %d positions\n", indent, lastmax );
 pwr_ratios = (float *)calloc(rest, sizeof(float));
 pwr_mid100 = (float *)calloc(rest, sizeof(float));
 pwr_100 = (float *)calloc(rest, sizeof(float));
 mid_slopes = (float *)calloc(rest, sizeof(float));
 slopes = (float *)calloc(rest, sizeof(float));
 for ( j=0; j< rest; j++) {
     /*pwr_ratios[j] = mid_pwr[j+start] / tot_pwr[j+start];*/
     pwr_mid100[j] = mid_pwr[j+start] / maxvoice_mid * 100; /* normalise mid_pwr
*/
     pwr_100[j] = tot_pwr[j+start] / loc_max_pwr * 100;         /*   normalise
tot_pwr */
 }
 find_slopes( rest, pwr_100, slopes );
 find_slopes( rest, pwr_mid100, mid_slopes );
 /* if not stressed nucleus, scale up the values appropriately
        */
```

```
gs_max = gs_mid = False;
for (i=0; i<lastmax; i++) {
  if ( (slopes[i] > thresh) && ((pwr_100[i+1] > 75.0) || ((loc_maxpos-i) < 3)) )
{
    gs_max = True;
  }
  else    {
    if ((mid_slopes[i]  >  mid_thresh)  &&  ((pwr_mid100[i+1]  >  60.0)  ||
(mid_maxpos-i < 3)) ) {
       gs_mid = True;
    }
  }
  if (gs_found = (gs_max || gs_mid)) {
    gs_pos = i;
    printf("%sfound edge: slope=%4.1f at position %d\n", indent,
          (gs_max ? slopes[i] : mid_slopes[i]), i );
    break;
  }
 }
  return( gs_pos );
} int find_NUC( int start, int rest, UINT stress, int lmaxpos, int maxmidpos, float
*tot_pwr,
      float *mid_pwr, float *d_data, float *form_fac, short *last_reg )
/* mid_pwr is now absolute, not %
   lmaxpos and maxmidpos are relative to start of _voice_ region
   (ie can be less than start) */
{
  register int    i, j, k;        /* k is an end marker */
  int   end = start+rest-1,
        Final_nuc_length = 6,     /* minimum duration of final NUC in region */
        start_to_max,
        next_max_pos = 0,
        temp, leftover,
        peak_pos1=0, peak_pos2=0;
  short    local_debug = 1,
        end_pt,
        Near = 8;
  BOOLEAN k_hi, test,
        loc_max_near, loc_max_past,
        mid_max_near, max_near;
  float     mean_pwr, mean_mid_pwr,
        mean_pwr_ratio,
        last_pwr_ratio,
        max_pwr, peak_mp,
        next_max_pwr,
```

```
        delta_ratio,
        *mid_slopes,            /* percent slopes of pwr2 curve */
        *pwr_mid100,
        *pwr_100,
        *slopes,            /* percent slopes of tot_pwr curve */
        *pwr_ratios;            /* mid_power / tot_pwr */
    float       pk_value = 36,      /* min spec-diff peak value for NUC-SON
transition */
        pwrl=3000,          /* absolute */
        mid_pl = 1.0,           /* percent */
        pwrh=60.0,          /* high power threshold in % */
        pwrmh=2.0e5, pwrm_son = 10000,
        pwr_son = 20000,    /* lower power threshold for sonorants */
        pwr_nuc = 5.0e5,
        n_fac = 0.2,            /* mid-power fraction for end of nucleus */
        nuc_ratio = 0.01; /* this will be sex-dependent */ printf( "\t\tIn find_NUC: distance to end of region = %d\n", rest);
    if (rest < 2) {
        printf( "\t\tEnd of region!!\n");
        return (end);
    }
    if ((*last_reg == NUCLEUS) || (*last_reg == NUC_END)) {
        return (start);
    }
    pwr_ratios = (float *)calloc(rest, sizeof(float));
    pwr_mid100 = (float *)calloc(rest, sizeof(float));
    pwr_100 = (float *)calloc(rest, sizeof(float));
    mid_slopes = (float *)calloc(rest, sizeof(float));
    slopes = (float *)calloc(rest, sizeof(float));
    for ( j=0; j< rest; j++) {
        pwr_ratios[j] = mid_pwr[j+start] / tot_pwr[j+start];
        pwr_mid100[j] = mid_pwr[j+start] / maxvoice_mid * 100; /* normalise mid_pwr
*/
        pwr_100[j] = tot_pwr[j+start] / maxpower * 100;       /* normalise tot_pwr
*/
    }
    find_slopes( rest, pwr_100, slopes );
    find_slopes( rest, pwr_mid100, mid_slopes );
    printf( "\t\tMid Power Slopes:" );
    for (i=0; i<rest; i++) {
        if (i % 6 == 0) printf("\n\t\t");
        printf("%3.1f\t", mid_slopes[i]);
    }
    printf("\n");
    mean_pwr_ratio = get_mean( pwr_100, 0, rest );     /* % mean power */
    mean_mid_pwr = get_mean( mid_pwr, start, end );
```

```
mean_pwr = mean_pwr_ratio / 100 * maxpower;              /* absolute mean power
*/
if (local_debug)
    fprintf(stderr, "\t\tMean midpower = %3.2f; mean %% power = %3.2f\n ",
mean_mid_pwr,
 mean_pwr_ratio);
start_to_max = lmaxpos - start;
if (local_debug)
    fprintf(stderr, "\t\tDistance to local (tot_pwr) max=%d; ", start_to_max);
loc_max_near = ((start_to_max >= 0) && (start_to_max < Near));
loc_max_past = start_to_max < 0;
start_to_max = maxmidpos - start;
mid_max_near = ((start_to_max >= 0) && (start_to_max < Near));
max_near = (loc_max_near || mid_max_near);
if ( max_near && local_debug )
    fprintf( stderr, "Near local maximum!");
fprintf(stderr, "\n");
/* if (*prev == SONORANT)
    j = start+1;
else */
j = start;
k = min( end, 25 );    /* don't start working backwards more than 25 positions
ahead */ if (rest < 11) { /* prob'ly a single position */
    if (stress) { /* stressed nucleus condition */
        if ( ((mean_pwr_ratio > pwrh) && (mean_mid_pwr > pwrmh)) ||
          ((mean_pwr_ratio > 0.5 * pwrh) && is_high( pwr_mid100, 0, rest )) ) {
            *last_reg = NUCLEUS;
            printf("\n");
            return (end);
        }
        else {     /* must be N+coda, or N+stop */
            if (local_debug)
                fprintf(stderr, "\t\tDidn't confirm stressed nucleus\n");
                while ( (slopes[j-start] > -25.0) && (mid_slopes[j-start] > -35) &&
(j<end) )
                    j++;
            end_pt = j+1;
            if ( j < end-3 ) {
                *last_reg = NUC_END;
                while (tot_pwr[j-start] > pwr_nuc) j++;
                if ( j < end-2 ) {
                    printf( "\t\t? found!\n" );
                    *last_reg = EDGE;    /* abrupt end of Nucleus = ? */
                    return (j-1);
                }
```

70

```
            if (j<temp+3) {         /* carry on looking */
                while ((tot_pwr[j] > pwr_nuc && (mid_pwr[j] > n_fac*maxvoice_mid))
&& (j<end))
                    j++;
            }
            else
                j=temp;
        }
        if ((tot_pwr[j] > pwr_nuc) && (j<rest-final_son_length)) {
          peak_pos1 = get_next_peak( d_data, j, end, &pk_value );
          if (peak_pos1 == j) {
             pk_value = 36;
             peak_pos2 = get_next_peak( form_fac, j, end, &pk_value );
          }
          /* put some conditions on peak_pos..... */
          j += max(peak_pos1, peak_pos2);
          printf( "\t\tget_next_peak moved j to %d\n", j );
        }
        if (end-j > rest/3) {
          *last_reg = NUC_END;       /* positively identified end of nucleus:
                         ******      only if -ve slope great enough */
          return (j);
        }
        if (j-start > Min_N2_length) {
          *last_reg = NUCLEUS;    /* not NUC_END, to avoid inserting a final SON
*/
          return (j);
        }
        while ((pwr_ratios[j-start] > nuc_ratio) && (j<end))
          j++;
        mean_pwr_ratio = (get_mean(tot_pwr, start, j)) / maxpower * 100;
        if (local_debug)
            fprintf(stderr, "\t\tvalue of  j=%d,  mean_pwr_ratio=%3.2f\n", j,
mean_pwr_ratio);
        if ((end-j) <= final_son_length) {
          if ( (end-j) <= 4 ) {
             *last_reg = NUCLEUS;
             return (end);
          }
          last_pwr_ratio = mean_pwr_ratio;
          test = False;
          while ( (!test) && (k > j) ) {
              mean_pwr_ratio = (get_mean( tot_pwr, start, k )) / maxpower * 100;
              test = (mean_pwr_ratio < 0.5*last_pwr_ratio);
              k--;
          }
          *last_reg = NUCLEUS;
```

```
            return (k);
          }
          if ( (j>lmaxpos) &&          /* well obviously it is */
          ((mean_pwr_ratio > pwrh) || is_high(pwr_mid100, start, j)) ) {
            /* find position of next peak in spec_diff or form_factor */
            printf("\n");
            *last_reg = NUCLEUS;
            return (j);
          }
          else {
            /* reduce j until the RHS is true */
          }
        }
        else {           /* in stress region, more than 8 positions before peak: */
          /* check for rising power: */
          while ((tot_pwr[j] > pwr_son) && (tot_pwr[j] < tot_pwr[j+1]))
            j++;
          /* Start from end and work backwards: */
          /* mean_pwr_ratio = */
          while ((mean_pwr_ratio < pwrh) && (k > j)) {
            k--;
            mean_pwr_ratio = (get_mean( tot_pwr, start, k )) / maxpower * 100;
          }
            printf("\t\tFinal value of k=%d, mean power ratio=%3.2f\n", k,
mean_pwr_ratio);
          if (k - start > 5) {
            *last_reg = NUCLEUS;
            return (k);
          }
          else
            return (start);   /* go looking for a Sonorant instead */
        }
      }
      else {       /* not primary stressed region */
        next_max_pwr = maxi(pwr_100, rest, &next_max_pos);   /* percent value */
        for ( i=0; i< rest; i++)
            pwr_100[i] = pwr_100[i] / next_max_pwr * 100;              /* re-normalise
tot_pwr */
        if (loc_max_past) {
            loc_max_near = loc_max_near || (next_max_pos < Near);
            printf("\t\tNext max at position %d: %s\n", next_max_pos,
              (loc_max_near ? "near to max" : ""));
        }
        if (loc_max_near) {    /* unstressed N: where's the end? */
            while ( (j < lmaxpos) || (j < (start + next_max_pos)) )
                j++;          /* skip past local max position */
            fprintf(stderr, "\t\tvalue of j=%d: ", j);
```

```c
      return (k);
    }
    if ( (j>lmaxpos) &&           /* well obviously it is */
       ((mean_pwr_ratio > pwrh) || is_high(pwr_mid100, start, j)) ) {
      /* find position of next peak in spec_diff or form_factor */
      printf("\n");
      *last_reg = NUCLEUS;
      return (j);
    }
    else {
      /* reduce j until the RHS is true */
    }
  }
  else {            /* in stress region, more than 8 positions before peak: */
    /* check for rising power: */
    while ((tot_pwr[j] > pwr_son) && (tot_pwr[j] < tot_pwr[j+1]))
      j++;
    /* Start from end and work backwards: */
    /* mean_pwr_ratio = */
    while ((mean_pwr_ratio < pwrh) && (k > j)) {
      k--;
      mean_pwr_ratio = (get_mean( tot_pwr, start, k )) / maxpower * 100;
    }
      printf("\t\tFinal value of k=%d, mean power ratio=%3.2f\n", k, mean_pwr_ratio);
    if (k - start > 5) {
      *last_reg = NUCLEUS;
      return (k);
    }
    else
      return (start);   /* go looking for a Sonorant instead */
  }
}
else {        /* not primary stressed region */
  next_max_pwr = maxi(pwr_100, rest, &next_max_pos);    /* percent value */
  for ( i=0; i< rest; i++)
      pwr_100[i] = pwr_100[i] / next_max_pwr * 100;              /* re-normalise tot_pwr */
  if (loc_max_past) {
    loc_max_near = loc_max_near || (next_max_pos < Near);
    printf("\t\tNext max at position %d: %s\n", next_max_pos,
      (loc_max_near ? "near to max" : ""));
  }
  if (loc_max_near) {     /* unstressed N: where's the end? */
    while ( (j < lmaxpos) || (j < (start + next_max_pos)) )
        j++;       /* skip past local max position */
    fprintf(stderr, "\t\tvalue of j=%d: ", j);
```

```
            if (end-j < 8) {
                *last_reg = NUCLEUS;
                printf( "returning.\n" );
                return (end);           /* make the rest of this region a N */
            }
            delta_ratio = 1 - (pwr_ratios[j-start] / pwr_ratios[j-start-1]);
                /* look for >80% change */
            while ((j < end) && ((delta_ratio < 0.8) && (pwr_100[j-start]>20)) )
{ j++;
                delta_ratio = 1 - (pwr_ratios[j-start] / pwr_ratios[j-start-1]);
            }
            if ( pwr_100[j-start] < 20 )
                *last_reg = NUC_END;
            else
                *last_reg = NUCLEUS;
            fprintf(stderr, "\t\tvalue of j=%d\n", j);
            return ((j-start > 6) ? (j-1) : (start));    /* i.e only if a valid region
*/
        }
        else {
            printf("\t\tTricky: giving up\n");    /* look for specdiff peak */
            return( start );
        }
    }
 }
 return (start);        /* default case */
}               /* end find_nuc */
/*****************************************************************/ float       Max_son_pwr_slope = 12.0;           /* max percent power slope allowed
in Sonorant */ define FLAT(x) (fabs((double) x) < Max_son_pwr_slope)

int find_SON( int start, int rest, int speaker, int lmax_pos, float *tot_pwr, float
*mid_pwr,
        float *d_data, float *form_fac, short *prev_type )
/* In sonorants, ratio of low power to mid-range power is
    for Females: > approx 4.0e3
    for Males: > 1000
 */
{
  register int      i, j;
  int   typ_son_length = 8,
        end = start+rest,
        peak_pos, end_so_far,
```

```
           mid_maxpos;
short      local_debug = 1;
BOOLEAN k_hi, sonorant,
           far_from_peak = False;
float      /*mean_pwr, mean_mid_pwr,*/
      mean_pwr_ratio,
      loc_mid_max,
      son_thresh,
      pk_val = 20,            /* height of next peak in spec_diff must be > this
*/
      form_pk_val = 35,  /* height of next peak in form_fac must be > this */
      *this_mid_pwr,
      *pwr_100,         /* normalised total power between start and end */
      *sl_array,        /* percent slope data for total power */
      *low_to_mid;          /* ratios of low power to mid power:
                        in voiced regions, low power = (total power - mid power)
*/
float      pwrl=3000,      /* absolute */
      mid_pl = 1.0,       /* percent */
      k1_thresh = 0.6;

printf( "\t\tIn find_SON: distance to end of region = %d\n", rest);
if (speaker == FEMALE)
   son_thresh = 4000;
else
   son_thresh = 300;

low_to_mid = (float *)calloc(rest, sizeof(float));
this_mid_pwr = (float *)calloc(rest, sizeof(float));
pwr_100 = (float *)calloc(rest, sizeof(float));
sl_array = (float *)calloc(rest, sizeof(float));
for ( j=0; j<rest; j++) {
    this_mid_pwr[j] = mid_pwr[j+start];
    low_to_mid[j] = (tot_pwr[j+start] / this_mid_pwr[j]) - 1;
    pwr_100[j] = tot_pwr[j+start] / maxpower * 100;        /* normalise tot_pwr
*/
 }
loc_mid_max = maxi( this_mid_pwr, rest, &mid_maxpos );
  far_from_peak = (rest > 10) && ( min( (lmax_pos-start), mid_maxpos) >=
typ_son_length );
  if (far_from_peak) {       /* i.e. at or near start of longish voiced region */
      if ( *prev_type == UNKNOWN && local_debug )
        printf( "\t\tLooking for initial sonorant: ");
      if ( is_low(d_data, start, start+typ_son_length, 40) ) {
        /* pk_val should never be < 20; check d_data is stable */
        peak_pos = get_next_peak( d_data, start, lmax_pos, &pk_val );
        if ((peak_pos > 0) && (peak_pos < 3)) {       /* try again */
```

```
            pk_val = 20;                            /* reset value */
            peak_pos = get_next_peak( d_data, start+peak_pos, end, &pk_val ) + 1;
        }
    }
    else {
     printf( "trying form_factor..." );
     peak_pos = get_next_peak( form_fac, start, lmax_pos, &form_pk_val);
                                 /* peak_pos should be relative to start */
     if ((peak_pos > 0) && (peak_pos < 3)) {         /* try again */
         form_pk_val = 35;                           /* reset value */
         peak_pos = get_next_peak( form_fac, start+peak_pos, end, &form_pk_val )
+ 1;
     }
    }
    if ( between(peak_pos, 4, 14) ) {         /* used to be 4, 10  */
         j=peak_pos;
       printf( "First spec diff peak at %d\n", peak_pos );
       if ( (mean_pwr_ratio = get_mean( low_to_mid, 0, j )) >= son_thresh) {
           printf( "\t\tMean low-to-midpower ratio = %4.1f\n", mean_pwr_ratio );
           while ( (low_to_mid[j] > son_thresh) && (j < lmax_pos) )
              j++;
           *prev_type = SONORANT;
           return (start+j);
       }                           /* above doesn't work for 1's */
       else {             /* try reducing position by 1 */
           if ( (mean_pwr_ratio = get_mean( low_to_mid, 0, j-1 )) >= son_thresh )
               return (j+start);
           if ((mid_maxpos - j > 3) || (this_mid_pwr[j] < 0.2*loc_mid_max) ) {
              *prev_type = SONORANT;
              return (j+start);
           }
           else {
              *prev_type = ONSET;         /* label this portion as ONSET */
              return (j+start) * 100;
           }
        }
     }
     else {
      printf( "get_next_peak returned value %d\n", peak_pos );
      /* try other method */
     }
}         /* end if far_from_peak */
j=0;
end_so_far = 0;
find_slopes( rest, pwr_100, sl_array );
/* printf("\t\t");
for (i=0; i<rest; i++) {
```

```
        printf("%3.1f\t", sl_array[i]);
        if (i % 4 == 0) printf("\n\t\t");
   }
   printf( "\n" ); */
   if ( (*prev_type == NUC_END) && (rest >= 4) ) {            /* Must be a sonorant
*/
       while ( FLAT(sl_array[j]) && (j < typ_son_length) )
          j++;
   }
   end_so_far = j;
                          /* Not sure.... */
   sonorant = (this_mid_pwr[j] < pwrl) &&
         ((low_to_mid[j] > son_thresh) || FLAT(sl_array[j]));
   while ( (sonorant) && (j<rest) && (j-end_so_far < typ_son_length) ) {
       j++;
       sonorant = (low_to_mid[j] > son_thresh) &&
         ((this_mid_pwr[j] < pwrl) || FLAT(sl_array[j]));
   }
   if (local_debug)
       printf( "\t\tFinal value of j=%d; end so far=%d\n", j, end_so_far );
   if (j==rest) {
      *prev_type = SONORANT;
      return (end-1);
   }
   if (j>3) {
      *prev_type = SONORANT;
      return (start+j-1);
   }
   else {
      if (end_so_far > 4)
         *prev_type = SONORANT;
      /* else:     prev_type remains unchanged */
      return (start+end_so_far);     /* go looking for a Nucleus instead; */
   }
}     /* end find_SON */

/*******************************************************************/ void assign_ntype( short length, short tot_length, int reg_num, char *type_str )
/* uses global parameters BR_NUCLEUS and BRN_IS_HEADED.
   General convention for code strings: changeable things are in lower case,
   non-changeable in UPPER case. */
{
 short       cutoff,
       rest = tot_length - length;
 BOOLEAN word_final = (rest <=2 && reg_num == FINAL);
```

77

```
if ( !BR_NUCLEUS ) {
   if (NN_SEQUENCE && length > Min_N2_length)
      strncpy( type_str, " SEQUENCE", 10 );
   else
      strncpy( type_str, " NON_BR", 8 );
   return;
}
if ( !BRN_IS_HEADED ) {      /* BrNuclei are OK but do not have to be headed */
   cutoff = (Max_N1_length + Min_N2_length) / 2;          /* = 14 */
   strcpy( type_str, (length > cutoff ? " BRANCHING" : " NON_BRANCHING") );
   return;
}
/* Now the case where Branching Nuclei must be headed: ie English */
if (length < Max_N1_length)
   strncpy( type_str, " non_branching", 15 );
else {
   if (word_final) {
      strncpy( type_str, " BRANCHING", 12 );
      return;
   }
   if (length > Min_N2_length)    /* assumes stressed word-final N is branching
*/
      strncpy( type_str, " branching", 12 );
   else
      strncpy( type_str, " unsure", 8 );   /* will be set by process_region */
 }
}

/******************************************************************/
short find_PV( short v_length, float *voice, float *tot_pwr )
/* look for pre-voicing: short period of energy at or around F0 only */
{
 /* Not implemented yet:
   when it is, redo the code in parse_voiced where find_edge_nuc is called */
/* return 1;      True */
   return 0; /* False */
} int get_nuclei(int n_start, int end, float *tot_pwr, float *mid_pwr, float tot_max,
float mid_max,
       int *pk_array)
{
 register int    j;

return 2;
}
```

```
/*************************************************************************/
char *parse_voiced( int reg_num, int start, int end, Feature *fea_set, int *uai,
int *peaks,
      short *prev )
/* Constraints on sequences: in general in a voiced region we must have alternating
   SON and NUCLEUS regions. (My voiced fricatives come out as Unvoiced).
   The trouble is the Nucleus can be empty, eg mem≠ry, fam≠ly, om≠nis etc. At most
   2 consecutive Sonorants are allowed, and then the preceding N must contain a
     stressed vowel. In Br Rhymes (lm, ln) are possible but rare, and maybe
non-existent
   in unstressed Rhymes (in English) ??? Rhymal consonants not important for now.
   Uses globals: max_power, maxpwr_mid, maxvoice_mid, Min_nuc_length.
   mid_pwr is now absolute, not %. If we want percent, work it out here.

*/
{
 register int    j;
 int  n_start, r_start,
      n_end, r_end,
      reg_ct = 0,
      sub_num = 0,
      *epk_array,           /* holds positions of nuclear peaks */
      last_used = 0,
      last_true = 0,            /* last position assigned to a region,
                                   used to check continuity of regions */
      e_code,                /* element code returned by process_region */
      speaker,               /* = MALE or FEMALE */
      mid_maxpos,            /* position of local max in mid_pwr */
      loc_maxpos;            /* position of loc_max in current region,
                                relative to start */
 BOOLEAN all_done,
      all_voiced = False,    /* true if word is a single voiced region */
      early_max,       /* true if the local max power value is in the first half
*/
      has_stress,            /* True if this region contains the overall maximum
                                power value: doesn't get changed */
      stress,                /* true until main energy peak is passed */
      PV = False,            /* PreVoicing found */
      nuc_assigned = False,
      falling,
      GS_Candidate,
      GS_held = False;
 Feature *p;
 short    length = (end - start),    /* amount of region remaining */
      v_length = length+1,           /* size of array: 0..length */
      rest = length,                 /* rest of array to be processed */
      last_reg = *prev,              /* type of previous sub-region */
```

```
        max_gap = 4,              /* size of maximum gap tolerated */
        Final_nuc_length = 6,     /* minimum duration of final NUC in region */
        Min_v_len = 7,            /* min. duration of real voiced region */
        nuc_type = *prev,         /* can be any region type, plus NUC_END */
        seg_length,
        edge_pos,                 /* result of find_edge_nuc */
        num_nuclei,               /* number of peaks in power curve(s) */
        peaks_past=0,             /* num of power peaks passed */
        nuc_ct, son_ct;           /* keeps current number of nuclei/sonorants */
 float  *k1, *F0, *voice,
        *d_data, *form_fac,
        *tot_pwr, *mid_pwr,
        *pwr_ratios,              /* mid_power / tot_pwr */
        mean_F0,
        this_pwr, this_mid_pwr,
        loc_mid_max,              /* local max mid power */
        loc_max;                  /* the local maximum total power value in this region
 */
 char   *type_str,
        *name_str,
        *nuc_str,
        *seg_str,
        e_str[3];

printf("\tIn Parse_voiced: region=%d\n", reg_num );
 type_str = (char *)calloc(20, sizeof(char));
 name_str = (char *)calloc(10, sizeof(char));
 seg_str = (char *)calloc(10, sizeof(char));
 k1 = (float *)calloc(v_length, sizeof(float));
 voice = (float *)calloc(v_length, sizeof(float));
 d_data = (float *)calloc(v_length, sizeof(float));
 form_fac = (float *)calloc(v_length, sizeof(float));
 tot_pwr = (float *)calloc(v_length, sizeof(float));
 mid_pwr = (float *)calloc(v_length, sizeof(float));
 F0 = (float *)calloc(v_length, sizeof(float));

p = fea_set + start;
 for ( j=0; j< v_length; j++) {
     /*zcr[j] = p->zeros; */
     k1[j] = p->k1;
     voice[j] = p->voiced;    /* real f.p. values, not coded */
     d_data[j] = p->d_data;
     form_fac[j] = p->form_diff * 100;
     tot_pwr[j] = p->power;
     mid_pwr[j] = p->midpower;
     F0[j] = p->F0;
     /* */
```

80

```c
        p++;
    }
    if ((*prev==UNKNOWN) && (reg_num == FINAL)) {       /* whole word is 1 voiced region */
        all_voiced = True;
        sub_num = (int) ( floor((float)v_length / 12) );    /* this value varies A LOT */
        printf( "\tAll Voiced: 1st est. no. of positions = %d\n", sub_num);

/********Now look for peaks in power curve to get total number of nuclei ****/

}
    /* Get position and value of local power max */
    if (all_voiced) {
        loc_max = maxpower;
        loc_maxpos = max_pwr_pos - start;
        loc_mid_max = maxvoice_mid;
        mid_maxpos = max_vmid_pos - start;
        has_stress = stress = True;
    }
    else {
        loc_max = maxi( tot_pwr, v_length, &loc_maxpos );
        loc_mid_max = maxi( mid_pwr, v_length, &mid_maxpos );
        fprintf( stderr, "\tLocal power max=%3.1f @ position %d\n", loc_max, loc_maxpos );
        if ((loc_max == maxpower) && (loc_mid_max >= 0.95 * maxvoice_mid)) {
            has_stress = stress = True;         /* only useful if not all_voiced) */
            fprintf( stderr, "\tThis region contains stressed vowel!\n" );
        }
        else
            has_stress = stress = False;
    } if (all_voiced || v_length > 15) {
        epk_array = (int *)calloc(MAX_NUCLEI, sizeof(int));
        num_nuclei = get_nuclei(n_start, end, tot_pwr, mid_pwr, loc_max, loc_mid_max, epk_array);
    }
    else
        num_nuclei = 1;
    printf("\tEstimated number of Nuclei = %d\n", num_nuclei);

early_max = ((loc_maxpos < length/2) && (mid_maxpos < length/2)) ? True: False;
    mean_F0 = get_mean( F0, 0, v_length );
    fprintf( stderr, "\tLocal mean F0 = %4.1f: ", mean_F0 );
    if (mean_F0 > 160) {
```

```
      speaker = FEMALE;
      printf( "Female\n" );
   }
   else {
      speaker = MALE;
      printf( "Male\n" );
   }
   j=0;
   n_start = n_end = 0;
   r_start = r_end = 0;
   all_done = False;
   nuc_ct = 0;

/* Look for initial Glottal Stop in appropriate cases */
 GS_Candidate = (*prev==UNKNOWN) || (*prev==BURST) || ((*prev==LOW_TONE) &&
(v_length > Min_v_len));
 if (GS_Candidate) {
         edge_pos = find_edge_nuc(n_start, rest, stress, loc_maxpos, mid_maxpos,
tot_pwr, mid_pwr);
      if ( edge_pos != -1 ) {
         fprintf(stderr, "\tGlottal Stop found (in Nucleus)\n");
         if (*prev == BURST) {
            printf("\tGlottal Stop confirmed by find_edge\n");
         }
         else {              /* No previous BURST */
            if (edge_pos < 4) {       /* assume no region before rising edge */
               if (*prev == LOW_TONE) {
                  strcat( seg_str, "Z" );
                  *prev = SILENCE;
               }
               else {     /* ie *prev == UNKNOWN */
               /* if not word-initial, glottal stop OK, otherwise need other evidence
                  since could be an empty onset with a phonetic glottal stop */
                     strcat( seg_str, "S" );
                     *prev = SILENCE;
               }
            }
            else {   /* assume a (prob. pre-voiced) region before rising edge */
               if (PV = find_PV( edge_pos, voice, tot_pwr /*,spec_array */ )) {
                  *prev = LOW_TONE;
                  strcat( seg_str, "Z." );   /* code for fully-voiced stop */
                  n_start = edge_pos;
               }
               else
                  GS_held = True;      /* should find a sonorant first */
                  /*strcat(seg_str, "R."); */
                  *prev = ONSET; /* ensure find_SON is called first */
```

```
                n_start = edge_pos;
            }
        }
    }
    else {      /* find_edge_nuc failed */
        if (*prev == BURST) {          /* We better find glottal stop... */
            printf("\tUh-Oh: Glottal Stop not confirmed by find_edge\n");
            /* might strip out the Sh sequence at this point */
        }
    }
}
switch (*prev) {
case EDGE:              /* shouldn't occur */
    printf( "\tWarning: previous region was EDGE.\n" );
    strcat( seg_str, "S" );          /* put in the missing S */
case SILENCE:
    strcat( seg_str, "." );          /* put in the missing . */
case LOW_TONE:
/*case SONORANT:        : only occurs if glottal stop found */
case ERROR:             /* so far this results only from pre-voicing */
case BURST:             /* a Nucleus must follow */
    while ( !all_done ) {
      rest = length-n_start;
      if ((rest < Final_nuc_length) && (last_reg == SONORANT)) {
          if (reg_num != FINAL) {
              this_pwr = tot_pwr[n_start];
              this_mid_pwr = mid_pwr[n_start];
              for (j=n_start+1; j<v_length; j++)
                  if ((tot_pwr[j] > this_pwr) && (mid_pwr[j] > this_mid_pwr)
                    && (mid_pwr[j] > 0.2*maxvoice_mid) )
                    break;
              if (j < v_length) {
                  printf( "\tNUCLEUS forced: start %d, end %d\n", start+n_start, end
);
                  n_end = length;
                  nuc_assigned = True;
                  *prev = NUCLEUS;
              }
          }
      }
      else {
          n_end = find_NUC( n_start, rest, stress, loc_maxpos, mid_maxpos, tot_pwr,
mid_pwr, d_data, form_fac, &nuc_type );
          last_used = n_end;
          if ((nuc_type == NUC_END) || (nuc_type == EDGE))    /*assign last_reg based
on nuc_type*/
              last_reg = NUCLEUS;
```

```
            else
                last_reg = nuc_type;
        }
        if (n_end - n_start > Min_nuc_length) {    /* NUC found, min 50ms */
            nuc_assigned = True;
        /* this should be pretty rare: but anyway.... */
            if ( (last_reg == SONORANT) && (n_start - last_true > max_gap) ) {
                /* Adjust start value to 1+end of SON region... */
                n_start = last_true+1;
                printf( "\tStart of NUC adjusted to %d\n", start+last_true+1 );
            }
            printf( "\tNUCLEUS: start %d, end %d:", start+n_start, start+n_end );
            assign_ntype( (n_end - n_start + 1), v_length, reg_num, type_str );
            printf( "%s\n", type_str);
            last_true = last_used;
            *prev = last_reg;
            e_code=process_region( start+n_start, start+n_end, spec_array, peaks, uai,
type_str );
            /* the above may change the br. vs non-br. decision in English */
            if (type_str[1] == 'b')
                    strcat( seg_str, "N2;" );
             else
                strcat( seg_str, "N1;" );
            itoa(e_code, e_str);
            strcat( seg_str, e_str );
            strcat( seg_str, "." );
            if (type_str[1] == 'S') {           /* nuclear Sequence maps on to N.O.N */
                strcat(seg_str, "O.N1;");        /* put in empty onset */
                strcat(seg_str, e_str);
                strcat( seg_str, "." );
            }
            /* NB last_reg is assigned after call to find_NUC */
        }
        if (nuc_type == EDGE ) {       /* special case: ? found */
            *prev = EDGE;
            all_done = True;
            break;
        }
        if ( (v_length - n_end <=2) || (n_end > v_length) ) {
            all_done = True;
            if (reg_num == FINAL) {    /* check for glottal stop */
                printf( "\tPretending to check for final ?...\n" );
            }
            break;
        }
        else {
            r_start = last_used+1;
```

```
            rest = length-r_start;
    /* Careful: only force a Sonorant if end of nucleus is certain ! */
        if ( early_max && (last_reg == NUCLEUS) && (nuc_type == NUC_END) &&
between(rest, 4, final_son_length) ) {
            printf( "\tSONORANT forced"/*, start+r_start, end */);
            r_end = length;
            name_str = "SONORANT";
        }
        else {
            r_end = find_SON( r_start, rest, speaker, loc_maxpos, tot_pwr, mid_pwr,
d_data, form_fac, &nuc_type );
            if (nuc_type == NUC_END)               /* should never be this */
               last_reg = NUCLEUS;
            else
               last_reg = nuc_type;
            if (r_end > 100) {
               name_str = "ONSET";
               r_end /= 100;
            }
            else
               name_str = "SONORANT";
            last_used = r_end;
        }
        if (r_end - r_start >= 4) {              /* SON found, min 40ms */
                printf( "\t%s: start %d, end %d\n", name_str, start+r_start,
start+r_end );
            if ((r_start - last_true > max_gap) && (last_reg == NUCLEUS)) {
                    /* fill in gap */
               /* Adjust value of end of NUC region... */
               printf( "\tEnd of previous NUC adjusted to %d\n", start+r_start-1
);
            }
            strcat( seg_str, (name_str[0] == 'S' ? "R." : "O."));
            last_true = last_used;
            last_reg = *prev = SONORANT;
        }
        if ( (v_length - r_end <=2) || (r_end > v_length) ) {
            all_done = True;
            /* *prev = SONORANT; */
            break;
        }
    }
    n_start = last_used+1;
    if ((n_start > loc_maxpos) && nuc_assigned)
            /* we've passed the stressed sub-region
                    and a nucleus has been assigned */
        stress = False;
```

```
}           /* end of while */
if (last_used - last_true > max_gap)
   printf( "\tEnd of previous region adjusted to %d\n", start+last_used );
break;

case UNKNOWN:         /* must be word-initial*/
   if (reg_num != FINAL) {    /* whole word is 1 voiced region */
      printf( "\tParsing initial voiced region...\n" );
      if (v_length <= Min_v_len ) { /* prob. pre-voicing */
         PV = find_PV( v_length, voice, tot_pwr );
         if (PV) {
            printf( "Pre-voicing found.\n" );
            *prev = LOW_TONE;
            last_true = end;
            /* don't write to the output string; taken care of in parse_unv() */
         }
         else
            last_true = end;  /* this prevents a default string being
                                 inserted later, since no nucleus is assigned */
         break;
      }
   }

/* don't break out, carry on */
case ONSET:     /* a 'voiced' fricative, pre-voicing or tapped thing */
case FRIC: /* could be nucleus or sonorant next */
   while ( !all_done ) {
      rest = length-r_start;
      /* Careful: only force a Sonorant if end of nucleus is certain ! */
      if (early_max && (last_reg == NUCLEUS) && (nuc_type == NUC_END) &&
          between(rest, 4, final_son_length) ) {
         if (peaks_past == num_nuclei) {
            printf( "\tSONORANT forced: "/*, start+r_start, end */);
            r_end = length;
            name_str = "SONORANT";
         }
         else {
            printf( "\tONSET forced: ");
            j=r_start;
            falling = True;
            while ((j < v_length) && falling) {
               falling = (tot_pwr[j] < tot_pwr[j-1]);
               j++;             /* find start of rise in pwr curve */
            }
            printf( "j = %d: ", j );
            r_end = j-1;
            last_true = last_used = r_end;
```

```
                name_str = "ONSET";
                if (r_end - r_start < 4) {
                    printf( "%s: start %d, end %d\n", name_str, start+r_start,
    start+r_end );
                    last_reg = *prev = ONSET;
                    strcat(seg_str, "O.");
                }
                /* The >4 case is handled below in the normal way */
            }
        }
        else {
            r_end = find_SON( r_start, rest, speaker, loc_maxpos, tot_pwr, mid_pwr,
    d_data, form_fac, &nuc_type );
            if (nuc_type == NUC_END)        /* it should hardly ever be this */
                last_reg = NUCLEUS;
            else
                last_reg = nuc_type;
            if (r_end > 100) {
                r_end /= 100;
                name_str = "ONSET";
            }
            else
                name_str = "SONORANT";
            last_used = r_end;
        }
        if (GS_held) {
            last_used = r_end = edge_pos;
            name_str = (r_end >=4 ? "SONORANT" : "ONSET");
            GS_held = False;  /* drop the GS once it's used */
        }
        seg_length = r_end - r_start;
        if ((seg_length >= 4) || (r_start < 2 && seg_length >= 2)) {
                /* allow word-initial sonorants of min 20ms!! (see yy_nana) */
            printf( "\t%s: start %d, end %d\n", name_str, start+r_start,
    start+r_end );
            if ((r_start - last_true > max_gap) && (*prev == NUCLEUS)) {
                /* Adjust value of end of NUC region to fill in gap... */
                printf( "\tEnd of previous NUC adjusted to %d\n", start+r_start-1
    );
            }
            last_true = last_used;
            last_reg = *prev = (name_str[0] == 'O' ? ONSET : SONORANT);
            strcat( seg_str, (name_str[0] == 'O' ? "O." : "R."));
        }
        if ( (v_length - r_end <=2) || (r_end > v_length) ) {
            all_done = True;
            /* *prev = SONORANT; */
```

87

```
            break;
      }
      else {
            n_start = last_used+1;
            rest = length-n_start;
            if (stress && (n_start > loc_maxpos) && nuc_assigned)
                        /* we've passed the stressed sub-region */
                  stress = False;
            if ( (rest < Final_nuc_length && peaks_past < num_nuclei) && (last_reg
!= NUCLEUS)) {
                  if ( !stress /*reg_num != FINAL*/) {
                        this_pwr = tot_pwr[n_start];
                        this_mid_pwr = mid_pwr[n_start];
                        printf("\tThis_pwr = %4.1f; this_mid_pwr = %4.1f\n", this_pwr,
this_mid_pwr);
                        for (j=n_start+1; j<v_length; j++)
                           if ((tot_pwr[j] > this_pwr) && (mid_pwr[j] > this_mid_pwr)
                              && (mid_pwr[j] > 0.2*loc_mid_max))
                              break;
                        if (j < v_length) {
                           printf( "\tNUCLEUS forced"/* start %d, end %d\n", start+n_start,
end*/ );
                           n_end = v_length;
                           nuc_assigned = True;
                        }
                  }
                  else {           /* FINAL region: Don't get into an infinite loop !
*/
                  }
            }
            else {
                  n_end = find_NUC( n_start, rest, stress, loc_maxpos, mid_maxpos,
tot_pwr, mid_pwr, d_data, form_fac, &nuc_type );
                  last_used = n_end;
                  if ((nuc_type == NUC_END) || (nuc_type == EDGE) )
                                    /* assign last_reg based on nuc_type */
                        last_reg = NUCLEUS;
                  else
                        last_reg = nuc_type;
            }
            if (n_end - n_start >= Min_nuc_length) {
               nuc_assigned = True;
               peaks_past++;
               printf( "\tNUCLEUS: start %d, end %d:", start+n_start, start+n_end );
               assign_ntype( (n_end-n_start+1), v_length, reg_num, type_str );
               printf( "%s\n", type_str );
               *prev = NUCLEUS;
```

```
                    /* NB last_reg is assigned by find_NUC */
                    last_true = last_used;
                        e_code = process_region(start+n_start, start+n_end, spec_array,
peaks, uai, type_str);
                    /* the above may change the br. vs non-br. decision */
                    strcat( seg_str, (type_str[1] == 'b' ? "N2;" : "N1;") );
                    itoa( e_code, e_str );
                    strcat( seg_str, e_str );
                    strcat( seg_str, "." );
                    if (type_str[1] == 'S') {
                       strcat(seg_str, "O0.N1;"); /* put in empty onset */
                       strcat(seg_str, e_str);
                       strcat( seg_str, "." );
                    }
                }
                if (nuc_type == EDGE) {    /* special case: ? found */
                   *prev = EDGE;
                   all_done = True;
                   break;
                }
                if ( (v_length - n_end <=2) || (n_end > v_length) )    {
                   all_done = True;
                   *prev = last_reg;
                   break;
                }
            }
            r_start = last_used+1;  /* safer than n_end+1, since n_end may not get
assigned */
        }       /* end of while */
        if (last_used - last_true > max_gap)
           /* check for only R */
           printf( "\tEnd of previous region adjusted to %d\n", start+last_used );
        break;

default:
       return "FAIL";
    }   /* end switch */
/*********** Repair strategy: if no nucleus assigned: ***************/
    if ( (last_true == 0) || !nuc_assigned /*&& (last_true != end) */ ) {
       printf( "No %s assigned: ", (nuc_assigned ? "regions" : "nucleus") );
       if (reg_num == 0) {       /* probably pre-voicing */
         printf(" assuming Pre-voicing\n");
         *prev = LOW_TONE;
       }
       else {
         if (has_stress) {
              if (v_length <= 12) {     /* single nuc */
```

```
                printf( "assuming single Nucleus\n" );
                assign_ntype( v_length, v_length, reg_num, type_str );
                *prev = NUCLEUS;
                e_code = process_region( start, end, spec_array, peaks, uai, type_str
);
                strcat( seg_str, (type_str[1] == 'b' ? "N2;" : "N1;") );
                itoa( e_code, e_str );
                strcat( seg_str, e_str );
                strcat( seg_str, "." );
            }
            else {       /* longer than 12 : could do better than this */
                printf( "too long to estimate\n" );
                if (!nuc_assigned && last_true > 0) {        /* ie only an R */
                    strcat( seg_str, "N1;0." );
                    *prev = NUCLEUS;
                }
                    else   {
                        strcat( seg_str, "N1;0.R." );
                        *prev = SONORANT;
                    }
                }
            }
        else {     /* unstressed nuc */
            printf( "assuming unstressed rhyme\n" );
            if (v_length <= 10) {
                strcat( seg_str, "N1;0." );
                *prev = NUCLEUS;
            }
            else {
                strcat( seg_str, "N1;0.R." );
                *prev = SONORANT;
            }
        }
    }
  }
}
strcat( seg_str, "\0" );
printf( "\tSegment string is %s\n", seg_str );
/* fprintf( fd, "%s", seg_str ); */
return (seg_str);
} int   min_sil_len = 4,   /* i.e. 5 x 10 = 50ms */
      min_fric_len = 6;  /* i.e. 60ms */

/*******************************          UNVOICED     stuff
********************************/
int find_FRIC( int start, int rest, float *zcr, float *k1, short *fric_type ) {
```

96

```c
/* return the first value after start such that no h is present.
   start and rest are relative to starting pos of input arrays,
   start + rest = length of arrays */ register int      j;
int   maxdex;
short       local_debug = 1,
      head_ct = 0,            /* no of points s.t. h= Head */
      op_ct = 0,       /*              s.t. h= Operator */
      end = start+rest,
      max_index = end-1;
float      Zcr, kval,
      max_zcr;
BOOLEAN h_found,
      burst` = False,
      h_head,
      h_operator;
float      burst_min = 6000,
      zcrh=5000,
      zcr_med=2000;

printf("\t\tIn find_FRIC: start=%d, rest=%d\n", start, rest );
Zcr = max(zcr[start], zcr[start+1]);         /* check for transition region */
kval = min(k1[start], k1[start+1]);
j = 1;
h_found = h_head = h_operator = False;
h_found = (Zcr > zcr_med) || (kval < 0.8);
while ( h_found && (j < rest) ) {
  j++;
  Zcr = zcr[start+j];
  kval = k1[start+j];
  h_head = (Zcr > zcrh) && (kval < 0);
  if (h_head)
     head_ct++;
  else {
     h_operator = (Zcr > zcr_med) || (kval < 0.5);
     if (h_operator)
        op_ct++;
  }
  h_found = h_head || h_operator;
}
*fric_type = ((head_ct > op_ct) ? HEAD : OPERATOR);
max_zcr = sub_max( zcr, start, end, &maxdex );
if (local_debug)
   fprintf(stderr, "\t\tValue of j = %d; Max ZCR value = %4.0f\n", j, max_zcr );
burst = (max_zcr > burst_min);
if (j == rest) {
```

91

```
         *fric_type += (burst * BURST);   /* add burst code to fric_type */
         return (end);
      }
      if (j>=2) {
         if ( rest < 10 ) {
            if ( get_mean(zcr, start, max_index) > zcr_med )
               *fric_type = OPERATOR;
            if ( get_mean(zcr, start, max_index) > zcrh )
               *fric_type = HEAD;
             *fric_type += (burst * BURST);     /* add burst code to fric_type */
            return (end);
         }
         else
            return (start+j);
      }
      else
         return (start+1);           /* to make sure we don't loop for ever */
   }

BOOLEAN  process_fric(  short   length,  short  *prev,  short  *fric_type,  char
*fric_string, char *seg_str )
{
 BOOLEAN burst = False,
         h_found = False;
 int   char_ct = 0;
 short      f_type = *fric_type;

if ((f_type-BURST == HEAD) || (f_type-BURST == OPERATOR)) {
         burst++;
         f_type -= BURST;
      }
      if (length >= min_fric_len) {
         strncpy(fric_string, "FRIC ", 6);
         if (*prev == SILENCE) {
            if (f_type == HEAD) {
               seg_str[char_ct++] = '-';   /* result is S-F ie affricate or {k,t}≠s
*/
               seg_str[char_ct++] = 'F';
            }
            else
               seg_str[char_ct++] = 'h';   /* long burst => ?+h */
            }
         else {    /* prev not Silence */
            if (*prev != LOW_TONE && *prev != UNKNOWN)
               seg_str[char_ct++] = (f_type == HEAD ? 'F' : 'f');
            else
               seg_str[char_ct++] = ((length<10 || *prev == FRIC) ? 'f' :
```

92

```
                                        (f_type == HEAD ? 'F' : 'f'));
        }
        /* h can't be the head of stop, so just use f->128, in case we missed a ? */
            /* NB pre-voiced Fricatives give 'Lf' only: *LF!! */
        seg_str[char_ct++] = '.';
        /* strcat( seg_str, */
        h_found = True;
        *prev = FRIC;
    }
    else {                                  /* duration of friction < min_fric_len
*/
        if (length >= 2) {        /* might be a burst */
/**** Make this a switch statement: UNKNOWN->Sh *********/
            switch (*prev) {
            case UNKNOWN: /* if (f_type == HEAD)*/
                if (burst)
                    seg_str[char_ct++] = 'S';
            case SILENCE:
            case LOW_TONE:
                if (burst) {
                    strncpy(fric_string, "BURST ", 8);
                    *prev = BURST;
                    seg_str[char_ct++] = 'h';
                }
                else {
                    strncpy(fric_string, "FRIC ", 6);
                    *prev = FRIC;
                    seg_str[char_ct++] = (f_type == HEAD ? 'F' : 'f');
                }
                break;
            default:   /* fric > 2 not following Silence or L */
                strncpy(fric_string, "FRIC ", 6);
                *prev = FRIC;
                seg_str[char_ct++] = (f_type == HEAD ? 'F' : 'f');
                break;
            }                     /* end switch */
            seg_str[char_ct++] = '.';
            h_found = True;
        }
        /* else no h_found */
    }
 seg_str[char_ct++] = '\0';
 *fric_type = f_type;
 return (h_found);
}     /* end of process_fric */
/***********************************************/
```

93

```
int find_SIL( int start, int rest, float *power, float *zeros, float *mid_pwr,
float *k1 ) {
/* return first position s.t. not in a silence region
   start + rest = length of arrays
   tot_pwr[] is absolute, mid_pwr[] is normalised */
 register int    j;
 int     end = start+rest,
         s_start = start;
 short       local_debug = 1;
 BOOLEAN k_hi;
 float       mean_pwr, mean_mid_pwr,
         mean_zcr,
         mean_pwr_ratio;
 float       pwr1=3000,       /* absolute */
         mid_p1 = 1.0,        /* percent */
         k1_thresh = 0.68;

printf("\t\tIn find_SIL: start=%d, rest=%d\n", start, rest );
 /* Try the whole of the rest of the region first */
 mean_pwr = get_mean( power, start, end );            /*   */
 mean_mid_pwr = get_mean( mid_pwr, start, end );
 mean_zcr = get_mean( zeros, start, end );
 if (local_debug)
     fprintf(stderr, "\t\tMean midpower = %3.2f\n", mean_mid_pwr);
 if (rest < 11) {       /* ie duration !>100ms */
     if ((mean_mid_pwr < mid_p1) && (mean_zcr < 1000))
       return (end);
 }
 /* else */
 j=start;
 k_hi = (k1[j++] > k1_thresh) || (k1[j++] > k1_thresh);
 if (k_hi)
     s_start = j-1;
 while ( k_hi && (j<end) ) {
     /*j++; */
     k_hi = (k1[++j] > k1_thresh) || (k1[++j] > k1_thresh);
 }
 if (local_debug)
     fprintf(stderr, "\t\tValue of j = %d\n", j);
 if ((j-start >= 4) || (j==end)) {
     mean_mid_pwr = get_mean( mid_pwr, s_start, j-1 );
     if (mean_mid_pwr < mid_p1)
      return (/*j==end ?*/ j );
     else {
      fprintf("\t\tFailed mid power test\n");
      return (start);
     }
```

94

```c
	}
	else
		return (start);
} char parse_unvoiced( int reg_num, int start, int end, Feature *fea_set, short
*prev, char *seg_str )
{
/* relevant features are: k1 value, zcr, specdiff */
/* TODO: decide what to do with regions shorter than min_sil_len. eg my [v] in
seven.
	At the moment they get labelled as Onsets */
	register int	j, ct;
	BOOLEAN all_done,
		h_present,
		h_found,
		burst = False;
	Feature *p;
	short	length = (end + 1 - start),
		max_pos = length-1,
		char_ct = 0,		/* counter for segment string */
		no_left = 3,		/* min no of records left before all done */
		f_type;			/* type of fricative: h = HEAD or OPERATOR */
	int	f_start, s_start,
		f_end, s_end,
		reg_ct = 0,
		v_end = 0,		/* position of end of LowTone region */
		L_length = 5;		/* min. period of Low Tone = 50ms */
	float	*zcr,
		* k1, *f0,
		*tot_pwr, *mid_pwr;
	float	zcrl=2000,		/* lower and upper thresholds for zc and power */
		pwr_fric=4500,		/* upper power threshold for fricatives */
		zcr0 = 600,		/* upper zc threshold for silence */
		zcrh=4000, pwrh=80.0,	/* zc's are absolute, powers are % */
		zcr_med=2000,		/* interesting zc level */
		zcr_top=7000,		/* definitely friction threshold */
		pwr_son = 20000,	/* lower power threshold for sonorants */
		L_min_pwr = 5.0E4,	/* min mean power for Low TOne */
		change, mean_zcr,
		mean_pwr, *voice;
	char *fric_string,		/* Type of fricative: FRIC or BURST */
		out_str[10];

printf("\tIn Parse_unvoiced: region=%d\n", reg_num );
	fric_string = (char *)calloc(10, sizeof(char));
	voice = (float *)calloc(length, sizeof(UINT));
```

95

```
zcr = (float *)calloc(length, sizeof(float));
k1 = (float *)calloc(length, sizeof(float));
f0 = (float *)calloc(length, sizeof(float));
tot_pwr = (float *)calloc(length, sizeof(float));
mid_pwr = (float *)calloc(length, sizeof(float));

p = fea_set + start;
for ( j=0; j< length; j++) { /* arrays are relative to start */
    voice[j] = p->voiced;    /* real f.p. values, not coded */
    zcr[j] = p->zeros;
    k1[j] = p->k1;
    f0[j] = p->F0;
    /* d_data[j] = p->d_data; */
    tot_pwr[j] = p->power;
    mid_pwr[j] = p->midpower / maxpwr_mid;    /* normalise */
    p++;
}
j=0;
f_start = f_end = 0;
s_start = s_end = 0;
all_done = h_found = False;
f_type = UNKNOWN;
char_ct = 0;
h_present = (zcr[j] > zcr_med) && (k1[j] < 0.8);
/* j++; */
if ((reg_num == 0) || (*prev == UNKNOWN)) {          /* we're not interested in
silence first*/
    if ( (mean_pwr = get_mean(tot_pwr, 0, length)) < 1000 ) {
      printf( "\tMean power = %3.2f: \n", mean_pwr );
      printf( "SILENCE in Region 0: ignoring\n");
      *prev = UNKNOWN;
      seg_str[char_ct++] = 'X';
      seg_str[char_ct] = '\0';            /* Terminator */
      return ('X');          /* return an exit code */
    }
    else
      printf( "\tMean power = %3.2f: \n", mean_pwr );
    while ( (!h_present) && ( j<max_pos ) ) {
      j++;
      h_present = (zcr[j] > zcr_med) || (k1[j] < 0.8);
    }
    /* Check for pre-voicing */
    f_start = (zcr[j-1] > (zcr_med/2) ? --j : j);
    if (j-1 >= L_length) {
      v_end = j-1;
      mean_pwr = get_mean(tot_pwr, 0, v_end);
      if (mean_pwr > L_min_pwr) /* && (get_mean(f0) < typical_f0) */ {
```

96

```
    /* must be Pre-voicing: join this region with next Voiced region */
        printf( "\tLow Tone! " );   /* now find the start: prob_voice > 0.2 */
        for (j=0; j<length; j++)
            if (voice[j] > 0.2) break;
        printf( "start=%d, end=%d\n", j, v_end );
        if ( v_end > (max_pos-2) ) {    /* end of region */
            *prev = v_end;
            seg_str = "";              /* Put in L- later */
            return( 'L' );
        }
        else {                 /* Some h left */
            seg_str[char_ct++] = 'L';
            *prev = LOW_TONE;
            f_start = v_end+1;
        } .
    }
    else {
        printf( "\tSILENCE in Region 0: ignoring\n" );
        *prev = UNKNOWN;
        seg_str = "X";        /* This is just silence, not necess. ? stop */ return ('X');          /* return an exit code */
    }
}
/* f_start = j; */
while ( !all_done ) {
  h_found = burst = False;
  f_end = find_FRIC( f_start, (max_pos-f_start), zcr, k1, &f_type );
  h_found = process_fric( f_end-f_start, prev, &f_type, fric_string, out_str
);
    if (h_found) {
        printf( "\t%s start: %d, end: %d. ", fric_string, start+f_start,
start+f_end );
        if (f_type == HEAD)
            printf( "h  is a Head!!\n");
        else
            printf( "h  is an Operator!\n");
        for(ct=0; ct<strlen(out_str); ct++)
            seg_str[char_ct++] = out_str[ct];
    }
    if ( length - f_end <=2 ) {
        all_done = True;
        break;
    }
    else {
      s_start = f_end+1;
      s_end = find_SIL( s_start, max_pos-s_start, tot_pwr, zcr, mid_pwr, k1 );
```

```
        if ((s_end - s_start >= min_sil_len) && (*prev != UNKNOWN)) {
            printf( "\tSILENCE start: %d, end: %d - ? found!\n", start+s_start,
start+s_end );
            *prev = SILENCE;
            /* strcat( seg_str, "S" ); */
            /* fprintf(stderr, "char ct = %d\n", char_ct );*/
            seg_str[char_ct++] = 'S';
        }
        else
            s_end = s_start;   /* don't increment pointer in file */
        if ( length-s_end <=1 ) {
            all_done = True;
            *prev = SILENCE;  /* prob'ly redundant, but just in case */
            break;
        }
    }
    f_start = s_end+1;
  } /* end of while loop */
}
else {           /* not the first region in the word: includes the EDGE case */
    while ( !all_done ) {
        s_end = find_SIL( s_start, (max_pos-s_start), tot_pwr, zcr, mid_pwr, k1 );
        if ( ((s_end - s_start) >= min_sil_len) || (*prev == EDGE) || (*prev ==
LOW_TONE)) {
            if (reg_num != FINAL) {
                printf( "\tSILENCE start: %d, end: %d - ? found!!\n", start+s_start,
start+s_end );
                seg_str[char_ct++] = (*prev==LOW_TONE ? 'Z' : 'S');
                *prev = SILENCE;
            }
            else {   /* FINAL region */
                if (length - s_end >= no_left) {   /* ie not all done yet */
                    printf( "\tSILENCE start: %d, end: %d - ? found!!\n",
start+s_start, start+s_end );
                    /* strcat( seg_str, "S" ); */
                    *prev = SILENCE;
                    /*fprintf(stderr, "char ct = %d\n", char_ct );*/
                    seg_str[char_ct++] = 'S';
                }
                /* if whole region is silence, ignore it */
                if ( (s_end - s_start) == max_pos ) {
                    if (*prev == EDGE) {
                        seg_str[char_ct++] = '?';
                        seg_str[char_ct++] = '.';
                    }
                    else {
                        printf( "\tIgnoring final Silence region\n");
```

*98*

```
               seg_str = "X";
               return ('X');
            }
         }
      }         /* end final region case */
   }
   else          /* find_SIL failed */
      s_end = s_start;           /* don't increment pointer in file */ if ( length - s_end <=no_left ) {
      if ( (*prev == SILENCE) && (length-s_end >=2) ) {
         printf( "\tBURST start: %d, end: %d\n", start+s_end+1, end );
         *prev = BURST;
         /* strcat( seg_str, "h." ); */
         /*    fprintf(stderr, "char ct = %d; ", char_ct );*/
         seg_str[char_ct++] = 'h';
         seg_str[char_ct++] = '.';
      }
      all_done = True;
      break;
   }
   else {
      f_start = (s_end > 0) ? (s_end+1) : 0;
      h_found = burst = False;
      f_end = find_FRIC( f_start, (max_pos-f_start), zcr, k1, &f_type );
      h_found = process_fric( f_end-f_start, prev, &f_type, fric_string, out_str
);
      if (h_found) {
         printf( "\t%s start: %d, end: %d. ", fric_string, start+f_start,
start+f_end );
         if (f_type == HEAD)
            printf( "h is a Head!!\n");
         else
            printf( "h is an Operator!\n");
         for(ct=0; ct<strlen(out_str); ct++)
            seg_str[char_ct++] = out_str[ct];
      }
      if ( (reg_num == FINAL) && (h_found) )
         if ( length-f_end <=5 ) {
            fprintf(stderr, "\t\tIgnoring the rest\n");
            all_done = True;
            break;
         }
      if ( length-f_end <=2 ) {
         all_done = True;
         break;
      }
```

99

```
        }
        s_start = f_end+1;
      }                /* end of while loop */
    }
    /*strcat( seg_str, "\0" ); */
    /*fprintf(stderr, "\tchar ct = %d; ", char_ct ); */

/* Check for empty strings: only do this for word-internal regions */
    if ((char_ct == 0) && (reg_num != 0) && (reg_num != FINAL)) {
       if (length > 3) {
          seg_str[char_ct++] = 'O';        /* label as Onset */
          seg_str[char_ct++] = '.';        /* label as Onset */
          *prev = ONSET;
       }
       else {
          /* don't change *prev; send a code back to find_regions to ignore this region
*/
          printf("\tInvalid unvoiced region\n");
          return ('X');
       }
    }

/* strncpy( out_str, seg_str, 10 );              safe copy !
     printf( "\tOutput string is %s\n", out_str );
     fprintf( *fd, "%s", out_str ); */ if (*prev != UNKNOWN) {
     seg_str[char_ct] = '\0';         /* Terminator */
     printf( "\tSegment string is %s\n", seg_str );
     return (0);
  }
  else {
     fprintf(stderr, "\tNon-Speech: ignoring this region!\n");
     seg_str[char_ct++] = 'X';
     seg_str[char_ct] = '\0';         /* Terminator */
     return ('X');
  }
}
/************ end of Parse_unvoiced ***********************/ int check_silence( int start, int end, Feature *fea_set )
{
 register int     j;
 int    length = end-start,
        local_debug = 1;
 Feature *p;
 BOOLEAN k_hi, unVoiced, Silence;
```

100

```c
    float     k1_thresh = 0.6;

if (local_debug)
       printf("\tChecking silence...start=%d, end=%d; ", start, end);
    if (length > 15)
       return False;
    p = fea_set + start;
    j=start;
    unVoiced = (p->voiced != VCD) || ((p+1)->voiced != VCD);
    k_hi = (p->k1 > k1_thresh) || ((p+1)->k1 > k1_thresh);          /*      never
   increments p */
    Silence = k_hi && unVoiced;
    j++;
    p++;

/* NB this will fail in unlikely event that p->k1 succeeds but p+1->k1 fails
    */
    while ( Silence && (j<end-1) ) {
       k_hi = (p->k1 > k1_thresh);
       unVoiced = ((p++)->voiced != VCD);            /* increment p after testing value
    */
       Silence = k_hi && unVoiced;
       j++;
    }
    if (j==end-1) {
       printf("\n");
       return True;
    }
    else {
       printf("no: position=%d\n", j);
       return False;
    }
 } char *find_regions( float *diffpeaks, Feature *fea_set, char names[][NAMESIZE], int
*uai, int *peaks )
/* outputs a list of regions, with boundaries, based on VOICED or UNVOICED */
{
 static FILE    *fp;
 register int    j=0,
                 n=0;
 char           *str, *v_str,
          str1[NAMESIZE],
          *seg_str;        /* stores the sequence of segment labels */
/* static char    *ofile_name = "/home/HAL/ipl/progs/data/default.fil"; */
 BOOLEAN all_done;
 short          prev_type,      /* coded type of previous (sub-)region:
                          0=FRIC, 1=SILENCE, 2=NUC, 3=SONORANT */
```

/0/

```
    rval=0, err_ct=0,
    Max_final_sil = 4;        /* longest found so far */
int ch,
    v_start, uv_start,
    v_end, uv_end,
    reg_ct = 0,
    final_pk_pos;
Feature *p;
float   *zcr,
    voice_val,
    Zcr_hi = 2600;
UINT    *voice;

final_pk_pos = diff_peaks[num_bounds-1];
if (final_pk_pos < (num_rec-10) )
    printf( "find_regions: Warning - final peak is a long way from end of
file!\n");
str = (char *)calloc(20, sizeof(char));
v_str = (char *)calloc(20, sizeof(char));
seg_str = (char *)calloc(80, sizeof(char));
voice = (UINT *)calloc(num_rec, sizeof(UINT));
zcr = (float *)calloc(num_rec, sizeof(float));
p = fea_set;
/* fprintf( stderr, "Find_regions: Voice values: " );
0....0.25............0.8.....1.0
| UNV  |  TRANSITION  |  VCD  |
*/
for (j=0; j< (int) num_rec; j++) {
    voice_val = p->voiced;
    if (voice_val > 0.8)
      voice[j] = VCD;
    else {
      if (voice_val < 0.25)
         voice[j] = UNV;
      else
         voice[j] = TRANSITION;
    }
    /*fprintf( stderr, "%d: %d\t", j, voice[j] );*/
    zcr[j] = p->zeros;
    p++;
}
/* first patch up any errors in the voicing data */
j=1;
while (j < num_rec ) {
    if ( (voice[j-1] == UNV) && ((voice[j] == VCD) || (voice[j] == TRANSITION))
) {
        if ( zcr[j] > Zcr_hi )
```

```
            voice[j] = UNV;
        }
        j++;
    }
/*  if ((fp = fopen( ofile_name, "w+t" )) != NULL) {
        printf( "File %s opened OK\n", ofile_name );
    } else {
        printf( "Failed to open output file in find_regions\n" );
        return ("FAIL");
    }
*/
    j=0;
    prev_type = UNKNOWN;
    all_done = False;
    uv_start = v_start = 0;
    while ( !all_done ) {
        /* assume UNVoiced first */
        while ( (j < num_rec) && (voice[j] != VCD) ) j++;
        if ((j == num_rec) || (j >= final_pk_pos)) {
          if (reg_ct == 0) {
              fprintf(stderr, "find_regions: Error: no voiced region found!!\n");
              all_done = True;
              free(voice);
              return ("FAIL");
          }
          else {            /* reg_ct > 0, close to end of array */
              uv_end = j-1;
              all_done = True;
              if ((uv_end-uv_start < Max_final_sil) || check_silence(uv_start, num_rec,
fea_set) )
                  fprintf(stderr, "Ignoring invalid final `UNV` region\n");
              else {
                  fprintf(stderr, "Region %d: UNVOICED; start=%d, end=%d\n",
                        reg_ct, uv_start, uv_end );
                  ch = parse_unvoiced( FINAL, uv_start, uv_end, fea_set, &prev_type, str
);
                  if ( ch == 'X' ) {
                      fprintf(stderr, "Deleting Region %d\n", reg_ct);
                      /*strcat( seg_str, "\0" ); */
                  }
                  else
                      seg_str = strcat( seg_str, str );
              }
              break;
          }
        }
        v_start = j;        /* start of voiced region */
```

103

```
    if (j>0) {
     uv_end = (j-1);
     fprintf(stderr, "Region %d: UNVOICED; start=%d, end=%d;", reg_ct, uv_start,
uv_end );
        if ((reg_ct == 0) && (uv_end-uv_start < 3))
            fprintf(stderr, " ignoring invalid region\n");
        else {
            fprintf(stderr, "\n");
            ch = parse_unvoiced( reg_ct, uv_start, uv_end, fea_set, &prev_type, str
);
            if ( ch != 'X' ) {          /* good news */
               if (ch == 'L') {
                  v_start = prev_type;        /* naughty: prev_type is used to pass new
                                 starting position */
                  prev_type = LOW_TONE;    /* or ONSET? */
                  if (reg_ct != 0)
                     seg_str = strcat( seg_str, "?." );
               }
               else
                  if (ch == 0) {
                     reg_ct++;
                     seg_str = strcat( seg_str, str );
                  }
            }
            else {   /* do nothing:
                     careful, prev_type might be invalid for voiced region*/
                     /*err_ct++;
               strcat( seg_str, str );*/
               prev_type = ERROR;
            }
            /* all_done = True; */
        }    /* outer else */
    }
    while ( (j < num_rec) && (voice[j] != UNV) ) j++;
     /* check for glitches in voicing curve */
    if ( (j < num_rec-1) && (voice[j+1] != UNV) ) {
     j++;
     while ( (j < num_rec) && (voice[j] != UNV) ) j++;
    }
    v_end = j-1;
     fprintf(stderr, "Region %d: VOICED; start=%d, end=%d\n", reg_ct, v_start,
v_end );
        if ( (j >= num_rec-3) || ((j>=num_rec-6) && check_silence(j, num_rec,
fea_set)) ) {
            /* look_ahead!  careful with final voiced fricatives */
       v_str = parse_voiced( FINAL, v_start, v_end, fea_set, uai, peaks, &prev_type
);
```

104

```
        all_done = True;
      }
      else {
       uv_start = j;
       if (v_end-v_start > 2) {
          v_str = parse_voiced( reg_ct, v_start, v_end, fea_set, uai, peaks,
 &prev_type );
          reg_ct++;
       }
       else
          strcpy( seg_str, "" );
      }
      if ( strstr(v_str, "FAIL") == NULL)
        seg_str = strcat( seg_str, v_str );
      else {
       printf( "Find_regions: error in parse_voiced\n" );
       err_ct++;
      }
 }         /* all done */
 /* strcat( seg_str, "\0" ); */
 printf( "Segment string is #%s#\n", seg_str );
/*
 if ((fp = fopen( ofile_name, "w+t" )) != NULL)
 {
  printf( "File %s opened OK\n", ofile_name );
    if (fputs( seg_str, fp ) != EOF)
      printf("Segment string ouput to file OK\n");
    else
      printf("Error writing string to ouput file\n");

j = 0;
    while ((ch = seg_str[j]) > '\0') {
      fprintf( fp, "%c", ch );
      j++;
    }
    printf( "\nSegment string copied to output file\n" );
    fclose( fp );
 }
*/
 if (err_ct) {
    printf( "%d error(s) occurred in find_regions\n", err_ct );
    return ("FAIL");
 }
 fprintf(stderr, "find_regions: input exhausted.\n");
 free( voice );
 return (seg_str);
}
```

105

```c
/* parse_seg.c
Part of program rec_word.
Converts a segment string (consisting of F|S(h)|h|R|N(2)) into a search string
for lexical access using Icon program 'connect'. Function parse_seg_str is
called by get_syl2.c and returns the search string as a character pointer.
Can be compiled and run separately by de-commenting main() and using:
     gcc -o parseng eng_pars.c parse_seg.c
        "  parsjap jap_pars.c    "       "
        "  parskor kor_pars.c    "       "
*/
/* Usage: parse_seg "seg_str" ofile language */ include <stdio.h>
include <stdlib.h>
include <string.h> define FINAL 100
define MAXTOKLEN 6
#define False 0
define True 1 if !defined(__BOOLEAN)
 typedef unsigned int BOOLEAN;
endif extern BOOLEAN
        BR_ONSET,
        BR_NUCLEUS,
        BR_RHYME,
        DF_LEN;
extern BOOLEAN
        HV_DEVOICED,
        SON_STOP;

void    reverse(char s[]);
void    itoa(int n, char *s);
char    *get_next_token( char *word, int ct );
char    *build_onset( char *seg, char *seg_str, int syl_ct );
char    *build_rhyme( char *seg, char *seg_str, int syl_ct );
char    *parse_seg_str( char *seg_str, char lang );

BOOLEAN    Japanese=False,
       Korean=False,
       Greek=False,
       Default=False;
int ct, token_num=0;
short last_tok = False;
```

106

```
int   debug = 0;

/*
void main(int argc, char *argv[])
{
 FILE       *fp;
 char *out_str, *lang_name;
 char lang;

out_str = (char *)calloc(64, sizeof(char));
 if (argc == 4) {
    lang = argv[3][0];
    switch (lang) {
      case 'j':
      case 'J': lang_name = "Japanese";
           break;
      case 'K':
      case 'k': lang_name = "Korean";
           break;
      case 'G':
      case 'g': lang_name = "Greek";
      default: lang_name = "Default";
           break;
    }
    if (debug)
      printf( "Language is %s\n", lang_name );
    if ( (fp = fopen(argv[2], "wt")) != NULL ) {
      printf( "Input string is %s\n", argv[1]);
      strcat(argv[1], "\0");
      out_str = parse_seg_str( argv[1], lang );
    }
    else {
      fprintf(stderr, "Error opening output file\n");
      exit (1);
    }
 }
 else {
    fprintf(stderr, "ERROR: wrong number of arguments\n");
    fprintf(stderr, "Usage: parsexxx \"seg_str\" ofile language\n");
    exit (1);
 }
 printf( "Output string is %s\n", out_str );
 fprintf( fp, "%s", out_str );
 fclose( fp );
 printf("OK\n");
}
*/
```

/07

```
/* reverse: reverse string s in place. From K&R page 62 */
void reverse(char s[])
{
 int c, i, j;

for (i=0, j=strlen(s)-1; i < j; i++, j--) {
     c = s[i];
     s[i] = s[j];
     s[j] = c;
 }
}

/* itoa: convert n to characters in s; from K&R page 64 */
void itoa(int n, char *s)
{
 int i, sign;
 if ((sign = n) < 0)    /* record sign */
    n = -n;         /* make n positive */
 i = 0;
 do {        /* generate digits in reverse order */
     s[i++] = n % 10 + '0';   /* get next digit */
 } while ((n /= 10) > 0);     /* delete it */
 if (sign < 0)
    s[i++] = '-';
 s[i] = '\0';
 reverse(s);
} char *get_next_token( char *word, int ct )
{
 char       ch,
       *token;           /* this MUST BE *char not [MAXTOKENLEN]!! */
 int  seg_ct=0,   /* no of dots scanned */
      pos=0,      /* current position in string (argv[1]) */
      o_pos=0,    /* current position in output string */
      length = strlen(word);

if (ct == token_num)
    last_tok = True;
 if (debug) {
    printf( "\tIn get_next_token: " );
    if (last_tok)
      printf( "getting last token" );
    printf( "\n" );
 }
 token = (char *)calloc(MAXTOKLEN, sizeof(char));
 while ((seg_ct < ct-1) && (pos < length-1)) {
```

```
      if (word[pos++] == '.')
         seg_ct++;
   }
   if (debug)
      printf( "\tseg_ct = %d\n", seg_ct );
   /* Now seg_ct = ct-1 */
   while ((word[pos] != '.') && (pos < length-1)) {
      token[o_pos] = word[pos++];
      o_pos++;
   }
   token[o_pos] = '\0';
   if (debug)
      printf( "\tToken is %s\n", token );
   return (token);
}

BOOLEAN licenses( char right, char left )
{
 /*   Checks pairs of adjacent segments for governing relations.
      Returns True if the segment 'right' can coda-license 'left', False otherwise.
  */
  switch (right) {
   case 'S': /* This routine not called if left seg = 'Sh',
                so don't need to consider it */
       return True;
   case 'F':
   case 'f':
       if (left == 'R')
          return True;
       else
          return False;
   case 'R': /* should be a Nasal really */
       if (left == 'R')
          return True;
       else
          return False;
   default:
       return False;
  }    /* end switch */
} char *build_onset( char *in_seg, char *seg_str, int syl_ct )
{
  char     *new_seg, *seg;
  char     syll[3], code_str[5],
       first, sec;
  char     *onset;
```

```
int     length = strlen(in_seg),
        code;
short       branch = 0,
        low_tone = 0;

onset = (char *)calloc(12, sizeof(char));
new_seg = (char *)calloc(MAXTOKLEN, sizeof(char));
seg = (char *)calloc(length+1, sizeof(char));

strncpy( seg, in_seg, length );
if (debug)
    printf( "\tIn build_onset: seg = %s\n", seg );
itoa(syl_ct, syll);
if (debug) {
    printf( "\tIn build_onset:    syll = '%s'\n", syll );
    printf( "\t   length of syll = %d\n", strlen(syll) );
}
strcat( onset, "O" );
strncat( onset, syll, 2 );
first = seg[0];
if (debug)
    printf( "\tfirst char is %c\n", first);
if (first == 'O' && seg[1] == '0')
    strcat( onset, "3;" );   /* pos value of 3 => empty onset */
else
    strcat( onset, "1;" );
if (debug)
    printf( "\tIn build_onset: onset = '%s', seg = %s\n", onset, seg );
if (first == 'L') {
    first = seg[1];
    low_tone++;
}
/*  Only use presence of Low Tone in English for BrO cases;
    otherwise use it anyway */
if (!BR_ONSET)
    code = (low_tone * 512);
else
    code = 0;
switch( first ) {
 case 'R': if (Japanese) {
            if (last_tok)
                strcat( onset, "616" );    /* R+N+L+? */
            else
                strcat( onset, "64" );
        }
        else {
            if (SON_STOP)
```

*FIG. 10*

```
               strcat( onset, "64" );     /* glottal stop */
             else
               strcat( onset, "0" );
           }
           break;
case 'h':  code += 128;
           itoa( code, code_str );       /* Stop Burst -> h */
           strncat( onset, code_str, 5 );
           break;
case 'O':  strcat( onset, "0" );
           break;
case 'F':  code += 8320;                 /* h Head (s, sh) */
           itoa( code, code_str );
           strncat( onset, code_str, 5 );
           if (HV_DEVOICED) {            /* fill in devoiced N */
             new_seg = get_next_token(seg_str, ct);   /* don't increment ct */
             if (new_seg[0] == 'S') {
                strcat( onset, "#N" );
                strncat( onset, syll, 2 );
                strcat( onset, "1;2066" );
             /* Only works for numbers lexicon: in general could be U or I */
             }
           }
           break;
case 'f':  code += 128;                  /* h operator */
           itoa( code, code_str );
           strncat( onset, code_str, 5 );
           break;
case 'Z':                                /* initial onsets with LowTone */
case '?':  strcat( onset, "192" );       /* special case of final ? */
           break;
case 'S':  /* printf( "\tCase S\n" ); */
           sec = seg[1];
           if (length > 1) {  /*((sec == 'h') || (sec == 'f') || (sec == 'F')) */
                                         /* S-F affricate */
             if ( strstr("h-Ff", ++seg) !=NULL )
                strcat( onset, "192" );           /* Glottal stop + h */
             else {
                if (seg[1] == '-')
                   strcat( onset, "192" );
                else
                   strcat( onset, "64" );
             }
           }
           else    /* length must = 1*/
             if (syl_ct == 1)  /* special case: could be empty onset */
                strcat( onset, "64" );
```

```
                    else
                        strcat( onset, "64" );
                    break;
            case 'N': /* must be the 2nd of 2 nuclei */
                    strcat( onset, "0" );
                    ct--;       /* decrement token counter so this token is re-used */
                    break;
            default: strcat( onset, "0" );
        }               /* end switch */
        if (BR_ONSET) {
            if ((first == 'S') || (first == 'f') || (seg[0] == 'L')) {
                                    /* Heads of Br. O */
                new_seg = get_next_token(seg_str, ct);
                if ( (new_seg[0] == 'R') || (new_seg[0] == 'O') ) {
                    branch = True;              /* & precedes stressed N */
                    ct++;
                }
            }
        }
        if (branch) {
            strcat( onset, "#0" );
            strncat( onset, syll, 2 );
            strcat( onset, "2;32" );  /* R element */
        }
        strcat( onset, "\0" );
        return( onset );
} const char *Coda_set = "RFfS";

char *build_rhyme( char *in_seg, char *seg_str, int syl_ct )
{
    /* rhyme strings are of the form: N0|1|;n where n is the element code;
       or N2;x;y where x, y are the element codes.
       0 < n,x,y < 7 */
    char        syll[3], first, second;
    char        *coda, *next_O, *rhyme,
            *seg;
    int pos=0, length = strlen(in_seg);

rhyme = (char *)calloc(12, sizeof(char));
    coda = (char *)calloc(MAXTOKLEN, sizeof(char));
    next_O = (char *)calloc(MAXTOKLEN, sizeof(char));
    seg = (char *)calloc(length+1, sizeof(char));

strncpy( seg, in_seg, length );
    if (debug)
```

/12

```
    printf( "\tIn build_rhyme:  seg = %s\n", seg );
itoa(syl_ct, syll);
rhyme[pos++] = 'N';
rhyme[pos++] = syll[0];
rhyme[pos++] = '1';
rhyme[pos++] = ';';

if (debug)
    printf( "\tIn build_rhyme:  seg = %s\n", seg );
first = seg[0];   /* always = N */
second = seg[1];  /* should be 0, 1 or 2 */
if (debug)
    printf( "\tIn build_rhyme: first=%c, second=%c\n", first, second );
switch (second) {
  case '0': rhyme[pos++] = '0';    /* use this for unstressed N */
            rhyme[pos] = '\0';
            break;
  case '1': rhyme[pos++] = seg[3];
            /* Now check for closed syllable: */
            if ((BR_RHYME) && (!last_tok)) {
              coda = get_next_token( seg_str, ct );
              if ( strchr(Coda_set, coda[0]) != NULL && coda[1] != 'h' ) { /*
possible Coda consonant */
                /* don't increment ct until we know there's a Coda */
                printf("\tPotential Coda consonant: checking next position: ");
                next_O = get_next_token(seg_str, ct+1);
                if ( licenses(next_O[0], coda[0]) ) {
                  ct++;
                  printf("Yes!\n");
                  rhyme[pos++] = '#';
                  rhyme[pos++] = 'R';
                  rhyme[pos++] = syll[0];
                  rhyme[pos++] = '2';    /* second position */
                  rhyme[pos++] = ';';
                  rhyme[pos++] = '\0';
                  switch (coda[0]) {
                    case 'R':
                    case 'S':
                        strcat(rhyme, "64");    /* Glottal */
                        break;
                    case 'F':
                    case 'f':
                        strcat(rhyme, "128");   /* h */
                        break;
                    default:
                        strcat(rhyme, "0");
                  }    /* end switch */
```

113

```c
            }
            else
                printf("No.\n");
        }   /* else do nothing */
        }
        else
         rhyme[pos] = '\0';      /* terminate the rhyme string */
        break;
  case '2': rhyme[pos++] = seg[3]; /* branching N */
        rhyme[pos++] = '#';
        rhyme[pos++] = 'N';
        rhyme[pos++] = syll[0];
        rhyme[pos++] = '2';        /* second position */
        rhyme[pos++] = ';';
        rhyme[pos++] = '0';
        rhyme[pos] = '\0';
        break;
    default: rhyme[pos++] = '0';   /* put something valid */
        rhyme[pos] = '\0';
        break;
}           /* end switch */
 return (rhyme);
} char *parse_seg_str( char *seg_str, char lang )
{
 char *segment,
      str[3],
      *onset, *rime,
      *out_str;
 int  syl_ct=1,
      pos = 0;
 short    all_done = 0;
/* Global:   int ct */ for (ct=0; ct<strlen(seg_str); ct++) {
      if (seg_str[ct] == '.')
      token_num++;
 }
 printf( "Number of tokens = %d\n", token_num );
 ct = 1;                /* No. of current token: start at 1 */
 out_str = (char *)calloc( 64, sizeof(char));
 segment = (char *)calloc(MAXTOKLEN, sizeof(char));
 onset = (char *)calloc(2 * MAXTOKLEN, sizeof(char));
 rime = (char *)calloc(2 * MAXTOKLEN, sizeof(char));

switch (lang) {
```

```
   case 'j':
   case 'J': Japanese = True;
           break;
   case 'K':
   case 'k': Korean = True;
           break;
   case 'g':
   case 'G': Greek = True;
           break;
   default: Default = True;
           break;
}
segment = get_next_token(seg_str, ct);
ct++;
if (debug) {
   printf("Back in parse_seg_str: segment is %s;", segment);
   printf("segment[0] is %c\n", segment[0]);
}
/* parse first O-R pair */
if ( segment[0] != 'N' ) {        /* initial Onset */
   /* str_cat( seg_str, "O11;" ); */
   onset = build_onset( segment, seg_str, syl_ct );
   strcat( out_str, onset );
   strcat( out_str, "#" );
   if (debug)
     printf("Back in parse_seg_str: out_str is %s\n", out_str);
   free( segment );
   segment = (char *)calloc(MAXTOKLEN, sizeof(char));
   segment = get_next_token(seg_str, ct);
   if (debug)
     printf("Back in parse_seg_str: segment is %s;", segment);
   if (segment[0] == 'N') {
      ct++;
      rime = build_rhyme( segment, seg_str, syl_ct );
      strcat( out_str, rime );
      strcat( out_str, "#" );
   }
   else   /* empty nuc will be handled by build_onset */
     if (debug)
        printf( "Ignoring empty nucleus.\n" );
}
else {         /* string begins with N: insert empty onset */
   strcat( out_str, "O11;0#" );   /* remember 3 = 0 for Icon's sake */
                                  /* changed to 0 : */
   rime = build_rhyme( segment, seg_str, syl_ct );
   strcat( out_str, rime );
   strcat( out_str, "#" );
```

114

```
                                                  115

}
if (debug)
   printf("Back in parse_seg_str: ct=%d; out_str is %s\n", ct, out_str);
if (ct > token_num)
   return( out_str );
syl_ct++;   /* = 2*/
while ( ct <= token_num ) {
   free( segment );
   segment = (char *)calloc(MAXTOKLEN, sizeof(char));
   segment = get_next_token(seg_str, ct);
   ct++;
   onset = build_onset( segment, seg_str, syl_ct );
   strcat( out_str, onset );
   strcat( out_str, "#" );
   if (ct <= token_num) {
      segment = get_next_token(seg_str, ct);
      if (segment[0] == 'N') {
         ct++;           /* increment token counter */
         rime = build_rhyme( segment, seg_str, syl_ct );
         strcat( out_str, rime );
         strcat( out_str, "#" );
      }    /* else: assume nucleus is handled by build_onset */
   }
   else {  /* last token used */
      if (DF_LEN) {    /* final empty nucleus */
         strcat( out_str, "N" );
         itoa(syl_ct, str);
         strcat( out_str, str );
         strcat( out_str, ";0#" );
      }
      else {            /* DF_LEN is False: language must be Japanese */
         switch (segment[0]) {
            case 'R': /* Japanese final eng */
                 strcat( out_str, "N" );
                 itoa(syl_ct, str);
                 strcat( out_str, str );
                 strcat( out_str, ";0#" );
                 break;
            case 'S':
            case 'F':
            case 'f':   /* Japanese devoiced /i/ */
                 strcat( out_str, "N" );
                 itoa(syl_ct, str);
                 strcat( out_str, str );
                 strcat( out_str, "1;2066#" );
                 break;
            default:
```

116

```
                break;
        } /* end switch */
    }
    }
    syl_ct++;
}
strcat( out_str, "\0" );
return (out_str);
}
```

```
/************************************************************************
*                        SPECTRUM.H                                     *
*                                                                       *
*     Header File containing routines for LPC spectral calculations     *
*     and curve plotting, using data from LSI files.                    *
*     Used by LPC.C and FINDUAI.C                                       *
*                                                                       *
*     Author:        G.Williams                                         *
*                                                                       *
*     All functions using SPECSIZE (and fstep which is                  *
*     dependent on it) are now independent of the value of SPECSIZE.    *
*     Everything is also independent of sampling rate.!!                *
*                                                                       *
*     Latest additions are curve updating routines used by FINDUAI.C    *
************************************************************************/
#include <stdio.h>
include <math.h> define WINDOWSIZE 200        /* was defined in LSIFILE.H */
/* #define STEPSIZE   50 */
#define SPECSIZE 256          /* Number of points in spectrum (0-6kHz in steps of
xHz) */
#define PI 3.14159
#define STARTFREQUENCY 100    /* Starting frequency for log frequency plot */
#define NORMALDB 40
#define sq( x )  ( ( x ) * ( x ) )

typedef     unsigned int      UINT;
typedef     unsigned long     ULONG;
typedef     unsigned int      BOOLEAN;

typedef struct {
            int  x;
            int  y;
} point;

typedef struct {
            float amp;        /* Amplitude in dB */
            UINT  f;          /* Frequency in Hz */
            UINT  peak_no;    /* Index of peak in array peaks[] */
} formant;

typedef struct {
      BOOLEAN    U0;
      BOOLEAN A1;
      BOOLEAN I0;
```

```
    BOOLEAN GS;
    BOOLEAN h0;
} E_type;

#if !defined(_debugfilename)
 extern char      *debugfilename /*= "D:\\LSISW\\DEBUG.TXT" */;
endif if !defined(_differenced)
 extern BOOLEAN   differenced;
#endif
/*extern    char   *ProgName = "Elemplot";
*/
extern      float  l_range /*= log10(Maxfrequency / STARTFREQUENCY)*/;
                   /* (usually) log (5000/100)=1.7 */
extern     point curve[2][SPECSIZE];     /* For storing curve coordinates */
int     fstep;                /* Frequency range / no. of spectral points */
float T;              /* Sampling period (1 / Sample Rate) */
float r = 1.0F;   /* Radius of unit circle for calculating spec */

UINT Maxfrequency;              /* Top limit of Frequency range for spectrum */
/* BOOLEAN  differenced; */
char window_name[12];
char window_label[25];
static     point curve_data[SPECSIZE];   /* For storing curve coordinates */
      /* Declared as static to avoid possible unwanted modification */
unsigned char *Title;       /* Title of plot */
/****************************************************************
*                  FUNCTION PROTOTYPES                          *
****************************************************************/
void  dump_spec ( float spec[SPECSIZE] );
void  replot_curve( point curve[], int colour );
/*
void  get_curve_data( int curve_name, long time );
void  update_curve( int c_name, float amplitude[2][SPECSIZE],
      float phase[2][SPECSIZE], float *y_max );
*/ void dump_spec ( float spec[SPECSIZE] )
{
 register int j;
 FILE       *fp;

if ( (fp = fopen("dumpspec.txt", "at")) != NULL ) {
    for (j=0; j<SPECSIZE; j++)
      fprintf(fp, "%f\t", spec[j]);
    fprintf(fp, "\n");
```

```c
    fclose( fp );
 }
 else {
       fprintf(stderr, "Error opening dumpspec.txt\n");
       exit(1);
 }
} void get_curve_data( int curve_name, long time )
/* Load array of spectral coordinates from global curve_data[SPECSIZE]
   into globals curve[0][SPECSIZE] (left) or curve[1][SPECSIZE] (rt).
   Curves can be replotted fast using replot_curve(curve, colour) below.
   Values are also stored in file D:\LSISW\DATA.TXT.
*/
{
 int xpos;
 register int ct;
 FILE *flist;
 char *fname;

if ( curve_name == 0 )
     fname = "Dataleft.txt";
 else
     fname = "Datart.txt";
 if ( (flist = fopen( fname, "wt" )) != NULL ) {
       fprintf( flist, "%s;\n", ProgName );
       curve[ curve_name ][0].x = curve_data[0].x ;
       curve[ curve_name ][0].y = curve_data[0].y ;
       ct = 1;
       while ( ct < SPECSIZE ) {
             xpos = curve_data[ct].x ;
             curve[ curve_name ][ct].x = xpos;
             curve[ curve_name ][ct].y = curve_data[ct].y ;
             fprintf( flist, "%d,%d\t", xpos, curve[ curve_name ][ct].y );
             ct++;
       }
       fclose( flist );
 /* The last pair of values in the output array should be 0,0. */
 }
 else {
       printf( "\Error opening DATA.TXT file.\n" );
 }
}
```

What is claimed is:

1. A machine-implemented process for recognition of a spoken word in an utterance, comprising the steps of:

receiving a speech signal containing the utterance;

detecting acoustic cues in the speech signal;

detecting, using the detected acoustic cues, the presence of one or more of a set of a small number of phonological elements, wherein a phonological element is a language independent atomic unit derived from one or more acoustic cues;

identifying, using the detected acoustic cues, a location of one or more sub-word units in the speech signal, each sub-word unit consisting of a pair of structural units, each structural unit having at most two positions to which a combination of one or more phonological elements may be associated;

associating each of the detected phonological elements with a position in one of the identified sub-word units and generating a representation of the spoken word in the speech signal indicating the sub-word units and the combination of phonological elements associated with each position in the sub-word units; and comparing the representation to a lexicon of predetermined representations of words to identify a best match, thereby recognizing the spoken word.

2. The process of claim 1, wherein the step of detecting acoustic cues comprises the steps of:

detecting voiced and voiceless regions in the speech signal;

detecting sonorant and nucleus regions in the voiced regions of the speech signal; and wherein the step of detecting presence of phonological elements, includes detecting phonological elements within each of any detected silence, fricative, sonorant and nucleus regions detected, and identifying each of the regions as defining either an onset or a rhyme.

3. The process of claim 1, further comprising the step of:

determining how the phonological elements associated with a position are combined to form a phonological expression according to language dependent constraints.

4. The process of claim 1, wherein the set of phonological elements consists of less than ten elements.

5. The process of claim 1, wherein the set of phonological elements includes at least A, I, U, N, H, L and ?.

6. The process of claim 1, wherein the pair of structural units is an onset-rhyme pair as defined according to the theory of government phonology.

7. The process of claim 1, wherein the structural units are defined by language dependent parameters.

8. An apparatus for recognition of a spoken word in an utterance, comprising:

means for receiving an speech signal containing the utterance;

means for detecting acoustic cues in the speech signal;

means for detecting, using the detected acoustic cues, the presence of one ore more of a set of a small number of phonological elements, wherein a phonological elements is a language independent atomic unit derived from one or more acoustic cues; and means for identifying, using the detected acoustic cues, a location of one or more sub-word units in the speech signal, each sub-word unit consisting of a pair of structural units, each structural unit having at most two positions to which a combination of one or more phonological elements may be associated;

means for associating each of the detected phonological elements with a position in one of the identified sub-word units and generating a representation of the spoken word in the speech signal indicating the sub-word units and the combination of phonological elements associated with each position in the sub-word units; and means for comparing the representation to a lexicon of predetermined representations of words, to identify a best match thereby recognizing the spoken word.

9. The apparatus of claim 8, wherein the means for detecting acoustic cues comprises:

means for detecting voiced and voiceless regions in the speech signal;

means for detecting sonorant and nucleus regions in the voiced regions of the speech signal; and wherein the means for detecting presence of phonological elements detects phonological elements within each of any detected silence, fricative, sonorant and nucleus regions, and identifies each of the detected regions as defining either an onset or a rhyme.

10. The process of claim 8, further comprising the step of:

determining how the phonological elements associated with a position are combined to form a phonological expression according to language dependent constraints.

11. The process of claim 8, wherein the set of phonological elements consists of less than ten elements.

12. The process of claim 8, wherein the set of phonological elements includes at least A. I, U, N, H, L and ?.

13. The process of claim 8, wherein the pair of structural units is an onset-rhyme pair as defined according to the theory of government phonology.

14. The process of claim 8, wherein the structural units are defined by language dependent parameters.

15. An apparatus for recognition of a spoken word in an utterance, comprising:

a phonological element and structure detector having an input for receiving a speech signal containing the utterance and an output providing a representation of the spoken word detected in the speech signal, wherein the representation comprises indications of at least one sub-word unit, each sub-word unit consisting of an a pair of structural units, each structural unit having at most two positions to which a combination of phonological elements may be associated, and indications of the combination of only phonological elements present in and associated with each position, wherein a phonological element is a language independent atomic unit derived from one or more acoustic cues and is either present or not at a point in time in the speech signal;

a lexicon of predetermined representations of words, and a lexical matching system having a first input for receiving the representation from the output of the phonological element and structure detector, a second input for receiving predetermined representations from the lexicon and an output providing an indication of the predetermined representation which best matches the representation output by the phonological element and structure detector.

16. The apparatus of claim 15, wherein the phonological element and structure detector comprises:

a phonetic classifier and segmenter having an input for receiving acoustic cues detected in the speech signal and an output for providing a string of tokens indicative of presence of phonological elements in the speech signal according to the detected acoustic cues; and a word parser having an input for receiving the string of tokens from the phonetic classifier and segmenter and which associates each detected phonological element with one of the structural units of a sub-word unit so as to provide the representation of the spoken word in the speech signal.

* * * * *